(12) United States Patent
Greaney et al.

(10) Patent No.: US 12,508,479 B2
(45) Date of Patent: Dec. 30, 2025

(54) SYSTEM AND METHOD FOR FORMING A GOLF CLUB HEAD HAVING A COMPOSITE FACE

(71) Applicant: Taylor Made Golf Company, Inc., Carlsbad, CA (US)

(72) Inventors: Mark Greaney, Vista, CA (US); Todd Beach, San Diego, CA (US); Stephen Kraus, Kaohsiung (TW); Connie Hsiao, Kaohsiung (TW); Tyson Hsiao, Kaohsiung (TW); Pei-Yao Lin, Kaohsiung (TW)

(73) Assignee: TAYLOR MADE GOLF COMPANY, INC., Carlsbad, CA (US)

( * ) Notice: Subject to any disclaimer, the term of this patent is extended or adjusted under 35 U.S.C. 154(b) by 351 days.

(21) Appl. No.: 18/172,834

(22) Filed: Feb. 22, 2023

(65) Prior Publication Data
US 2023/0249036 A1    Aug. 10, 2023

Related U.S. Application Data

(63) Continuation-in-part of application No. 17/321,315, filed on May 14, 2021, now Pat. No. 11,633,947.

(60) Provisional application No. 63/312,771, filed on Feb. 22, 2022.

(51) Int. Cl.
*B32B 41/00*    (2006.01)
*A63B 53/04*    (2015.01)

(52) U.S. Cl.
CPC ...... *A63B 53/0429* (2020.08); *A63B 53/0425* (2020.08)

(58) Field of Classification Search
CPC ............ A65B 53/0429; A65B 53/0445; A63B 53/0425; A63B 53/0466; A63B 2071/0694; A63B 2209/02; A63B 2209/023; B29C 70/46; B29L 2031/5227
USPC .................... 156/60, 64, 350, 351, 378, 379
See application file for complete search history.

(56) References Cited

U.S. PATENT DOCUMENTS

| | | |
|---|---|---|
| 8,012,039 B2 | 9/2011 | Greaney et al. |
| 10,881,916 B2 | 1/2021 | Greaney et al. |
| 2011/0083800 A1 | 4/2011 | Chao |
| 2012/0199282 A1 | 8/2012 | Chao |
| 2014/0251546 A1 | 9/2014 | Deguchi et al. |
| 2014/0274446 A1 | 9/2014 | Greaney et al. |

OTHER PUBLICATIONS

U.S. Appl. No. 17/156,205, filed Jan. 22, 2021.
U.S. Appl. No. 18/179,848, filed Mar. 7, 2023.

*Primary Examiner* — Michael N Orlando
*Assistant Examiner* — Joshel Rivera
(74) *Attorney, Agent, or Firm* — Kunzler Bean & Adamson

(57) ABSTRACT

A method of creating a multi-layer composite strike face of a golf club head includes positioning a first non-cluster panel. The method also includes creating and attaching a cluster panel to the first non-cluster panel, which includes attaching a first elongated strip to the first non-cluster panel at a first strip angle, attaching a second elongated strip to a portion of the first elongated strip and a portion of the first non-cluster panel at a second strip angle, and attaching a third elongated strip to a portion of the second elongated strip, and a portion of the first non-cluster panel at a third strip angle.

22 Claims, 48 Drawing Sheets

-18° ORIENTATION

0° ORIENTATION

+18° ORIENTATION

SYSTEM AND METHOD FOR FORMING A GOLF CLUB HEAD HAVING A COMPOSITE FACE

CROSS-REFERENCE TO RELATED APPLICATIONS

This application is a continuation-in-part of U.S. patent application Ser. No. 17/321,315, filed May 14, 2021, and claims the benefit of U.S. Provisional Patent Application No. 63/312,771, filed Feb. 22, 2022, which are incorporated herein by reference in their entirety.

FIELD

This disclosure relates generally to forming laminated structures made of fiber-reinforced polymers, and more particularly to forming a golf club head having a strike plate made of a composite material.

BACKGROUND

Laminated structures can be made from stacked plies of fiber-reinforced polymers. Commonly, each one of the stacked plies is made of an uncured pre-impregnated fiber-reinforced polymer. Uncured pre-impregnated fiber-reinforced polymers are used because they can be shaped into any of various shapes prior to curing. The stacked plies of uncured pre-impregnated fiber-reinforced polymer may have backing paper affixed to the plies to help prevent damage to or contamination of the uncured pre-impregnated fiber-reinforced polymer during transportation, storage, or handling of the plies. Before curing the plies, the backing paper is removed. However, removal of the backing paper in an efficient automated manner, without damaging the uncured pre-impregnated fiber-reinforced polymer, can be difficult due to the tackiness of the uncured pre-impregnated fiber-reinforced polymer and the thinness of the backing paper. Additionally, forming, handling, and processing such laminated structures, as well as assembling such laminated structures with other structures to form more complex structures, in a safe, efficient, and reliable manner can also be difficult.

SUMMARY

The subject matter of the present application has been developed in response to the present state of the art, and in particular, in response to the shortcomings of methods for forming laminated structures made of fiber-reinforced polymers. Accordingly, the subject matter of the present application has been developed to provide systems and associated methods, for forming a golf club head having a strike plate made of a composite material, that overcome at least some of the shortcomings of prior art techniques.

According to some examples, a method of creating a multi-layer composite strike face of a golf club head includes positioning a first non-cluster panel having a first panel perimeter, a first panel width, a first panel length, a first panel thickness, a first panel longitudinal axis, and a first panel transverse axis. The method also includes creating and attaching a cluster panel to the first non-cluster panel. Creating and attaching the cluster panel to the first non-cluster panel includes attaching a first elongated strip to the first non-cluster panel at a first strip angle relative to the first panel longitudinal axis, wherein the first elongated strip has a first strip width, a first strip length, a first strip thickness, and a first strip longitudinal axis. Creating and attaching the cluster panel to the first non-cluster panel also includes attaching a second elongated strip to a portion of the first elongated strip and a portion of the first non-cluster panel at a second strip angle relative to the first panel longitudinal axis, wherein the second elongated strip has a second strip width, a second strip length, a second strip thickness, and a second strip longitudinal axis. Creating and attaching the cluster panel to the first non-cluster panel additionally includes attaching a third elongated strip to a portion of the second elongated strip, and a portion of the first non-cluster panel at a third strip angle relative to the first panel longitudinal axis, wherein the third elongated strip has a third strip width, a third strip length, a third strip thickness, and a third strip longitudinal axis. The method further includes positioning and attaching a second non-cluster panel to a portion of the third elongated strip, a portion of the second elongated strip, a portion of the first elongated strip, and a portion of the first non-cluster panel, wherein the second non-cluster panel has a second panel perimeter, a second panel width, a second panel length, a second panel thickness, a second panel longitudinal axis, and a second panel transverse axis.

In some examples, a golf club face includes a first rough surface and a second rough surface. A roughness of the first rough surface is greater than a roughness of the second rough surface. The golf club face also includes a protective layer covering at least a portion of the first rough surface. The protective coating is capable of preventing an adhesive from touching the first rough surface.

According to certain examples, a method for making a component of a golf club head includes retaining a component of the golf club head to a mold. The component includes first retention features. The mold includes second retention features. Retaining the component of the golf club head to the mold includes engaging each one of the first retention features to a corresponding one of the second retention features.

In some examples, a method of creating a multi-layer composite face includes positioning a first non-cluster panel having a first panel perimeter, a first panel width, a first panel length, a first panel thickness, a first panel longitudinal axis, and a first panel transverse axis. The method also includes creating and attaching a second non-cluster panel to the first non-cluster panel, wherein the second non-cluster panel has a second panel perimeter, a second panel width, a second panel length, a second panel thickness, a second panel longitudinal axis, and a second panel transverse axis. The method additionally includes creating and attaching a cluster panel to the second non-cluster panel, which includes attaching a first elongated strip to the second non-cluster panel at a first strip angle relative to the second panel longitudinal axis, wherein the first elongated strip has a first strip width, a first strip length, a first strip thickness, and a first strip longitudinal axis. Creating and attaching a cluster panel to the second non-cluster panel also includes attaching a second elongated strip to a portion of the first elongated strip and a portion of the second non-cluster panel at a second strip angle relative to the first panel longitudinal axis, wherein the second elongated strip has a second strip width, a second strip length, a second strip thickness, and a second strip longitudinal axis. Creating and attaching a cluster panel to the second non-cluster panel further includes attaching a third elongated strip to a portion of the second elongated strip, and a portion of the second non-cluster panel at a third strip angle relative to the first panel longitudinal axis, wherein the third elongated strip has a third strip width, a third strip length, a third strip thickness, and a third strip longitudinal axis, wherein the cluster panel forms a rear surface of the multi-layer composite face.

According to certain examples, a method of creating a multi-layer composite face includes positioning a first non-cluster panel having a first panel perimeter, a first panel width, a first panel length, a first panel thickness, a first panel longitudinal axis, and a first panel transverse axis. The method also includes creating and attaching a cluster panel to the first non-cluster panel, which includes attaching a first elongated strip to the first non-cluster panel at a first strip angle relative to the second panel longitudinal axis, wherein the first elongated strip has a first strip width, a first strip length, a first strip thickness, and a first strip longitudinal axis. Creating and attaching a cluster panel to the second non-cluster panel further includes attaching a second elongated strip to a portion of the first elongated strip and a portion of the first non-cluster panel at a second strip angle relative to the first panel longitudinal axis, wherein the second elongated strip has a second strip width, a second strip length, a second strip thickness, and a second strip longitudinal axis. Creating and attaching a cluster panel to the second non-cluster panel additionally includes attaching a third elongated strip to a portion of the second elongated strip, and a portion of the first non-cluster panel at a third strip angle relative to the first panel longitudinal axis, wherein the third elongated strip has a third strip width, a third strip length, a third strip thickness, and a third strip longitudinal axis, wherein the cluster panel forms a rear surface of the multi-layer composite face.

In certain examples, a method of removing a backing layer from a panel, made of an uncured pre-impregnated fiber-reinforced polymer, is disclosed. The backing layer is secured to, via a tack force between the backing layer and the uncured pre-impregnated fiber-reinforced polymer, and flush against a broad surface of the panel. The method includes orienting the panel into a backing-separation orientation relative to an edge-engagement tool and positioning the panel into a backing-separation position relative to the edge-engagement tool. The method also includes moving the edge-engagement tool, relative to the panel and when the panel is in the backing-separation orientation and the backing-separation position, so that backing-engagement features of the edge-engagement tool engage the backing layer, at only an edge portion of the backing layer, and just the edge portion of the backing layer separates from the panel. The method additionally includes gripping the backing layer, after the edge portion separates from the panel, and, when gripped, moving the backing layer relative to the panel so that an entirety of the backing layer separates from the panel. The edge-engagement tool includes a plate, and the backing-engagement features include a plurality of protrusions protruding from the plate. The step of moving the edge-engagement tool includes reciprocating the plate along a plane, angled at a plate angle relative to the panel and parallel with a leading edge of the edge portion, when the panel is oriented in the backing-separation orientation and positioned in the backing-separation position, so that only the plurality of protrusions of the plate engage only the edge portion of the backing layer when the plate moves along the plane.

According to some examples, a strike-plate preform for manufacturing a golf club head includes a variable thickness and a base surface that defines a bulge and a roll of a strike face of the golf club head. The preform also includes a first layer of paint applied onto the base surface over a first surface area of the base surface, and a second layer of paint applied onto at least one of the base surface and the first layer of paint. The second layer of paint is applied over a second surface area of the base surface. The preform additionally includes a third layer of paint applied onto at least one of the base surface, the first layer of paint, or the second layer of paint. The second layer of paint is applied over a third surface area of the base surface, and each one of the first surface area and the second surface area is larger than the third surface area. The preform also includes a polymer coating applied over the base surface, the first layer of paint, the second layer of paint, and the third layer of paint. The polymer coating defines an exterior surface of the strike-plate preform and the polymer coating includes a plurality of peaks and troughs formed in the exterior surface. The plurality of peaks and troughs define a surface roughness of the exterior surface of the strike-plate preform with an Ra value between, and inclusive of, 2.5 $\mu$m and 5 $\mu$m. The strike-plate preform defines a strike face of the golf club head. The strike face has a fourth surface area, which is less than the first surface area and the second surface area. The polymer coating has a variable thickness and a maximum thickness between 0.2 mm and 1.2 mm.

The described features, structures, advantages, and/or characteristics of the subject matter of the present disclosure may be combined in any suitable manner in one or more examples and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example or implementation. In other instances, additional features and advantages may be recognized in certain examples and/or implementations that may not be present in all examples or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings, which are not necessarily drawn to scale, depict only certain examples of the subject matter and are not therefore to be considered to be limiting of its scope, the subject matter will be described and explained with additional specificity and detail through the use of the drawings, in which.

DETAILED DESCRIPTION

Figure 1:
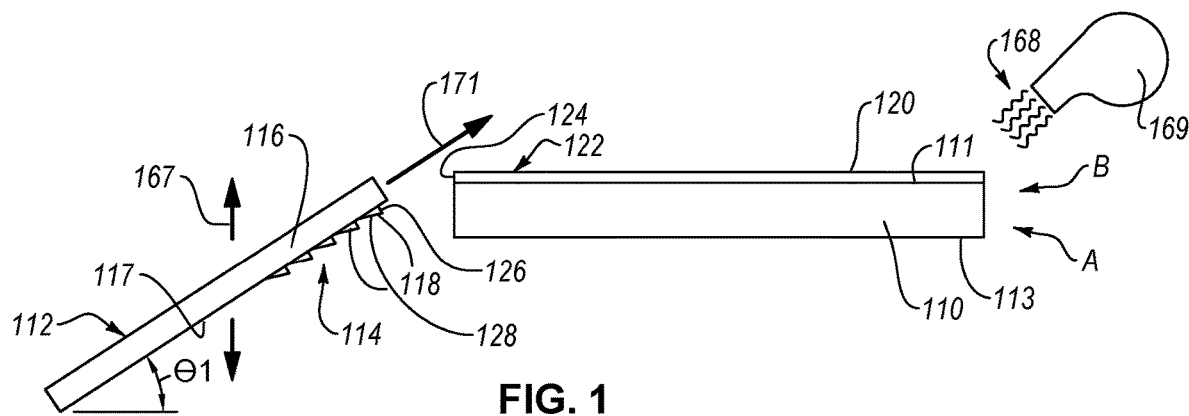
FIG. 1 is a schematic side elevation view of an edge-engagement tool of an automated system for removing a backing layer from a panel, shown with the edge-engagement tool in a first stage of motion, according to one or more examples of the present disclosure.

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

Laminated structures, made from layers of uncured pre-impregnated fiber-reinforced polymer, can be difficult to make. Sometimes, the difficulty with making such laminated structures stems from the preparation, handling, and assembly of the layers of uncured pre-impregnated fiber-reinforced polymer. Disclosed herein is a system and method of manufacture that overcomes many of the difficulties associated with the manufacture of laminated structures. For example, the system and method of manufacture disclosed herein can be an automated system and method of manufacture that provides an efficient way to automatedly remove a backing layer from a panel made of uncured pre-impregnated fiber-reinforced polymer. The efficient removal of the back layer enables automated stacking of multiple panels in an efficient and precise manner. As an additional example, the automated system and method of manufacture promotes the efficient and precise automated stacking of multiple strips of uncured pre-impregnated fiber-reinforced polymer at different angles to form a panel. Further, in some examples, the automated system and method of manufacture disclosed herein provides an efficient and precise way to automatedly manufacture a striking plate of a golf club head.

According to some examples, the automated system 100 of the present disclosure includes an edge-engagement tool 112 and a gripper 130. Referring to FIGS. 1-8 and 15-18, in certain examples, the edge-engagement tool 112 is configured to promote partial removal of a backing layer 120 from a panel 110 (e.g., a first panel), such as in an automated manner. As shown in FIGS. 9-12 and 19-21, the gripper 130 is configured to promote full removal of the backing layer 120 from the panel 110. Accordingly, as used in the claims, removal of the backing layer 120 can mean partial removal or full removal.

The panel 110 is made of an uncured pre-impregnated fiber-reinforced polymer. As used herein, an uncured pre-impregnated fiber-reinforced polymer is a material that includes fibers embedded in a polymer matrix, where the polymer matrix is curable, and may be partially cured, but is not fully cured, such as with so-called B-stage pre-preg, and may be a thermoset variation or a thermoplastic variation. In other words, the polymer matrix of the uncured pre-impregnated fiber-reinforced polymer can be partially cured or where some chemical reaction has started, which helps to provide some rigidity compared to a polymer matrix in a liquid or flowable state, but the polymer matrix is not yet fully cured where the chemical reaction has completed. Accordingly, as used herein, when used to describe a cured state of the pre-impregnated fiber-reinforced polymer, uncured means not fully cured or, at most, partially cured. Thus, a partially cured polymer matrix is in a cured state between a state without any curing (e.g., A stage), where the polymer matrix is in a liquid or flowable form and has not undergone any chemical reaction, and fully cured, where the polymer matrix is in a rigid form and has undergone a complete chemical reaction. The polymer matrix, being partially cured, is pliable, easily deformable, tacky, and handleable such that the fibers can be held in place by the polymer matrix and the pre-impregnated fiber-reinforced polymer can be shaped into a desired shape prior to a final cure of the polymer matrix. In certain examples, after the polymer matrix, which can be a thermoset epoxy or resin, is cured or hardened, the fiber-reinforced polymer becomes stiff, unpliable, and non-tacky. In some examples, the epoxy can be any of various type of epoxy and the fibers can be any of various fibers, such as carbon fibers, glass fibers, and the like. In certain examples, the volume fraction of fibers, of the uncured pre-impregnated fiber-reinforced polymer, is 50%, and the weight fraction of the epoxy, of the uncured pre-impregnated fiber-reinforced polymer, is 45%.

Figure 23:
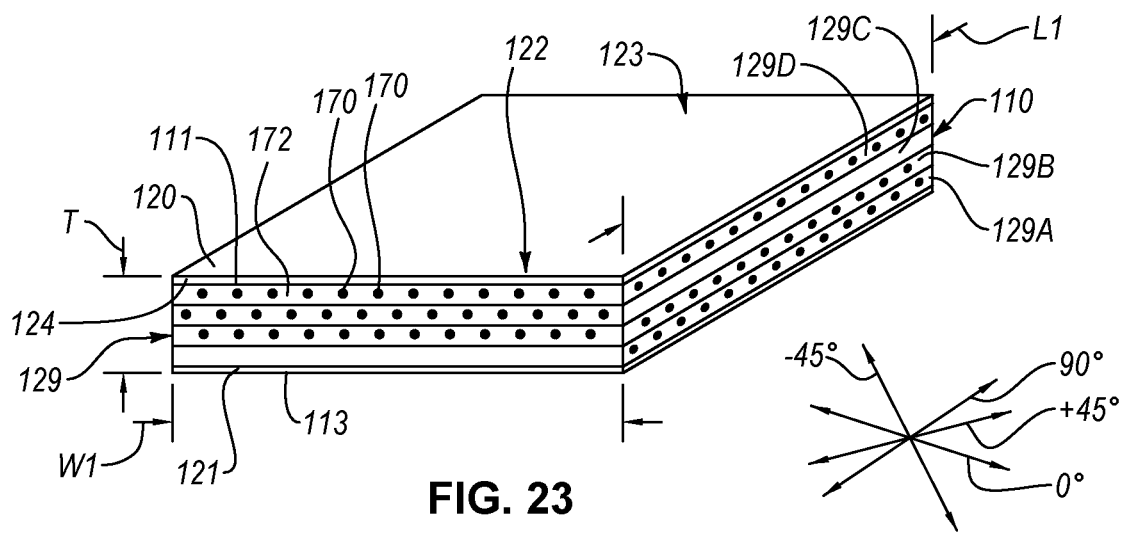
FIG. 23 is a schematic isotropic view of a panel, according to one or more examples of the present disclosure.

Referring to FIG. 23, one example of a panel 110 is shown. The panel 110 is made of a pre-impregnated fiber-reinforced polymer. More specifically, the panel 110 includes unidirectional fibers 170 embedded in a polymer matrix 172.

Although, in certain examples, the panel 110 includes no more than one ply, in other examples, the panel 110 includes a plurality of plies 129, and the panel 110 composed of a single ply or a plurality of plies 129 may be referred to as a non-cluster panel. Each one of the plies 129 is made of the pre-impregnated fiber-reinforced polymer. Accordingly, the unidirectional fibers 170 of each one of the plies 129 are continuous and parallel to each other. The plies 129 of the panel 110 are stacked together in a stacked arrangement (e.g., form a stack of plies). Because the polymer matrix of the plies 129 is only partially cured, the plies 129 of the panel 110 are coupled together or maintained in the stacked arrangement via the tackiness of the polymer matrix. As used herein, the adhesive force, generated by the tackiness of the polymer matrix, that couples the plies 129 of the panel 110 together, that couples multiple panels together, and that couples the backing layer 120 to a ply 129 is known as a tack force. More specifically, the tack force that adhesively bonds together plies or panels is considered a panel-to-panel tack force, and the tack force that adhesively bonds a backing layer to a ply or a panel is considered a backing-to-panel tack force.

The plies 129 of a given panel 110 can be arranged relative to each other such that the unidirectional fibers 170 of a given ply 129 are parallel to or angled relative to the unidirectional fibers 170 of an adjacent one of the plies 129. In one example, the plies 129 of the panel 110 are arranged relative to each other such that the unidirectional fibers 170 of all the plies 129 of the panel 110 are unidirectional, parallel to each other, or extend in the same direction. However, in other examples, the plies 129 of the panel 110 are arranged relative to each other such that the unidirectional fibers 170 of any one of the plies 129 are angled relative to any other one of the plies 129.

Figure 32:
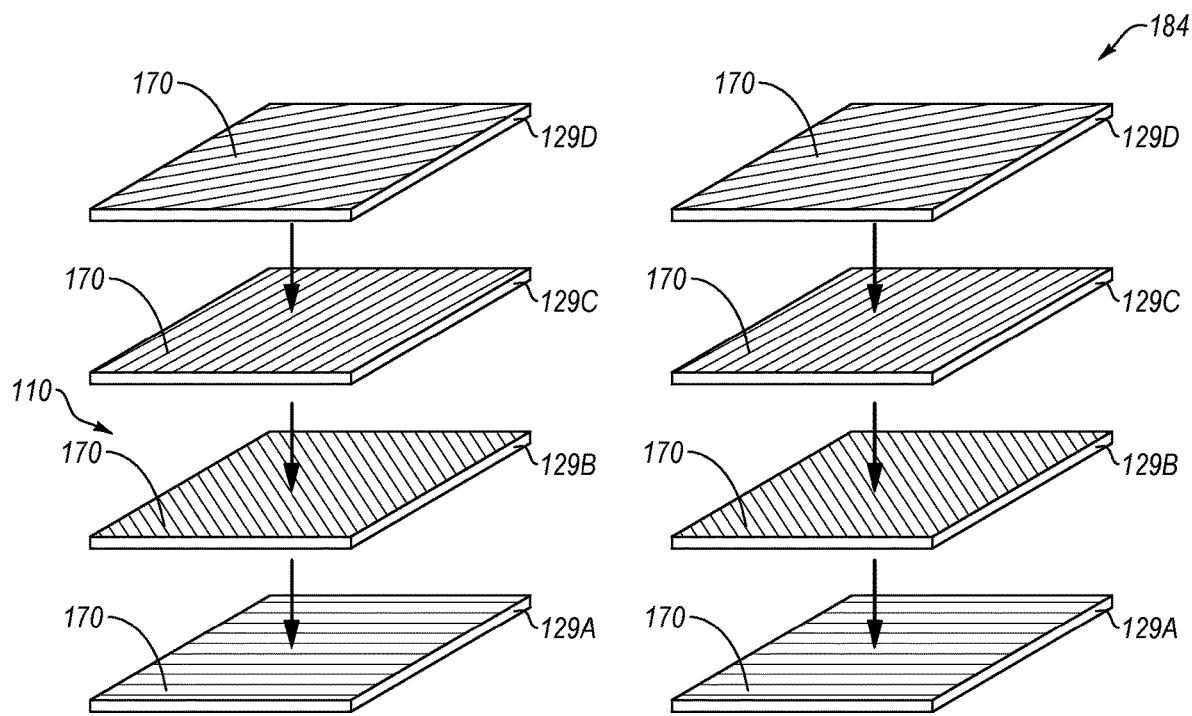
FIG. 32 is a schematic, isotropic view of multiple plies being stacked to form a first panel and multiple plies being stacked to form a second panel, according to one or more examples of the present disclosure.

In the illustrated example of FIGS. 23 and 32, the panel 110 includes four plies 129. The four plies 129 of the panel 110 of FIGS. 23 and 32 include a first ply 129A, a second ply 129B, a third ply 129C, and a fourth ply 129D. The unidirectional fibers 170 of the first ply 129A are orientated at 0°, the unidirectional fibers 170 of the second ply 129B are orientated at +45°, relative to the unidirectional fibers 170 of the first ply 129A, the unidirectional fibers 170 of the third ply 129C are orientated at 90°, relative to the unidirectional fibers 170 of the first ply 129A, and the unidirectional fibers 170 of the fourth ply 129D are orientated at −45°, relative to the unidirectional fibers 170 of the first ply 129A.

As used herein, a panel 110 having the ply arrangement shown in FIG. 23 is one example of a quasi-isotropic panel. Moreover, the panel 110 of FIG. 23 is non-symmetric relative to a midplane that is parallel with the broad surfaces of the plies and separates the panel 110 into two halves. Although the plies 129 of the panel 110 shown in FIGS. 23 and 32 have a [0°, +45°, 90°, −45°] layup configuration, in other examples, the layup configuration can be different, such as [0°, 90°, +45°, −45°]. It is recognized that the particular layup of the panel 110 in FIGS. 23 and 32 ensures the fibers of adjacent plies are not angled more than 45° relative to each other, which helps to improve strength and performance of the panel. According to some examples, the plies 129 of the panel 110 can have yet a different layup configuration, such as including a ply with unidirectional fibers 170 oriented at +60° and a ply with unidirectional fibers 170 orientated at −60°, relative to a ply with unidirectional fibers 170 oriented at 0°. In other words, in view of the foregoing, the panel 110 of the present disclosure can have one ply or any number of stacked plies with fibers at any of various orientations relative to each other. The relative orientation of the fibers of the plies corresponds with a desired directional stiffness (e.g., x-axis stiffness or y-axis stiffness) and desired level of stiffness in such directions of the panel 110.

Although the unidirectional fibers 170 from ply to ply may not be parallel, the plies 129 of the panel 110 of the example shown in FIG. 23 are aligned. The plies 129 are aligned because the outer peripheral edges of the plies 129 are aligned or flush. As used herein, with regard to the alignment of plies 129, the peripheral edges of the plies 129 are flush when corresponding edges of the plies are substantially co-planar. Because the plies 129 are aligned, a thickness T of the panel 110 is constant or the same at any location on the panel 110.

Figure 24:
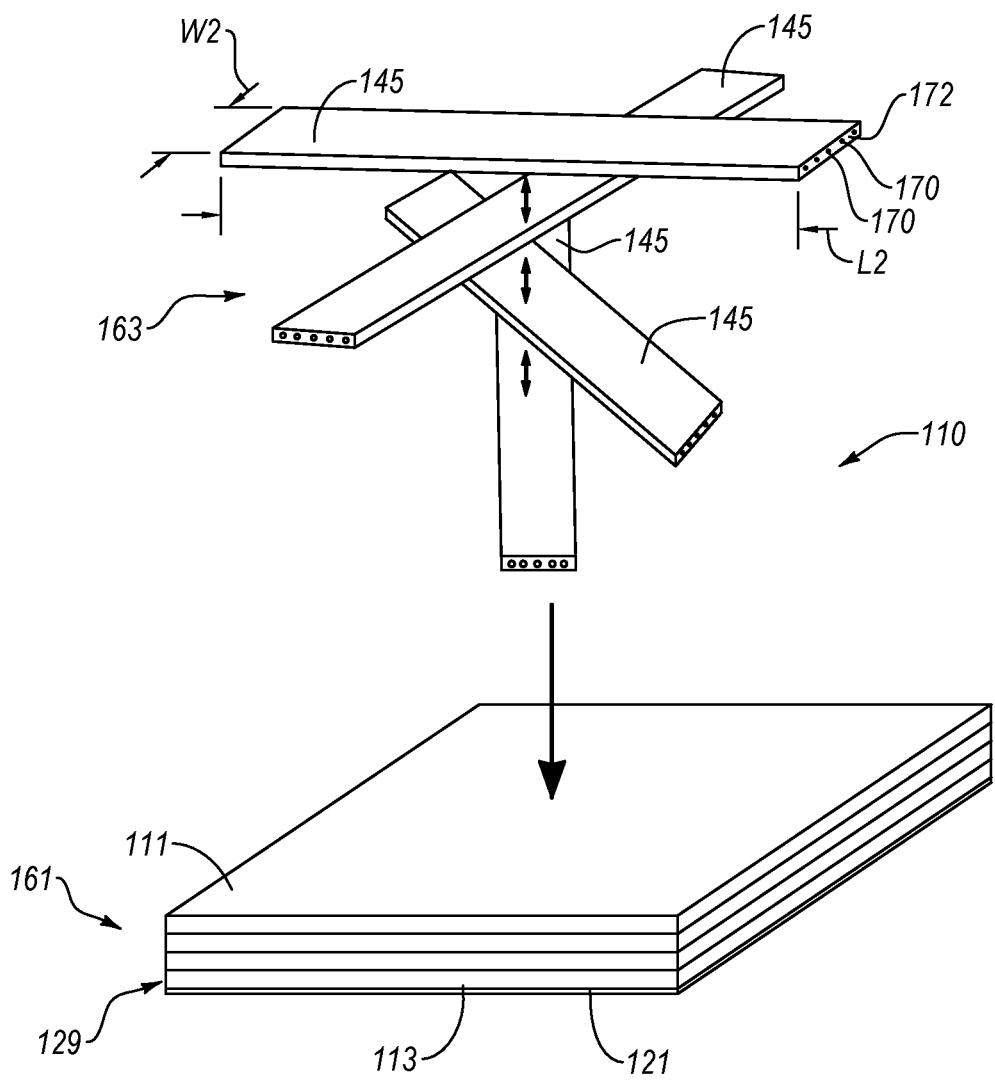
FIG. 24 is a schematic, isotropic, exploded view of a panel, according to one or more examples of the present disclosure.
Figure 26:
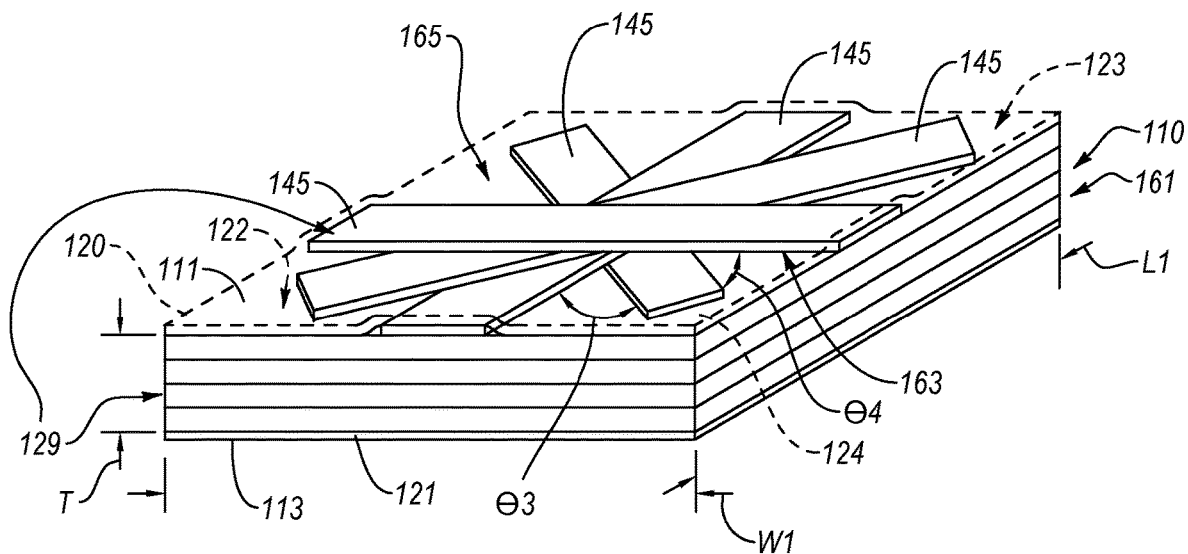
FIG. 26 is a schematic, isotropic view of a panel, according to one or more examples of the present disclosure.
Figure 27:
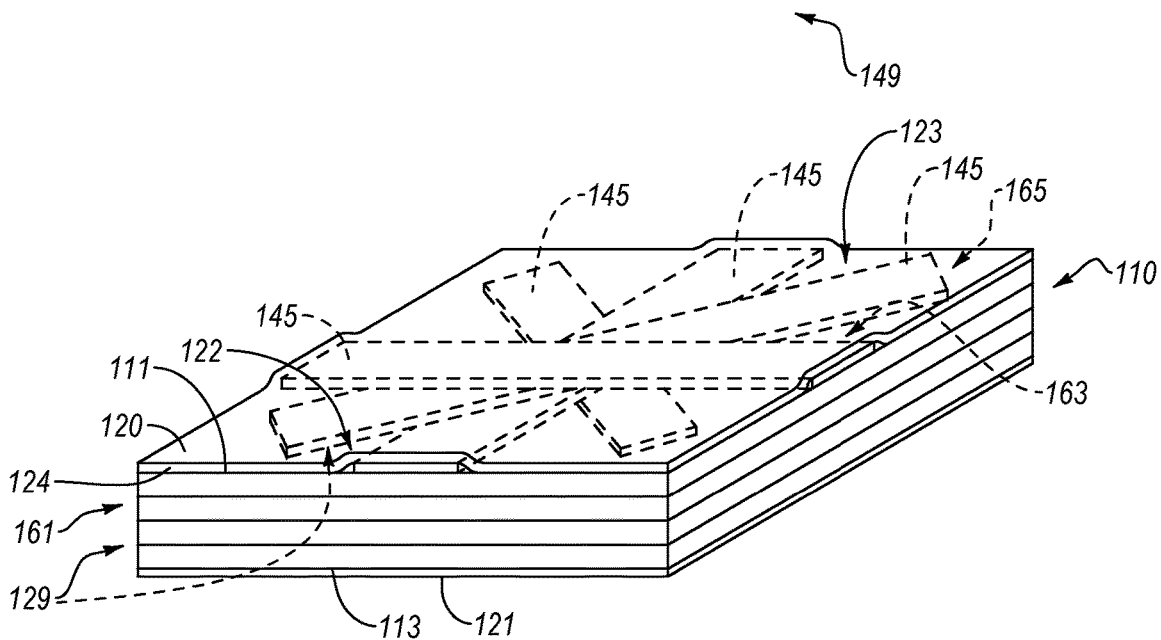
FIG. 27 is a schematic, isotropic view of the panel of FIG. 26, according to one or more examples of the present disclosure.

Referring to FIGS. 24, 26, and 27, in some examples, the panel 110 is considered a cluster panel because the panel 110 includes a cluster 165 of elongated strips 145. The cluster 165, also referred to as a cluster panel, is stacked onto aligned plies, or continuous full-face ply or plies, like that shown in FIG. 23, to form the panel 110, or the cluster 165 may form the panel 110 via the elongated strips 145 being spaced to eliminate voids between elongated strips 145, which is easy to imagine with reference to FIG. 26 with wider elongated strips 145 and/or more elongated strips 145, and thus in some embodiments eliminating the full face ply, or plies. Thus, references to panel 110 throughout does not exclude panels 110 constructed entirely of elongated strips 145 without containing a single continuous ply or plies. Additionally or alternatively, the panel also referred to as a non-cluster panel may be formed from multiple Quasi or Qs stacked on top of one another, or the panel could be an injection molded panel using a thermo-plastic and fiber reinforced or graphene reinforced or both. The quasi-isotropic panels may also use a thermoplastic resin or thermoset resin. The cluster 165 defines a second stack 163 of the panel 110 and the aligned plies define a first stack 161 of the panel 110. Therefore, the plies 129 of the second stack 163 are the elongated strips 145. The elongated strips 145 are made of an uncured pre-impregnated fiber-reinforced polymer. Moreover, as shown in FIG. 24, each one of the elongated strips 145 is elongated along a length L2 of the elongated strip 145, which can be the same as or less than a length L1 of the first stack 161 (i.e., a length L1 of the panel 110). Accordingly, each one of the elongated strips 145 has a length L2 that is greater than a width W2 of the elongated strip 145. The unidirectional fibers 170 of each one of the elongated strips 145 extend parallel to the length L2 of the elongated strip 145. The elongated strips 145 are considered strips because the width W2 of each one of the strips 145 is smaller than a width W1 of the first stack 161 of the panel 110 (i.e., a width W1 of the panel 110) onto which the elongated strips 145 are stacked to form the panel 110. According to some examples, the width W2 of each one of the elongated strips 145 is the same. However, in other examples, the width W2 of at least one of the elongated strips 145 can be different than the width W2 of at least another one of the elongated strips 145.

In certain examples, the elongated strips 145 are stacked onto the first stack 161 such that a center (or midpoint) of each one of the elongated strips 145 is centered on the first stack 161. Accordingly, the cluster 165 or second stack 163 is centered on the first stack 161 in some examples. However, although the elongated strips 145 of the cluster 165 are centered on the first stack 161, the elongated strips 145 are angled relative to each other such that the elongated strips 145 are considered misaligned. More specifically, the elongated strips 145 are misaligned because the outer peripheral edges of the plies 129 are not aligned or not flush. Each one of the elongated strips 145 is angled at a cluster angle θ3, relative to a first adjacent one of the elongated strips 145, and at a cluster angle θ4, relative to a second adjacent one of the elongated strips 145. In some examples, the cluster angle θ3 is different than the cluster angle θ4. According to one example, the cluster angle θ3 is 35° and the cluster angle θ4 is 55°. However, in other examples, the cluster angle θ3 is the same as the cluster angle θ4. According to one example, in which the cluster 165 has four elongated strips 145, both the cluster angle θ3 and the cluster angle θ4 are 45°. In an alternative example, such as when the cluster 165 has eight elongated strips 145, both the cluster angle θ3 and the cluster angle θ4 are 22.5°. Accordingly, in some examples, the cluster 165 forms a symmetrical star shape centered on the first stack 161.

Figure 30A:
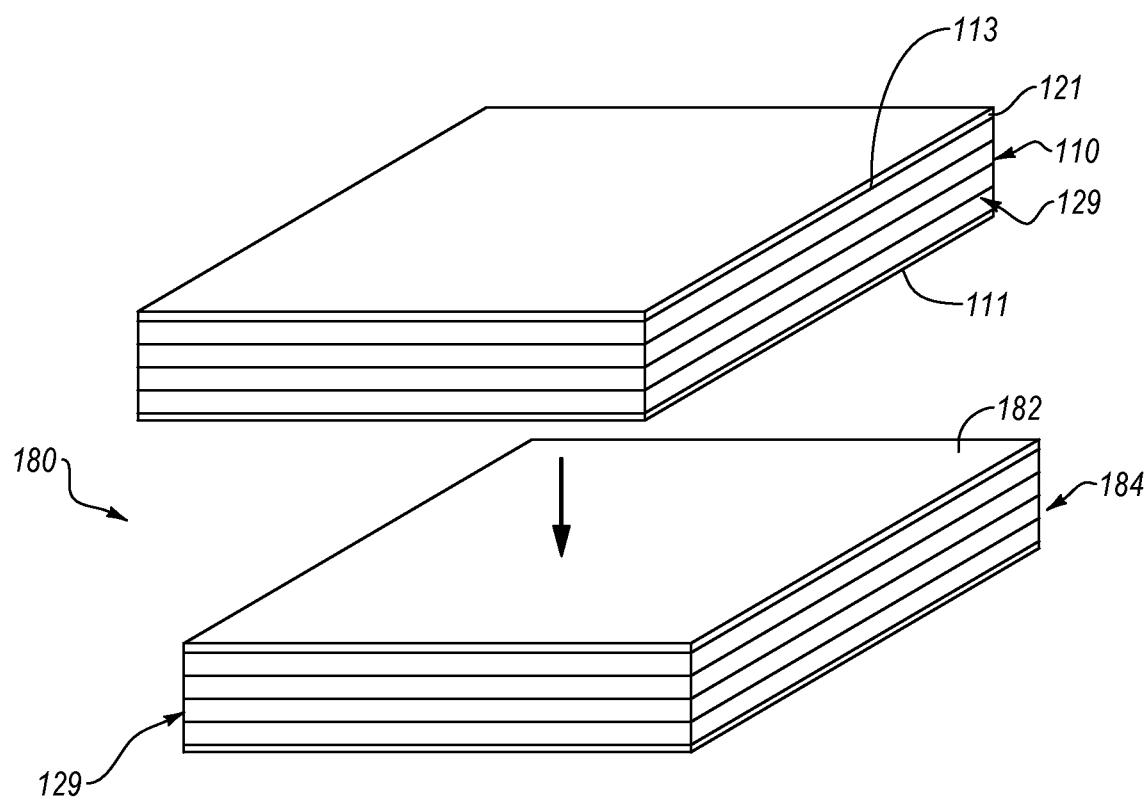
FIG. 30A is a schematic, isotropic view of a first panel being stacked onto a second panel, according to one or more examples of the present disclosure.
Figure 30B:
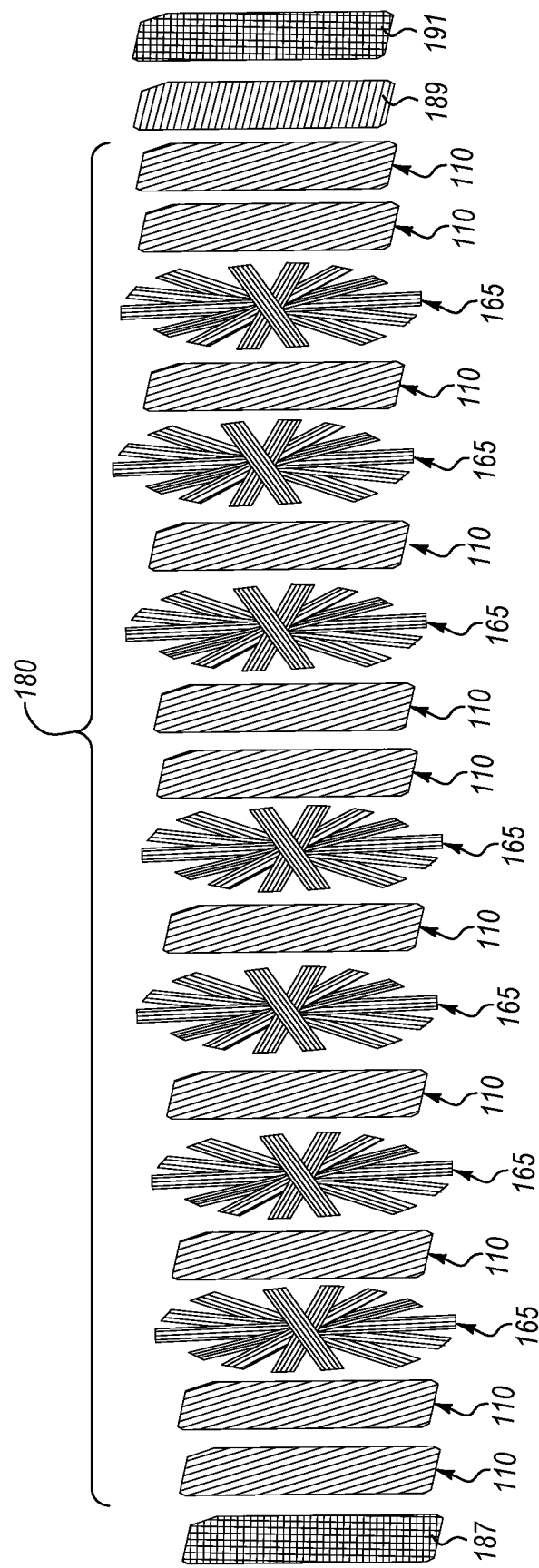
FIG. 30B is a schematic, isotropic, exploded view of a laminated structure, according to one or more examples of the present disclosure.

Although the cluster 165 of FIGS. 26 and 27 includes four elongated strips 145, in other examples, such as shown in FIG. 30B, the cluster 165 includes more than four elongated strips 145. In one particular example, the cluster 165 includes seven elongated strips 145.

Alternatively, in some examples, the elongated strips 145, while partially overlapping each other, are not all centered on the first stack 161. In such examples, the cluster 165 may not be symmetrical, but may have any of various non-symmetrical shapes dictated by the angles and positioning of the elongated strips 145 relative to each other. Alternatively, although the elongated strips 145 are not centered on the first stack 161f, the cluster 165 may nevertheless be symmetrical about the center of the first stack. For example, referring to FIG. 30C, the elongated strips 145 are applied onto the broad surface 111 of a first stack 161 of a panel 110 at locations that are offset from a center of the first stack 161. In this manner, the cluster 165, which forms a second stack 163, can help to increase a thickness of a strike plate along a perimeter of a strike plate 243 (indicated virtually by an outline on the panel 110).

For each cluster 165, only portions of the elongated strips 145 overlap each other. Because the elongated strips 145 are misaligned on the first stack 161, a thickness T of a cluster panel is different at different locations across the cluster panel. In other words, a cluster panel, such as shown in FIGS. 26 and 27, has a variable thickness. For some clusters 165, such as symmetrical clusters, the thickness of the cluster 165 varies away from an axis-of-symmetry or center of the cluster 165, but is the same at multiple locations that are the same distance away from the center of the cluster 165, such as with a cone or conical frustum. However, for other clusters 165, such as non-symmetrical clusters, the thickness of the cluster 165 can vary such that different locations that are the same distance away from a center of the cluster 165 having different thicknesses.

Figure 25:
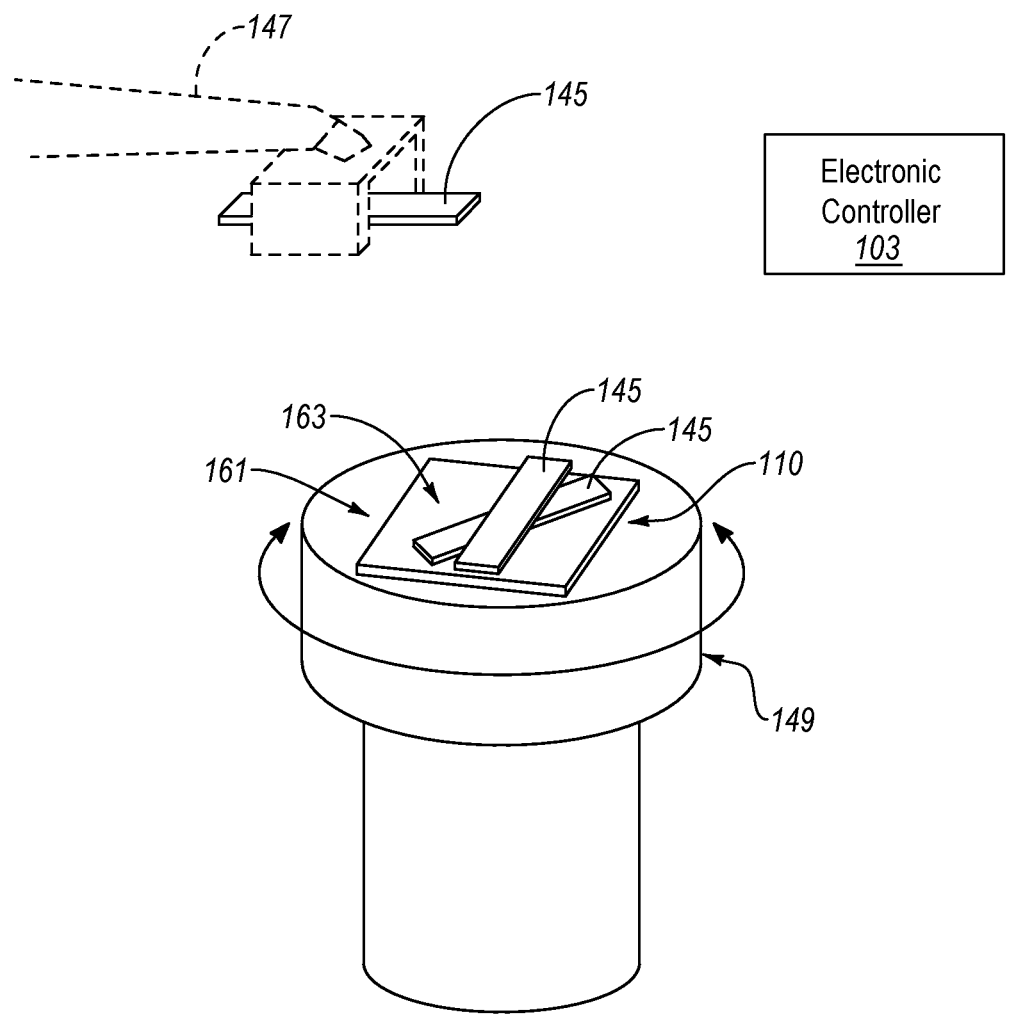
FIG. 25 is a schematic, isotropic view of a robotic arm and rotatable platform of an automated system for forming a panel, according to one or more examples of the present disclosure.

In some examples, the elongated strips 145 are laid up on the first stack 161 via an automated process. For example, as shown in FIG. 25, the automated system 100 can further include a robotic arm 147 and a rotatable platform 149. The robotic arm 147 is configured to grasp and maintain an orientation of an elongated strip 145. With the elongated strip 145 maintained in a given orientation, the robotic arm 147 is translationally movable relative to the rotatable platform 149 to apply the elongated strip 145 onto the first stack 161, when the first stack 161 is supported on the rotatable platform 149. After one of the elongated strips 145 is applied onto the first stack 161, the rotatable platform 149 rotates a predetermined amount (corresponding to a desired angular difference between the elongated strips 145) and the robotic arm 147 applies another elongated strip 145 onto the previously applied elongated strip 145 and the first stack 161. Rotation of the rotatable platform 149 is computer controlled, which helps to ensure the relative orientations of, or angular differences between, the elongated strips 145, applied onto each other and the first stack 161, are within a predetermined minimal tolerance of the desired angular differences between the elongated strips 145.

According to certain examples, the automated system 100 supplies a continuous length of uncured pre-impregnated fiber-reinforced material, such as from a roll, to the robotic arm 147. In one example, the robotic arm 147 grasps an end portion of the continuous length of material and, while grasped, a cutter of the automated system 100 cuts the material to a length corresponding with the elongated strip 145, thus forming the elongated strip 145. Alternatively, in another example, the continuous length of material is cut, by a cutter of the automated system 100, to the length corresponding with the elongated strip 145, before the robotic arm 147 grasps the elongated strip 145. In either example, the automated system 100 enables cutting of a continuous length of uncured pre-impregnated fiber-reinforced material into elongated strips 145 concurrently or near concurrently with grasping the material by the robotic arm 147. In this manner, the elongated strips 145 can be cut from a continuous length of material and applied onto the panel 110 in a continuous automated process.

In view of the foregoing, the panels 110 of the present disclosure, in some examples, can be the same as or similar to the panels disclosed in U.S. Patent Application Publication No. 2012/0199282, published Aug. 9, 2012, which is incorporated herein by reference. The panel 110 of the present disclosure, in some examples, is flat and has a generally rectangular outer peripheral shape. However, in other examples, the panel 110 can be contoured and/or have an outer peripheral shape other than rectangular, such as square, triangular, polygonal, and the like.

Whether a quasi-isotropic panel (Qs) or a cluster panel (Cs), the panel 110 of the present disclosure includes a first broad surface 111 (e.g., a first-panel broad surface) and a second broad surface 113 (e.g., a second first-panel broad surface), opposite the first broad surface 111. The first broad surface 111 is a first outward-facing surface or surfaces of the ply or plies 129 of the panel 110 not tack bonded to another ply 129 of the panel 110. The second broad surface 113 is a second outward-facing surface or surfaces of the ply or plies 129 of the panel not tack bonded to another ply 129 of the panel 110 and facing a direction opposite that of the first outward-facing surface or surfaces. The first broad surface 111 and the second broad surface 113 are considered broad surfaces because they are parallel to a width and length of the panel and perpendicular to a thickness of the panel, where the thickness of the panel is smaller than the width or the length of the panel. The first broad surface 111 or the second broad surface 113 can include the outwardly-facing surface of a single ply 129, such as with the quasi-isotropic panel of FIG. 23. Alternatively, the first broad surface 111 or the second broad surface 113 can include the outwardly-facing surfaces of multiple plies 129, such as the outwardly-facing surface of an outer ply 129 of the first stack 161 and the multiple outwardly-facing surfaces of the elongated strips 145 of the second stack 163 of the cluster panel of FIGS. 26 and 27. Accordingly, a broad surface of the panel 110 need not be a single surface.

Referring to FIGS. 23, 26, and 27, a backing layer 120 is secured to and substantially flush against one or both of the first broad surface 111 and the second broad surface 113 of the panel 110. As used herein, with regard to the coupling between the backing layer 120 and a broad surface of the panel 110, flush means directly abutting or immediately adjacent. Moreover, the backing layer 120 is flush against a broad surface when the backing layer 120 is substantially flush or substantially flat against the broad surface. Accordingly, even if some small portions of the backing layer 120 are not directly coupled to a broad surface, such as via small air pockets, the backing layer 120 can still be considered to be flush against a broad surface. In the examples shown in FIGS. 23, 26, and 27, one backing layer 120 (i.e., a first backing layer) is secured to the first broad surface 111 of the panel 110 and another backing layer 121 (i.e., a second backing layer) is secured to the second broad surface 113 of the panel 110. The backing layer 120 is secured to the first broad surface 111 via the tack force that is generated by the tackiness of the uncured pre-impregnated fiber-reinforced polymer of the panel 110 and acts to adhesively bond the backing layer 120 to the first broad surface 111. Similarly, the backing layer 121 is secured to the second broad surface 113 via the tack force generated by the tackiness of the panel 110, which adhesively bonds the backing layer 121 to the second broad surface 113. The tack force, provided by the tackiness of the pre-impregnated fiber-reinforced polymer, is sufficient to retain the backing layers against the broad surfaces, but is overcome by a pull-off force greater than the tack force. Although the pull-off force is relatively small, such that manual removal of the backing layer is possible, manually applying such a pull-off force to the backing layers can be difficult because gripping enough of the backing layers to pull them off of the panel 110 is cumbersome due to the thinness or low profile of the backing layers.

Additionally, the tack force is proportional to the temperature of the pre-impregnated fiber-reinforced polymer. In other words, the higher the temperature the higher the tack force. If the tack force is too high, the structural integrity of the pre-impregnated fiber-reinforced polymer can be negatively affected as the pull-off force necessary to remove the backing layers could be enough to pull away some of the impregnated fiber-reinforced polymer along with the backing layer. Accordingly, the temperature of the pre-impregnated fiber-reinforced polymer can be maintained within a predetermined range to promote a secure retention of the backing layer to the panel, as well as to promote removal of the backing layer from the panel 110 without damaging the panel.

According to some examples, the backing layer 120 and the backing layer 121 (e.g., second backing layer) are made of a fibrous material, such as paper, a polymeric material, such as plastic, or any of various other release or protective films. Accordingly, a backing layer, as used herein, can be any of various release films. The backing layers are secured to the panel 110 to protect the panel 110 from impact damage and contaminants (such as dust and debris) during transportation, storage, and handling of the panel 110. In some examples, each one of the plies 129 of the panel 110 is cut from a sheet of the pre-impregnated fiber-reinforced polymer. The sheet of the pre-impregnated fiber-reinforced polymer, which can come in the form of a continuous roll of the pre-impregnated fiber-reinforced polymer, includes a protective film on both sides of the sheet. After, or before, the plies 129 are cut from the sheet, the protective film is removed from the sheet. The plies 129, including the elongated strips 145 if applicable and with the protective film removed, are then stacked together, as disclosed above, to form the panel 110. After the plies 129 are stacked together, the backing layer 120 and the backing layer 121 are secured to the first broad surface 111 and the second broad surface 113, respectively, such that the backing layers are substantially flush against the broad surfaces. With the backing layers secured to the panel 110, the panel 110 is then ready to be assembled into a laminated structure 180 using the automated system 100.

Referring to FIGS. 1-8 and 15-18, various stages of motion of the edge-engagement tool 112, relative to the panel 110, is shown. The motion of the edge-engagement tool 112 relative to the panel 110 helps to separate only an edge portion 122 of the backing layer 120 from the panel 110. In some examples, the position and orientation of the edge-engagement tool 112, while the edge-engagement tool 112 is moved, relative to the panel 110, is fixed. Accordingly, the panel 110 is oriented into a backing-separation orientation A and positioned in a backing-separation position B, relative to the edge-engagement tool 112, that enables the edge-engagement tool 112 to engage only the edge portion 122 of the backing layer 120. Although not shown, the automated system 100 includes one or more automated tools (e.g., robotic arms or robotic actuators) that secure the panel 110 and move it into and maintain it in the backing-separation orientation A and the backing-separation position B.

With the panel 110 in the backing-separation orientation A and the backing-separation position B, the automated system 100 moves the edge-engagement tool 112, relative to the panel 110, so that backing-engagement features 114 of the edge-engagement tool 112 engage the backing layer 120, at only the edge portion 122 of the backing layer 120, and so that just the edge portion 122 of the backing layer 120 separates from the panel 110. The edge portion 122 of the backing layer 120 is a portion of the backing layer 120 that includes a leading edge 124 of the backing layer 120. The leading edge 124 extends along and is parallel with an entire width W1 of the panel. Additionally, the edge portion 122 includes the portion of the backing layer 120 that extends away from the leading edge 124, in a direction parallel with the length L1 of the panel, a distance D less than an entire length L1 of the panel 110 (see, e.g., FIG. 8). In some examples, the distance D is no more than half an entire length L1 of the panel 110. According to other examples, the distance D is no more than a quarter of an entire length L1 of the panel 110.

As shown in FIGS. 1-8, in some examples, the edge-engagement tool 112 includes a plate 116 and the backing-engagement features 114 include a plurality of protrusions 118. The plate 116 is flat and thin in some examples. Moreover, the plate 116 defines an engagement surface 117. The protrusions 118 protrude or extend from the engagement surface 117 of the plate 116. In some examples, the protrusions 118 have a sharp side 126, which includes at least one sharp edge, and a dull side 128 (see, e.g., FIGS. 2B, 3B, and 4B). The sharp side 126 is considered a sharp side because it is sharper than the dull side 128, which is considered a dull side because it is duller or less sharp than the sharp side 126. The protrusions 118 are arranged on the plate 116 such that the sharp sides 126 of all the protrusions 118 face a first direction and such that the dull sides 128 of all the protrusions 118 face a second direction, opposite the first direction. The sharp sides 126 are configured to grab, pierce, or penetrate the backing layer 120 and the dull sides 128 are configured to avoid piercing or penetrating the backing layer 120.

The plate 116 is fixed at a plate angle θ1 relative to the panel 110, when the panel 110 is in the backing-separation orientation A and positioned in the backing-separation position B. The plate angle θ1 is the angle defined between the engagement surface 117 and the first broad surface 111 of the panel 110. Moreover, because the backing layer 120 is flush against the first broad surface 111, the plate angle θ1 is also defined as the angle between the engagement surface 117 and the backing layer 120. The plate angle θ1 is selected to enable the backing-engagement features 114 to engage the backing layer 120 and lift at least a portion of the edge portion 122 of the backing layer 120 away from the panel 110 without engaging the panel 110. The plate angle θ1 is an oblique angle, and more particularly, as shown in FIG. 1, the plate angle θ1 is an acute angle.

The plate 116 of the edge-engagement tool 112 is operationally coupled with an actuator (not shown) that, when actuated, moves (e.g., reciprocates) the plate 116 along a plane. The plane is angled at the plate angle θ1 and is parallel with the leading edge 124 of the edge portion 122.

The plate 116 moves along the plane toward the panel 110, in a forward direction 171, and away from the panel 110, in a backward direction 173, which is opposite the forward direction 171. The protrusions 118 are arranged on the plate 116 such that the sharp sides 126 of all the protrusions 118 face the forward direction 171 and the dull sides 128 of all the protrusions 118 face the backward direction 173.

Figure 2A:
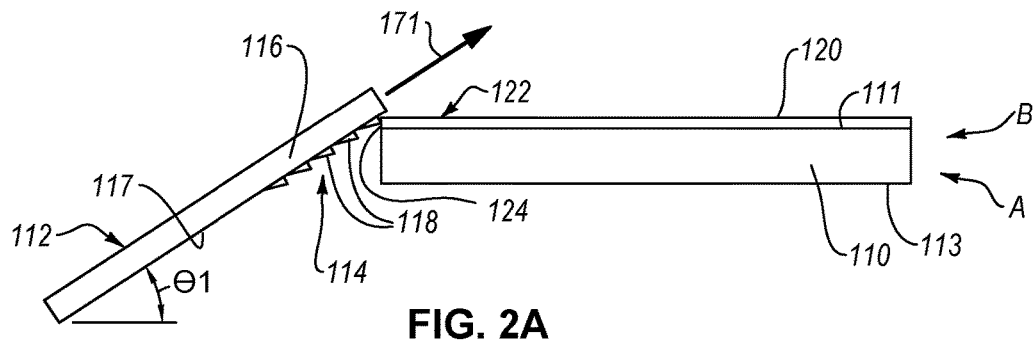
FIG. 2A is a schematic side elevation view of the edge-engagement tool of FIG. 1, shown with the edge-engagement tool in a second stage of motion, according to one or more examples of the present disclosure.
Figure 2B:
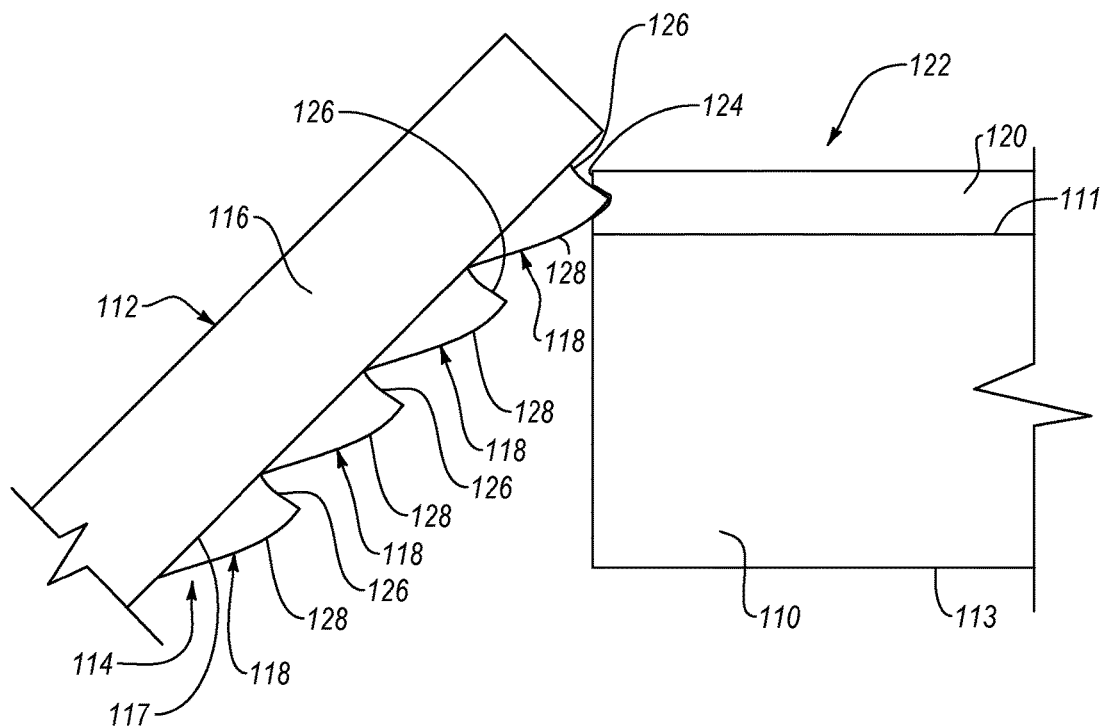
FIG. 2B is a schematic, side elevation, enlarged view of a portion of the edge-engagement tool of FIG. 2A, according to one or more examples of the present disclosure.
Figure 3A:
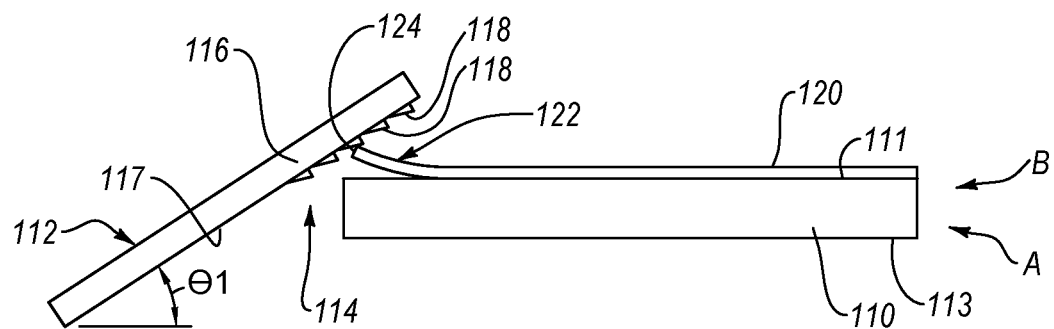
FIG. 3A is a schematic side elevation view of the edge-engagement tool of FIG. 1, shown with the edge-engagement tool in a third stage of motion, according to one or more examples of the present disclosure.
Figure 3B:
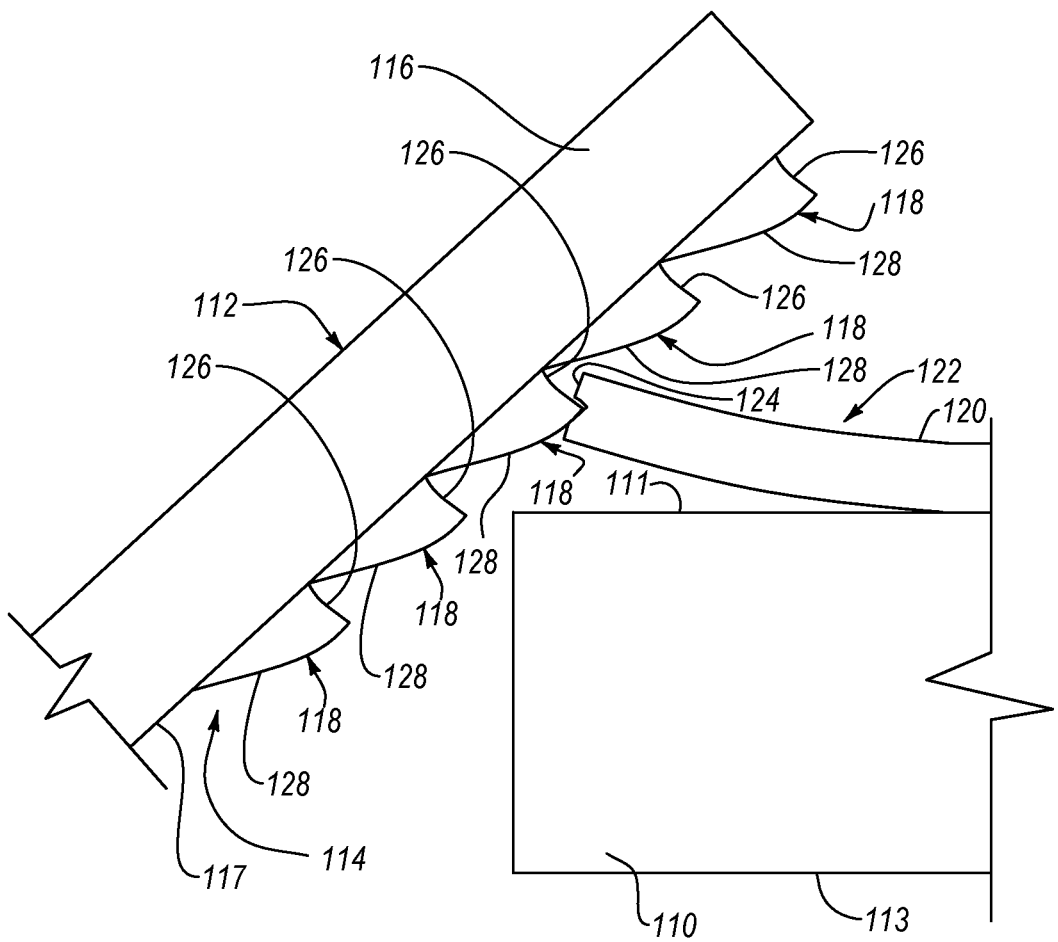
FIG. 3B is a schematic, side elevation, enlarged view of a portion of the edge-engagement tool of FIG. 3A, according to one or more examples of the present disclosure.

Referring to FIG. 1, the plate 116 is shown moving in the forward direction 171, at the plate angle θ1, toward the panel 110. As the plate 116 moves in the forward direction 171, the backing-engagement features 114 eventually engage the leading edge 124 of the backing layer 120, as shown in FIGS. 2A and 3A. Initially, a first one or ones of the backing-engagement features 114 engage the leading edge 124 of the backing layer 120, as shown in FIG. 2A, and, upon further movement of the plate 116 in the forward direction 171, an additional one or ones of the backing-engagement features 114 engage the leading edge 124 and potentially an underside of the edge portion 122. In the illustrated example of FIG. 2B, as the plate 116 moves in the forward direction 171, the sharp side 126 of at least a first one of the protrusions 118 at least partially penetrates (e.g., deforms) the leading edge 124 of the backing layer 120. The penetration or deformation of the leading edge 124 by the sharp side 126 imparts an upwardly directed force to the leading edge 124, which results in the leading edge 124 partially separating from the panel 110. Further movement of the plate 116 in the forward direction 171 results in the first one or ones of the protrusions 118 disengaging from the backing layer 120, and the sharp side 126 of second one or ones of the protrusions 118 penetrating or deforming the leading edge 124 (see, e.g., FIG. 3B). The penetration or deformation of the leading edge 124 by the sharp side 126 of the second one or ones of the protrusions 118 imparts an upwardly directed force to the leading edge 124, which results in the leading edge 124 further separating from the panel 110. Further movement of the plate 116 in the forward direction 171 results in the second one or ones of the protrusions 118 disengaging from the backing layer 120, and the sharp side 126 of another one or other ones of the protrusions 118 penetrating or deforming the leading edge 124, lifting, and disengaging in a similar manner.

Figure 4A:
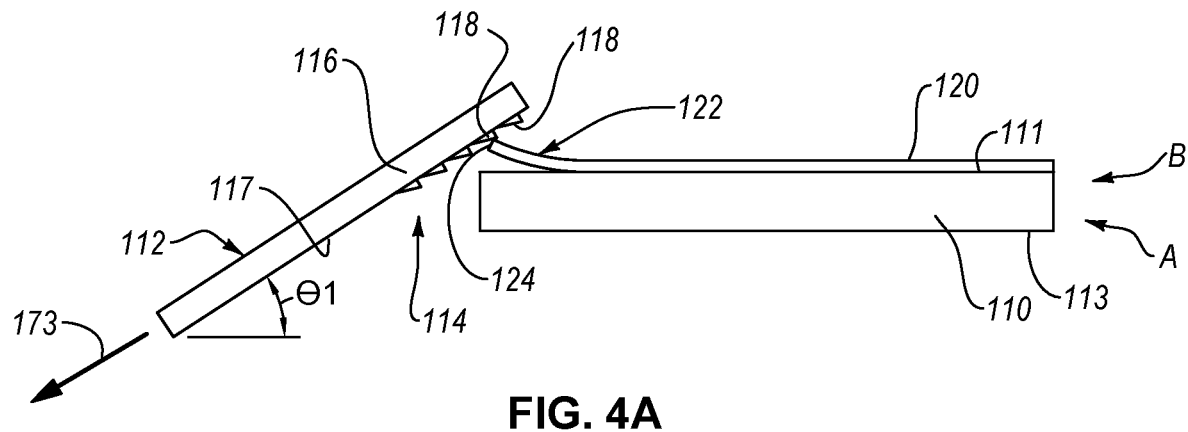
FIG. 4A is a schematic side elevation view of the edge-engagement tool of FIG. 1, shown with the edge-engagement tool in a fourth stage of motion, according to one or more examples of the present disclosure.
Figure 4B:
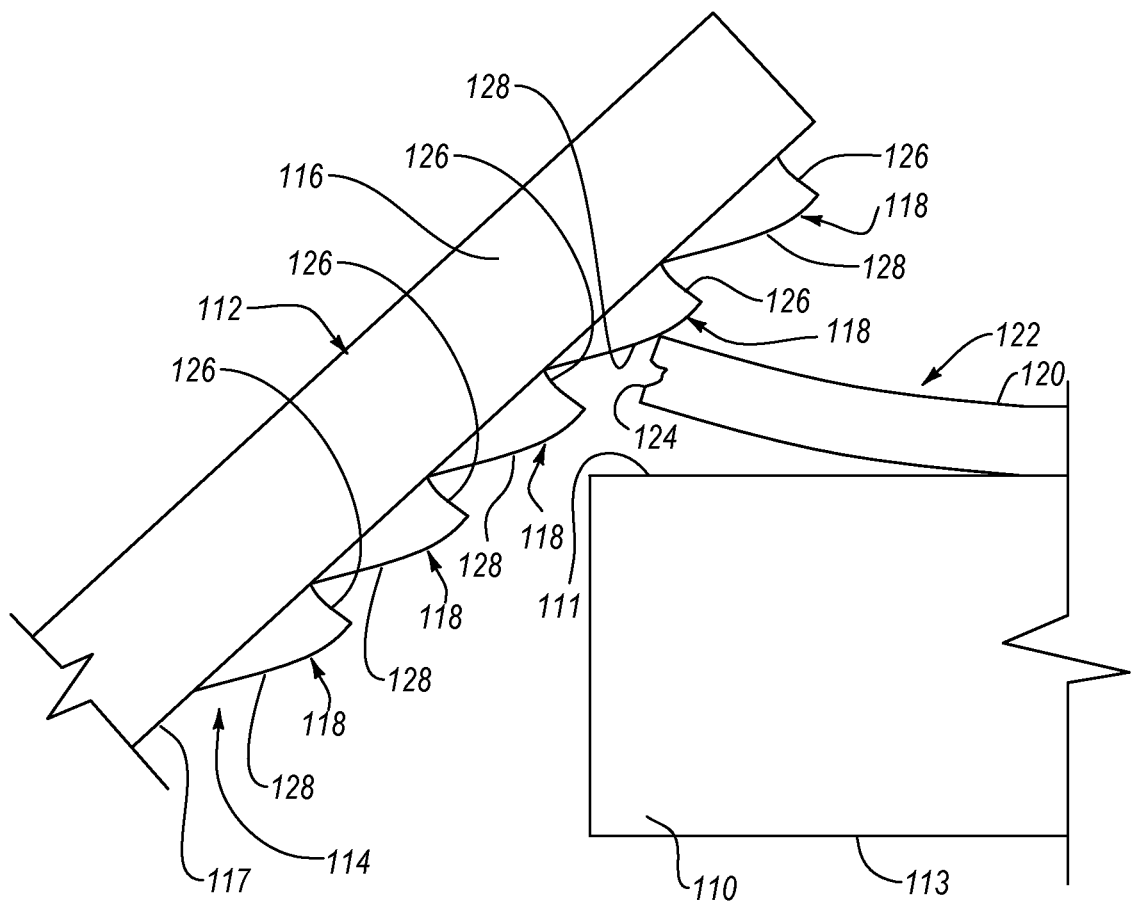
FIG. 4B is a schematic, side elevation, enlarged view of a portion of the edge-engagement tool of FIG. 4A, according to one or more examples of the present disclosure.
Figure 5:
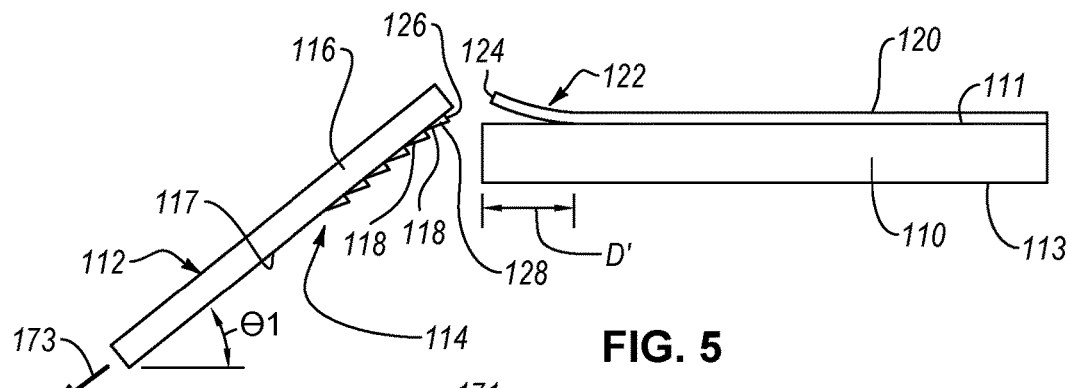
FIG. 5 is a schematic side elevation view of the edge-engagement tool of FIG. 1, shown with the edge-engagement tool in a fifth stage of motion, according to one or more examples of the present disclosure.
Figure 8:
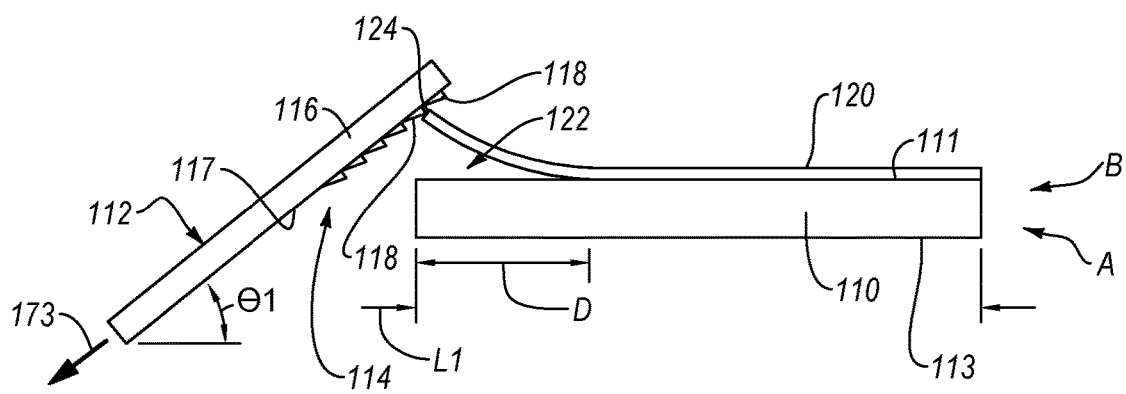
FIG. 8 is a schematic side elevation view of the edge-engagement tool of FIG. 1, shown with the edge-engagement tool in an eighth stage of motion, according to one or more examples of the present disclosure.

After the plate 116 has moved in the forward direction 171 such that a desired number of the backing-engagement features 114 engage the leading edge 124 of the backing layer 120, the movement of the plate 116 is reversed. In other words, the plate 116 is moved in the backward direction 173, as shown in FIG. 8. As the plate 116 moves in the backward direction 173, the backing-engagement features 114 move along the edge portion 122 of the backing layer 120 separated from the panel 110 without penetrating the backing layer 120. More specifically, the dull sides 128 of the protrusions 118 may contact, but not penetrate the backing layer 120 (as shown in FIG. 4B). In this manner, the separated portion of the backing layer 120 is not pressed down against the first broad surface 111, but remains separated, as the plate 116 moves in the backward direction 173. As shown in FIG. 5, the plate 116 continues to move in the backward direction 173 until the backing-engagement features 114 are clear of the separated portion of the backing layer 120.

Figure 6:
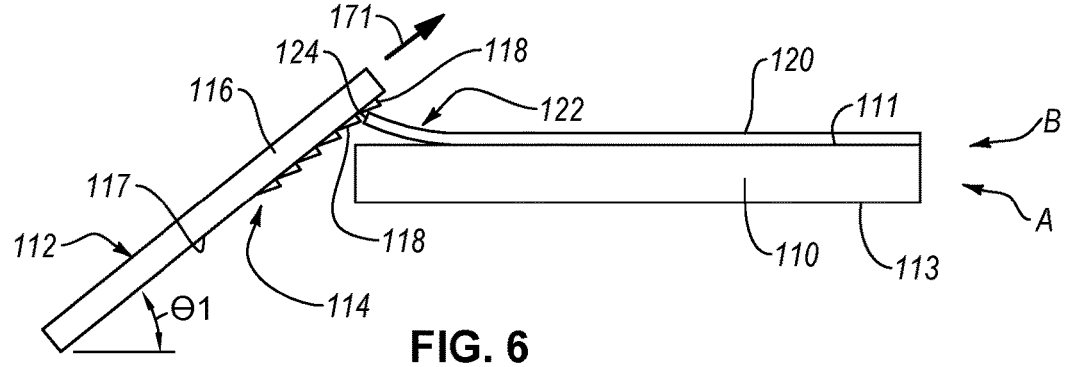
FIG. 6 is a schematic side elevation view of the edge-engagement tool of FIG. 1, shown with the edge-engagement tool in a sixth stage of motion, according to one or more examples of the present disclosure.
Figure 7:
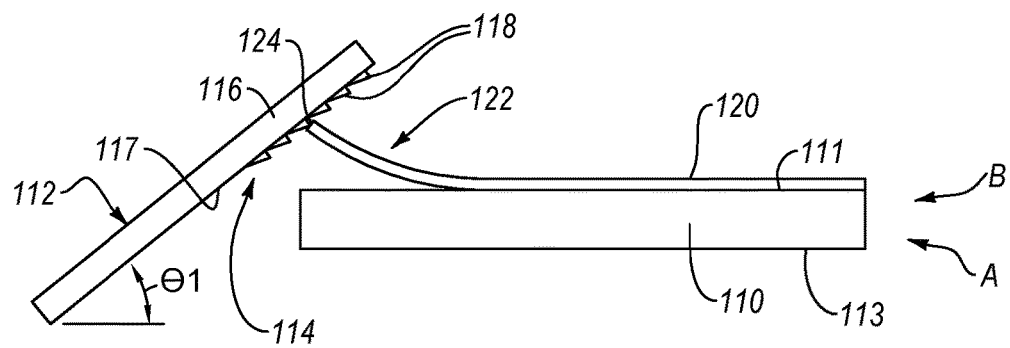
FIG. 7 is a schematic side elevation view of the edge-engagement tool of FIG. 1, shown with the edge-engagement tool in a seventh stage of motion, according to one or more examples of the present disclosure.

At least some of the edge portion 122 of the backing layer 120 remains separated from the panel 110 after a single pass of the plate 116 (i.e., movement of the plate 116 in the forward direction 171 and backward direction 173). In other words, the edge portion 122 is separated a distance D' away from the leading edge 124. However, if further separation of the edge portion 122 from the panel 110 is needed, one or more additional passes of the plate 116 can be performed. For example, as shown in FIGS. 6-8, a second pass of the plate 116 in the forward direction 171 and the backward direction 173 is performed to separate more of the edge portion 122 from the panel 110. In other words, the edge portion 122 is separated the distance D in FIG. 8, which is greater than the distance D' in FIG. 5. Such reciprocation of the plate 116, or multiple passes (i.e., at least two passes) of the plate 116, is performed until a desired separation of the edge portion 122 is achieved. The desired separation of the edge portion 122 corresponds with enough separation of the edge portion 122 that the gripper 130 can grip the separated portion of the backing layer 120 and remove the remaining non-separated portion of the backing layer 120 as described below.

Although the backing-engagement features 114 of the plate 116, in the illustrated examples, are protrusions having a particular shape, in other examples the backing-engagement features 114 can be protrusions having a different shape, such as a textured or rough surface formed on or attached to the plate 116. Alternatively, the backing-engagement features 114 are not protrusions, but can be a tacky film or other coating that frictionally engages the edge portion 122 of the panel 110 as the plate 116 moves in the forward direction 171.

Figure 9:
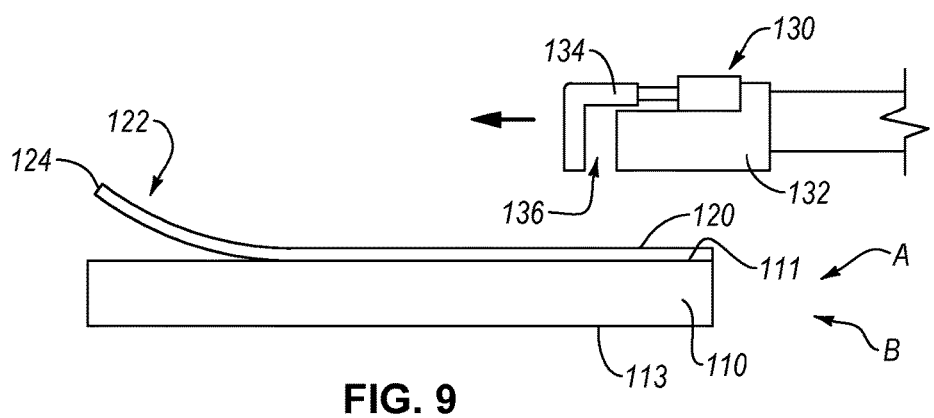
FIG. 9 is a schematic side elevation view of a gripper of an automated system for removing a backing layer from a panel, according to one or more examples of the present disclosure.
Figure 10:
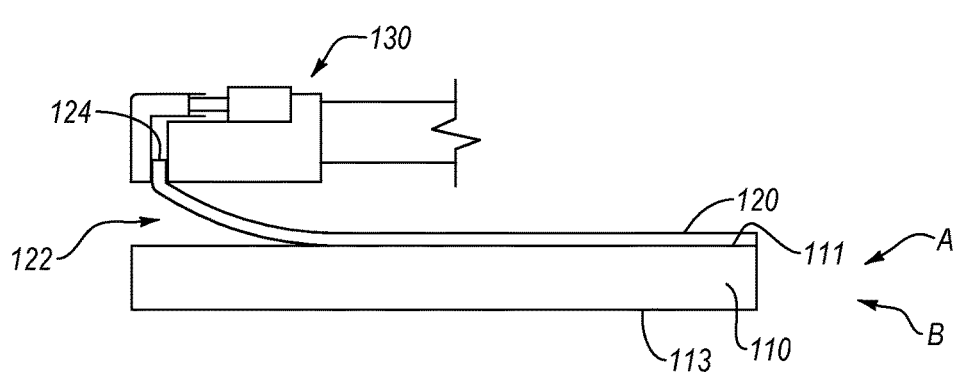
FIG. 10 is a schematic side elevation view of the gripper of FIG. 9, shown with the gripper gripping an edge portion of the backing layer, according to one or more examples of the present disclosure.
Figure 11:
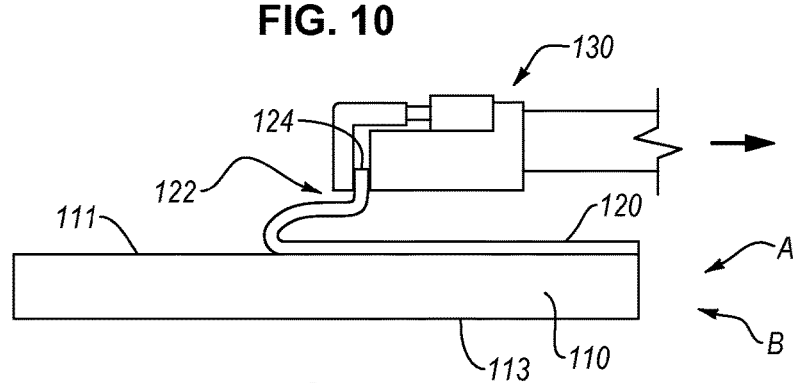
FIG. 11 is a schematic side elevation view of the gripper of FIG. 9, shown with the gripper gripping and pulling an edge portion of the backing layer, according to one or more examples of the present disclosure.
Figure 12:
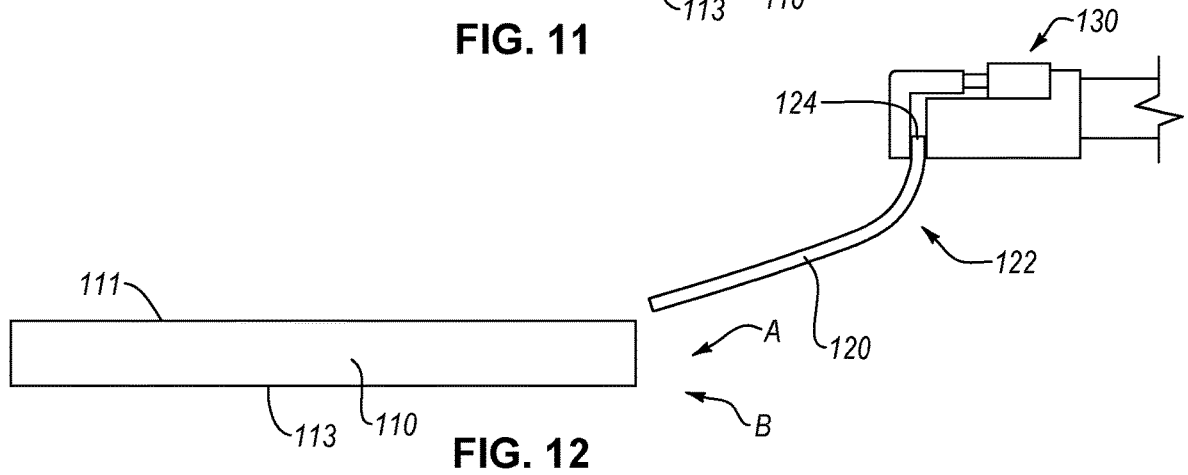
FIG. 12 is a schematic side elevation view of the gripper of FIG. 9, shown with the gripper gripping and removing the backing layer from the panel, according to one or more examples of the present disclosure.

After a desired separation of the edge portion 122 of the backing layer 120 is achieved by the edge-engagement tool 112, the separated portion of the backing layer 120 can be manually gripped and removed, or automatedly gripped and removed, by the gripper 130. Referring to FIGS. 9-12, and according to some examples, the gripper 130 is a pinching device that includes a base 132 and a finger 134. The finger 134 is actuatable toward and away from the base to close and open a receptacle 136 of the gripper 130. Moreover, the base 132 and the finger 134 are collectively movable relative to the panel 110. As shown in FIGS. 9 and 10, in some examples, the gripper 130 is moved in a retrieval direction, as indicated by a directional arrow, relative to the panel 110 and positioned to receive part (e.g., the leading edge 124) of the separated portion of the backing layer 120 within the receptacle, when the receptacle is open. The finger 134 can then be moved toward the base 132 such that the receptacle 136 is closed and the separated portion of the backing layer 120 is pinched between the finger 134 and the base 132. When the separated portion of the backing layer 120 is pinched by the gripper 130, the gripper 130 can be moved relative to the panel 110, such as in a removal direction opposite the retrieval direction, as shown by the directional arrow in FIG. 11. As the gripper 130 moves in the removal direction, the backing layer 120 is peeled back and away from the panel 110. Eventually, as shown in FIG. 12, the entirety of the backing layer 120 is removed from the panel 110 by the gripper 130. The gripper 130 can then release the backing layer 120 and the backing layer 120 can be disposed of (e.g., recycled or reused).

Referring to FIGS. 72-75, in some examples, the gripper 130 is a vacuum device 510 that is configured to grip the backing layer 120 at a location other than (e.g., separate from, adjacent to, offset from, or spaced apart from) the separated edge portion 122. Accordingly, unlike the gripper 130 of FIGS. 9-12, which is configured to grip or pinch the separated edge portion 122 and to peel the backing layer 120 away from the panel 110, the gripper 130 of FIGS. 72-75 is configured to apply a suction force V2 to the backing layer 120 and pull the backing layer 120 away from the panel 110. In one example, after the edge portion 122 is separated from panel 110 by the edge-engagement tool 112, the vacuum device 510 is brought into contact with the backing layer 120 and activated to apply the suction force V2 to the backing layer 120. The suction force V2 is greater than the adhesion force between the backing layer 120 and the panel 110. It is noted that the overall adhesion force between the backing layer 120 and the panel 110 is reduced when the edge portion 122 is separated by the edge-engagement tool 112. Moreover, the separation of the edge portion 122 creates a significant localized reduction in the adhesion force at the boundary between the adhered portion of the backing layer 120 and the separated edge portion 122, which promotes a reliable and consistent pull-away starting point that doesn't tear the backing layer 120. Accordingly, the vacuum device 510 is able to pull the backing layer 120 away from the panel 110 without tearing the backing layer 120 or leaving portions of the backing layer 120 adhered to the panel 110 because of the localized adhesion force reduction created by the separation of the edge portion 122 from the panel 110 by the edge-engagement tool. When opposing edge portions are separated by opposing edge-engagement tools (see, e.g., FIG. 40), the vacuum device 510 can apply the suction force to the backing layer 120 at a location between the separated edge portions 122 and remove the backing layer 120 in the same manner. Although not shown, the vacuum device 510 can be coupled with an actuator that moves the vacuum device 510 relative to the panel 110.

Figure 75:
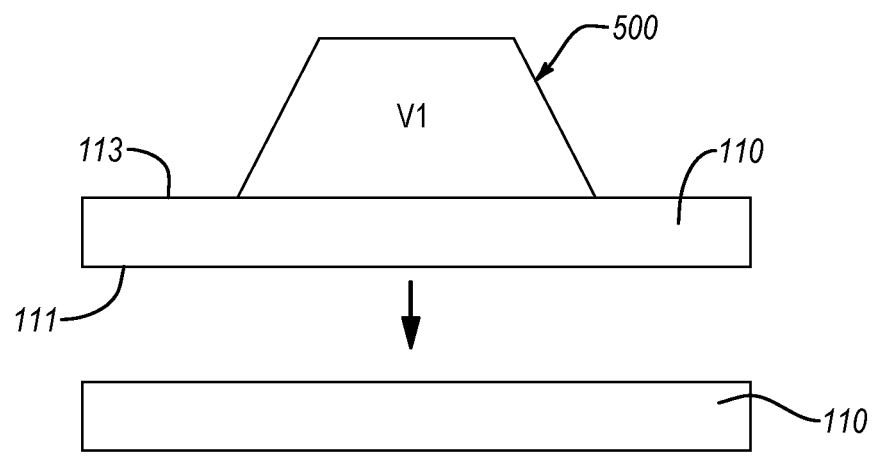
FIG. 75 is a schematic, side elevation view of the second vacuum device moving the panel into placement against a second panel, according to one or more examples of the present disclosure.

According to some examples, the panel 110 can be fixed by a vacuum device 500 when the edge portion 122 is separated from the panel 110 (e.g., when the backing layer is partially removed from the panel 110) and when the backing layer 120 is fully removed from the panel 110 by the gripper 130. The vacuum device 500 is configured to apply a suction force V1 to the panel 110. The suction force V1 of the vacuum device 500 is greater than the suction force V2 of the vacuum device 510. Accordingly, when the vacuum device 510 applies the suction force V2 to the backing layer 120 and pulls the backing layer 120 relative to the panel 110, the suction force V1 resists the pull-off force from the vacuum device 510 and the panel 110 remains attached to the vacuum device 500 as the backing layer 120 is pulled off of the panel 110. Additionally, in certain examples, as shown in FIG. 75, the vacuum device 500 can be coupled with an actuator (not shown), which can be actuated to move the vacuum device 500, and thus the panel 110 attached to the vacuum device 500. In one example, movement of the vacuum device 500 includes rotational movement and translational movement to flip the panel 110 and to position the panel 110 onto a second panel 110 for attachment to the second panel 110. In some examples, the second panel 110 includes one or more elongated strips attached thereto, such that the panel 110 is positioned for attachment onto the one or more elongated strips and the second panel 110. After the panel 110 is properly positioned, the suction force V1 can be removed from the panel 110 and the vacuum device V1 can be moved away from the panel 110 if desired.

Figure 13:
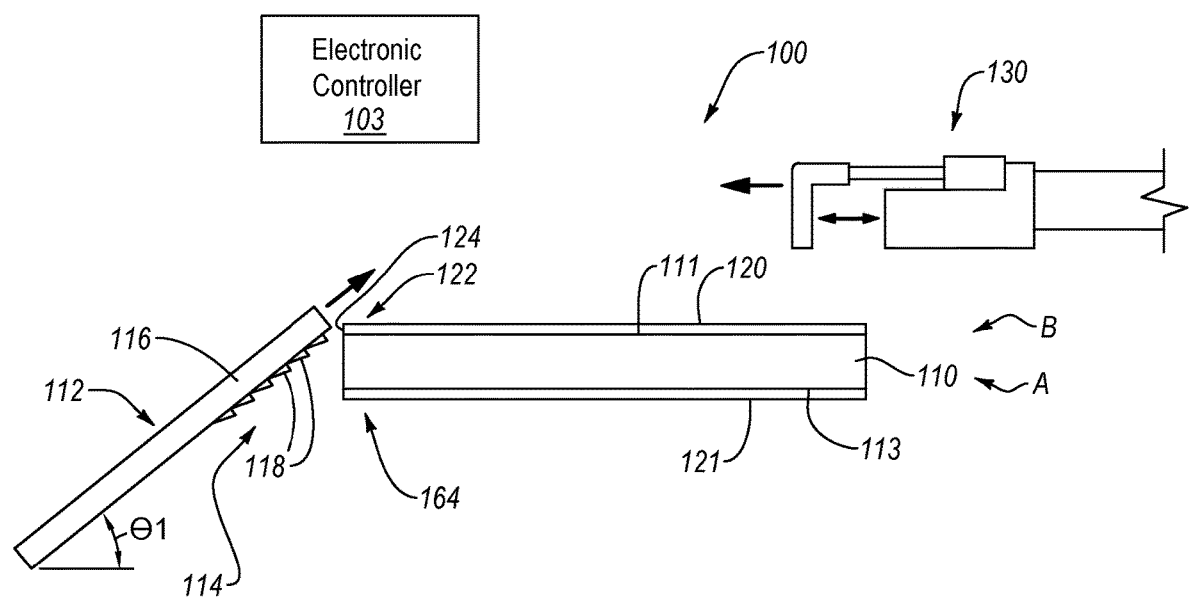
FIG. 13 is a schematic side elevation view of an automated system for removing a backing layer from a panel, according to one or more examples of the present disclosure.
Figure 14:
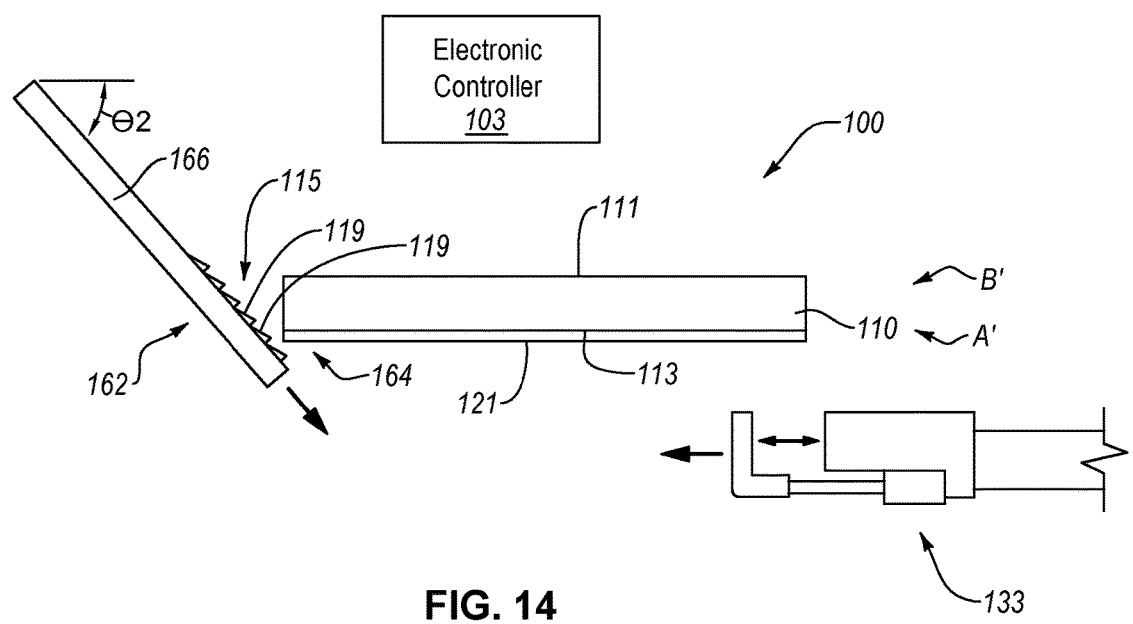
FIG. 14 is a schematic side elevation view of an automated system for removing a backing layer from a panel, according to one or more examples of the present disclosure.

In some examples, the automated system 100 is configured to remove the backing layer from both sides of a panel. According to one example, the automated system 100 is configured to flip the panel 110 (such as 180°), after the backing layer 120 is removed from the first broad surface 111 of the panel 110, and the same plate 116 used to remove the backing layer 120 from the first broad surface 111 is used to remove a second backing layer 121 from the second broad surface 113. Alternatively, the panel 110 is not flipped, but the plate 116 is repositioned or reoriented before removing the second backing layer 121. However, in certain examples, as shown in FIGS. 13 and 14, a second edge-engagement tool 162 is used to separate the second backing layer 121 from the second broad surface 113 of the panel 110. The second edge-engagement tool 162 is similar to the edge-engagement tool 112. For example, the second edge-engagement tool 162 includes a plate 166 (e.g., second-tool plate) and backing engagement features 115, which can be protrusions 119. The panel 110 can be positioned and oriented relative to the plate 166 (e.g., in a second backing-separation position B' and a second backing-separation orientation A' as shown in FIG. 14), and the plate 166 can be moved (e.g., reciprocated) relative to the panel 110, in a manner similar to the plate 116, to separate an edge portion 164 of the second backing layer 121 from the second broad surface 113 of the panel 110.

In some examples, as shown in FIG. 14, the plate 166 is angled relative to the plate 116, and the second backing-separation orientation A' of the panel 110 is the same as the backing-separation orientation A of the panel 110, when the plate 166 is moved to separate the edge portion 164 of the second backing layer 121 from the second broad surface 113 of the panel 110. The angle between the plate 116 and the plate 166 is no more than 90°, in some examples, and less than 90°, in other examples. For example, the angle between the plate 116 and the plate 166 can be less than 45° or less than 30°. Such angles promote an efficient separation of the backing layer 120 and the backing layer 121 from the panel 110.

In contrast to the example shown in FIG. 14, in some examples, the plate 166 is co-planar with or parallel to the plate 116, and the second backing-separation orientation A' of the panel 110 is different than the backing-separation orientation A of the panel 110, when the plate 166 is moved to separate the edge portion 164 of the backing layer 121 from the second broad surface 113 of the panel 110. In such examples, the panel 110 can be flipped, such as by 180°, after the backing layer 120 is removed from the panel 110 and before the plate 166 separates the backing layer 121 from the panel 110. Accordingly, in some examples, the second backing-separation orientation A' of the panel 110 is different than the backing-separation orientation A of the panel 110 by 180°.

Referring to FIG. 14, the automated system 100 further includes a second gripper 133 that is similar to (e.g., has the same features as) the gripper 130. After the edge portion 164 of the second backing layer 121 is separated from the second broad surface 113 of the panel 110. The second gripper 133 is movable in a retrieval direction, as indicated by a directional arrow, and actuatable to grip the edge portion 164. After gripping the edge portion 164, the second gripper 133 can be moved in a removal direction, opposite the retrieval direction, to peel the backing layer 121 back and away from the panel 110 until the backing layer 121 is entirely removed from the panel 110. The second gripper 133 can then release the backing layer 121 and the backing layer 121 can be disposed of.

As shown in FIGS. 15-18, in some examples, the edge-engagement tool 112 includes a wheel 150 and the backing-engagement features 114 include a plurality of teeth 152. The teeth 152 are spaced apart circumferentially about the wheel 150, which can be elongated in a direction parallel with an axis 154 of the wheel 150. In some examples, the wheel 150 has a width that is at least as wide as the width W1 of the panel 110. Additionally, in some examples, the teeth 152 are elongated such that each one of the teeth 152 extends along an entirety of the width of the wheel 150. The wheel 150 rotates about the axis 154 in a rotational direction, as indicated by directional arrow. Each one of the teeth 152 includes a sharp side that faces in the rotational direction. The sharp side of each one of the teeth 152 is configured to grab, pierce, or penetrate the backing layer 120.

Figure 15:
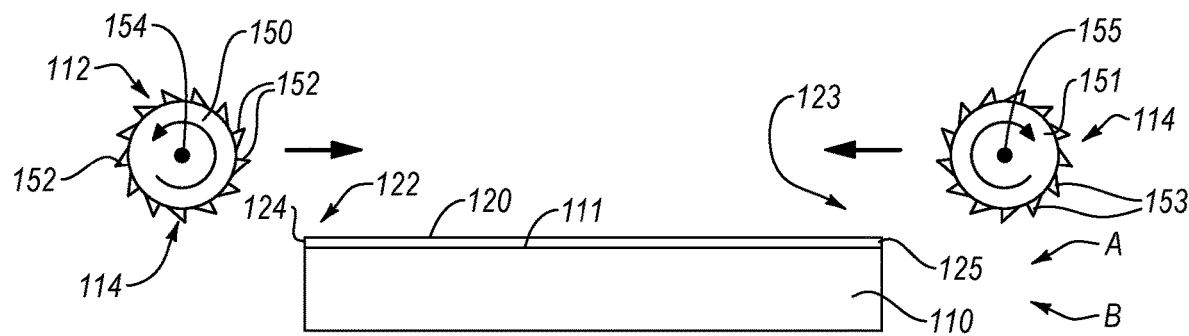
FIG. 15 is a schematic side elevation view of an edge-engagement tool of an automated system for removing a backing layer from a panel, shown with the edge-engagement tool in a first stage of motion, according to one or more examples of the present disclosure.
Figure 16:
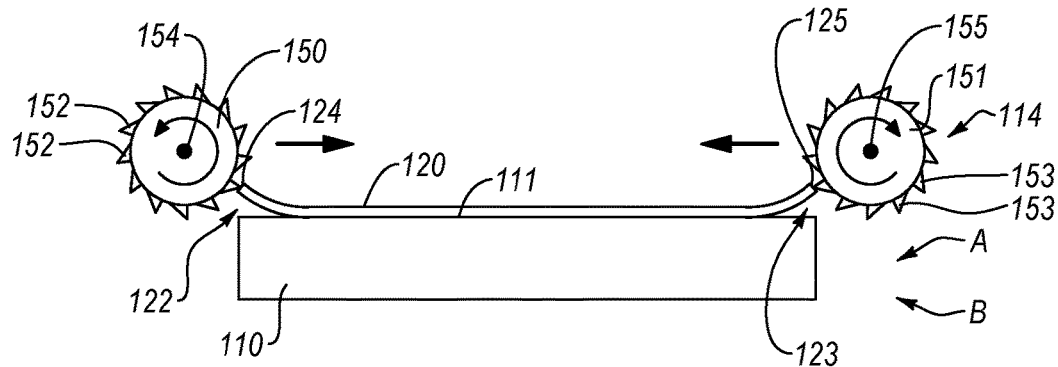
FIG. 16 is a schematic side elevation view of the edge-engagement tool of FIG. 15, shown with the edge-engagement tool in a second stage of motion, according to one or more examples of the present disclosure.
Figure 17:
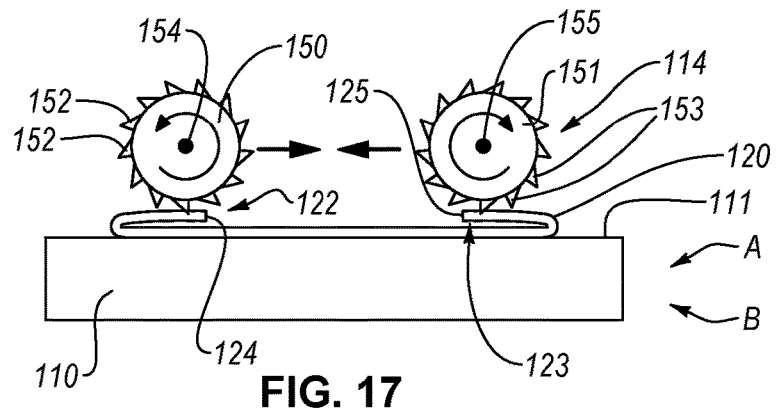
FIG. 17 is a schematic side elevation view of the edge-engagement tool of FIG. 15, shown with the edge-engagement tool in a third stage of motion, according to one or more examples of the present disclosure.
Figure 18:
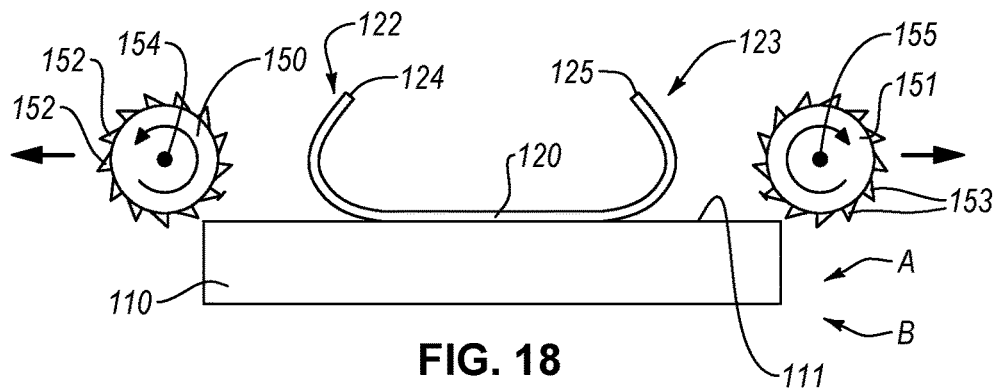
FIG. 18 is a schematic side elevation view of the edge-engagement tool of FIG. 15, shown with the edge-engagement tool in a fourth stage of motion, according to one or more examples of the present disclosure.
Figure 19:
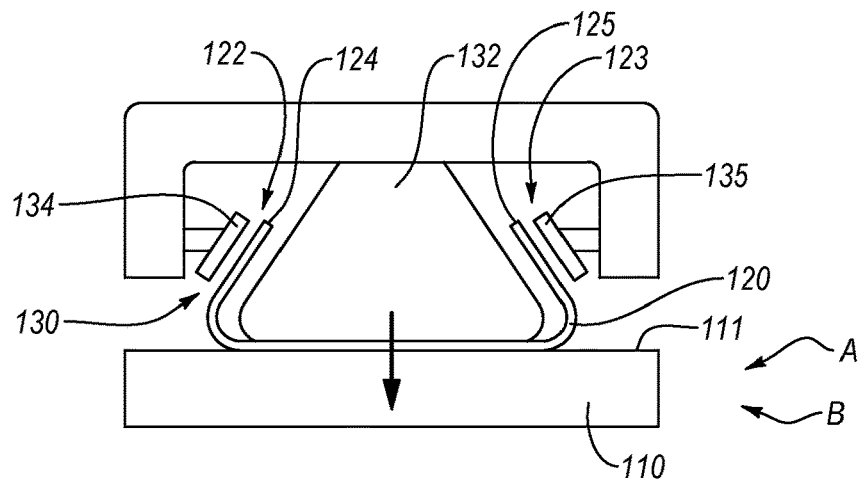
FIG. 19 is a schematic side elevation view of a gripper of an automated system for removing a backing layer from a panel, according to one or more examples of the present disclosure.
Figure 20:
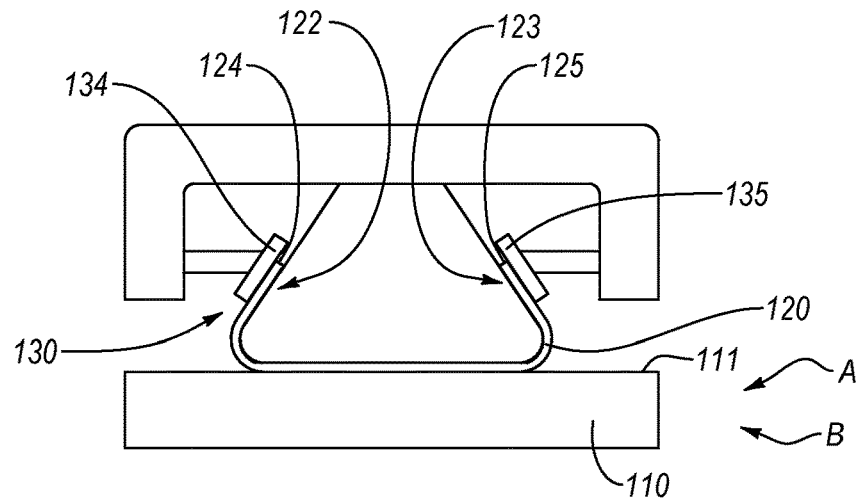
FIG. 20 is a schematic side elevation view of the gripper of FIG. 19, shown with the gripper gripping edge portions of the backing layer, according to one or more examples of the present disclosure.

With the panel 110 in the backing-separation orientation A and positioned in the backing-separation position B, the wheel 150 is rotatable about the axis 154 and translationally movable toward the panel 110, as shown in FIG. 15. The wheel 150 is positioned relative to the panel 110, such that as the wheel 150 moves into a position above the panel 110 (see, e.g., FIG. 16), the teeth 152 of the wheel 150 engage only the leading edge 124 and edge portion 122 of the backing layer 120. As the wheel rotates, the teeth 152 of the wheel 150 repeatedly engage the edge portion 122 of the backing layer 120. Moreover, because the teeth 152 are being rotated upward and away from the panel 110 after engaging the backing layer 120, the edge portion 122 is effectively lifted and separated away from the first broad surface 111 of the panel 110. Further translational movement of the wheel 150 along the panel 110 results in further engagement of the teeth 152 with the edge portion 122 and separation of additional portions of the edge portion 122 (see, e.g., FIG. 17) until a desired amount of the edge portion 122 is separated from the panel 110 (see, e.g., FIG. 18). After the desired amount of the edge portion 122 is separated from the panel 110, the wheel 150 is retracted away from the separated portion of the edge portion 122, as indicated by directional arrow in FIG. 18.

Figure 21:
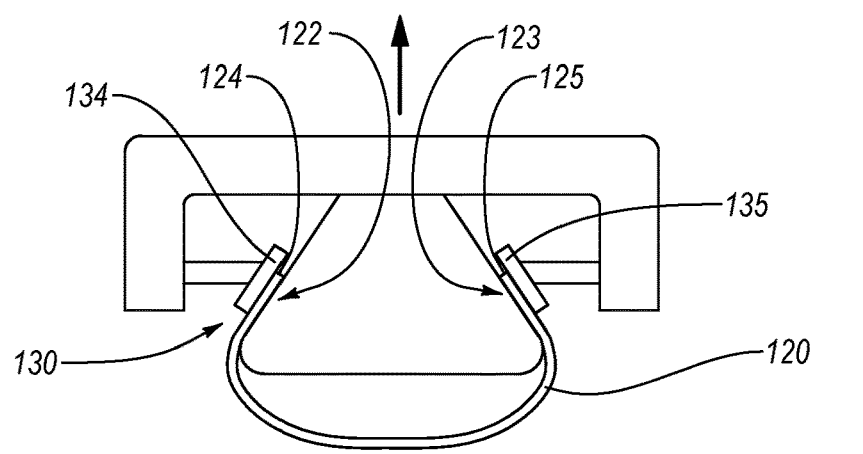
FIG. 21 is a schematic side elevation view of the gripper of FIG. 19, shown with the gripper gripping and removing the backing layer from the panel, according to one or more examples of the present disclosure.

With the wheel 150 retracted away from the panel 110, the separated portion of the backing layer 120 can be manually gripped and removed, or automatedly gripped and removed, by the gripper 130. For example, the gripper 130 is moved in a retrieval direction, as indicated by a directional arrow in FIG. 19, which can be perpendicular relative to the panel 110, and positioned to receive part (e.g., the leading edge 124) of the separated portion of the backing layer 120. The finger 134 can then be moved toward the base 132 such that the backing layer 120 is pinched between the finger 134 and the base 132 (see, e.g., FIG. 20). When the separated portion of the backing layer 120 is pinched by the gripper 130, the gripper 130 can be moved relative to the panel 110, such as in a removal direction opposite the retrieval direction, as shown by the directional arrow in FIG. 21. As the gripper 130 moves in the removal direction, the backing layer 120 is peeled away from the panel 110. Eventually, as shown in FIG. 21, the entirety of the backing layer 120 is removed from the panel 110 by the gripper 130. The gripper 130 can then release the backing layer 120 and the backing layer 120 can be disposed of (e.g., recycled or reused).

Referring back to FIGS. 15-18, in some examples, the edge-engagement tool 112 includes a second wheel 151 and the backing-engagement features 114 include a plurality of second teeth 153. The second wheel 151 is similar to the wheel 150. For example, the second teeth 153 are spaced apart circumferentially about the second wheel 151, which can be elongated in a direction parallel with an axis 155 of the second wheel 151. In some examples, the second wheel 151 has a width that is at least as wide as the width W1 of the panel 110. Additionally, in some examples, the teeth 153 are elongated such that each one of the second teeth 153 extends along an entirety of the width of the second wheel 151. The second wheel 151 rotates about the axis 155 in a second rotational direction, as indicated by directional arrow, which is opposite the rotational direction of the wheel 150. Each one of the second teeth 153 includes a sharp side that faces in the second rotational direction. The sharp side of each one of the teeth 152 is configured to grab, pierce, or penetrate the backing layer 120.

With the panel 110 in the backing-separation orientation A and positioned in the backing-separation position B, the second wheel 151 is rotatable about the axis 155 and translationally movable toward the panel 110 and the wheel 150, as shown in FIG. 15. The second wheel 151 is positioned relative to the panel 110, such that as the second wheel 151 moves into a position above the panel 110 (see, e.g., FIG. 16), the teeth 153 of the second wheel 151 engage only the trailing edge 125 and the second edge portion 123 of the backing layer 120. As the second wheel rotates, the teeth 153 of the second wheel 151 repeatedly engage the second edge portion 123 of the backing layer 120. Moreover, because the teeth 152 are being rotated upward and away from the panel 110 after engaging the backing layer 120, the second edge portion 123 is effectively lifted and separated away from the first broad surface 111 of the panel 110. Further translational movement of the second wheel 151 along the panel 110 results in further engagement of the second teeth 153 with the second edge portion 123 and separation of additional portions of the edge portion 123 (see, e.g., FIG. 17) until a desired amount of the second edge portion 123 is separated from the panel 110 (see, e.g., FIG. 18). After the desired amount of the second edge portion 123 is separated from the panel 110, the second wheel 151 is retracted away from the separated portion of the second edge portion 123, as indicated by directional arrow in FIG. 18.

With the wheel 150 and the second wheel 151 retracted away from the panel 110, the separated portions of the backing layer 120 can be manually gripped and removed, or automatedly gripped and removed, by the gripper 130. For example, the gripper 130 can have a second finger 135 that is actuatable relative to the base 132. The second finger 135 can then be moved toward the base 132 such that the separated portion of the second edge portion 123 is pinched between the second finger 135 and the base 132 (see, e.g., FIG. 20). When both separated portions of the backing layer 120 are pinched by the gripper 130, the gripper 130 can be moved relative to the panel 110, such as in a removal direction opposite the retrieval direction, as shown by the directional arrow in FIG. 21.

Figure 40:
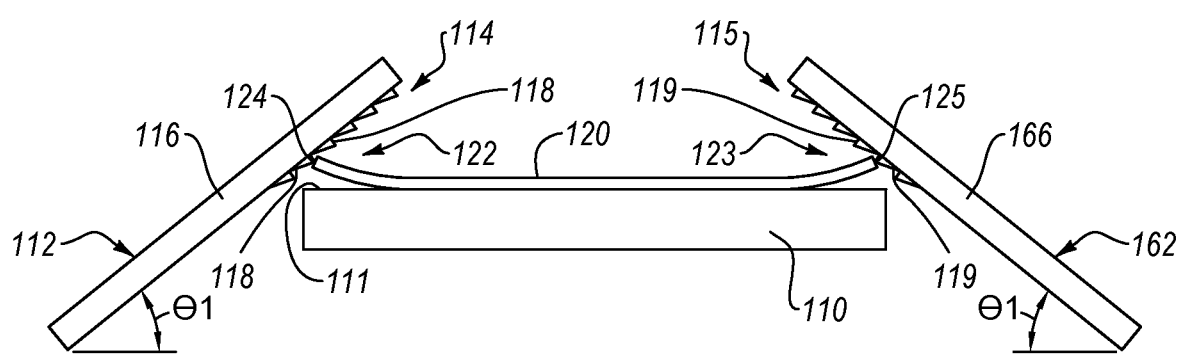
FIG. 40 is a schematic side elevation view of an edge-engagement tool of an automated system for removing a backing layer from a panel, according to one or more examples of the present disclosure.

Similar to FIG. 15, in which two wheels are used to separate the edge portion 122 and the second edge portion 123 of the backing layer 120, according to some examples, as shown in FIG. 40, two plates can be used to separate the edge portion 122 and the second edge portion 123 of the backing layer 120. More specifically, the plate 116 of the edge-engagement tool 112 can be moved relative to the panel 110 to separate the edge portion 122 of the backing layer 120 from the panel 110, as disclosed above, and the plate 166 of the second edge-engagement tool 162 can be moved relative to the panel 110, concurrently with the plate 116 in certain examples, to separate the second edge portion 123 of the backing layer 120. In this manner, two plates, and the corresponding backing-engagement features, can be moved (e.g., reciprocated) to separate opposite edge portions of the same backing layer at the same time.

In some examples, the panel 110 is a quasi-isotropic panel and after the backing layer 120 is removed by the gripper 130, the panel 110 receives the elongated strips 145 to transform the quasi-isotropic panel into a cluster panel.

Figure 22:
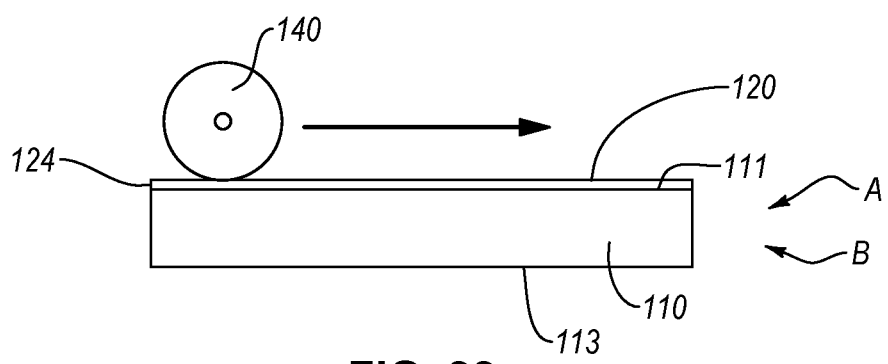
FIG. 22 is a schematic side elevation view of a roller of an automated system for removing a backing layer from a panel, according to one or more examples of the present disclosure.

In some examples, as shown in FIG. 22, the automated system 100 additionally includes at least one roller 140. The roller 140 is selectively automatedly operable to roll along the backing layer 120 then the backing layer 120 is adhesively secured to the broad surface 111 of the panel 110.

Accordingly, the roller 140 rolls along the backing layer 120 before the backing layer 120 is separated by the edge-engagement tool 112 and removed by the gripper 130. Rolling the roller 140 along the backing layer 120 compresses the backing layer 120 against the broad surface 111, which promotes a flush engagement between the backing layer 120 and the broad surface 111 of the panel 110 and helps to eliminate undulations in the panel 110 and backing layer 120 and to reduce air pockets between the backing layer 120 and the panel 110. Although one roller 140 is shown, the automated system 100 can include a second roller that rolls along a second backing layer 121 secured to the second broad surface 113 of the panel 110 before the second backing layer 121 is separated and removed from the panel 110.

Figure 29:
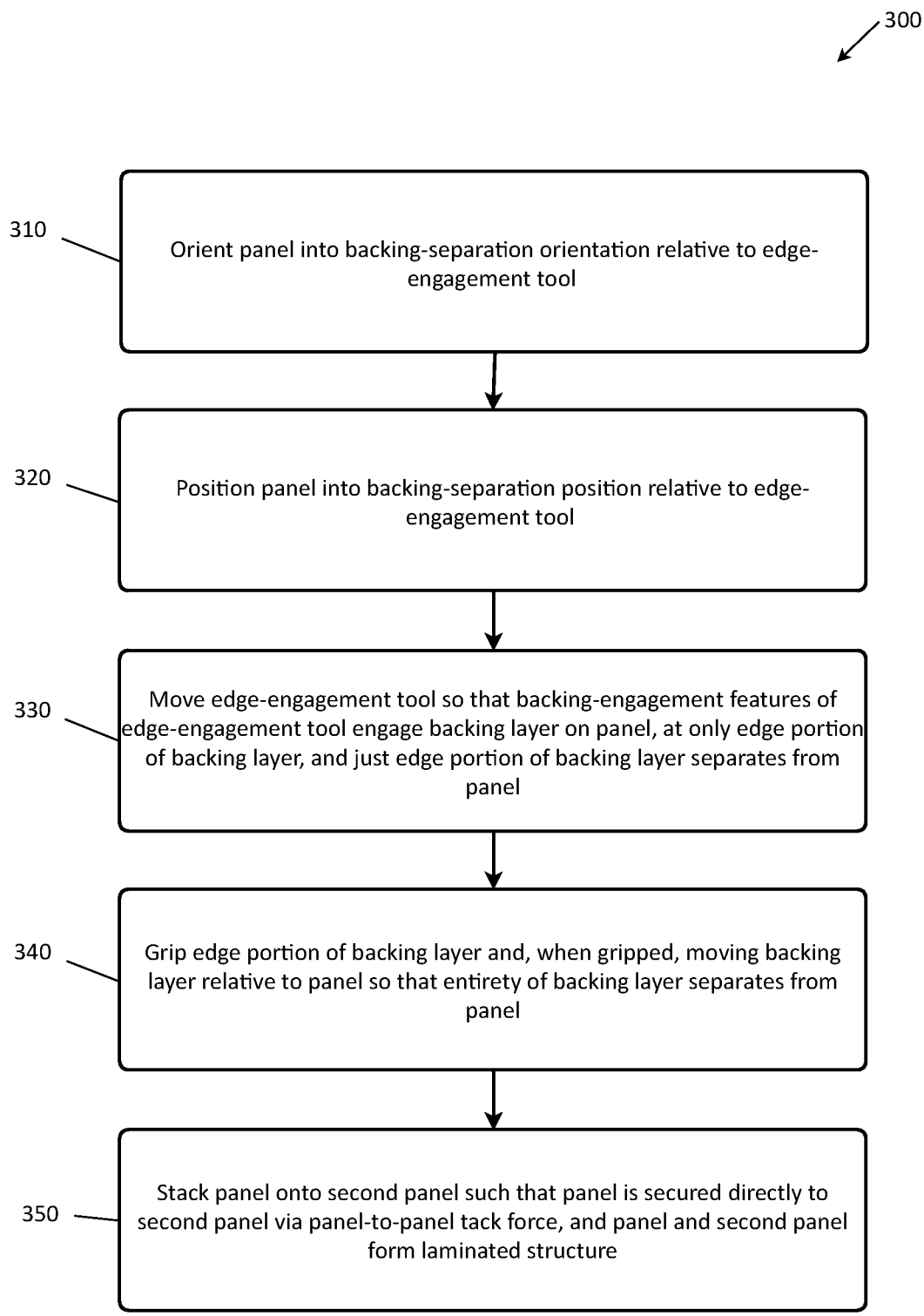
FIG. 29 is a schematic flow chart of a method of forming a laminated structure, according to one or more examples of the present disclosure.

Referring to FIG. 29, according to some examples, a method 300 of forming the laminated structure 180, using the automated system 100, includes (block 310) orienting the first panel 110, and the backing layer 120 secured to the first panel 110, into the backing-separation orientation A, relative to the edge-engagement tool 112. The method 300 additionally includes (block 320) positioning the panel 110 into the backing-separation position B, relative to the edge-engagement tool 112. The method 300 also includes (block 330) moving the edge-engagement tool 112, relative to the first panel 110 and when the first panel 110 is in the backing-separation orientation A and the backing-separation position B, so that the backing-engagement features 114 of the edge-engagement tool 112 engage the backing layer 120, at only the edge portion 122 of the backing layer 120, and just the edge portion 122 of the backing layer 120 separates from the first panel 110. According to some examples, a temperature of the panel 110 is maintained below a predetermined temperature (such as room temperature or between 66° F. and 72° F. (e.g., 68° F.)). Maintaining the temperature of the panel 110 at or below the predetermined temperature is accomplished by blowing air 168, such as from a blower 169 (see, e.g., FIG. 1), that has a temperature at or below the predetermined temperature. The method 300 further includes (block 340) gripping the edge portion 122 of the backing layer 120, after the edge portion 122 separates from the first panel 110, and, when gripped, moving the backing layer 120 relative to the panel 110 so that an entirety of the backing layer 120 separates from the broad surface 111 of the first panel 110. As shown in FIG. 30A, the method 300 additionally includes (block 350) stacking the first panel 110 onto the second panel 184, such that the first panel 110 is secured directly to the second panel 184 via panel-to-panel tack force between the pre-impregnated fiber reinforced polymer of the first panel 110 and the pre-impregnated fiber reinforced polymer of the second panel 184, and the first panel 110 and the second panel 184 form, at least part of, the laminated structure 180.

Referring to FIG. 30B, in some examples, the laminated structure 180 includes a plurality of panels 110, some of which include one of a plurality of clusters 165, that are stacked together as shown, according to block 350 of the method 300. In some examples, each one of the clusters 165 is applied onto a corresponding one of the panels 110, to form part of the panels, before the panels are stacked together. As shown, the laminated structure 180 can include a plurality of panels 110, some with clusters 165, where each one of the panels includes multiple plies. As such, in some examples, the laminated structure 180 can include a significant number of plies, such as at least 10 plies, in certain examples, at least 60 plies, in other examples, and between 20 and 80 plies, or between 40 and 80 plies, in yet further examples. The thickness of each ply can be such that a total thickness of the laminated structure 180 is between 3 mm and 6.5 mm. Moreover, because some laminated structures are formed from many panels, each having at least one backing layer adhesively attached thereto prior to being stacked together, a backing layer removal process, which does not degrade the quality of the panels, may need to be performed many times for a single laminated structure. The automated system 100 and corresponding method 300 of the present disclosure, which enable removal of multiple backing layers from multiple panels in a clean, controlled, and efficient manner, are particularly useful for assembling laminated structures made from multiple panels. In certain examples, other panels, such as a fiberglass ply 187, made of a fiberglass material, a single ply 189, made of a fiber-reinforced polymer other than fiberglass, and a second fiberglass ply 191, made of a fiberglass material, can be stacked with the panels 110 and clusters 165 as shown.

In some examples, the method 300 additionally includes automatedly separately applying the elongated strips 145 onto the first stack 161, at different angles relative to each other, to form the cluster 165 of the second stack 163. Automatedly separately applying the elongated strips 145 can include, while maintaining an orientation of the elongated strips 145, incrementally rotating the first stack 161 relative to the elongated strips 145. Accordingly, in some examples, the step of automatedly separately applying the elongated strips 145 onto the first stack 161 comprises, while maintaining an orientation of the elongated strips 145, incrementally rotating the first stack 161 relative to the elongated strips 145.

Referring to FIG. 1, the method 300 additionally, or alternatively, includes of adjusting a distance, in a stacked direction 167 that is perpendicular to the broad surface 111 when the first panel 110 is stacked onto the second panel 184, between the edge-engagement tool 112 and the second panel 184 prior to the step of moving the edge-engagement tool 112. As panels are stacked onto each other, the height of the laminated structure 180 changes. To compensate for the adjustment to the height of the laminated structure 180, and ensure the edge-engagement tool 112 is properly positioned to engage only the backing layer 120 on the panel at the top of the laminated structure, the position of the edge-engagement tool 112 is adjusted. Each adjustment of the position of the edge-engagement tool 112 can be equal to a thickness of the panel added to the stack of panels forming the laminated structure 180.

Figure 31:
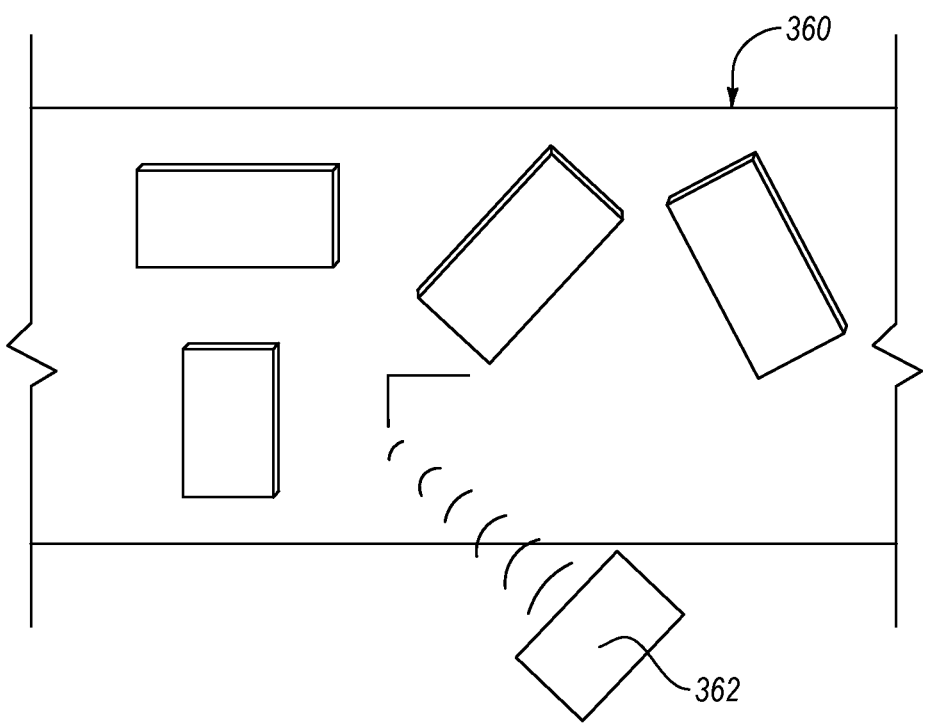
FIG. 31 is a schematic, isotropic view of a sheet of pre-impregnated reinforced polymer and plies being removed therefrom, according to one or more examples of the present disclosure.

In some examples, the method 300 further includes steps for forming each of the panels before stacking them. For example, the method 300 can include ultrasonically cutting a sheet 360, made of the pre-impregnated fiber-reinforced polymer, into the plurality of plies 129 using a cutter 362, which can be an ultrasonic cutter 362 (see, e.g., FIG. 31), stacking a first set of the plurality of plies 129 (e.g., a first ply 129A, a second ply 129B, a third ply 129C, and a fourth ply 129D) to form the first panel 110, and stacking a second set of the plurality of plies 129 (e.g., a first ply 129A, a second ply 129B, a third ply 129C, and a fourth ply 129D) to form the second panel 184 (see, e.g., FIG. 32).

Figure 33:
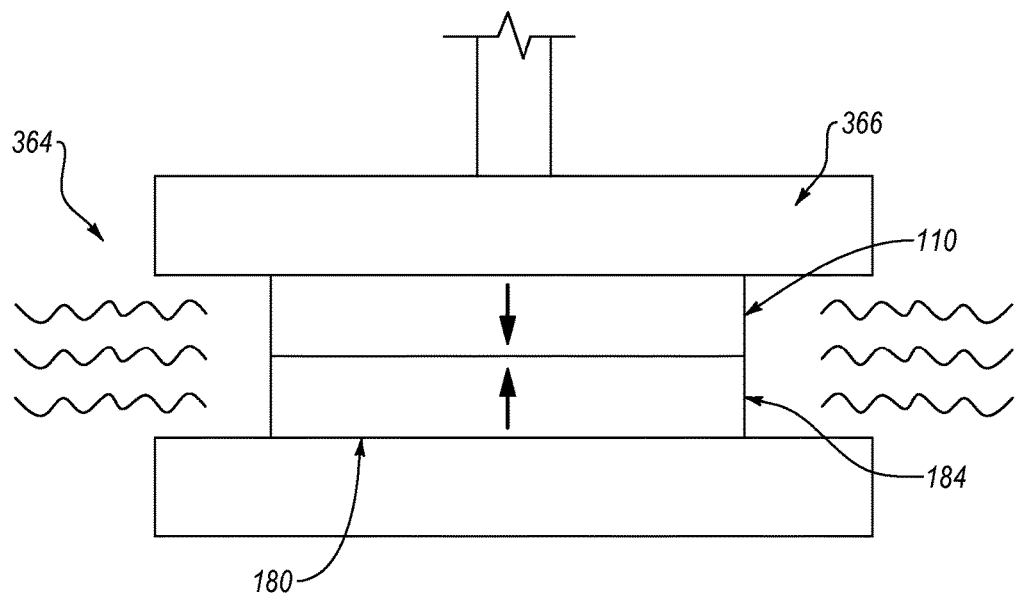
FIG. 33 is a schematic, isotropic view of a first panel and a second panel being compressed together and heated, according to one or more examples of the present disclosure.

After stacking the first and second panels, in some examples, the method 300 also includes compressing, using a compression device 366 (such as a compression molding device), and heating, with heat 364, the first panel 110 and the second panel 184 such that the pre-impregnated fiber-reinforced polymer is cured (see, e.g., FIG. 33). The compression molding device, in some examples, includes molds that shape the panels into a desired final shape.

Figure 34:
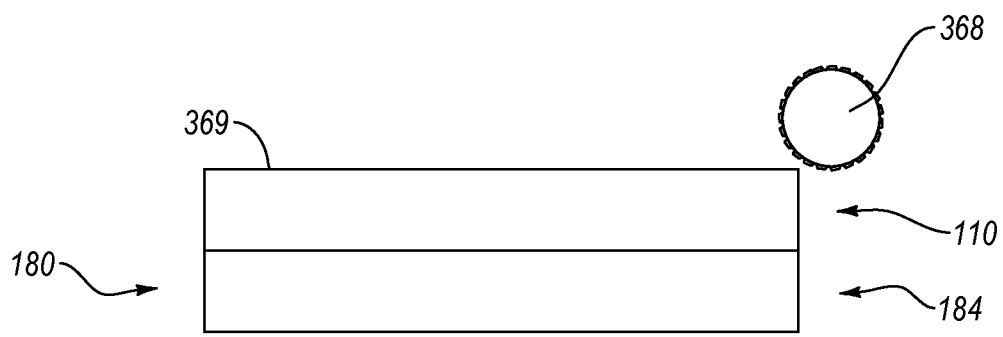
FIG. 34 is a schematic, isotropic view of the first panel of FIG. 33 being surface roughened, according to one or more examples of the present disclosure.
Figure 35:
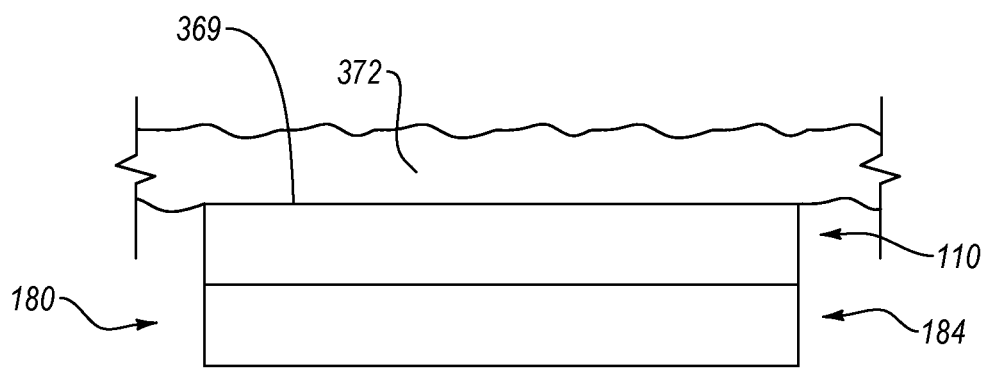
FIG. 35 is a schematic, isotropic view of the first panel of FIG. 34 being cleaned, according to one or more examples of the present disclosure.
Figure 36:
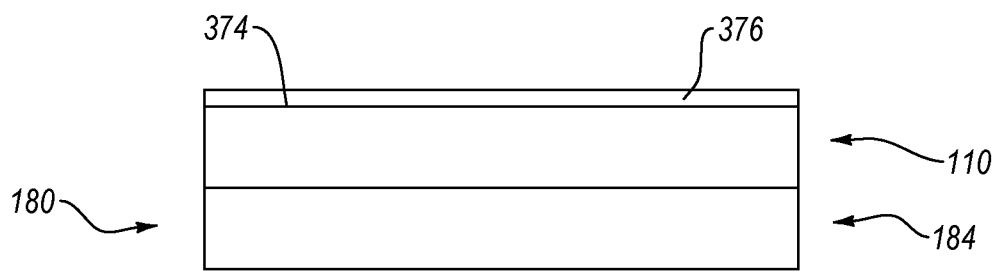
FIG. 36 is a schematic, isotropic view of the first panel of FIG. 35 and a primer layer applied onto the first panel, according to one or more examples of the present disclosure.
Figure 37:
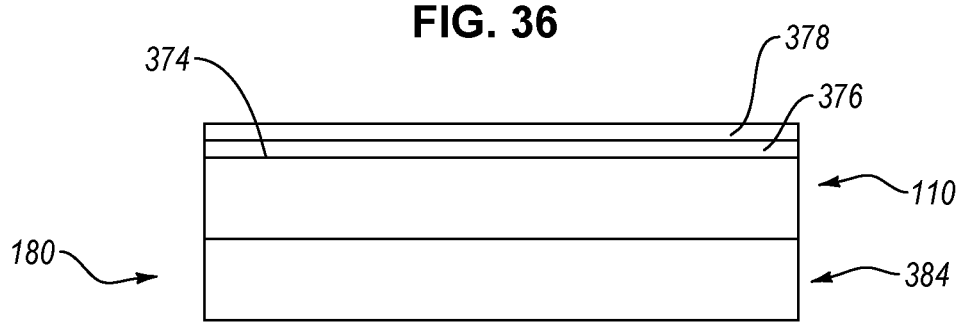
FIG. 37 is a schematic, isotropic view of the first panel and primer layer of FIG. 36 and an ink applied onto the primer layer, according to one or more examples of the present disclosure.

After curing the first panel 110 and the second panel 184, the method 300 can include the steps of roughening an outer surface (e.g., one of the broad surfaces) of one of the first panel 110 or the second panel 184, such as with a surface roughening device 368 (e.g., grinder), to form a roughened outer surface 369 (see, e.g., FIG. 34), cleaning the roughened outer surface 369, such as with a cleaning agent 372 (e.g., water or chemical), to form a cleaned-roughened outer surface 374 (see, e.g., FIG. 35), applying a primer layer 376 onto the cleaned-roughened outer surface 374 (see, e.g., FIG. 36), and applying ink 378 onto the primer layer 376 (see, e.g., FIG. 37). Applying the primer layer 376 and the ink 378 can be executed as a single step, such as where the ink 378 is capable of performing as a primer layer. In some examples, the step of applying the primer layer 376 and/or applying the ink 378 can be accomplished in a manner similar to that disclosed in U.S. Patent Application Publication No. 2014/0274446, published Sep. 18, 2014, which is incorporated herein by reference in its entirety. In one example, the ink 378 includes indicia of alignment aids or additional color contrasts or images that are printed on one of the outer surfaces of the first panel 110 or the second panel 184 using halftone printing, relief printing, thermal transfer printing, ink-jet printing, pad printing or other techniques, which are described more fully in U.S. patent application Ser. No. 14/210,000, filed on Mar. 13, 2014, which is incorporated herein by reference in its entirety. Additionally, or alternatively, the ink 378 includes indicia of alignment aids or additional color contrasts or images that are printed on one of the outer surfaces of the first panel 110 or the second panel 184 using inkjet printing, single pass inkjet printing, digital printing, or other techniques, which are described more fully in U.S. patent application Ser. No. 17/156,205, filed on Jan. 22, 2021, U.S. Patent Application No. 62/965,129, filed on Jan. 23, 2020, and U.S. Patent Application No. 63/066,033, filed on Aug. 14, 2020, which are incorporated herein by reference in their entirety.

Figure 38:
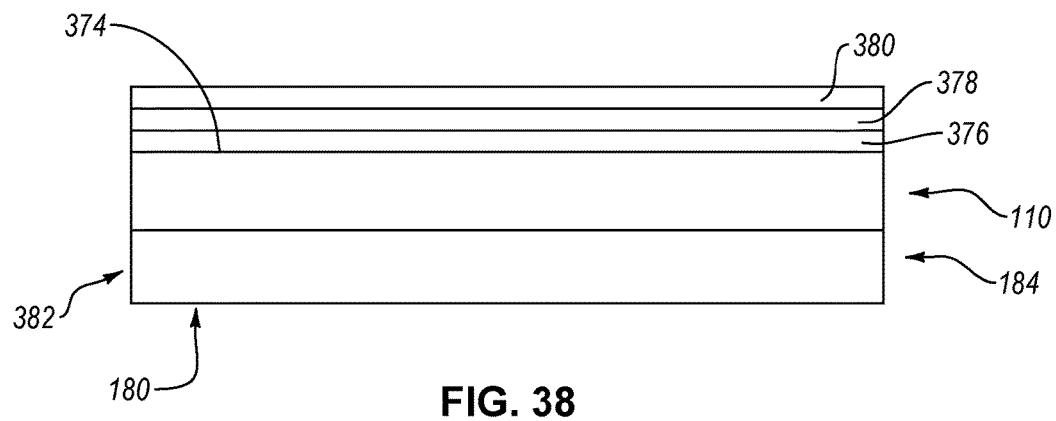
FIG. 38 is a schematic, isotropic view of the first panel, primer layer, and ink of FIG. 37 and a polymeric layer applied onto the ink to form a pre-cut laminated structure, according to one or more examples of the present disclosure.
Figure 39:
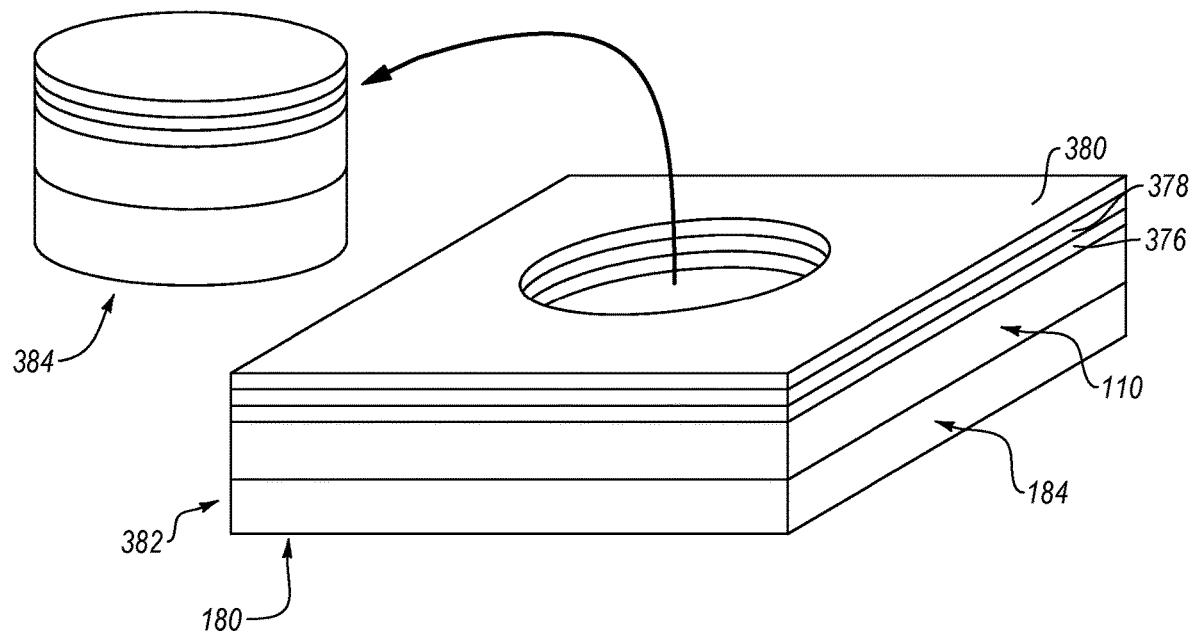
FIG. 39 is a schematic, isotropic view of a cut laminated structure cut from the pre-cut laminated structure of FIG. 38, according to one or more examples of the present disclosure.

After applying the ink 378 onto the primer layer 376, in some examples, the method 300 additionally includes compression molding a polymeric layer 380 onto the primer layer 376 and over the ink 378 to form a pre-cut laminated structure 382 (see, e.g., FIG. 38). The polymeric layer 380 defines a portion of a preform 410 (e.g., plaque) in some examples. A thickness of the polymeric layer 380 is constant in some examples. In other examples, the thickness of the polymeric layer 380 varies from 0.03 mm to 0.70 mm or from 0.2 mm to 1.2 mm. According to some examples, the thickness of the polymeric layer 380 varies from 0.0001 mm to 2.5 mm and the polymeric layer 380 defines at least a portion of the bulge and the roll of the strike face of the golf club head. In certain examples, the primer layer and the ink 378 are flat, and the polymeric layer 380, having a varied thickness, such as from 0.0001 mm to 2.5 mm, defines the bulge and the roll of the strike face. The method 300 additionally includes, in some examples, cutting the pre-cut laminated structure 382 to form a cut laminated structure 384 having a predefined shape (see, e.g., FIG. 39). The mold facilitates a plurality of peaks and troughs in the exterior surface of the polymeric layer 380 such that a surface roughness value Ra of the exterior surface of the polymeric layer 380 is between, and inclusive of, 2.5 µm and 5 µm. In some examples, the polymeric layer 380 is at least translucent (e.g., translucent or transparent) such that at least a portion of at least one of the base surface, the first layer of paint, the second layer of paint, and the third layer of paint is visible through the polymeric layer 380.

According to some examples, the preform 410 includes three layers of paint, which are applied onto a surface (e.g., base surface) of an outermost panel 110 of the preform 410. The three layers of paint (e.g., the primer coating 418, the first pattern of ink 428, and the second pattern of ink 432) are applied over a surface area of the base surface. The surface areas covered by the three layers of paint can be different. For example, a first surface area of a first layer of paint and a second surface area of a second layer of paint is more than a third surface area of a third layer of paint.

Figure 28:
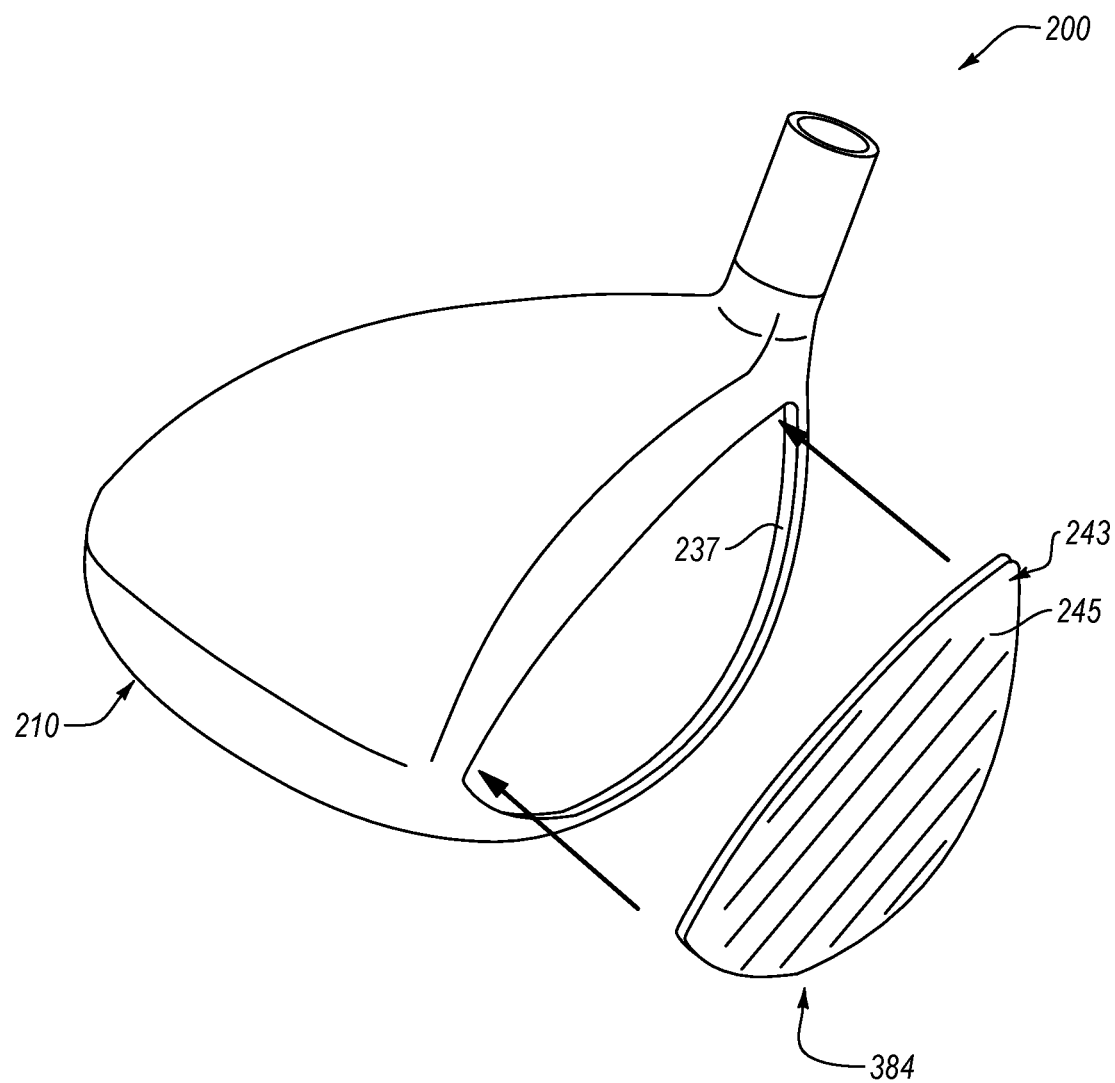
FIG. 28 is a schematic isotropic view of a golf club head, according to one or more examples of the present disclosure.

The cut laminated structure 384 is a strike plate of a golf club head, such as the strike plate 243 of the golf club head 200 of FIG. 28, in some examples. The golf club head 200 includes a body 210 that defines an opening 237. The strike plate 243 is attached (e.g., adhered) to the body 210 over the opening 237 to effectively close the opening 237. The strike plate 243 includes a strike face 245 configured to impact a golf ball during a proper golf shot. In such examples, the step of compressing the first panel 110 and the second panel 184, such as via a compression molding technique, can include shaping the strike plate 243 to incorporate various features into the strike plate 243, such as a desired bulge and roll radius and/or a twisted strike face.

The bulge and roll radius feature, which can be incorporated into the strike plate 243 when compression molded, can be similar to the bulge and roll radius features disclosed in U.S. Pat. No. 8,012,039, issued Sep. 6, 2011, which is incorporated herein by reference in its entirety.

The twisted strike face features, which can be incorporated into the strike plate 243, can be similar to the features of the strike face disclosed in U.S. Pat. No. 10,881,916, issued Jan. 5, 2021, which is incorporated herein by reference in its entirety. For example, the strike face 245 of the strike plate 243 can be twisted such that an upper toe portion of the strike face 245 is more open than a lower toe portion of the strike face 245, and such that a lower heel portion of the strike face 245 is more closed than an upper heel portion of the strike face 245. In certain examples, the golf club head 200 has a volume of 50 cubic centimeters (cc) to 500 cc, 390 cc to 490 cc, 100 cc to 430 cc, 100 cc to 400 cc, 100 cc to 350 cc, 100 cc to 300 cc, 100 cc to 299 cc, 100 cc to 250 cc, 100 cc to 200 cc, 140 cc to 160 cc, or 149 cc to 154 cc. In a particular example, the golf club head 200 has a volume of 456.6 cc. In particular examples, the strike face 245, the strike-plate preform 410, and/or the golf club head 200 has a bulge curvature or radius of from 100 millimeters (mm) to 500 mm, 190 mm to 500 mm, 200 mm to 450 mm, 203 mm to 407 mm, 250 mm to 460 mm, 224 mm to 355 mm, 250 mm to 355, 203 mm to 305 mm, or 230 mm to 280 mm. In a particular example, the golf dub head 200 has a bulge radius of 254 mm or 300 mm. In some examples, the strike face 245 and/or the golf club head 200 has a roll curvature radius of from 1.00 mm to 510 mm, 120 mm to 500 mm, 150 mm to 500 mm. 200 mm to 450 mm, 203 mm to 407 mm, 224 mm to 355 mm, 250 mm to 355, 203 mm to 305 mm, or 230 mm to 280 mm, in a particular example, the golf club head 200 has a roll radius of 254 mm or 300 mm. The above bulge radius and roll radius numbers can apply to golf club heads with a strike plate, made of a liber-reinforced polymer, that has a "twisted" bulge radius and roll radius or without a twisted bulge radius and roll radius ("non-twisted").

In some examples, the cut laminated structure 384 is one of a crown insert, a sole insert, or other portion of a golf club head made of a fiber-reinforced polymer. Alternatively, according to certain examples, the cut laminated structure 384 forms at least part of a shaft of a golf club. Accordingly, the same process for making the strike plate 243 can be followed to make a crown insert or a sole insert of a golf club head, or a shaft of a golf club.

Referring to FIGS. 41-69, examples of a system 100, and corresponding methods of using the system 100, for forming a golf club head having a composite strike plate are shown. The composite strike plate is a strike plate made of a fiber-reinforced polymeric material. The composite strike plate can be the same as or similar to the strike plate 243 of FIG. 28. Alternatively, in some examples, as shown in FIGS. 62, 63, and 66-69, the composite strike plate can be the same as or similar to the strike plate 470 of the golf club head 401. In some examples, the golf club head 401 is the same as or similar to the golf club head disclosed in U.S. patent application Ser. No. 17/124,134, filed Dec. 16, 2020, or U.S. patent application Ser. No. 17/505,511, filed Oct. 19, 2021, which are incorporated herein by reference in its entirety.

Figure 41:
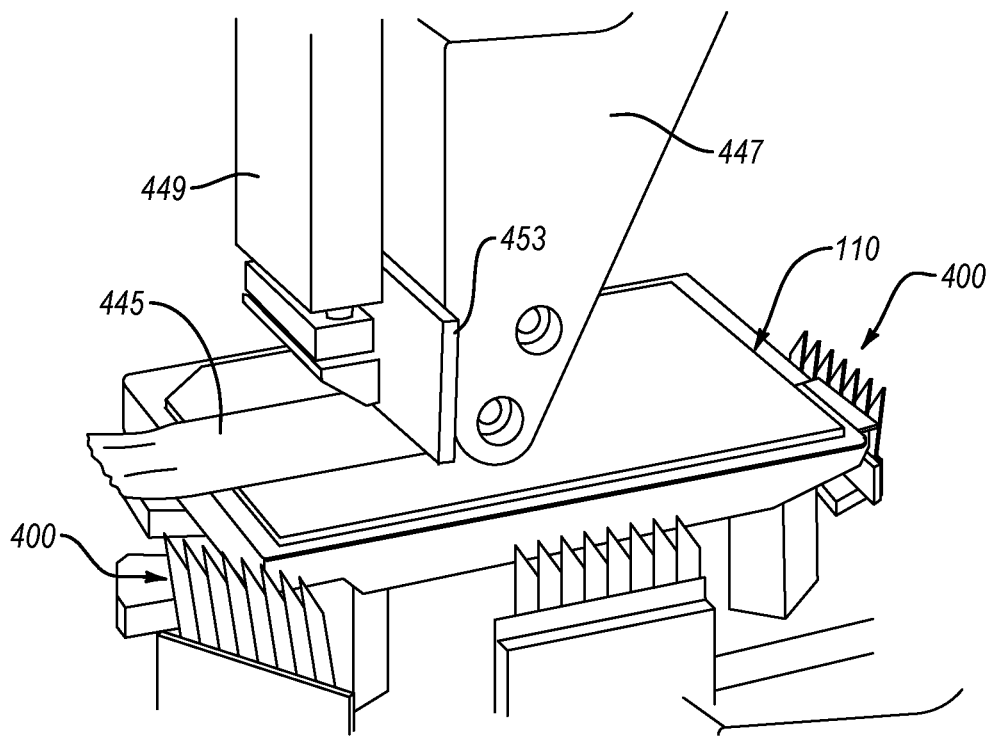
FIG. 41 is a schematic, isotropic view of a strip layup tool of a system for forming a golf club head having a composite strike plate, which includes multiple stacked elongated strips made of a fiber-reinforced polymeric material, according one or more examples of the present disclosure.
Figure 42:
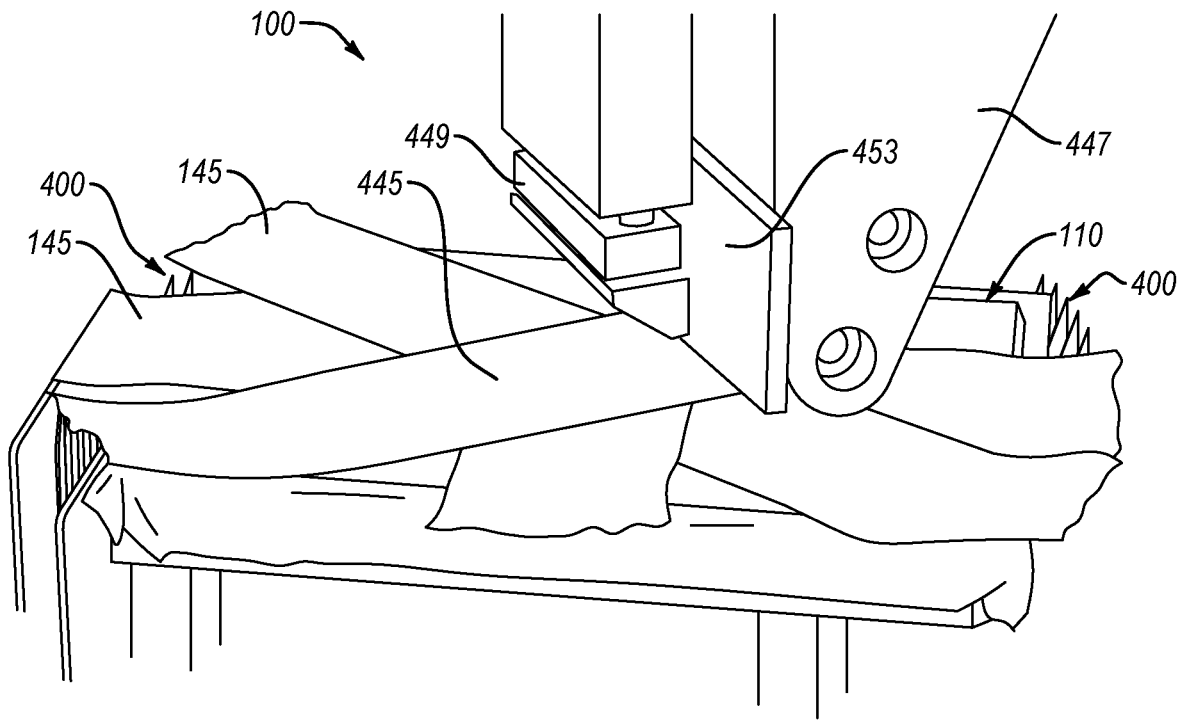
FIG. 42 is a schematic, isotropic view of the tool of FIG. 41, according one or more examples of the present disclosure.

Referring to FIGS. 41 and 42, in some examples, the system 100 includes a tape dispenser 447, which is an alternative example of the robotic arm shown in FIG. 25. The tape dispenser 447 is configured to dispense a length of uncured pre-impregnated fiber-reinforced material 445 from a continuous length of the uncured pre-impregnated fiber-reinforced material (e.g., from a roll of the uncured pre-impregnated fiber-reinforced material 445). The dispensed length of uncured pre-impregnated fiber-reinforced material 445 is applied onto the panel 110. In some examples, the panel 110 is not attached directly to another panel 110. However, in other examples, the panel 110 is a first panel attached directly to second panel 110 prior to or after applying the material 445 onto the first panel 110. The applied material 445 forms a rear surface of a strike plate of a golf club head. In yet some examples, the second panel 110 is attached onto the applied material 445, such that the applied material 445 is interposed or sandwiched between the first panel 110 and the second panel 110. The tape dispenser 447 includes a pressure plate 453 (e.g., applicator) that is positioned to apply a downward pressure onto the uncured pre-impregnated fiber-reinforced material 445 as the material is dispensed onto the panel 110. The downward pressure helps promote an initial adherence of the material 445 to the panel 110 by removing air bubbles.

In some examples, the continuous length of the uncured pre-impregnated fiber-reinforced material 445 includes a backing paper. Although not shown, the tape dispenser 447 can include a backing paper release mechanism, that removes the backing paper just prior to the material 445 being deposited, and a holder, that retains released backing paper.

After the dispensed length of uncured pre-impregnated fiber-reinforced material 445 is applied onto the panel 110, the tape dispenser 447 is moved relative to a first one of several cutting blades 400. Then, an actuating arm 449 of the tape dispenser 447 is actuated to press down on the material 445 and force the material 445 into contact with the cutting blades 400, which trims the dispensed length of material 445 into an elongated strip 145 (e.g., first elongated strip 145A of FIG. 70). Subsequently, an additional length of the uncured pre-impregnated fiber-reinforced material 445, from the continuous length of the uncured pre-impregnated fiber-reinforced material, is dispensed from the tape dispenser 447 and applied onto the previously applied elongated strip 145 and the panel 110. The additional length of the material 445 is trimmed using a second one of the cutting blades 400 to form another elongated strip 145 (e.g., second elongated strip 145B of FIG. 70). After this, another length of the uncured pre-impregnated fiber-reinforced material 445, from the continuous length of the uncured pre-impregnated fiber-reinforced material 445, is dispensed from the tape dispenser 447 and applied onto the two previously applied elongated strips 145 and the panel 110. This additional length of the material 445 is trimmed using a third one of the cutting blades 400 to form yet another elongated strip 145 (e.g., third elongated strip 145C of FIG. 70). A fourth or more elongated strips can be applied onto one another in a similar manner until a desired number of elongated strips are applied onto the panel 110. The trimming is performed by pulling the material 445 down over the blades 400 in some examples. In other examples, the trimming is performed by moving (e.g., drawing) the blades 400 into contact with the material 445. In some examples, the blades 400 are attached to the tape dispenser 447 and actuated relative to the pressure plate 453 (e.g., via motors or other actuators) to cut the material 445.

According to some examples, the tape dispenser 447 is positioned such that the downward pressure applied onto the uncured pre-impregnated fiber-reinforced material 445, as the material is dispensed onto the panel 110 by the pressure plate 453 to form any one or more of the first elongated strip, the second elongated strip, or the third elongated strip, is at least 1700 pascal (0.2465 psig) for a given pressure period of less than 5 seconds, is at least 3400 pascal for a given pressure period of less than 2.5 seconds, or is at least 5100 pascal for a given pressure period of less than 1 second. According to some examples, the downward pressure applied onto the uncured pre-impregnated fiber-reinforced material 445 is at least 6800 pascal, less than 140,000 pascal, less than 120,000 pascal, less than 100,000, less than 80,000 pascal, less than 60,000 pascal, less than 40,000 pascal, or less than 20,000 pascal. In certain examples, the pressure is applied for a pressure period of at least 0.05 seconds, at least 0.10 seconds, at least 0.15 seconds, or at least 0.20 seconds. The pressure applied to one of the elongated strips is different than the pressure applied to another one or more of the elongated strips in some examples. Moreover, the pressure applied to an elongated strip can vary as the elongated strip is applied from a lowest pressure to a highest pressure. The highest pressure is at least 5%. 10%, 15%, or 20% greater than the lowest pressure, in some examples. In these or other examples, the highest pressure is no more than 100%. 85%, 70%, or 55% greater than the lower pressure.

In some examples, at the first elongated strip 145A, the second elongated strip 145B, and the third elongated strip 145C are applied onto the panel 110, the strips are heated to above 30 degrees Celsius.

According to some examples, the tape dispenser 447 is moved relative to the panel 110 so that the uncured pre-impregnated fiber-reinforced material 445 is applied or attached onto the panel 110 at an attachment rate of at least 25% of the strip width W2 per second, at an attachment rate of at least 50% of the strip width W2 per second, at an attachment rate of at least 75% of the strip width W2 per second, at an attachment rate of at least 100% of the strip width W2 per second. According to at least one of the above examples, the tape dispenser 447 is moved relative to the panel 110 so that the uncured pre-impregnated fiber-reinforced material 445 is applied or attached onto the panel 110 at an attachment rate of no more than 700% of the strip width W2 per second, at an attachment rate of no more than 600% of the strip width W2 per second, at an attachment rate of no more than 500% of the strip width W2 per second, at an attachment rate of no more than 400% of the strip width W2 per second, at an attachment rate of no more than 300% of the strip width W2 per second, and at an attachment rate of no more than 200% of the strip width W2 per second.

According to certain examples, the strip widths W2 of the elongated strips 145 are not the same.

According to some examples, the tape dispenser 447 is moved relative to the panel 110 so that the uncured pre-impregnated fiber-reinforced material 445 is applied or attached onto the panel 110 at an attachment rate of at least 10% of the panel width W1 per second, at an attachment rate of at least 20% of the panel width W1 per second, at an attachment rate of at least 30% of the panel width W1 per second, at an attachment rate of at least 40% of the panel width W1 per second. According to some examples, including at least one of the above examples, the tape dispenser 447 is moved relative to the panel 110 so that the uncured pre-impregnated fiber-reinforced material 445 is applied or attached onto the panel 110 at an attachment rate of no more than 500% of the panel width W1 per second, at an attachment rate of no more than 400% of the panel width W1 per second, at an attachment rate of no more than 300% of the panel width W1 per second, at an attachment rate of no more than 200% of the panel width W1 per second, at an attachment rate of no more than 100% of the panel width W1 per second.

According to some examples, the tape dispenser 447 is moved relative to the panel 110 so that the uncured pre-impregnated fiber-reinforced material 445 is applied or attached onto the panel 110 at an attachment rate of at least 6.3 mm per second, no more than 150 mm per second, between, and inclusive of 9 mm per second and 130 mm per second, between, and inclusive of 12 mm per second and 100 mm per second, between, and inclusive of, 15 mm per second and 85 mm per second, or between, and inclusive of, 18 mm per second and 75 mm per second.

Figure 70:
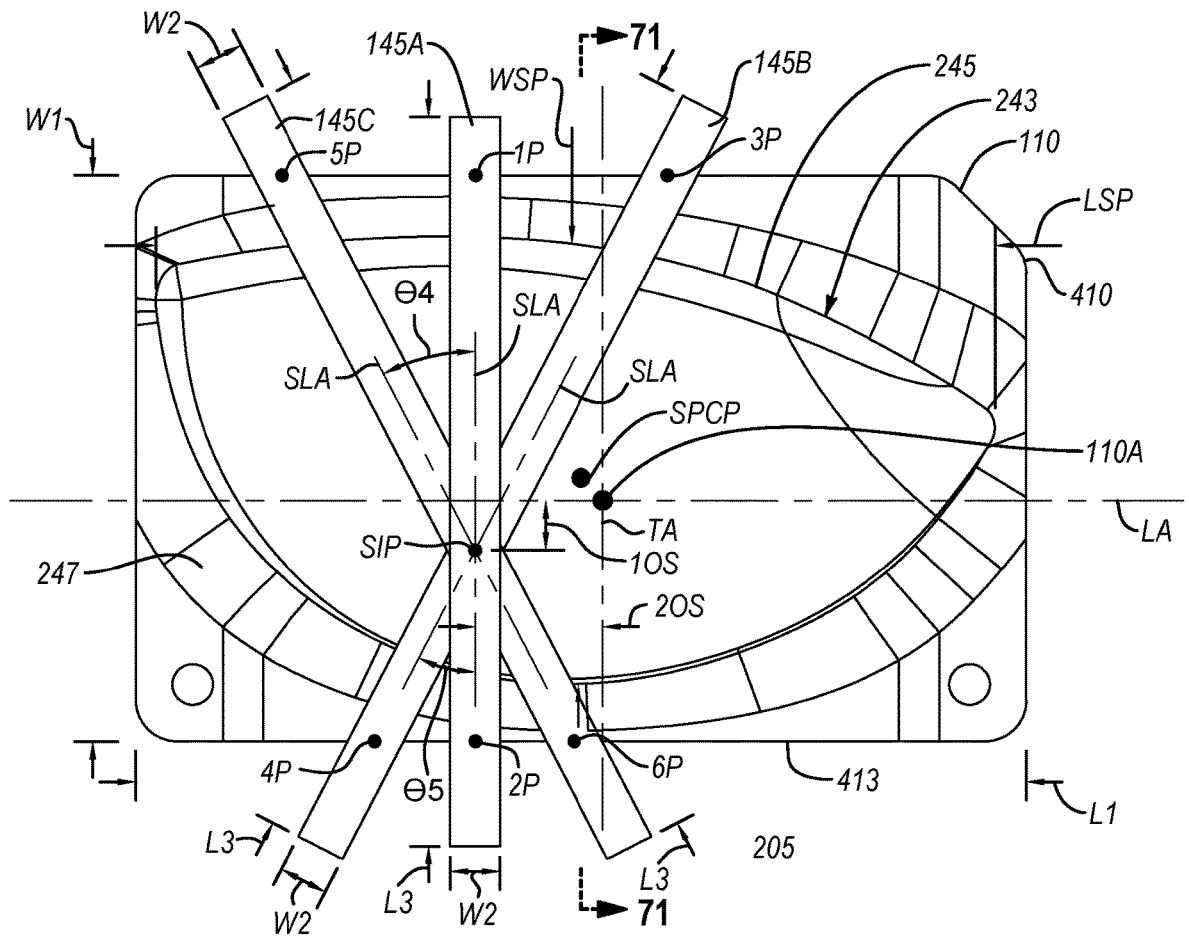
FIG. 70 is a schematic, top plan view of a strike-plate preform, showing representative elongated strips overlaying the strike-plate preform, according to one or more examples of the present disclosure.

The elongated strips shown in FIG. 70 are representations of three elongated strips of the strike-plate preform 410 and the panel 110 in FIG. 70 is a representation of one of the panels of the strike-plate preform 410. In some examples, the lengths of the elongated strips 145 applied onto the panel 110 are not the same. For example, referring to FIG. 70, the length L3 of the first elongated strip 145A is less than the length L3 of the second elongated strip 145B and the third elongated strip 145C, and the length L3 of the second elongated strip 145B is more than the length of the third elongated strip 145C. Additionally, or alternatively, in certain examples, the elongated strips 145 are applied so that the elongated strips 145 extend from one point on a perimeter of the panel 110 to another point on the perimeter of panel 110. In some examples, the elongated strips 145 extend in a straight path. For example, referring to FIG. 70, the first elongated strip 145A extends from a first point 1P on the perimeter of the panel 110 to a second point 2P on the perimeter of the panel 110, the second elongated strip 145B extends from a third point 3P on the perimeter of the panel 110 to a fourth point 4P on the perimeter of the panel 110, and the third elongated strip 145C extends from a fifth point 5P on the perimeter of the panel 110 to a sixth point 6P on the perimeter of the panel 110.

Referring to FIG. 70, the panel 110 has a longitudinal axis LA that passes through a centroid 110A (e.g., geometric center) of the panel and is parallel to the length L1 of the panel 110 and a transverse axis TA that passes through the centroid 110A of the panel and is parallel to the width W1 of the panel 110. Additionally, each one of the elongated strips 145 has a strip longitudinal axis SLA that is parallel to a length of the elongated strip 145 and passes through a midpoint relative to a width of the elongated strip 145. According to some examples, the strip longitudinal axis SLA of the first elongated strip 145A intersects with the strip longitudinal axis SLA of the second elongated strip 145B and/or the third elongated strip 145C at a strip intersection point SIP. The strip intersection point SIP is offset from the centroid 110A by a first offset 10S parallel to the width W1 of the panel 110 and a second offset 20S parallel to the length L1 of the panel 110. In some examples, one or both of the first offset 10S and the second offset 20S is at least 10%, 15%, 25% or 50% of the strip width W2 of at least one of the first elongated strip 145A, the second elongated strip 145B, or the third elongated strip 145C. In the same or different examples, one or both of the first offset 10S and the second offset 20S is no more than 300%, 250%, 200%, 175%, 165%, 155%, 145%, 135%, 125%, 115%, or 105% of the strip width W2 of at least one of the first elongated strip 145A, the second elongated strip 145B, or the third elongated strip 145C. In some examples, one or both of the first offset 10S and the second offset 20S is between, and inclusive of, 10% and 100% of the minimum strip width W2 of at least one of the first elongated strip 145A, the second elongated strip 145B, or the third elongated strip 145C.

In some examples, the strip intersection point SIP of the overlapping elongated strips forming a cluster layer of the preform 410 are shifted toeward of the geometric center SPCP of the strike plate 243 (e.g., strike face) and the geometric center 110A of the preform 410. The shift can be between, and inclusive of, 10% and 100% of the minimum width of the overlapping elongated strips. In one example, the strip intersection point SIP is shifted toeward of the geometric center SPCP of the strike plate 243 by a distance between, and inclusive of, 3 mm and 10 mm. In the same example, or an alternative example, the strip intersection point SIP is shifted toeward of the geometric center 110A of the preform 410 by a distance between, and inclusive of, 3 mm and 20 mm. Shifting the clusters toeward helps spread the coefficient of restitution (COR) of the overall face, thus increasing the sweet spot and helps control off-center characteristic time (CT) away from center face which tends to spike. Without the clusters shifted toeward the whole face would have to be slower in order to confirm to the USGA rule of less than 257 µs within a 40×20 mm central region on the face.

According to certain examples, the strip longitudinal axis SLA of the first elongated strip 145A intersects with the strip longitudinal axis SLA of the second elongated strip 145B at a first intersection point SIP and the strip longitudinal axis SLA of the first elongated strip 145A intersects with the strip longitudinal axis SLA of the third elongated strip 145C at a second intersection point SIP. The first intersection point SIP can be the same as (e.g., aligned with) the second intersection point SIP so that the first offset 10S and the second offset 20S are the same for both first and second intersection points SIP (see, e.g., FIG. 70). Alternatively, the first intersection point SIP can be different than the second intersection point SIP such that the first intersection point SIP is offset from the second intersection point SIP, so that the first offset 10S and the second offset 20S are different for at least one of the first and second intersection points SIP. For example, the first offset 10S and/or the second offset 20S of the first intersection point SIP is at least 10% or 20% greater than, and/or no more 200%, 150%, or 100% than, the first offset 10S and/or the second offset 20S, respectively, of the second intersection point SIP.

The elongated strips 145 are applied onto the panel 110 and each other such that the fibers of each one of the elongated strips 145 forms an angle relative to the panel 110. According to some examples, the angle defined by one of the elongated strips 145 is different than other ones of the elongated strips 145. Moreover, the cutting blades 400 are positioned about the panel 110 at locations that correspond with the angles of the elongated strips 145. In this manner, the cutting blades 400 are situated to trim the elongated strips 145 when the elongated strips 145 are in any of various angles relative to the panel 110.

In some examples, one of the panel 110 is rotated and the tape dispenser 447 is rotatably fixed, the tape dispenser 447 is rotated and the panel 110 is rotatably fixed, or both the panel 110 and the tape dispenser 447 are rotated a fourth angle θ4 after the first elongated strip 145A is applied onto the panel 110 and before the second elongated strip 145B is applied onto the panel 110, so that the first elongated strip 145A and the second elongated strip 145B are angled relative to each other at the fourth angle θ4. Similarly, in some examples, one of the panel 110 is rotated and the tape dispenser 447 is rotatably fixed, the tape dispenser 447 is rotated and the panel 110 is rotatably fixed, or both the panel 110 and the tape dispenser 447 are rotated a fifth angle θ5 after the second elongated strip 145B is applied onto the panel 110 and before the third elongated strip 145C is applied onto the panel 110, so that the second elongated strip 145B and the third elongated strip 145C are angled relative to each other at the fifth angle 05. Accordingly to one example, the fourth angle θ4 and the fifth angle θ5 are the same. In other examples, the fourth angle θ4 and the fifth angle θ5 are different. For example, the fourth angle θ4 can be at least 25%, at least 35%, at least 45%, or at least 55% greater than the fifth angle θ5. In other examples, the fourth angle θ4 is no more than 300%, no more than 250%, no more than 200%, or no more than 175% greater than the fifth angle θ5.

Each one of the first elongated strip 145A, the second elongated strip 145B, and the third elongated strip 145C includes a quantity of longitudinal continuous fibers that extend along the length of elongated strips. Moreover, each one of the first elongated strip 145A, the second elongated snip 145B, and the third elongated strip 145C includes a polymeric matrix material (e.g., resin) in which the longitudinal continuous fibers are embedded. In one example, the quantity of longitudinal continuous fibers in the first elongated strip 145A is different than the quantity of longitudinal continuous fibers in one or both of the second elongated strip 145E and the third elongated strip 145C. In another example, the quantity of longitudinal continuous fibers in each of the first elongated strip 145A, the second elongated strip 145B, and the third elongated strip 145C is the same. According to yet another example, the quantity of longitudinal continuous fibers in each of the first elongated strip 145A, the second elongated strip 145B, and the third elongated strip 145C is different.

As mentioned above, panel 110 includes a polymeric matrix material (e.g., resin) in which longitudinal continuous fibers are embedded. In one example, the total mass or total content of the resin of the first elongated strip 145A is different than the total mass or total content of the resin of at least one of the second elongated strip 145B and the third elongated strip 145C. In this or another example, the total mass or total content of the resin in the panel 110 is different than the total mass or total content of the resin in at least one of the first elongated strip 145C, the second elongated strip 145B, and the third elongated strip 145C.

Figure 43:
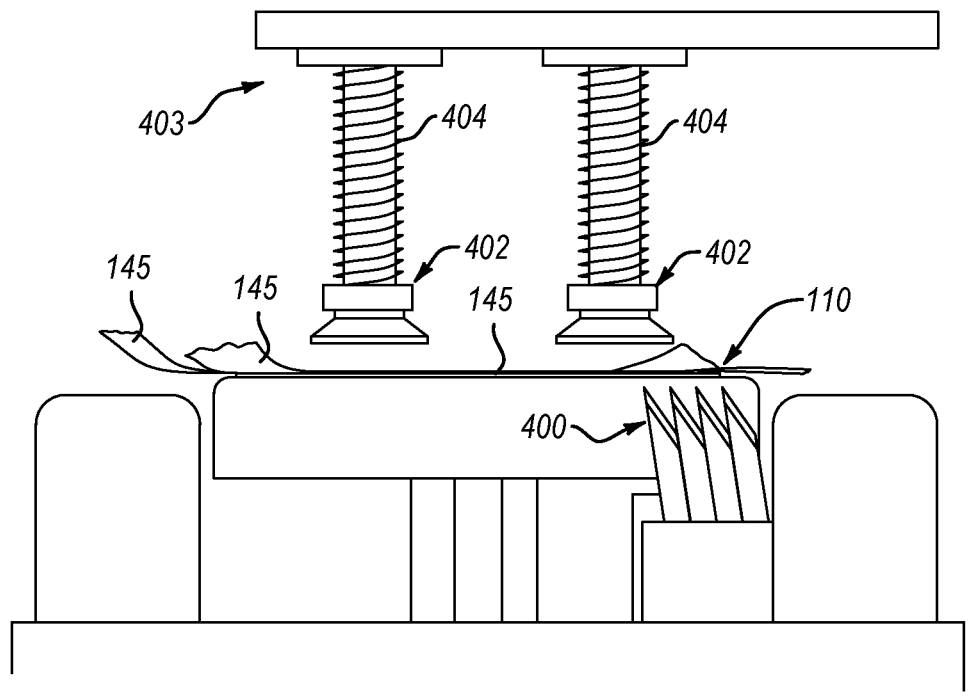
FIG. 43 is a schematic, isotropic view of a panel removal tool of a system for forming a golf club head having a composite strike plate, according one or more examples of the present disclosure.
Figure 44:
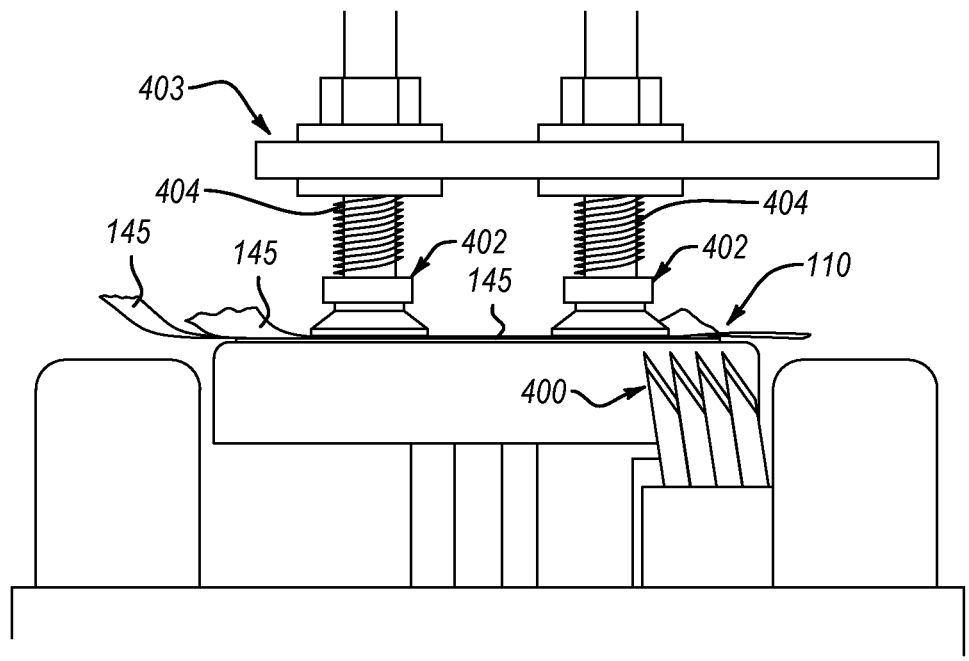
FIG. 44 is a schematic, isotropic view of the panel removal tool of FIG. 43, according one or more examples of the present disclosure.

Referring to FIGS. 43 and 44, after the elongated strips 145 are applied onto the panel 110a suction tool 403 of the system 100 can be used to grip and relocate the elongated strips 145 and the panel 110. The suction tool 403 includes multiple suction stems 402 that are spaced apart from each other. Each one of the suction stems 402 includes a hollow shaft and a suction cup on the end of the hollow shaft. The suction cup of each suction stem 402 is fluidically coupled with the hollow shaft of the corresponding suction stem 402. Although not shown, the suction tool 403 includes a vacuum source that is fluidically coupled with the hollow shafts of the suction stems 402. The vacuum source is selectively operable to generate negative pressure in the hollow shafts and the suction cups of the suction tool 403. When the elongated strips 145 and the panel 110 are to be moved, the suction tool 403 is moved over the elongated strips 145 and the panel 110, as shown in FIG. 43, and positioned such that the suction cups come in contact with the outward facing surface or surfaces of the elongated strips 145 and the panel 110. When in contact with the outward facing surface or surfaces, the vacuum source generates a negative pressure in the suction cups, which retains the elongated strips 145 and the panel 110 to the suction cups. After the elongated strips 145 and the panel 110 are retained by the suction cups, via negative pressure, the suction tool 403 can be moved, which correspondingly moves the elongated strips 145 and the panel 110.

As shown, in some examples, each one of the suction stems 402 includes a biasing member, such as compression spring 404, that helps bias the suction cup outwardly away from the suction tool 403. As suction tool 403 moves the suction cups of the suction stems 402 into contact with the surface or surfaces of the elongated strips 145 and the panel 110, the biasing member helps cushion the impact with the surface or surfaces. In this manner, the suction cups of the suction stems 402 can be moved into contact with the surface or surfaces without damaging the surface or surfaces. Additionally, the bias of the biasing members promotes sufficient engagement between the suction cups and the surface or surfaces that a vacuum seal can be created between the suction cups and the surface or surfaces. As shown in FIG. 44, the compression spring is compressed when the suction cups are in contact with the surface or surfaces to urge the suction cups into contact with the surface or surfaces of the elongated strips 145 and the panel 110 to ensure a proper vacuum seal is created. In certain examples, the hollow shafts of the suction stems 402 have a telescoping arrangement, which enables the hollow shafts to collapse as the suction stems 402 are pressed against the surface or surfaces of the elongated strips 145 and the panel 110.

Figure 71:
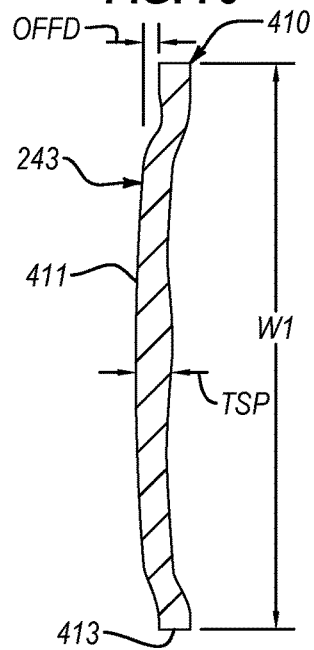
FIG. 71 is a schematic, sectional, side elevation view the strike-plate preform of FIG. 70, taken along the line 71-71 of FIG. 70, according to one or more examples of the present disclosure.
Figure 72:
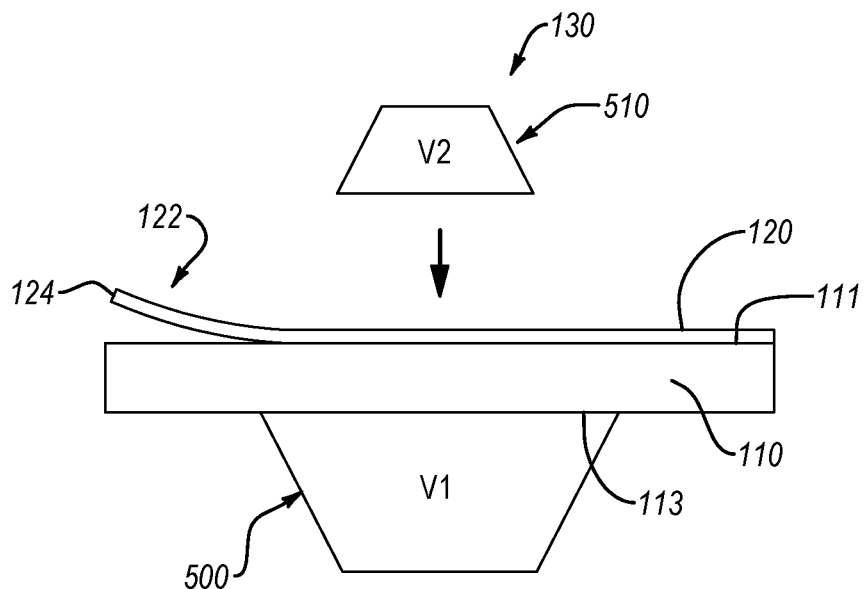
FIG. 72 is a schematic, side elevation view of a first vacuum device and a second vacuum device relative to a panel and a backing layer, according to one or more examples of the present disclosure.
Figure 73:
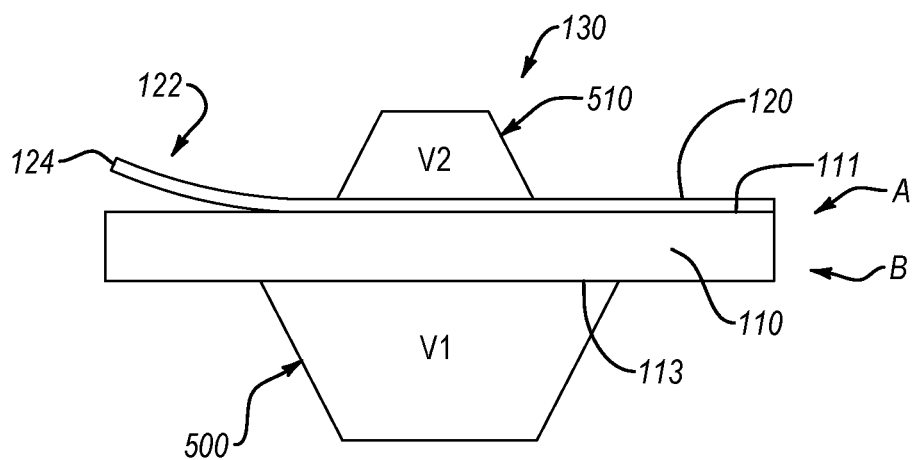
FIG. 73 is a schematic, side elevation view of the first vacuum device attached to the backing layer and the second vacuum device attached to the panel, according to one or more examples of the present disclosure.
Figure 74:
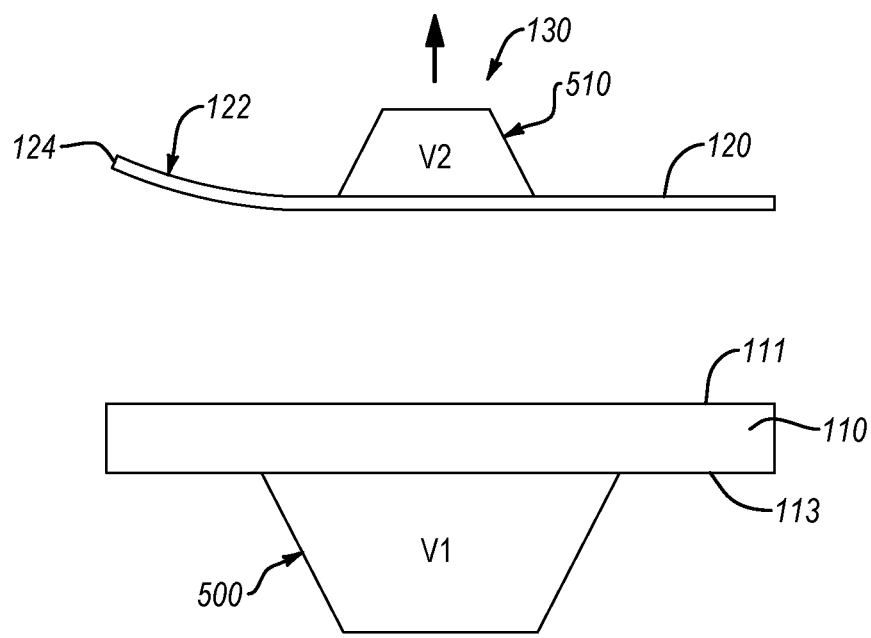
FIG. 74 is a schematic, side elevation view of the first vacuum device of removing the backing layer from the panel when the second vacuum device is attached to the panel, according to one or more examples of the present disclosure.

Additional panels 110 and elongated strips 145, panels 110, and/or layers of elongated strips 145 can be stacked together, as discussed above, to form a laminated structure 180. The laminated structure 180 is then cured to form a strike-plate preform 410. Referring to FIGS. 70 and 71, the strike-plate preform 410 has a front surface 411 (which has a total surface area) and a perimeter 413. Additionally, the strike-plate preform 410 has a width and a length equal to the width W1 and the length L1 of the panel 110. The strike-plate preform 410 defines the strike plate 243, which has a maximum length LSP and a width WSP. The strike plate 243 also has a geometric center point (e.g., centroid) SPCP, a thickness TSP, and a perimeter 245, and a front surface (striking surface) of the strike plate 243 has a total surface area. The strike plate 243 also has a bulge and a roll. The strike plate width WSP is the dimension of the strike plate 243 that passes through the geometric center point of the strike plate 243 and is perpendicular to the maximum length LSP of the strike plate 243. In some examples, the length L1 of the preform 410 is at least 3% greater than the maximum length LSP of the strike plate 243, the width W1 of the preform 410 is at least 5% greater than the width WSP of the strike plate 243, and the total surface area of the front surface 411 of the preform 410 is not more than 200% of the total surface area of the front surface of the strike plate 243. In some examples, the length L1 of the preform 410 is no more than 50%, 30%, or 20% greater than the maximum length LSP of the strike plate 243, the width W1 of the preform 410 is no more than 75%, 60% or 45% greater than the width WSP of the strike plate 243, and the total surface area of the front surface 411 of the preform 410 is at least 110%, 120%, or 130% of the total surface area of the front surface of the strike plate 243.

The preform 410 has a total mass and the strike plate 243 has a total mass. In some examples, the total mass of the strike plate 243 is at least 55%, at least 60%, at least 65%, at least 70% of the total mass of the preform 410. In these, or alternative, examples, the total mass of the strike plate 243 is no more than 95%, 90%, 85%, 80%, or 75% of the total mass of the preform 410.

Referring to FIGS. 70 and 71, the preform 410 includes a transition region 247 around a predetermined offset percentage of the strike plate perimeter 245. Additionally, the transition region 247 is proud of (e.g., offset from) the front surface 411 of the preform 410 at the perimeter of the preform 410 by an offset distance OFFD parallel to the thickness of the preform 410 and the strike plate 243. In some examples, the predetermined offset percentage is at least 50%, at least 60%, or at least 70% and the offset distance OFFD is at least 20%, at least 40%, or at least 60% of the thickness TSP of the strike plate 243. In the same or other examples, the predetermined offset percentage is at least 60%, at least 70%, at least 80%, at least 90%, at least 100% and the offset distance OFFD is no more than 400%, 350%, 300%, 250%, or 200% of the thickness TSP of the strike plate 243. The thickness TSP of the strike plate 243 can vary, and can be between, and inclusive of, 3.2 mm and 6.0 mm.

Figure 45:
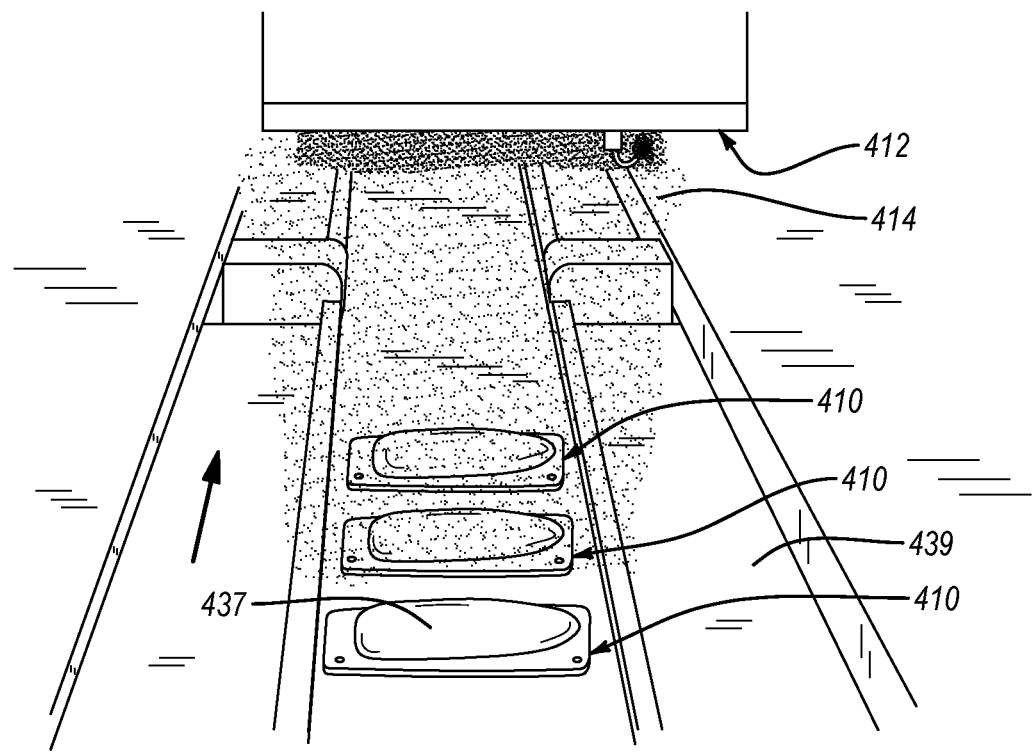
FIG. 45 is a schematic, isotropic view of a plasma tool of a system for forming a golf club head having a composite strike plate, according to one or more examples of the present disclosure.
Figure 46:
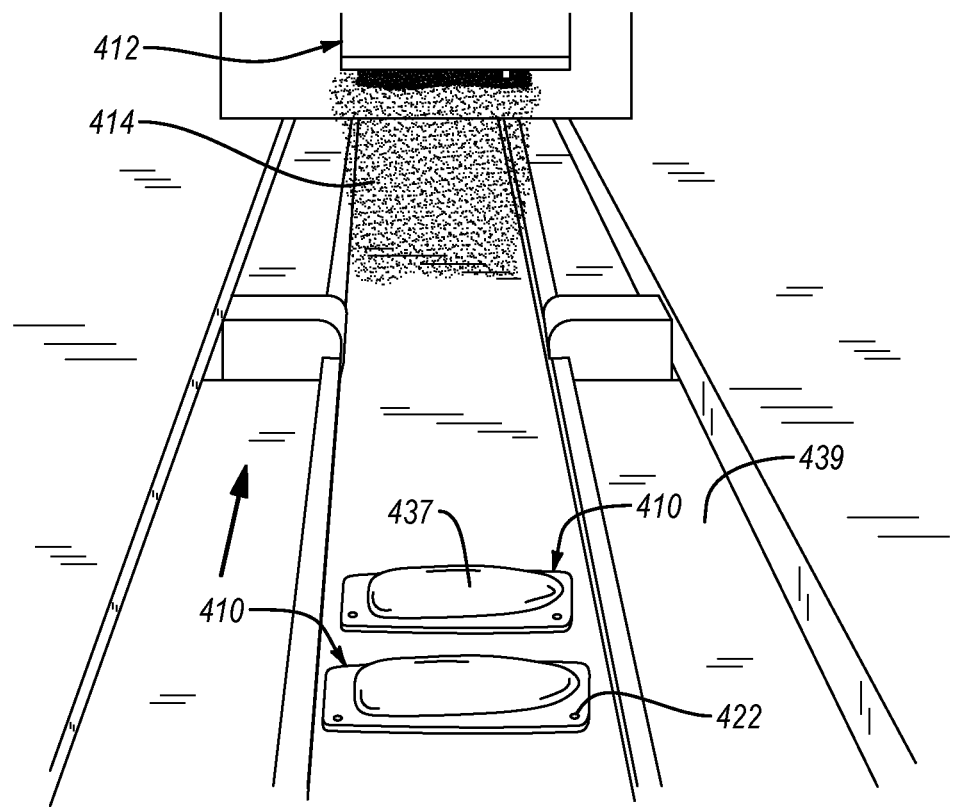
FIG. 46 is a schematic, isotropic view of the plasma tool of FIG. 45, according to one or more examples of the present disclosure.

Referring to FIGS. 45 and 46, the system 100 further includes a plasma tool 412 that is configured to generate a plasma arc 414. The plasma tool 412 can be any of various types of plasma tools for generating any of various types of plasma arcs. In some examples, as shown, the plasma tool 412 is a flame plasma tool for generated a flame plasma arc. However, in other examples, the plasma tool 412 can be a blown arc plasma tool, a vacuum plasma tool, and the like. The plasma treatment process can be similar to or the same as the process described in U.S. Pat. No. 9,089,745, issued Jul. 28, 2015, which is incorporated herein by reference in its entirety. Some embodiments utilize corona-based surface treatment and plasma-based surface treatment solutions, however further embodiments utilize excimer-based surface treatment solutions including vacuum-ultraviolet (VUV) surface irradiation, as well as laser-based surface treatment solutions. Thus, all the disclosure related to plasma and plasma tools also apply to these surface treatment solutions.

The plasma tool 412 is positioned relative to a conveyor belt 439, which is operable to move strike-plate preforms 410, relative to the plasma tool 412, in a direction as indicated by a directional arrow in FIGS. 45 and 46. Each one of the strike-plate preforms 410 defines a forward surface 437 and a rearward surface 438 (see, e.g., FIG. 55). The strike-plate preforms 410 are oriented on the conveyor belt 439 that that the forward surface 437 is facing the plasma tool 412 as the strike-plate preforms 410 moves past the plasma tool 412 on the conveyor belt 439. Moreover, the conveyor belt 439 is spaced apart from the plasma tool 412 (e.g., a desired distance between the forward surface 437 and where the plasma arc 414 is generated by the plasma tool 412) such that a leading portion of the plasma arc 414, having a desired intensity, impacts the forward surface 437 of the strike-plate preforms 410 as the strike-plate preforms 410 move along the conveyor belt 439. The desired distance between the forward surface 437 and where the plasma arc 414 is generated by the plasma tool 412 is at least 50% of the strike-plate preform 410 width, seen in FIG. 46, and is at least 75%, 100%, 125%, and 150% in further embodiments. In a further series of embodiments, the distance between the forward surface 437 and where the plasma arc 414 is generated by the plasma tool 412 is no more than 400% of the strike-plate preform 410 width, seen in FIG. 46, and is no more than 350%, 300%, 250%, and 200% in further embodiments. In another embodiment, the distance between the forward surface 437 and where the plasma arc 414 is generated by the plasma tool 412 is between 2 inches and 6 inches, such as 3 inches. Moreover, the conveyor belt 439 is operable to move the strike-plate preforms 410 at a desired feed rate past the plasma arc 414. Accordingly, the plasma arc 414 impacts each portion of the forward surface 437 of the strike-plate preforms 410 for a desired time at a desired intensity. In some examples, the desired feed rate is from 50 ft/min to 90 ft/min, such as from 60 ft/min to 80 ft/min, or such as 75 ft/min. In one embodiment, the plasma arc 414 has a contact period of no greater than 2 seconds for an individual pass; while in further embodiments the contact period is no greater than 1.5 seconds, 1.25 seconds, 1.0 seconds, and 0.75 seconds. In a further series of embodiments, the contact period is at least 0.1 seconds, and at least 0.2 seconds, 0.3 seconds, 0.4 seconds, and 0.5 seconds in further embodiments. In one embodiment the plasma arc 414 raises the temperature of the forward surface 437 at least 35° C. during the contact period, and at least 50° C., at least 75° C., at least 100° C., and at least 125° C. in further embodiments. Further, another series of embodiments caps the temperature rise of the forward surface 437 to no more than 350° C. during the contact period, and no more than 300° C., no more than 250° C., no more than 200° C., and no more than 150° C. in further embodiments.

The desired feed rate and intensity is selected to promote sanitation and activation, via ionization, of the forward surface 437 of the strike-plate preforms 410 in preparation for the application of a primer coating onto the forward surface. More specifically, the plasma tool 412 and the conveyor belt 439 are operated to expose the forward surface 437 to the plasma arc 414 such that the forward surface 437 is cleaned and has a water contact angle conducive to receiving and adhering to a primer coating. In some examples, the water contact angle is less than 40°, such as less than 30°, less than 20°, or less than 10°. in some examples, the water contact angle is between 2° and 25°, or between 5° and 18°. According to yet certain examples, the water contact angle is less than 50°, less than 45°, less than 40°, less than 35°, less than 30°, less than 25°, or less than 20°. In some examples, the water contact angle is greater than zero degrees and less than 30° or greater than zero degrees and less than 25°. In certain examples, the water contact angle is between 1° and 18°.

Figure 47:
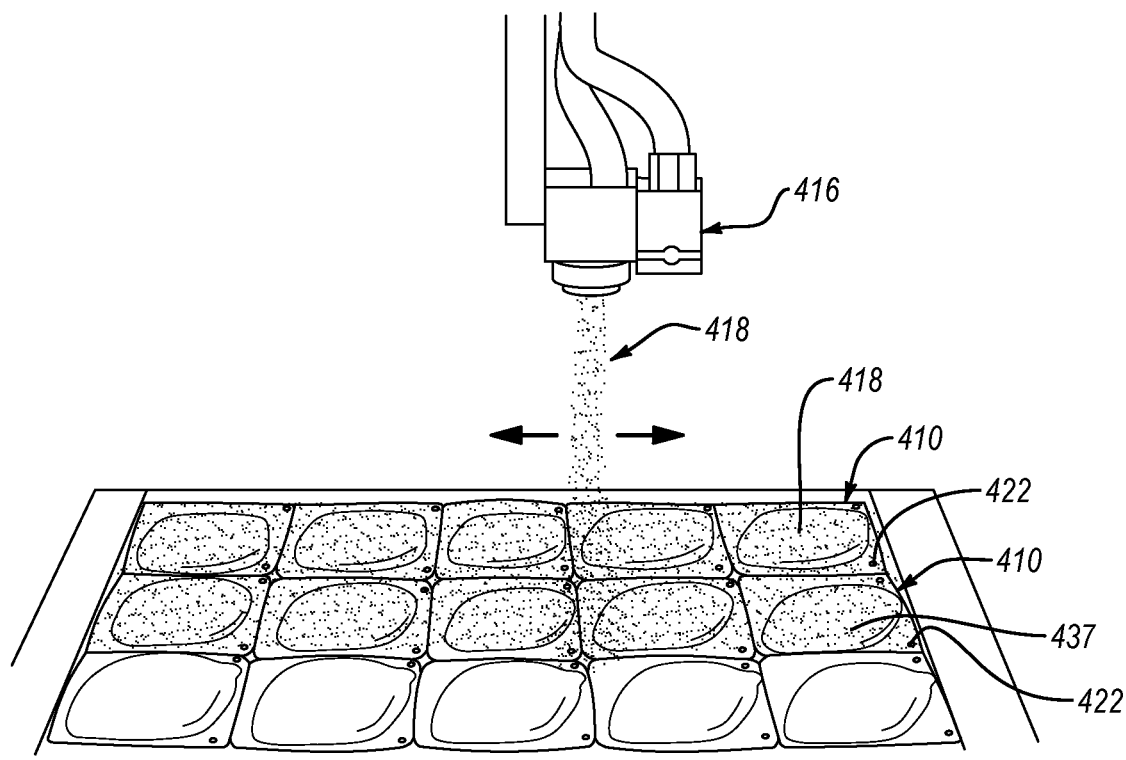
FIG. 47 is a schematic, isotropic view of a paint application tool of a system for forming a golf club head having a composite strike plate, according to one or more examples of the present disclosure.
Figure 48:
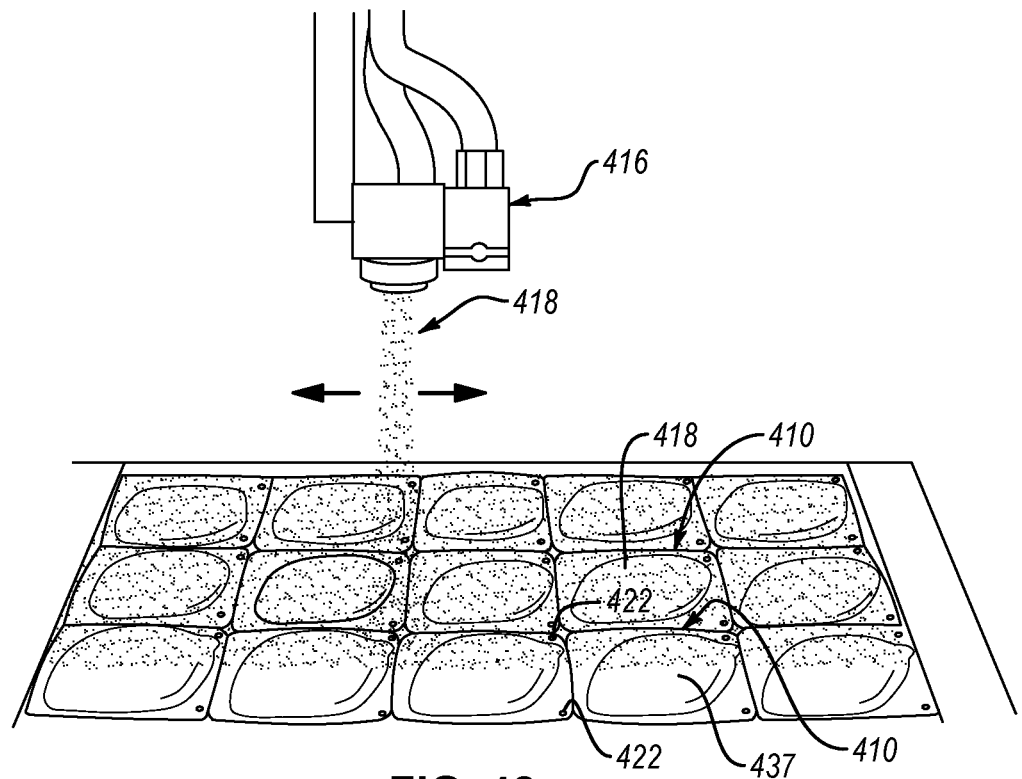
FIG. 48 is a schematic, isotropic view of the paint application tool of FIG. 47, according to one or more examples of the present disclosure.

After the forward surface 437 is treated by the plasma tool 412, the strike-plate preforms 410 receive a primer coating 418 from paint application tool 416, as shown in FIGS. 47 and 48. In certain examples, the forward surfaces 437 of multiple strike-plate preforms 410 are arranged together and receive the primer coating 418 in the same processing step. As shown in FIG. 47, multiple strike-plate preforms 410 are arranged on a tray and the paint application tool 416 moves relative to the strike-plate preforms 410 in a rastering pattern while generating a spray of primer coating 418 towards the forward surfaces 437. The paint application tool 416 applies the primer coating 418 directly onto the forward surfaces 437. Although not shown, a clearcoat can be applied over the primer coating 418 by an application tool similar to the paint application tool 416. Also, although not shown, the primer coating 418 and the clearcoat can be applied using a paint application process different than that shown in FIGS. 47 and 48, such as a digital printing process, as disclosed above and further disclosed in U.S. patent application Ser. No. 17/399,823, filed Aug. 11, 2021, which is incorporated herein in its entirety. It is recognized that in some examples, the primer coating 418 is applied to cover the entire forward surface 437 of the strike-plate preform 410, and not just the portion of the strike-plate preform 410 that will eventually become the strike plate 470.

Figure 49:
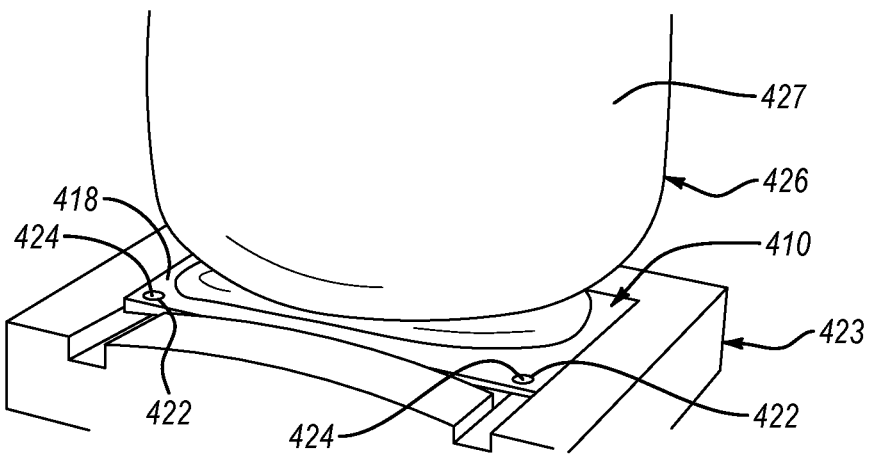
FIG. 49 is a schematic, isotropic view of a first pad printer of a system for forming a golf club head having a composite strike plate, according to one or more examples of the present disclosure.
Figure 50:
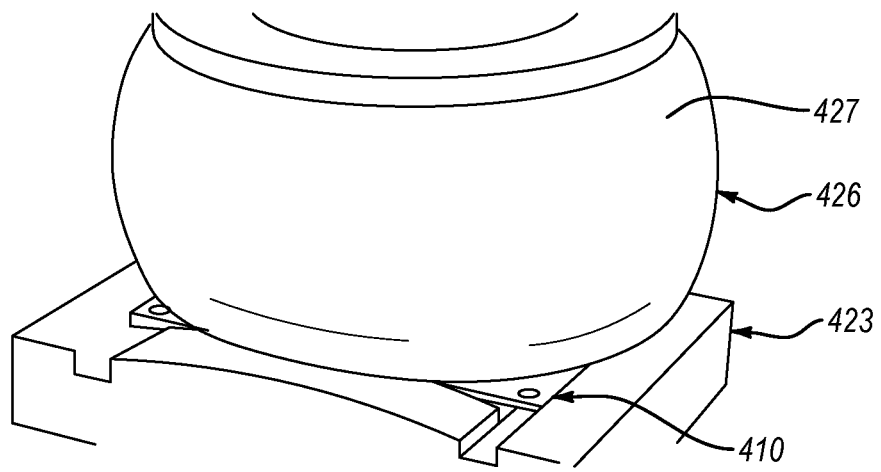
FIG. 50 is a schematic, isotropic view of the first pad printer of FIG. 49, according to one or more examples of the present disclosure.

Referring to FIGS. 49-54, after the primer coating 418 and the clearcoat is applied onto the strike-plate preforms 410, additional indicia is printed onto the clearcoat of each one of the strike-plate preforms 410. In certain examples, the additional indicia is printed onto the strike-plate preforms 410 individually. Referring to FIG. 49, the strike-plate preform 410 is secured in place using a jig 423. In some examples, to promote retaining and precisely locating (e.g., registering) the strike-plate preform 410 relative to the jig 423, the jig 423 includes a pair of alignment posts 424. Correspondingly, the strike-plate preform 410 includes a pair of alignment openings 422. Each opening of the pair of alignment openings 422 are sized, shaped, and positioned to nestably receive (such as with a friction fit or an interference fit) a corresponding one of the alignment posts 424 as the strike-plate preform 410 is coupled with the jig 423. Engagement between the alignment posts 424 and the alignment openings 422 ensures the strike-plate preform 410 is properly positioned on the jig 423. In some examples, the alignment posts 424 are formed in the strike-plate preform 410 and the alignment openings 422 are formed in the jig 423. Other methods of registering the strike-plate preform 410 on the jig 423 can be used in other examples, such as clamping, taping, adhering, etc. In some examples, the jig 423 includes a cavity sized to nestably retain the strike-plate preform 410.

Figure 51:
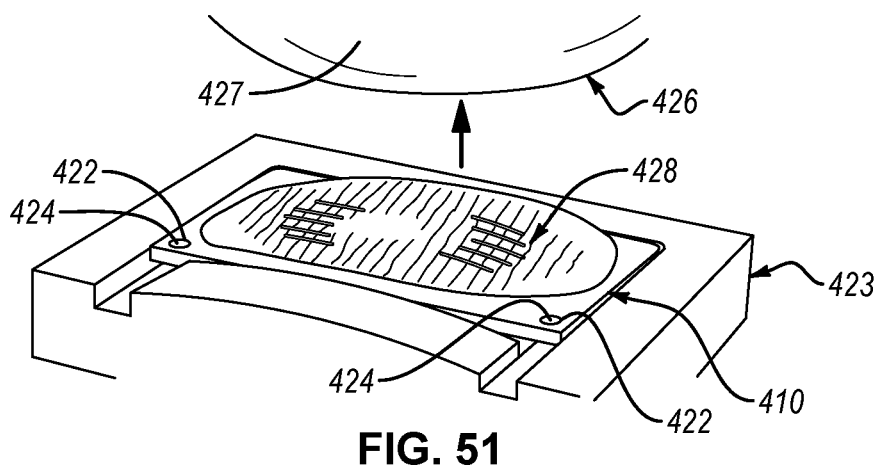
FIG. 51 is a schematic, isotropic view of the first pad printer of FIG. 49 and a pattern, formed by the first pad printer, on a strike-plate preform, according to one or more examples of the present disclosure.

When the strike-plate preform 410 is retained by the jig 423, the jig 423 can be positioned such that the strike-plate preform 410 receives an impact from a first pad printer 426. The first pad printer 426 includes a flexible pad 427 that receives a first pattern of ink 428 from a printing plate (not shown). The flexible pad 427 is then moved toward the strike-plate preform 410 (see, e.g., FIG. 49) until the flexible pad 427 impacts and deforms against the strike-plate preform 410 (see, e.g., FIG. 50). As shown in FIG. 51, the first pattern of ink 428 on the flexible pad 427 is transferred onto the strike-plate preform 410 when the flexible pad 427 is pressed against the strike-plate preform 410. The flexible pad 427 of the first pad printer 426 is made of a material, such as silica, that promotes temporary adhesion of ink from the printing plate and transfer of the ink from the flexible pad 427 to the strike-plate preform 410. Accordingly, the material of the flexible pad 427 has a percent composition of oil that facilitates such temporary adhesion and transfer of ink.

Figure 52:
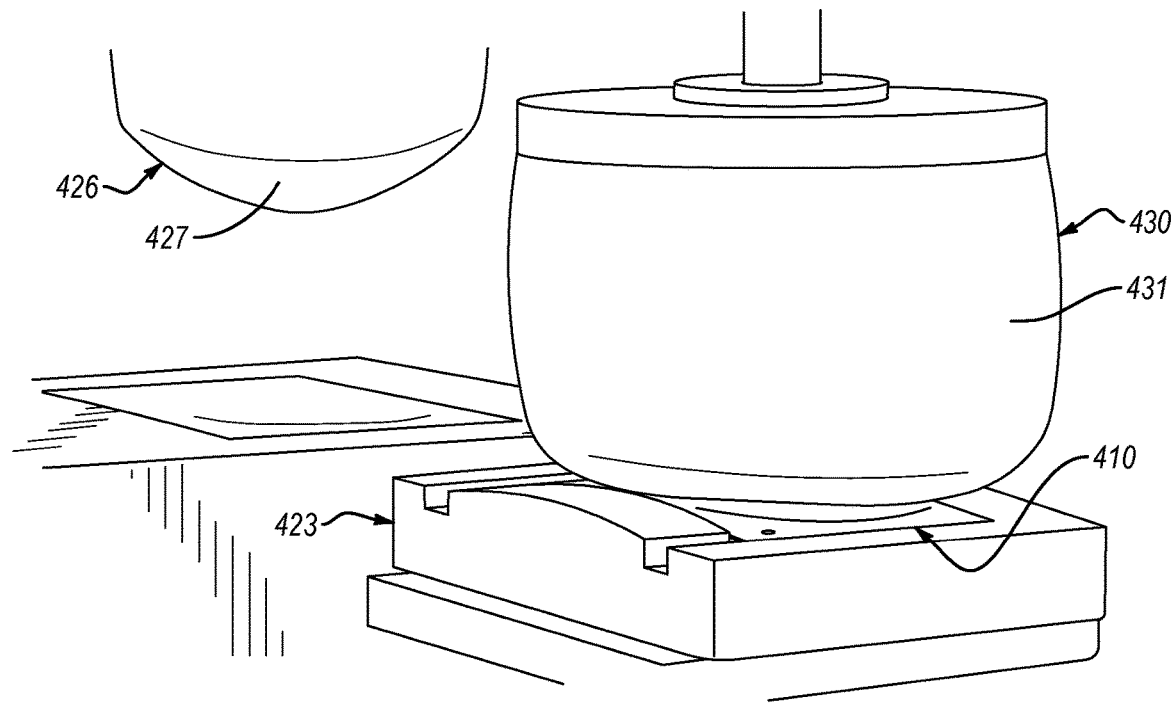
FIG. 52 is a schematic, isotropic view of a second pad printer of a system for forming a golf club head having a composite strike plate, according to one or more examples of the present disclosure.
Figure 53:
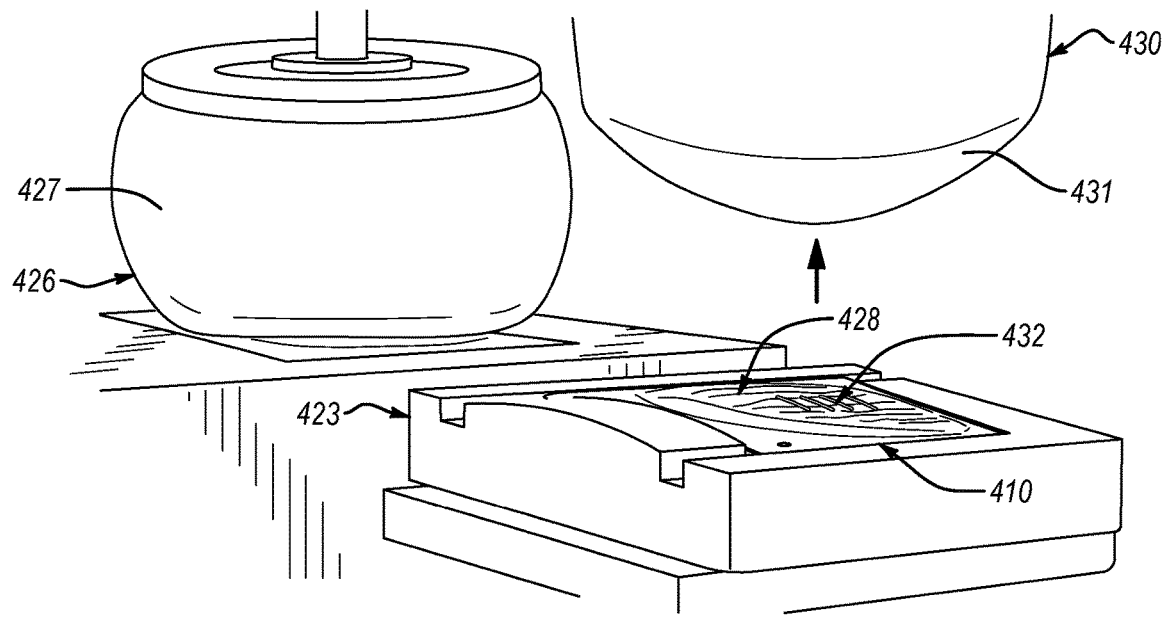
FIG. 53 is a schematic, isotropic view of the second pad printer of FIG. 52 and a pattern, formed by the second pad printer, on a strike-plate preform, according to one or more examples of the present disclosure.

Referring now to FIGS. 52 and 53, with the strike-plate preform 410 retained by the jig 423 and the first pattern of ink 428 printed on the strike-plate preform 410, the jig 423 can be positioned such that the strike-plate preform 410 receives an impact from a second pad printer 430. The second pad printer 430 includes a flexible pad 431 that receives a second pattern of ink 432 from a printing plate (not shown). The flexible pad 431 is then moved toward the strike-plate preform 410 until the flexible pad 431 impacts and deforms against the strike-plate preform 410 (see, e.g., FIG. 52). As shown in FIG. 53, the second pattern of ink 432 on the flexible pad 431 is transferred onto the strike-plate preform 410 when the flexible pad 431 is pressed against the strike-plate preform 410. The flexible pad 431 of the second pad printer 430 is made of a material that is the same as or similar to that of the flexible pad 427 of the first pad printer 426. However, the ink of the first pattern of ink 428 is different (e.g., a different color, viscosity, etc.) than the ink of the second pattern of ink 432. For example, the ink of the first pattern of ink 428 is a different color (e.g., black) than the ink of the second pattern of ink 432 (e.g., white).

Figure 54:
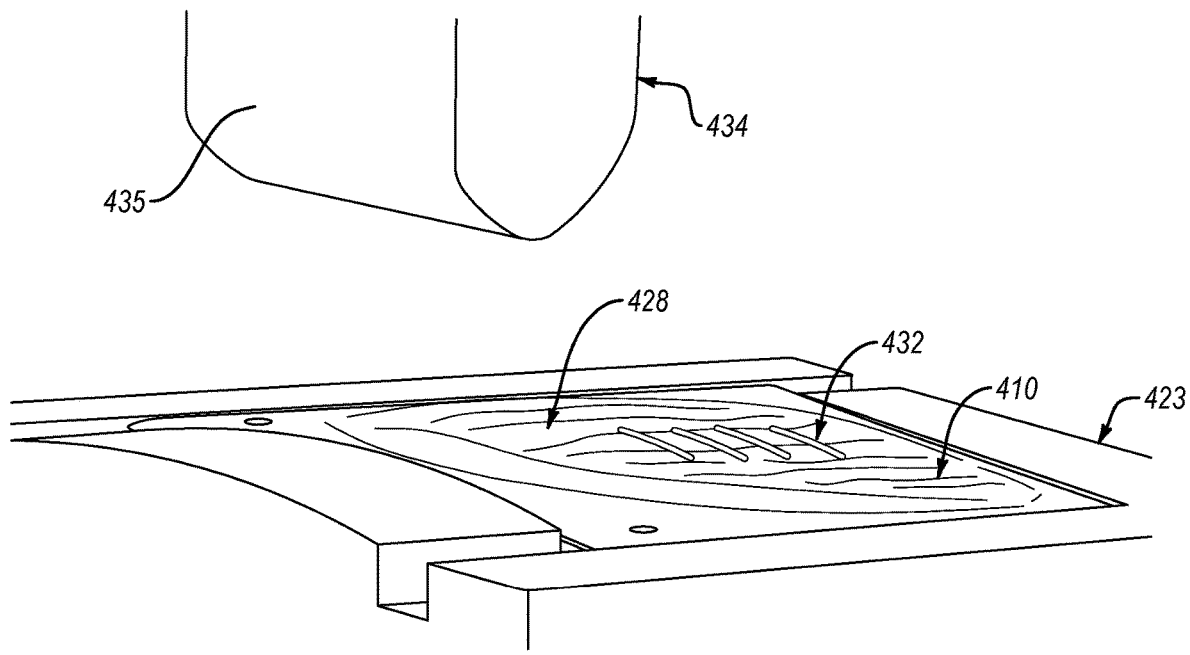
FIG. 54 is a schematic, isotropic view of a third pad printer of a system for forming a golf club head having a composite strike plate, according to one or more examples of the present disclosure.

Referring now to FIG. 54, with the strike-plate preform 410 retained by the jig 423, and the first pattern of ink 428 and the second pattern of ink 432 printed on the strike-plate preform 410, the jig 423 can be positioned such that the strike-plate preform 410 receives an impact from a third pad printer 434. The third pad printer 434 includes a flexible pad 435 that receives a third pattern of ink 433 (see, e.g., FIG. 61) from a printing plate (not shown). The third pattern of ink 433 can be different than the first pattern of ink 428 and the second pattern of ink 432. For example, in the illustrated implementation, the first pattern of ink 428 and the second pattern of ink 432 are non-textual graphics and the third pattern of ink 433 is textual (e.g., a word or phrase). Additionally, the ink of the third pattern of ink 433 can be a color that is different than the color of the ink of the first pattern of ink 428 and the second pattern of ink 432. Accordingly, in some examples, three or more different colors of ink is pad printed onto the strike-plate preform 410.

After receiving the third pattern of ink 433, the flexible pad 435 is moved toward the strike-plate preform 410 until the flexible pad 435 impacts and deforms against the strike-plate preform 410. The third pattern of ink 433 on the flexible pad 435 is transferred onto the strike-plate preform 410 when the flexible pad 435 is pressed against the strike-plate preform 410. The flexible pad 435 of the third pad printer 434 is made of a material that is the same as or similar to that of the flexible pad 427 of the first pad printer 426 and the flexible pad 431 of the second pad printer 430. However, in some examples, the size of the flexible pad 435 of the third pad printer 434 is smaller and has a different shape than the flexible pad 427 and the flexible pad 431. For example, as shown in FIG. 54, the flexible pad 435 has a long and slender shape, while the flexible pad 427 and the flexible pad 431 have a circular or spherical shape.

In some examples, one or both of the second pattern of ink 432 and the third pattern of ink 433 is applied onto the first pattern of ink 428. Also, although not shown, one or more of the first pattern of ink 428, the second pattern of ink 432, or the third pattern of ink 433 can be printed using a method other than pad printing, such as via a digital printing process, as disclosed above.

Figure 55:
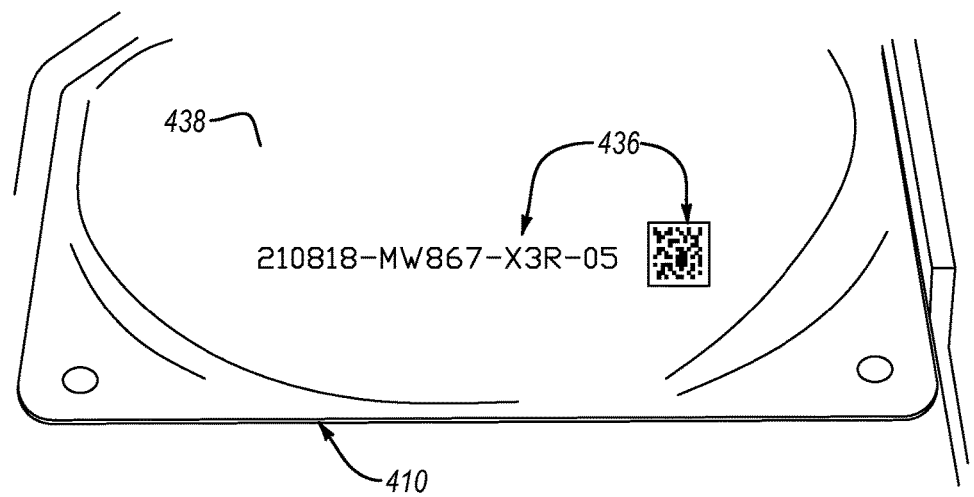
FIG. 55 is a schematic, top plan view of a strike-plate preform being marked by a marking tool of a system for forming a golf club head having a composite strike plate, according to one or more examples of the present disclosure.

Referring to FIG. 55, the system 100 includes a marking tool (not shown) that is configured to mark the rearward surface 438 of the strike-plate preform 410 with identification information 436. In some examples, the identification information 436 marked onto the rearward surface 438 of the strike-plate preform 410 is unique to the strike-plate preform 410 or different from any other strike-plate preform 410. The identification information 436 can include textual information regarding the strike-plate preform 410, such as batch number, model number, part number, etc. Additionally, or alternatively, the identification information 436 can include a QR code that stores the same or different information regarding the strike-plate preform 410 as a series of pixels.

The marking tool is a laser etching tool in some examples. Accordingly, the marking tool utilizes a laser beam to etch the identification information 436 into the rearward surface 438 of the strike-plate preform 410. Other types of tools and/or methods for marking the strike-plate preform 410 with identification information are used in other examples.

Figure 56:
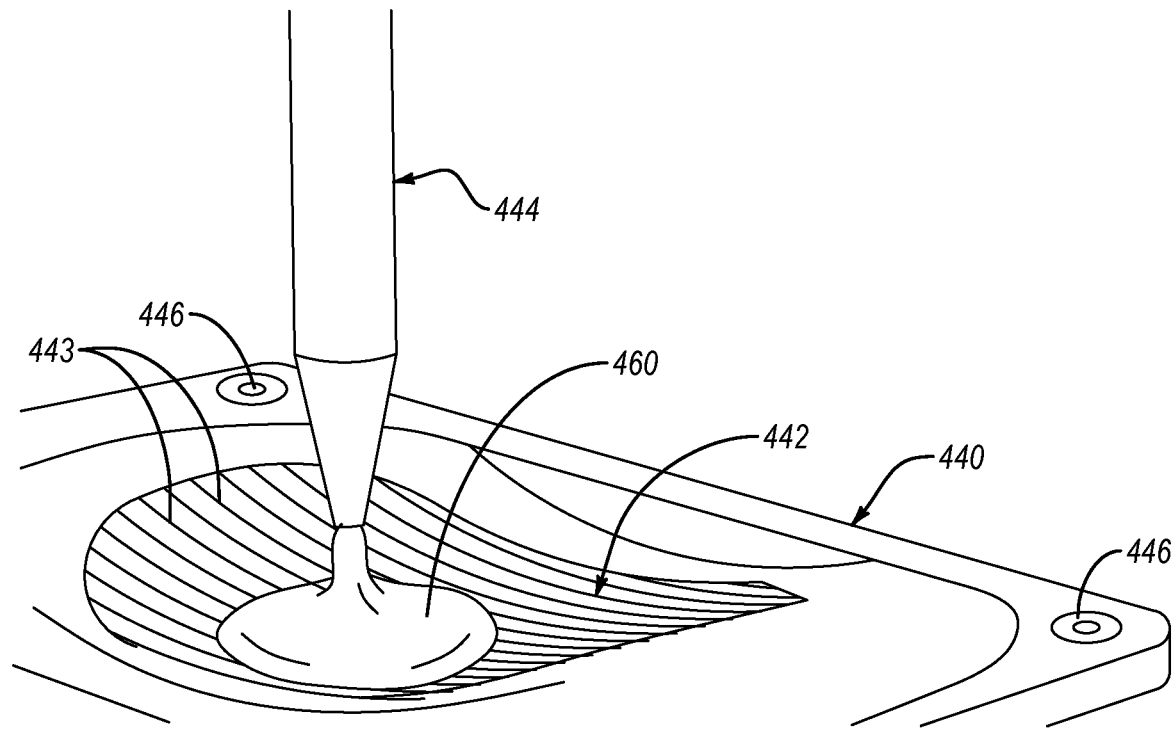
FIG. 56 is a schematic, isotropic view of a polymer dispensing tool and first part of a two-part compression mold of a system for forming a golf club head having a composite strike plate, according to one or more examples of the present disclosure.
Figure 57:
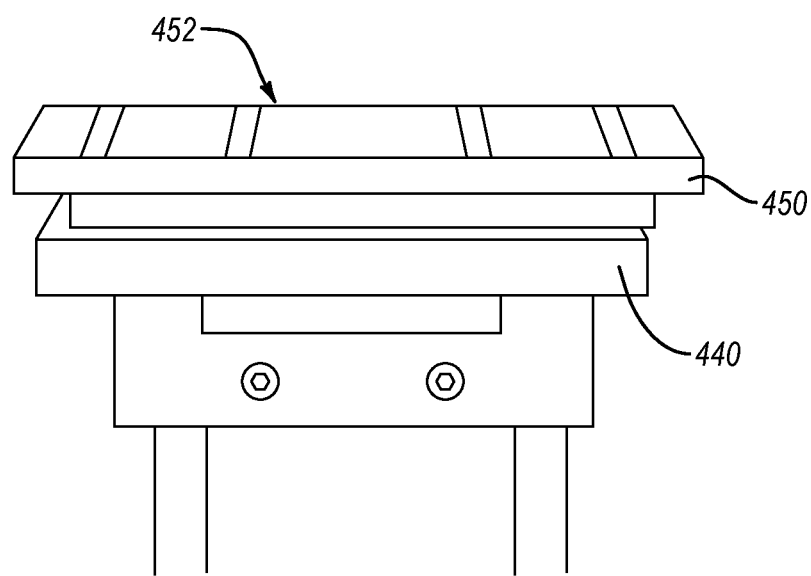
FIG. 57 is a schematic, isotropic view of a two-part compression mold, which includes the first part of FIG. 56, of a system for forming a golf club head having a composite strike plate, according to one or more examples of the present disclosure.

Referring to FIGS. 56-61, the system 100 includes features configured to apply a polymeric layer 380 onto the primer layer 376, and any patterns of ink applied onto the primer layer 376. In some examples, as shown in FIG. 57, the system 100 includes a two-part compression mold 452. The two-part compression mold 452 includes a first part 440, or first half, and a second part 450, or second half (see, e.g., FIG. 57). As shown in FIG. 56, the first part 440 of the two-part compression mold 452 is configured to help form the shape of the polymeric layer 380. As such, the first part 440 includes a mold cavity 442 that defines the shape of the polymeric layer 380. The polymeric layer 380 defines the face (e.g., strike face) of the strike plate 470. Therefore, the mold cavity 442 defines the size, shape, and appearance of the polymeric layer 380, which defines the size, shape, and appearance of the face of the strike plate 470. Accordingly, in some examples, the mold cavity 442 defines a surface that is contoured to define an appropriate bulge, roll, and twist of the polymeric layer 380 and thus the face of the strike plate 470. Additionally, the mold cavity 442 includes ribs 443 along the surface of the mold cavity 442 that form corresponding grooves in the polymeric layer 380 and thus the face of the strike plate 470. The ribs 443 are parallel to each other and extend from a first side of the mold cavity 442 to an opposite side of the mold cavity 442.

In a first step, a polymer dispensing tool 444 of the system 100 mixes and dispenses a polymeric material 460 into the mold cavity 442. In some examples, the polymeric material 460 is a polyurethane material that is dispensed in a flowable state. The polyurethane material can be made from a polyurethane resin and a hardener that are mixed together by the polymer dispensing tool 444 just before the polyurethane material is dispensed into the mold cavity 442. For example, the polymer dispensing tool 444 includes a hollow tube and a dynamic mixer (e.g., a motor, shaft, and impeller) situated within the hollow tube. The dynamic mixer is operable to rotate the impeller as the polyurethane resin and hardener, which are separately introduced into the hollow tube, flow through the hollow tube. Rotation of the impeller mixes the polyurethane resin and the hardener such that when dispensed from the hollow tube the polyurethane resin and the hardener are fully mixed. The disclosed steps and method are essential in improving abrasion resistance, reducing stress-whitening of the polymeric material, reducing porosity in the polymeric material, and adhesion to the other materials. In other embodiments, the polymeric layer 380 may take the form of an ionomer resin.

After the polymeric material 460 is dispensed into and fills the mold cavity 442 of the first part 440 of the two-part compression mold 452, the second part 450 of the two-part compression mold 452 is coupled with the first part 440 to form the two-part compression mold 452. Prior to, or after, coupling together the first part 440 and the second part 450, the first part 440 is flipped 180-degrees such that the mold cavity 442 and the polymeric material 460 in the mold cavity 442 faces vertically downward. In the illustrated example, after the polymeric material 460 is allowed to gel, the mold 452 is flipped after coupling together the first part 440 and the second part 450. When allowed to gel, the viscosity and adhesive properties of the polymeric material 460 are such that the polymeric material 460 does not spill out of the mold cavity 442, but remains within the mold cavity 442.

Figure 58:
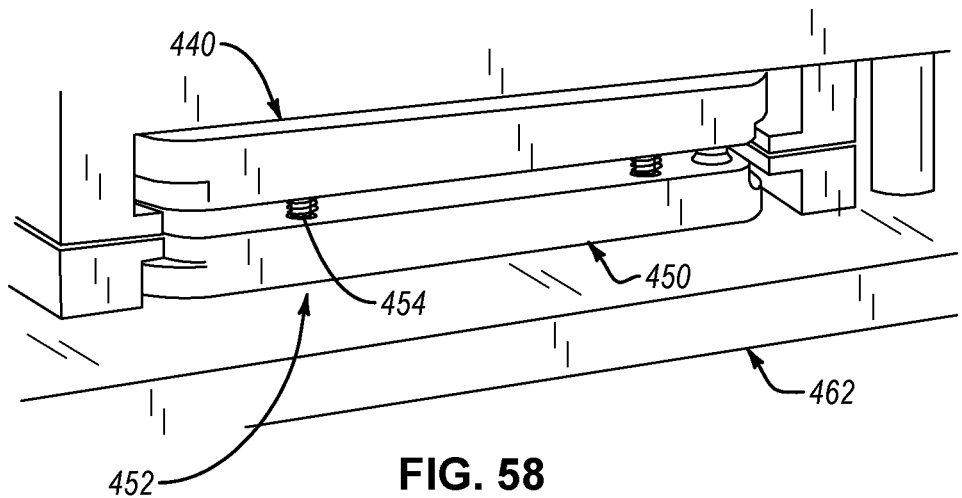
FIG. 58 is a schematic, isotropic view of the two-part compression mold of FIG. 57, shown under compression, according to one or more examples of the present disclosure.
Figure 59:
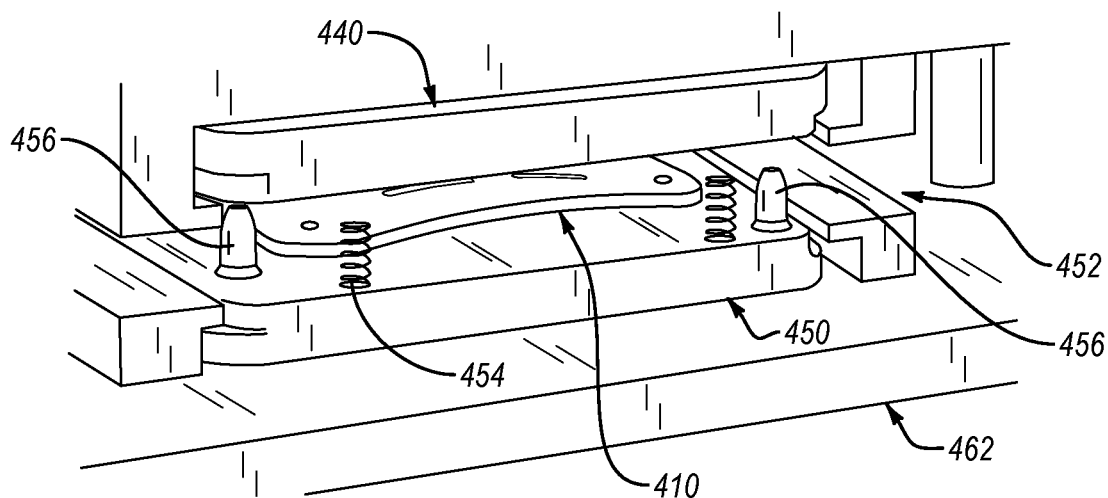
FIG. 59 is a schematic, isotropic view of the two-part compression mold of FIG. 57, shown after compression of a strike-plate preform and with first and second parts of the two-part compression mold separated, according to one or more examples of the present disclosure.
Figure 60:
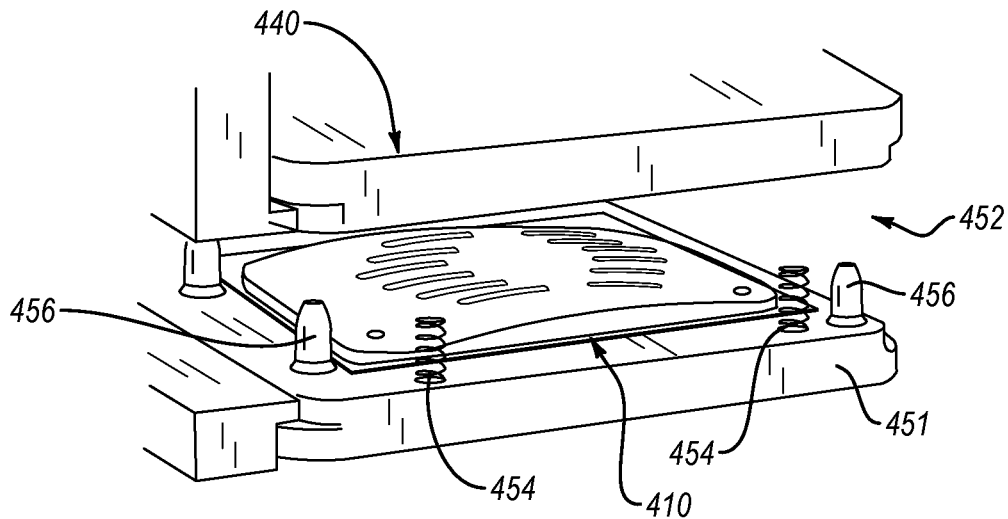
FIG. 60 is a schematic, isotropic view of the two-part compression mold of FIG. 57, shown after compression of a strike-plate preform and with first and second parts of the two-part compression mold further separated, according to one or more examples of the present disclosure.

Referring to FIG. 57, the two-part compression mold 452 is moved to a mold compression tool 462, which is shown in FIGS. 58-60. The mold compression tool 462 is operable to compress together the first part 440 and the second part 450. More specifically, the mold compression tool 462 is configured to move the first part 440 and the second part 450 together to transition the two-part compression mold 452 from an uncompressed state to a compressed state. In the uncompressed state (see, e.g., FIG. 57), the polymeric material 460 in the mold cavity 442 of the first part 440 is not in contact with a strike-plate preform 410 fixed to the second part 450. However, in the compressed state, the polymeric material 460 in the mold cavity 442 of the first part 440 is in contact with and compressed against the strike-plate preform 410 fixed to the second part 450. Accordingly, while being transported to and prior to being compressed by the mold compression tool 462, the two-part compression mold 452 is configured to keep the first part 440 and the second part 450 coupled together in the uncompressed state, which maintains a gap between the polymeric material 460 and the strike-plate preform 410.

Figure 61:
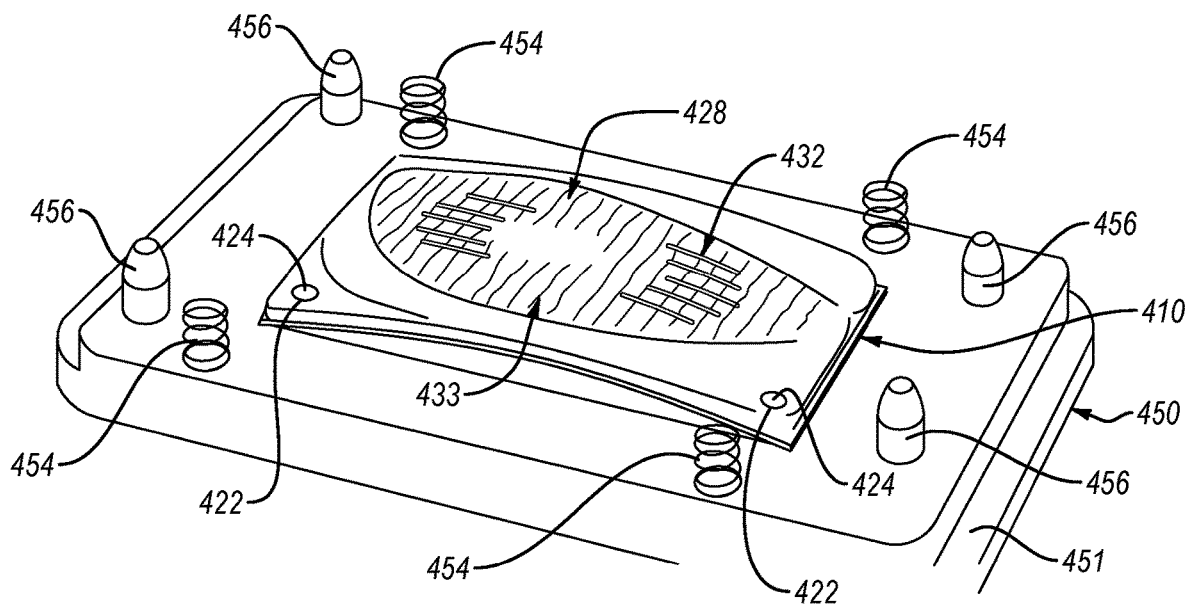
FIG. 61 is a schematic, isotropic view of a second part of the two-part compression mold of FIG. 57, according to one or more examples of the present disclosure.

Referring to FIG. 61, the second part 450 of the two-part compression mold 452 includes a base 451, a plurality of posts 456 extending from the base, and a plurality of biasing elements 454 extending from the base. The plurality of posts 456 and the plurality of biasing elements 454 extend from the same surface (e.g., top surface) of the base. In some examples, the plurality of posts 456 and the plurality of biasing elements 454 are spaced apart about an outer periphery of the top surface of the base. In the illustrated example, the second part 450 includes four posts 456 and four biasing elements 454. However, in other examples, the second part 450 includes fewer or more than four posts 456 and four biasing elements 454. The biasing elements 454 are compression springs is some examples. Referring to FIG. 56, the first part 440 of the two-part compression mold 452 also includes a plurality of receptacles 446 that are sized and positioned to receive, in nested engagement, corresponding ones of the plurality of posts 456 of the second part 450.

As shown in FIG. 57, in the uncompressed state, the second part 450 is located above the first part 440 with the plurality of posts 456 engaged with corresponding ones of the plurality of receptacles 446. Engagement between the plurality of posts 456 and the plurality of receptacles 446 ensures the first part 440 and the second part 450 are properly aligned and remain coupled together during transportation and compression of the mold. The weight of the second part 450 urges the second part 450 toward the first part 440 until the second part 450 contacts the biasing elements 454, which are configured to maintain a gap between the first part 440 and the second part 450 when no external compression forces are acting on the second part 450. In other words, in some examples where the biasing elements 454 are compression springs, the length and spring constant of the compression springs are selected to support the second part 450 at a desired distance away from the first part 440 without external compression forces acting on the second part 450. The desired distance is associated with a gap between the polymeric material 460 deposited on the second part 450 and the strike-plate preform 410 coupled to the first part 440. In some examples, the gap is from 0.001 mm to 15 mm, such as from 2 mm to 7 mm, or 5 mm.

Referring to FIG. 58, the two-part compression mold 452 is inserted into the mold compression tool 462 with the first part 440 on top. While the polymeric material 460 has not yet set, the mold compression tool 462 is selectively operated to apply a compressive force to the mold to move together the first part 440 and the second part 450 and to compress the polymeric material 460 against the strike-plate preform 410. The compressive force is sufficient to overcome the spring force of the biasing elements 454, which causes the biasing elements 454 to compress and enable the first part 440 and the second part 450 to come together into the compressed state. As the first part 440 and the second part 450 come together, the plurality of posts 456 are inserted further into the corresponding ones of the plurality of receptacles 446, to maintain alignment and coupling between the first part 440 and the second part 450 as the two-part compression mold 452 is compressed. Compression of the polymeric material 460 against the strike-plate preform 410 is maintained for a desired time interval and at a desired compressive force until the polymeric material 460 is adequately adhered to the strike-plate preform 410 and is adequately set. It is recognized that in some examples, the polymeric material 460 is compressed to cover the entire forward surface 437 of the strike-plate preform 410, and not just the portion of the strike-plate preform 410 that will eventually become the strike plate 470.

To promote adhesion between the polymeric material 460 and the strike-plate preform 410, in some examples, the strike-plate preform 410, with the primer coating 418 and the ink patterns, can be passed under the plasma tool 412 as the plasma arc 414 contacts the primer coating 418 and the ink patterns to clean and create a desired water contact angle for reception of and adherence to the polymeric material 460. Additionally, in some examples, the paint and ink applied onto the strike-plate preform 410 is not fully dry when the polymeric material 460 is applied onto the paint and ink. The paint and ink, being partially wet when the polymeric material 460 is applied promotes adhesion between the paint and ink, and the polymeric material 460.

After the polymeric material 460 is adequately set and adhered to the strike-plate preform 410, thus forming part of the strike-plate preform 410, the mold compression tool 462 is selectively operable to move the first part 440 and the second part 450 away from each other to release the compressive force on the two-part compression mold 452. As shown in FIGS. 59 and 60, as the compressive force is released, the biasing elements 454 decompress and the plurality of posts 456 move out of the corresponding ones of the plurality of receptacles 446.

Although in the illustrated examples, the plurality of posts 456 and the plurality of biasing elements 454 form part of the second part 450 and the plurality of receptacles 446 form part of the first part 440, in other examples, the plurality of posts 456 can form part of the first part 440 and the plurality of receptacles 446 can form part of the second part 450, and/or the plurality of biasing elements 454 can form part of the first part 440.

Similar to the jig 423, to promote retaining and precisely locating (e.g., registering) the strike-plate preform 410 relative to the second part 450, the second part 450 includes a pair of alignment posts 424. Each one of the pair of alignment openings 422 of the strike-plate preform 410 are sized, shaped, and positioned to nestably receive (such as with a friction fit or an interference fit) a corresponding one of the alignment posts 424 of the second part 450. Engagement between the alignment posts 424 and the alignment openings 422 ensures the strike-plate preform 410 is properly positioned on the second part 450. In some examples, the alignment posts 424 are formed in the strike-plate preform 410 and the alignment openings 422 are formed in the second part 450. Other methods of registering the strike-plate preform 410 on the second part 450 can be used in other examples, such as clamping, taping, adhering, etc.

Figure 62:
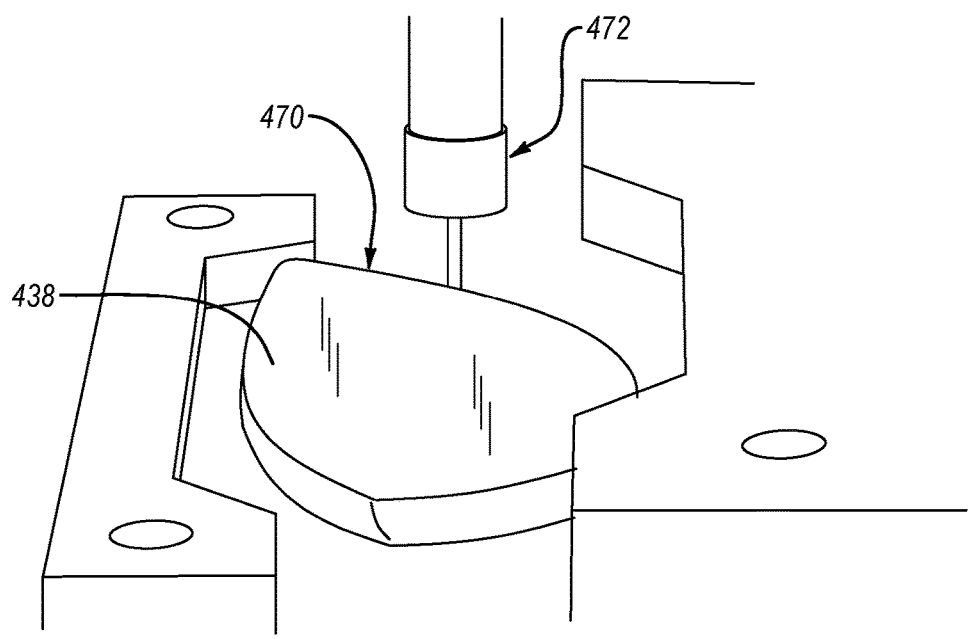
FIG. 62 is a schematic, isotropic view of a cutting tool of a system for forming a golf club head having a composite strike plate, according to one or more examples of the present disclosure.

Referring to FIG. 62, after the polymeric material 460 is applied to the strike-plate preform 410, the strike-plate preform 410 is cut by a cutting tool 472 of the system 100 to form the strike plate 470. The cutting tool 472 includes a rotating bit in some examples that cuts through the strike-plate preform 410 along an outer peripheral edge of the strike plate 470. In certain examples, the cutting tool 472 is an automated tool that moves the rotating bit along a preprogrammed path. The system 100 can further include a tool that retains the strike-plate preform 410 in place via suction force. The suction force can be applied to the strike-plate preform 410 within a designated outer peripheral edge of the strike plate 470. In this manner, the strike-plate preform 410 can be held in place as the cutting tool 472 cuts away all portions of the preform excluding the strike plate 470. Additionally, in some examples, the strike-plate preform 410 is retained by the tool in an upside-down orientation such that the forward surface 437 of the strike-plate preform 410 is retained directly by the tool and the rearward surface 438 is exposed and facing upward. The cutting tool 472 then cuts the strike-plate preform 410 from above the preform. Cutting the strike-plate preform 410 in this manner helps protect, and prevent damage to, the polymeric material 460. Forming a strike-plate preform 410 and cutting the strike plate 470 from the strike-plate preform promotes durability of the strike plate 470 by enabling the removal of potential voids from the strike face of the strike plate 470 during the formation of the strike-plate preform 410.

Figure 63:
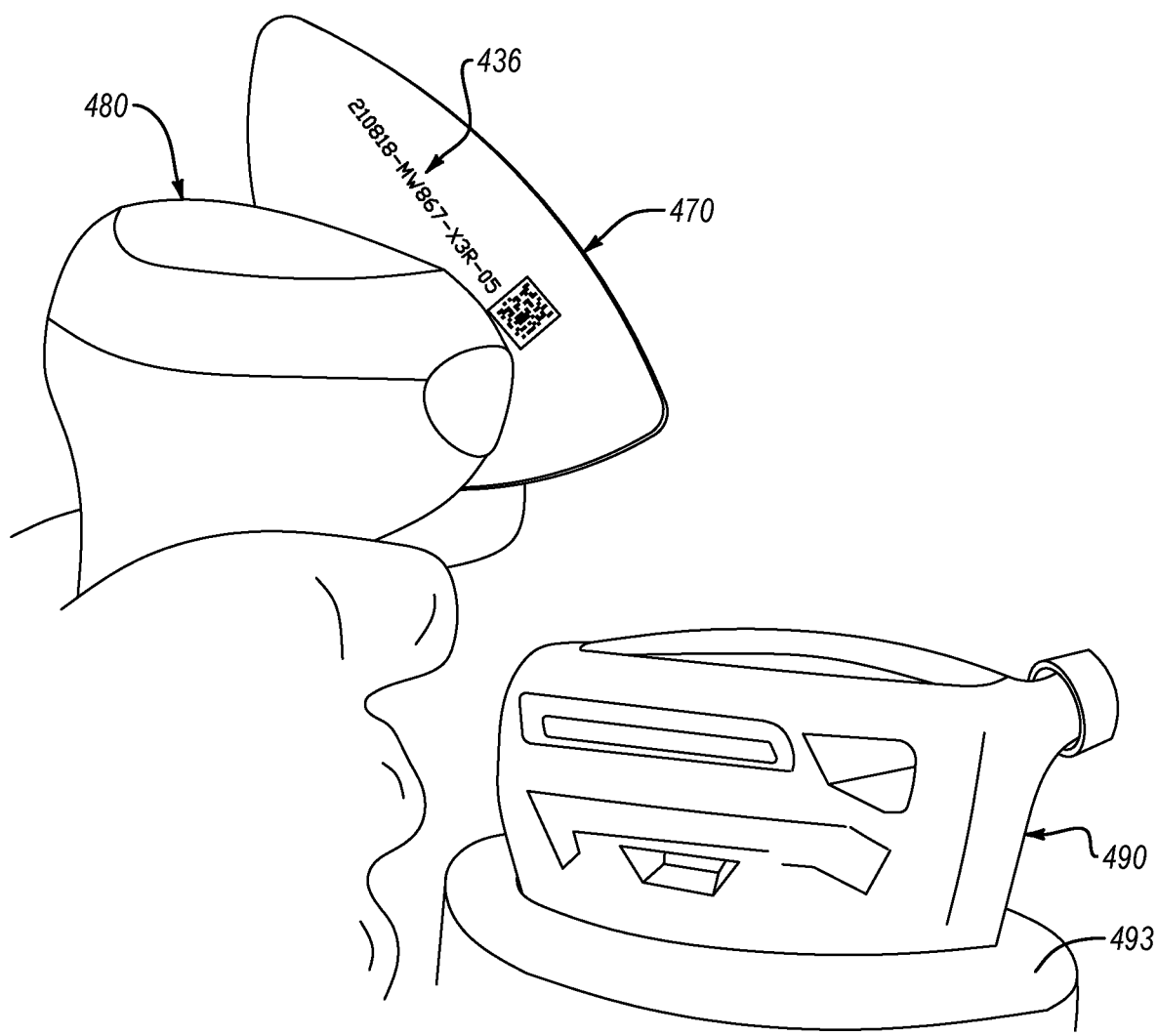
FIG. 63 is a schematic, isotropic view of a composite strike plate being electronically identified, according to one or more examples of the present disclosure.

Referring to FIG. 63, after, and/or before, the strike plate 470 is cut away from the strike-plate preform 410, the strike plate 470 can be identified using an identification tool 480 of the system 100. The identification tool 480 can be a scanner, such as a radio-frequency (RF) scanner, barcode scanner, QR-code scanner, and the like, that is configured to scan the identification information 436 on the rearward surface 438 of the strike plate 470 and to identify the strike plate 470 based on the identification information 436. One or more characteristics of the strike plate 470 can be associated with the strike plate 470 identified by the identification tool 480 and stored in a database. For example, a weight, lay-up configuration, cluster characteristics, and/or a thickness of the strike plate 470 can be measured and associated with the strike plate 470.

Figure 64:
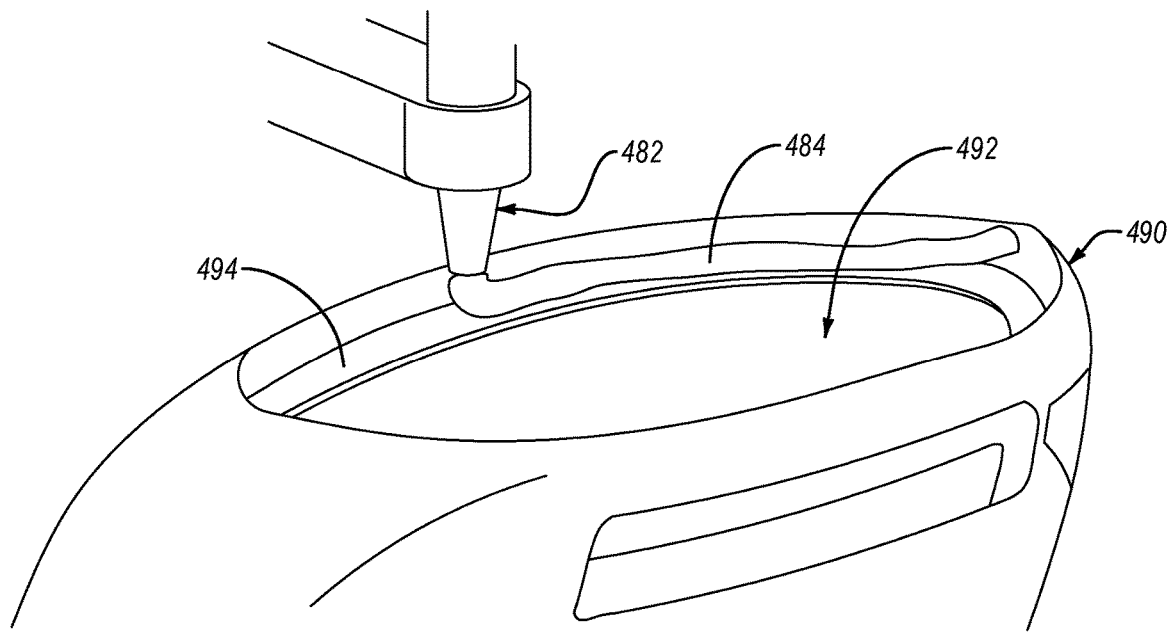
FIG. 64 is a schematic, isotropic view of an adhesive application tool of a system for forming a golf club head having a composite strike plate, according to one or more examples of the present disclosure.
Figure 65:
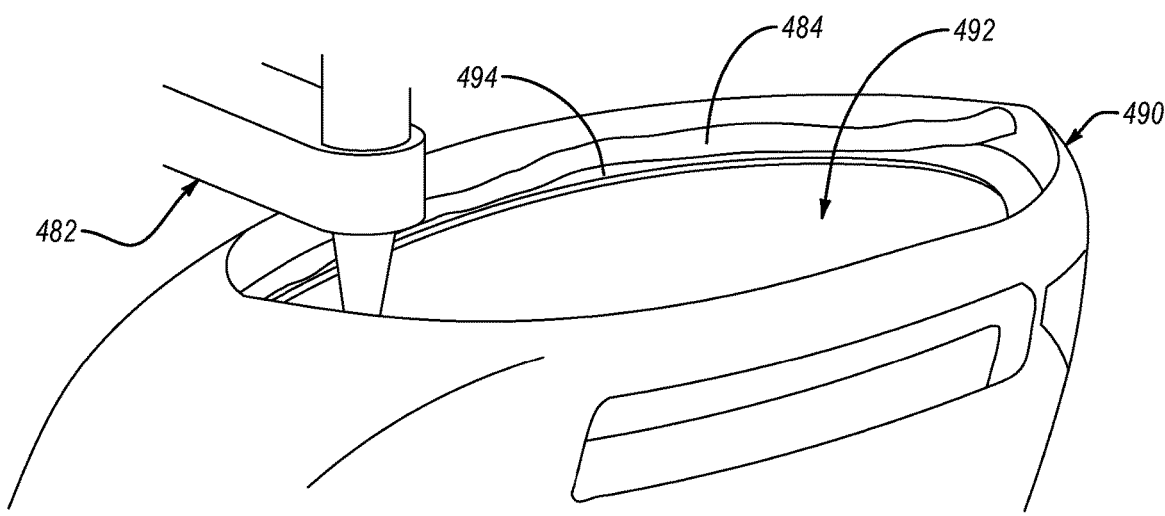
FIG. 65 is a schematic, isotropic view of the adhesive application tool of FIG. 64, according to one or more examples of the present disclosure.

As shown in FIGS. 64 and 65, in some examples, the system 100 includes an adhesive application tool 482 that is configured to apply a bead of adhesive 484 onto a body 490 of the golf club head 401 for promoting adhesion of the strike plate 470 to the body 490. The adhesive application tool 482 can have a hollow tube and a dynamic mixer, to mix the adhesive 484, similar to the polymer dispensing tool 444. The body 490 can include a face opening 492 that is defined by a face-opening recessed ledge 494 that extends circumferentially about the face opening 492. In certain examples, the adhesive application tool 482 is an automated tool that automatically applies the adhesive 484 onto the body 490 at a desired rate along a preprogrammed path. In certain examples, the surface of the face-opening recessed ledge 494, which receives the adhesive 484, is laser ablated prior to the application of the adhesive 484. Laser ablation can be accomplished in a manner described in U.S. patent application Ser. No. 17/389,167, filed Jul. 29, 2021, which is incorporated herein in its entirety.

Figure 66:
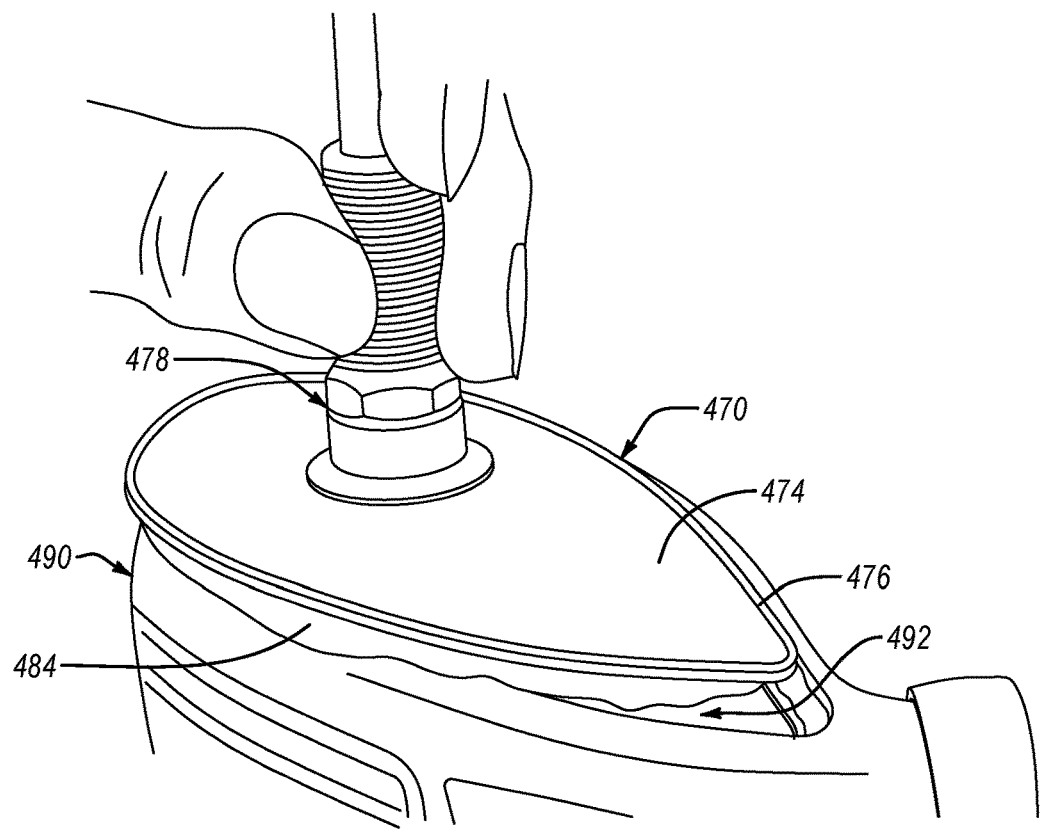
FIG. 66 is a schematic, isotropic view of a handheld vacuum tool of a system for forming a golf club head having a composite strike plate, according to one or more examples of the present disclosure.
Figure 67:
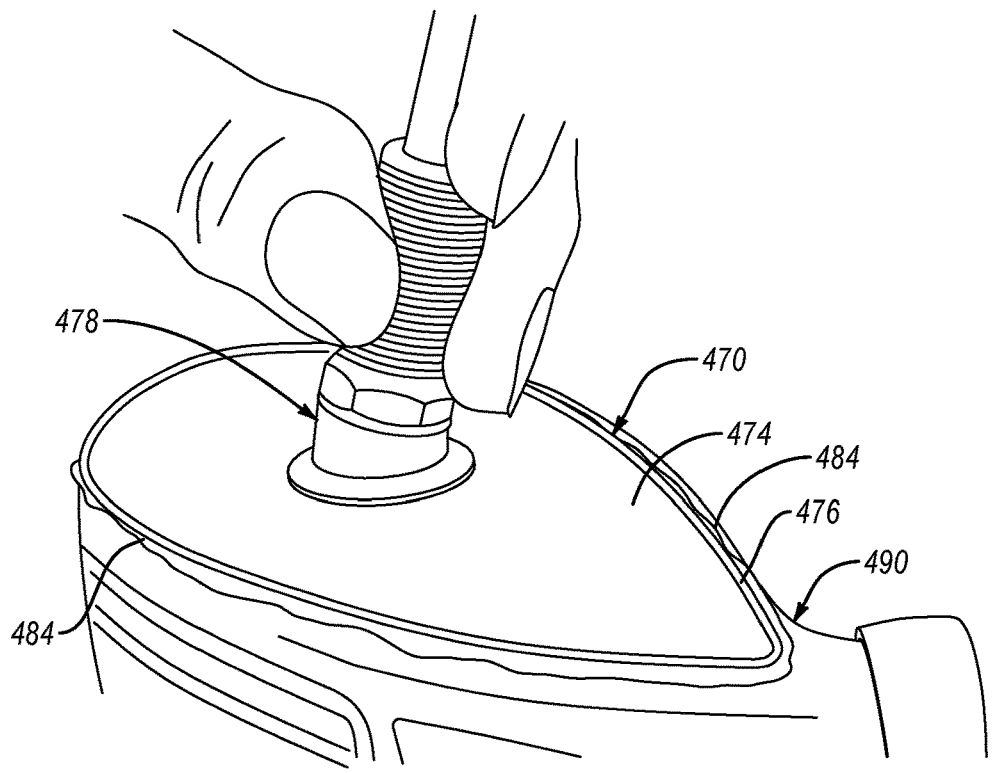
FIG. 67 is a schematic, isotropic view of the handheld vacuum tool of FIG. 66, according to one or more examples of the present disclosure.
Figure 68:
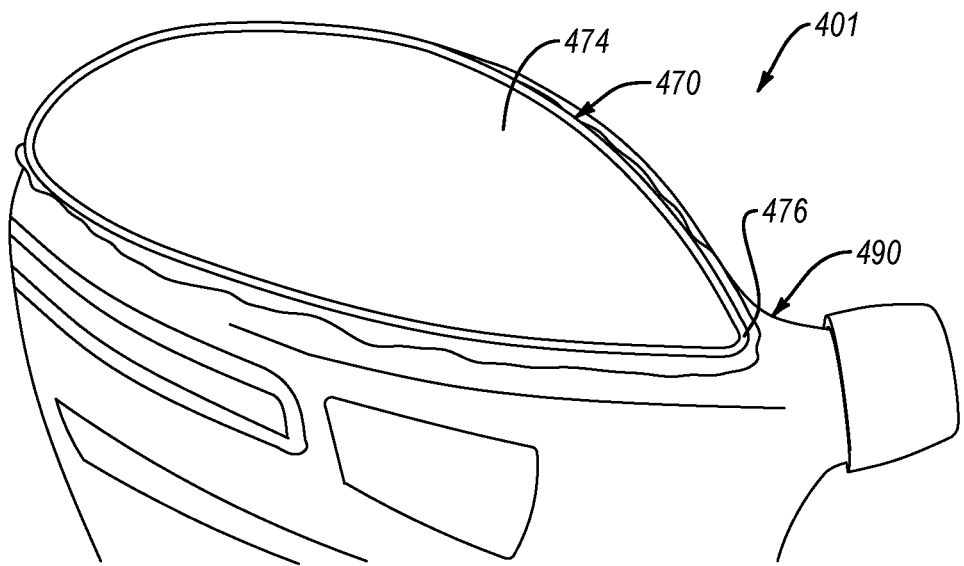
FIG. 68 is a schematic, isotropic view of a golf club head having a composite strike plate, shown with a protective tape on a face of the composite strike plate, according to one or more examples of the present disclosure.

Referring to FIGS. 66-68. in preparation for adhering the strike plate 470 to the body 490 over the face opening 492, a protective film 474 is applied onto a portion of the polymeric material 460 defining the strike face of the strike plate 470. The protective film 474 includes an adhesive on one side and an outward-facing surface on an opposite side. The adhesive can be a pressure activated adhesive. The outward-facing surface of the protective film 474 is made of a fibrous material, in one example, and has a surface roughness that is less than an average surface roughness of the strike face. As described previously, the polymeric material 460 that defines the strike face of the strike plate 470 includes grooves. Because of the grooves, the average surface roughness of the strike face, which accounts for the grooves, is relatively high. Accordingly, the protective film 474 provides an outward-facing surface that is smoother than the strike face, which enables a handheld vacuum tool 478 to apply a suction force to and generate a vacuum seal against the outward-facing surface of the protective film 474. The handheld vacuum tool 478 includes a suction cup that applies the suction force directly onto the outward-facing surface of the protective film 474. Without the protective film 474, because of the grooves in the polymeric material 460, an adequate vacuum seal between the suction cup of the handheld vacuum tool 478 and the strike face could not be formed as the suction cup would not be able to seal against the surfaces of the grooves. The use of the protective film 474 enables retention of the strike plate 470 by the handheld vacuum tool 478 via a suction force.

Additionally, the protective film 474 prevents the adhesive 484 from entering the grooves formed in the polymeric material 460. If the adhesive 484 entered the grooves, the adhesive 484 would be difficult to remove from the grooves. Referring to FIG. 66, the protective film 474 covers an entirety of the grooves formed in the protective film 474. Because the grooves are covered, the adhesive 484 is not able to enter into the grooves.

In some examples, as shown in FIG. 66, the protective film 474 does not cover an entirety of the strike face defined by the polymeric material 460. For example, an outer peripheral portion 476 of the strike face remains uncovered. The outer peripheral portion 476 can be uncovered because the grooves do not extend into the outer peripheral portions 476. Moreover, the outer peripheral portion 476, being uncovered, promotes removal of the protective film 474 and ensures no portion of protective film 474 is bonded, via the adhesive 484, to the body 490. In some examples, the protective film 474 covers from 70% to 100% of the strike face, such as from 95% to 98% of the strike face.

When the strike plate 470 is retained by the handheld vacuum tool 478, the strike plate 470 can be easily moved into position, relative to the body 490, for adhesion to the body 490. Moreover, because the handheld vacuum tool 478 is secured to the strike face away from the outer peripheral portion 476 of the strike face, the grip on the strike plate 470 does not interfere with interface between the strike plate 470 and the body 490. In some examples, the body 490 is held in plate by a nest mount 493, which receives the body 490 in nested engagement. After the strike plate 470 is properly adhered to the body 490, the vacuum pressure supplied to the handheld vacuum tool 478 can be disabled, such as via a manually-operated switch or button on the handheld vacuum tool 478, to release the strike plate 470 from the grip of the handheld vacuum tool 478. The adhesive 484 is then cured to harden or set the adhesive.

Figure 69:
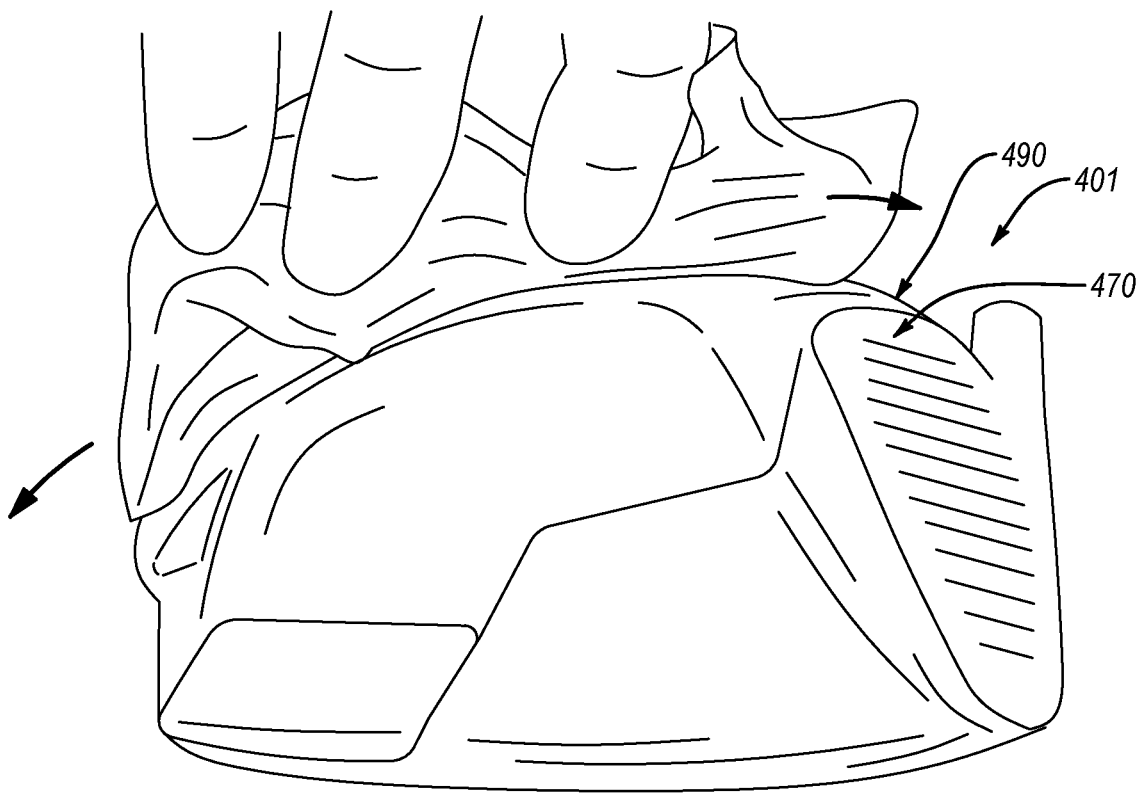
FIG. 69 is a schematic, isotropic view of the golf club head of FIG. 68 being cleaned, according to one or more examples of the present disclosure.

As shown in FIG. 69, excess portions of the adhesive 484 can be removed from the golf club head 401 and the golf club head 401 can be further cleaned. In certain examples, the protective film 474 is removed prior to or after removing the excess portions of the adhesive 484, curing the adhesive 484, and/or the further cleaning the golf club head 401. In some examples, the method additionally includes applying (e.g., adhering) a metallic backing (e.g., titanium plate) to the rearward surface 438 of the strike plate 470 prior to or after adhering the strike plate 470 to the body 490. At least a portion of the metallic backing can be positioned within the face opening 492.

In some examples, the golf club head 401 includes at least one of a crown insert, a sole insert, a rear ring and a continuous collar, similar to that shown and described in U.S. patent application Ser. No. 17/560,054, filed Dec. 22, 2021, which is incorporated herein by reference in its entirety. In such examples, the adhesive 484 that bonds the strike plate 470 to a continuous collar (e.g., body) is cured, in an oven, before the crown insert and sole insert, which can be made of fiber-reinforced polymeric materials, are adhesively bonded to the continuous collar or the rear ring. Moreover, in some examples, the adhesive bonding the sole insert to the continuous collar is cured, in an oven, before the adhesive bonding the crown insert to the continuous collar is cured, in an oven. In certain examples, the adhesive that bonds together the rear ring, the continuous collar, and the crown insert is cured, in an oven, before the adhesive bonding together the sole insert to the continuous collar and to the rear ring is cured, in an oven. In other words, in some examples, the adhesives associated with adhesively bonding together the multiple pieces of the golf club head are cured, in a oven, in at least three separate curing operations.

The composite face disclosed herein can be manufactured using alternative or additional manufacturing steps or have alternative or additional features, such as those disclosed in one or more of U.S. Pat. No. 8,303,435, issued Nov. 6, 2012, U.S. Pat. No. 8,684,864, issued Apr. 1, 2014, U.S. Pat. No. 9,089,745, issued Jul. 28, 2015, U.S. Patent Application Publication No. 2014/0274446, published Sep. 18, 2014, U.S. Pat. No. 11,186,016, issued Nov. 30, 2021, U.S. Pat. No. 11,110,325, issued Sep. 7, 2021, U.S. Pat. No. 10,881, 921, issued Jan. 5, 2021, and U.S. Pat. No. 10,183,202, issued Jan. 22, 2019, which are all incorporated herein by reference in their entirety.

The desired goals are provided by a delicate interplay of relationships of the various components and manufacturing methods, variables within each component or step in a process as well as relationships across the components and steps. The disclosed relationships are more than mere optimization, maximization, or minimization of a single characteristic or variable or manufacturing step, and are often contrary to conventional design and manufacturing thinking, yet have been found to achieve a unique balance of the trade-offs associated with competing criteria such as speed, durability, acoustics, vibration, fatigue resistance, weight, ease of manufacture, and reduction of waste. Afterall, the manufacture of laminate structures containing a multiple of materials, including but not limited to pre-preg, primers, paints, inks, thermoplastic materials, thermoset materials, is incredibly complex and requires careful balance of properties, including activation levels, to ensure that the various laminates are joined to one another to withstand the dramatic impacts experienced by the face of a golf club head. The relationships disclosed do more than maximize or minimize a single characteristic and/or manufacturing process/step such as bonding, durability, vibration damping, changes in face mode frequencies, coefficient of restitution (COR) at a single point such as face center or offset/distributed COR, and ease/speed of manufacturing, and the disclosed relationships achieve a unique balance among these characteristics, which are often conflicting, to produce a club head that has improved interlaminate durability, feel, sound, performance, and/or ease of manufacturing. After all, such variations in materials and multi-layered laminate face structures have the potential to delaminate when subjected to repeated impacts and significantly adversely impact the durability, sound, feel, and performance of the golf club head. The aforementioned balance requires trade-offs among the competing characteristics recognizing key points of diminishing returns. Further, it is important to recognize that all the associated disclosure and relationships apply equally to all embodiments and should not be interpreted as being limited to the particular embodiment being discussed when a relationship is mentioned. Further, the aforementioned balances require trade-offs among the competing characteristics recognizing key points of diminishing returns, as often disclosed with respect to open and closed ranges for particular variables and relationships. Proper functioning of each component including each layer of the laminate structure, and the overall system, on each and every shot, over thousands of impacts during the life of a golf club, is critical. Therefore, this disclosure contains unique combinations of components, manufacturing steps and configurations, and relationships that achieve these goals. While the relationships of the various features and dimensions of a single component or manufacturing step play an essential role in achieving the goals, the relationships of features across multiple components, steps, and processes are just as critical, if not more critical, to achieving the goals. Further, the relative length, width, thickness, geometry, mass, and material properties of various components, strips, layers, and their relationships to one another and the other design variables disclosed herein, influence the durability, feel, sound, safety, and ease of manufacture.

While FIGS. 41-68 illustrate embodiments and methods of creating strike-plate preforms 410 and strike plates 470 that are then bonded to a face opening 492 in the body 490, one skilled in the art will appreciate that any of the disclosed methods and/or processes may be used to form other portions and/or components of a golf club head. For instance, the cup member, labeled 104 in U.S. Ser. No. 17/124,134, may be formed via any of the methods disclosed herein. Similarly, an integral one-piece combination of at least a portion of the cup member and the strike face, labeled 145 in U.S. Ser. No. 17/124,134, may be formed via any of the methods disclosed herein. Further, an integral one-piece combination of at least a portion of the cup member and the crown and/or sole of U.S. Ser. No. 17/124,134, may be formed via any of the methods disclosed herein. Additionally, an integral one-piece combination of at least a portion of the strike face and the crown and/or sole of U.S. Ser. No. 17/124,134, may be formed via any of the methods disclosed herein, with or without an identifiable cup member. The entire contents of U.S. Ser. No. 17/124,134 are incorporated by reference in its entirety herein.

In another embodiment a traditional crown insert, or panel, and/or a sole insert, or panel, is formed via any of the methods disclosed herein; and in one embodiment either insert includes at least N elongated strips 145 to facilitate desired thickness variations in the insert to reduce weight, distribute stress, and achieve the desired rigidity, and in one embodiment N is 2, while in further embodiments N is 3, 4, 5, 6, or 7. In another series of embodiments N is no more than 20, and in additional embodiments no more than 18, 16, 14, or 12. In another embodiment a predetermined percentage of the elongated strips 145 extends continuously from a first point on a perimeter of the insert to a second point on the perimeter of the insert, and in one embodiment the predetermined percentage is at least 20%, and in further embodiments at least 40%, 60%, 80%, or 90%. Thus, a crown insert preform and/or a sole insert preform may be formed like any of the embodiments of the strike-plate preform 410. For instance, either insert may incorporate a first non-cluster panel has a first panel centroid, overlaid by a first strip and a second strip, wherein a second strip longitudinal axis crosses a first strip longitudinal axis at a first intersection point that is offset from the first panel centroid by a first offset distance. In one embodiment the offset distance is at least 25% of at least one of the first strip width and the second strip width, and in further embodiments at least 50%, 75%, or 100%. In another embodiment the first offset distance is no more than 300% of at least one of the first strip width and the second strip width, and in further embodiments no more than 250%, 200%, 150%, or 125%. In another embodiment a third strip longitudinal axis of a third strip crosses the second strip longitudinal axis at a second intersection point that is offset from the first panel centroid by a second offset distance. In one embodiment the second offset distance is at least 25% of at least one of the second strip width and the third strip width, and in further embodiments at least 50%, 75%, or 100%. In another embodiment the second offset distance is no more than 300% of at least one of the second strip width and the third strip width, and in further embodiments no more than 250%, 200%, 150%, or 125%. In one embodiment the second intersection point aligns with the first intersection point, while in an alternative embodiment the second intersection point is offset from the first intersection point. In another embodiment the second offset distance is greater than the first offset distance, and in further embodiments the second offset distance is at least 10%, 20%, 30%, or 40% greater than the first offset distance. In still another embodiment the second offset distance is no more than 200% greater than the first offset distance, and in further embodiments no more than 150%, 125%, 100%, or 75% greater than the first offset distance. In one embodiment the first non-cluster panel is asymmetric, while in another embodiment the second non-cluster panel is asymmetric.

Figure 30C:
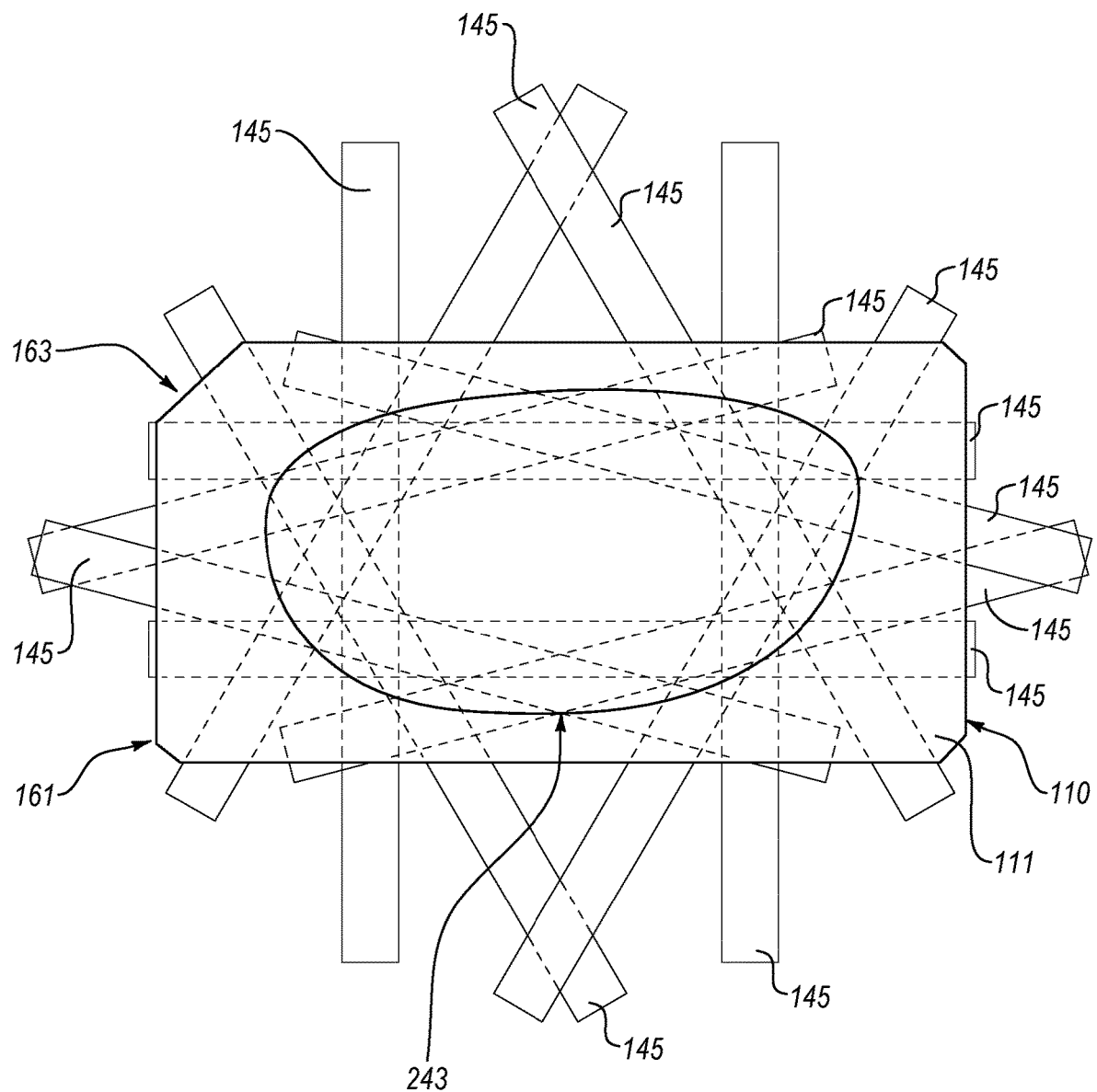
FIG. 30C is a schematic, top plan view of a panel, according to one or more examples of the present disclosure.

Thus, the disclosed use of intersecting elongated strips 145, such as those illustrated in FIG. 30C, is not limited to a single portion of the club head and in some embodiments at least one elongated strip 145 extends across the face and into at least a portion of the crown and/or sole. In one embodiment at least N elongated strips 145 extend from a first point on the face perimeter located below center face through a second point on the face perimeter located above center face, and extends onto the crown and rearward of an offset loft plane, labeled element 5100 in U.S. Ser. No. 63/433,380, the entire contents of which are incorporated by reference in its entirety herein. In one embodiment N is 1, and in further embodiments N is 2, 3, 4, or 5. In another embodiment N is no more than 50, and in additional embodiments no more than 45, 40, 35, or 30. In one embodiment the face portion has at least Y less non-cluster panel(s) than the adjacent body portion, thereby creating a slight recess in the face portion for the polymeric layer 380, wherein in one embodiment Y is 1, and in further embodiments Y is 2, 3, or 5. However, in another series of embodiments Y is no greater than 10, 8, or 6.

The face has a face surface roughness. Surface textures or roughness can be conveniently characterized based a surface profile, i.e., a surface height as a function of position on the surface. A surface profile is typically obtained by interrogating a sample surface with a stylus that is translated across the surface. Deviations of the stylus as a function of position are recorded to produce the surface profile. In other examples, a surface profile can be obtained based on other contact or non-contact measurements such as with optical measurements. Surface profiles obtained in this way are often referred to as "raw" profiles. Alternatively, surface profiles for a golf club striking surface can be functionally assessed based on shot characteristics produced when struck with surfaces under wet conditions. For convenience, a control layer is defined as a striking face configured so that shots are consistent under wet and dry playing conditions. Generally, satisfactory roughened or textured striking surfaces (or other control surfaces) provide ball spins of at least about 2000 rpm, 2500 rpm, 3000 rpm, or 3500 rpm under wet conditions when struck with club head speeds of between about 75 mph and 120 mph. Such control surfaces thus provide shot characteristics that are substantially the same as those obtained with conventional metal woods. Stylus or other measurement based surface roughness characterizations for such control surfaces are described in detail below.

A surface profile is generally processed to remove gradual deviations of the surface from flatness. For example, a wood-type golf club striking face generally has slight curvatures from toe-to-heel and crown-to-sole to improve ball trajectory, and a "raw" surface profile of a striking surface or a cover layer on the striking surface can be processed to remove contributions associated with these curvatures. Other slow (i.e., low spatial frequency) contributions can also be removed by such processing. Typically features of size of about 1 mm or greater (or spatial frequencies less than about 1/mm) can be removed by processing as the contributions of these features to ball spin about a horizontal or other axis tend to be relatively small. A raw (unprocessed) profile can be spatially filtered to enhance or suppress high or low spatial frequencies. Such filtering can be required in some measurements to conform to various standards such as DIN or other standards. This filtering can be performed using processors configured to execute a Fast Fourier Transform (FFT).

Generally, a patterned roughness or texture is applied to a substantial portion of a striking surface or at least to an impact area. For wood-type golf clubs, an impact area is based on areas associated with inserts used in traditional wood golf clubs. For irons, an impact area is a portion of the striking surface within 20 mm on either side of a vertical centerline, but does not include 6.35 mm wide strips at the top and bottom of the striking surface. Generally, such patterned roughness need not extend across the entire striking surface and can be provided only in a central region that does not extend to a striking surface perimeter.

Striking surface roughness can be characterized based on a variety of parameters. A surface profile is obtained over a sampling length of the striking surface and surface curvatures removed as noted above. An arithmetic mean Ra is defined a mean value of absolute values of profile deviations from a mean line over a sampling length of the surface. For a surface profile over the sampling length that includes N surface samples each of which is associated with a mean value of deviations Yi, from the mean line, the arithmetic mean Ra is:

$$R_a = \frac{1}{N}\sum_{i=1}^{N} |Y_i|,$$

wherein which is an integer i=1, . . . , N. The sampling length generally extends along a line on the striking surface over a substantial portion or all of the striking area, but smaller samples can be used, especially for a patterned roughness that has substantially constant properties over various sample lengths. Two-dimensional surface profiles can be similarly used, but one dimensional profiles are generally satisfactory and convenient. For convenience, this arithmetic mean is referred to herein as a mean surface roughness.

A surface profile can also be further characterized based on a reciprocal of a mean width Sm of the profile elements. This parameter is used and described in one or more standards set forth by, for example, the German Institute for Standardization (DIN) or the International Standards Organization (ISO). In order to establish a value for Sm, an upper count level (an upward surface deviation associated with a peak) and a lower count level (a downward surface deviation associated with a valley) are defined. Typically, the upper count level and the lower count level are defined as values that are 5% greater than the mean line and 5% less than the mean line, but other count levels can be used. A portion of a surface profile projecting upward over the upper count level is called a profile peak, and a portion projecting downward below the given lower count level is called a profile valley. A width of a profile element is a length of the segment intersecting with a profile peak and the adjacent profile valley. Sm is a mean of profile element widths Smi within a sampling length:

$$S_m = \frac{1}{K}\sum_{i=1}^{K} S_{mi}$$

For convenience, this mean is referred to herein as a mean surface feature width.

In determining Sm, the following conditions are generally satisfied: 1) Peaks and valleys appear alternately; 2) An intersection of the profile with the mean line immediately before a profile element is the start point of a current profile element and is the end point of a previous profile element; and 3) At the start point of the sampling length, if either of the profile peak or profile valley is missing, the profile element width is not taken into account. Rpc is defined as a reciprocal of the mean width Sm and is referred to herein as mean surface feature frequency.

Another surface profile characteristic is a surface profile kurtosis Ku that is associated with an extent to which profile samples are concentrated near the mean line. As used herein, a the profile kurtosis Ku is defined as:

$$Ku = \frac{1}{R_q^4}\frac{1}{N}\sum_{i=1}^{N}(Y_i)^4,$$

wherein Rq is a square root of the arithmetic mean of the squares of the profile deviations from the mean line, i.e., $$R_q = \left(\frac{1}{N}\sum_{i=1}^{N} Y_i^2\right)^{1/2}.$$

Profile kurtosis is associated with an extent to which surface features are pointed or sharp. For example, a triangular wave shaped surface profile has a kurtosis of about 0.79, a sinusoidal surface profile has a kurtosis of about 1.5, and a square wave surface profile has a kurtosis of about 1.

Other parameters that can be used to characterize surface roughness include Rz which is based on a sum of a mean of a selected number of heights of the highest peaks and a mean of a corresponding number of depths of the lowest valleys. One or more values or ranges of values can be specified for surface kurtosis Ku, mean surface feature width Sm, and arithmetic mean deviation Ra (mean surface roughness) for a particular golf club striking surface and/or other component of the club head.

In one embodiment the face surface roughness is the face mean surface roughness f-Ra. In one such embodiment the at least a portion of the face has a face mean surface roughness f-Ra is at least 2.0 μm, and in further embodiments at least 2.5 μm, 3.0 μm, 3.5 μm, or 4.0 μm. In a further embodiment at least 50% of the external surface of the face has a face mean surface roughness f-Ra is at least 2.0 μm, and in further embodiments at least 2.5 μm, 3.0 μm, 3.5 μm, or 4.0 μm. In still another embodiment at least 70% of the external surface of the face has a face mean surface roughness f-Ra is at least 2.0 μm, and in further embodiments at least 2.5 μm, 3.0 μm, 3.5 μm, or 4.0 μm. Similarly, in one embodiment at least 50% of the crown located in front of the offset loft plane, labeled element 5100 in U.S. Ser. No. 63/433,380, has a face mean surface roughness f-Ra of less than 3.0 μm, and in further embodiments less than 2.5 μm, 2.0 μm, or 1.5 μm. In another embodiment at least 75% of the crown located in front of the offset loft plane has a face mean surface roughness f-Ra of less than 3.0 μm, and in further embodiments less than 2.5 μm, 2.0 μm, or 1.5 μm. In still another embodiment at least 90% of the crown located in front of the offset loft plane has a face mean surface roughness f-Ra of less than 3.0 μm, and in further embodiments less than 2.5 μm, 2.0 μm, or 1.5 μm. Such relationships balance diminishing returns and trade-offs regarding performance of the face and aerodynamic performance of the club head. In one embodiment the face mean surface roughness f-Ra is achieve via roughness features formed in the polymeric material 460, however in a further embodiment the roughness features are formed directly in the face material, and in an even further embodiment the roughness features are formed in a resin that forms the outermost surface of the golf club head. In one such embodiment the resin is a thermoplastic.

Figure 76:
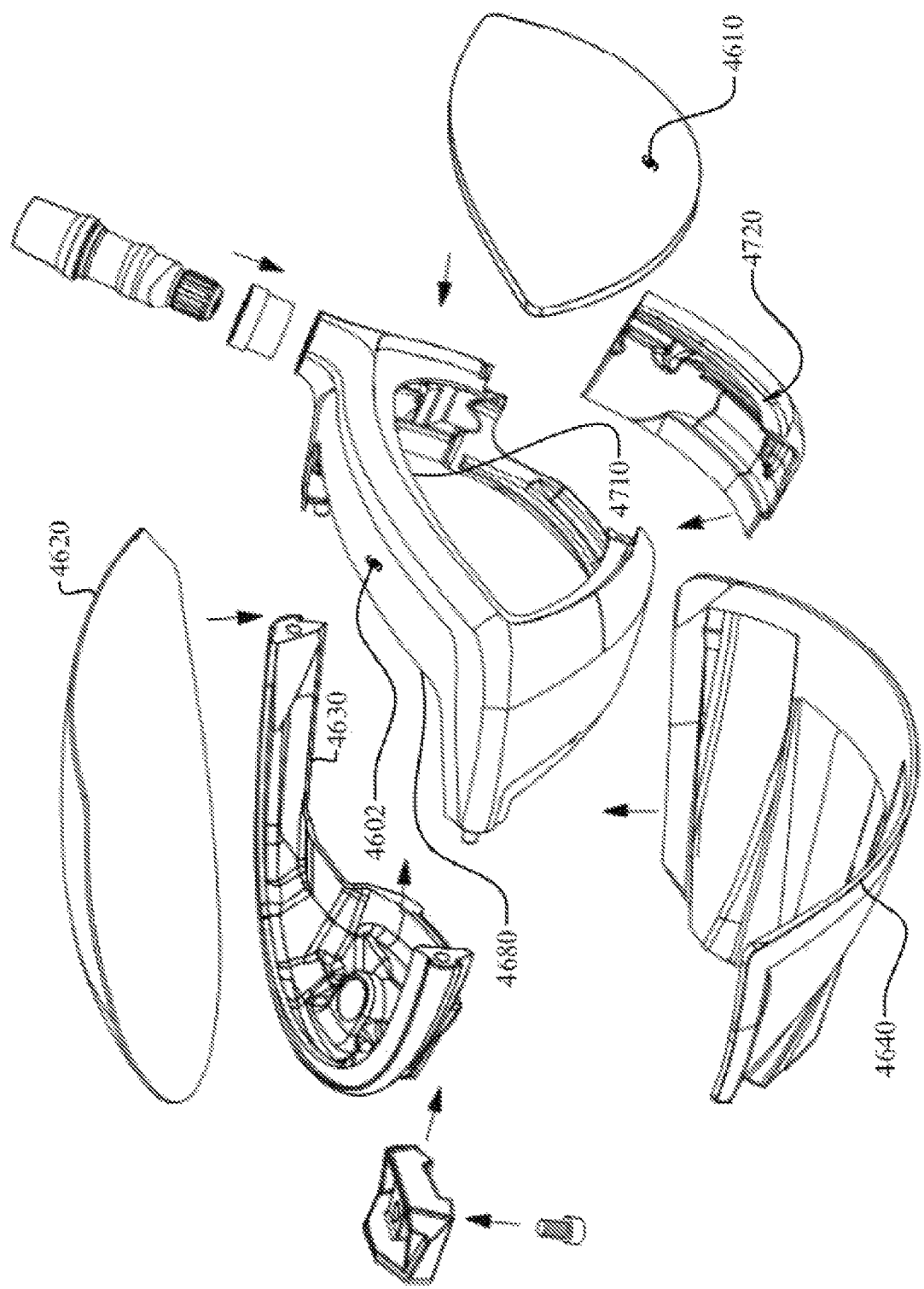
FIGS. 76-82 are various schematic views of a golf club head, according to one or more examples of the present disclosure.

FIG. 76 illustrates an embodiment having a first ledge wall region 4710 and a second ledge wall region 4720. In a further embodiment the second ledge wall material density is at least 25% greater than the first ledge wall material density, and in further embodiments is at least 50%, 75%, 100%, 125%, 150%, 175%, 200%, 225%, 250%, or 275% greater. In a further embodiment the first ledge wall material density is less than 5 g/cc, while in another embodiment it is less than 3 g/cc, and in an even further embodiment it is less than 2 g/cc. The second ledge wall material density is at least 4 g/cc in one embodiment, at least 7 g/cc in another embodiment, and at least 10 g/cc in still a further embodiment. The following disclosure is applicable to all face support ledge wall embodiments, whether a single continuous face support ledge wall, a face support ledge wall composed of multiple distinct sections separated from one another but formed of the same material, or a face support ledge wall with multiple distinct sections, whether separated or not, and formed of different materials. In one embodiment the second ledge wall average thickness is less than the first ledge wall average thickness; while in another embodiment the second ledge wall average thickness is at least 10% less than the first ledge wall average thickness; and in further embodiments it is at least 15% less, 20% less, 25% less, 30% less, or 35% less. In another series of embodiments the second ledge wall average thickness is 40-80% of the first ledge wall average thickness, and is 45-75%, 50-70%, or 55-65% in further embodiments. In one specific embodiment the ledge wall average thickness and/or the first ledge wall average thickness is at least 1.1 mm and the second ledge wall average thickness is no more than 1.0 mm; in another embodiment the ledge wall average thickness and/or the first ledge wall average thickness is at least 1.15 mm and the second ledge wall average thickness is no more than 0.95 mm; in another embodiment the ledge wall average thickness and/or the first ledge wall average thickness is at least 1.20 mm and the second ledge wall average thickness is no more than 0.90 mm; in another embodiment the ledge wall average thickness and/or the first ledge wall average thickness is at least 1.25 mm and the second ledge wall average thickness is no more than 0.85 mm. In one specific embodiment the ledge wall average thickness and/or the first ledge wall average thickness is at least 0.875 mm and the second ledge wall average thickness is no more than 0.86 mm; in another embodiment the ledge wall average thickness and/or the first ledge wall average thickness is at least 0.90 mm and the second ledge wall average thickness is no more than 0.85 mm; in another embodiment the ledge wall average thickness and/or the first ledge wall average thickness is at least 0.925 mm and the second ledge wall average thickness is no more than 0.84 mm; in another embodiment the ledge wall average thickness and/or the first ledge wall average thickness is at least 0.95 mm and the second ledge wall average thickness is no more than 0.83 mm.

In one embodiment the first ledge wall region 4710 of FIG. 76 encompasses at least 90 degrees around the perimeter of the face plate 4610; while in further embodiments it encompasses at least 145 degrees, 180 degrees, 190 degrees, 200 degrees, 210 degrees, 220 degrees, 230 degrees, 240 degrees, 250 degrees, 260 degrees, 270 degrees, or 280 degrees. In one embodiment the first ledge wall region 4710 encompasses the entire top perimeter located from a 90 degree line toward the heel, in a face on front elevation view, to a 270 degree line toward the toe. In a further embodiment the first ledge wall region 4710 encompasses at least 10 degrees around the perimeter of the face 4610 in the region between a 225 degree line and a 270 degree line, where a 0 degree line extends vertically from center face, while in further embodiments the 10 degree range is expanded to 15 degrees, 20 degrees, 25 degrees, 30 degrees, or 35 degrees. In yet another embodiment the first ledge wall region 4710 encompasses at least 10 degrees around the perimeter of the face plate 4610 in the region between the 135 degree line and the 90 degree line, while in further embodiments the 10 degree range is expanded to 15 degrees, 20 degrees, 25 degrees, 30 degrees, or 35 degrees. In still another embodiment the first ledge wall region 4710 encompasses no more than 350 degrees around the perimeter of the face; while in further embodiments it encompasses no more than 340 degrees, 330 degrees, 320 degrees, 310 degrees, 300 degrees, 290 degrees, 280 degrees, 270 degrees, or 260 degrees. While in the illustrated embodiment the first ledge wall region 4710 is continuous, in some embodiments it is discontinuous and formed of distinct sections with together total the ranges mentioned above. In fact one such embodiment includes at least 2 distinct sections of the first ledge wall region 4710, while further embodiments include at least 3 distinct sections, at least 4 distinct sections, or at least 5 distinct sections.

In one embodiment the second ledge wall region 4720 of FIG. 76 encompasses at least 10 degrees around the perimeter of the face; while in further embodiments it encompasses at least 20 degrees, 30 degrees, 40 degrees, 50 degrees, 60 degrees, 70 degrees, 80 degrees, 90 degrees, or 100 degrees. In one embodiment the second ledge wall region 4720 encompasses at least 10 degrees around the perimeter of the face in the region between the 180 degree line and the 90 degree line, while in further embodiments the 10 degree range is expanded to 15 degrees, 20 degrees, 25 degrees, 30 degrees, 35 degrees, 40 degrees, 45 degrees, or 50 degrees. In yet another embodiment the second ledge wall region 4720 encompasses at least 10 degrees around the perimeter of the face in the region between the 180 degree line and the 270 degree line, while in further embodiments the 10 degree range is expanded to 15 degrees, 20 degrees, 25 degrees, 30 degrees, or 35 degrees. In still another embodiment at least a portion of the second ledge wall region 4720 is located above the elevation of center face. In one embodiment the second ledge wall region 4720 encompasses at least 5 degrees around the perimeter of the face in the region between the 270 degree line and the 0 degree line, while in further embodiments the 5 degree range is expanded to 10 degrees, 15 degrees, 20 degrees, 25 degrees, 30 degrees, 35 degrees, 40 degrees, or 45 degrees. In another embodiment the second ledge wall region 4720 encompasses at least 5 degrees around the perimeter of the face in the region between the 0 degree line and the 90 degree line, while in further embodiments the 5 degree range is expanded to 10 degrees, 15 degrees, 20 degrees, 25 degrees, 30 degrees, 35 degrees, 40 degrees, or 45 degrees. In still another embodiment the second ledge wall region 4720 encompasses no more than 180 degrees around the perimeter of the face; while in further embodiments it encompasses no more than 170 degrees, 160 degrees, 150 degrees, 140 degrees, 130 degrees, 120 degrees, 110 degrees, 100 degrees, 90 degrees, or 80 degrees. While in the illustrated embodiment of FIG. 76 the second ledge wall region 4720 is continuous, in some embodiments it is discontinuous and formed of distinct sections with together total the ranges mentioned above. In fact one such embodiment includes at least 2 distinct sections of the second ledge wall region 4720, while further embodiments include at least 3 distinct sections, at least 4 distinct sections, or at least 5 distinct sections. The second ledge wall region 4720 may be formed as a portion of a forward insert that also forms a portion of the sole, as described in detail in U.S. patent application Ser. No. 17/560,054, which is incorporated by reference herein in its entirety.

Figure 77:
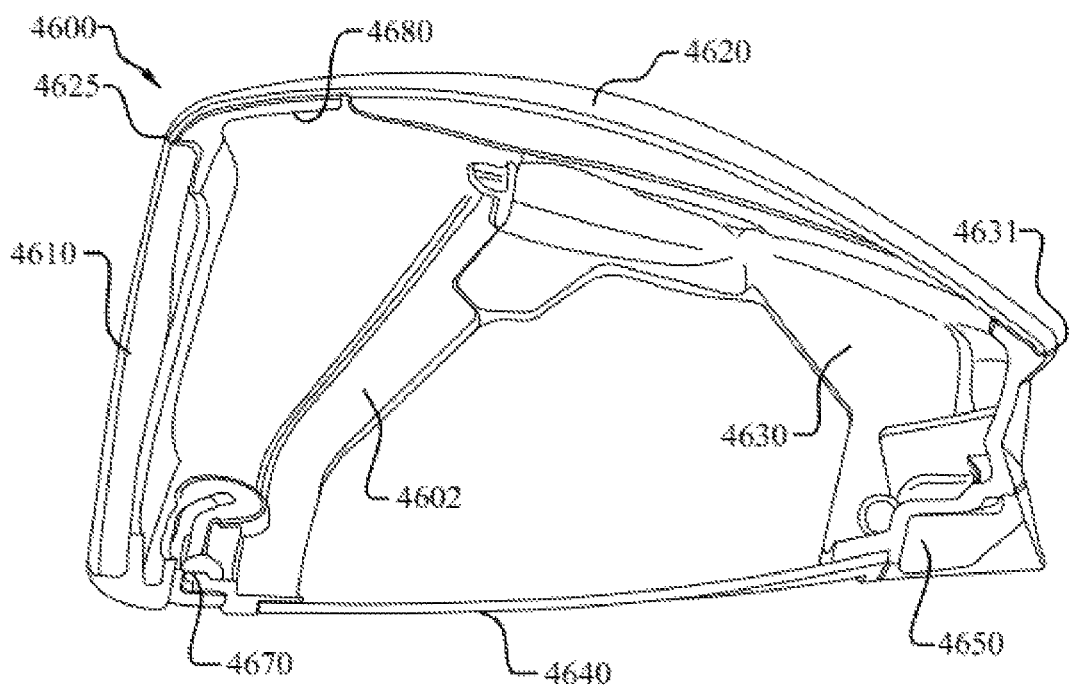

With reference now to FIG. 77, while the front body portion 4602 and the rear ring portion 4630 may be separate and distinct components mechanically joined, adhesively bonded, welded, and/or brazed together, they may also be formed as a single unitary component. Additionally, the front body portion 4602 may be formed as a unitary body, or may be composed of multiple components joined together such as disclosed in detail in U.S. patent application Ser. No. 17/560,054, which is incorporated by reference herein in its entirety. Regardless, in the illustrated embodiment of FIG. 77 the front body portion 4602 includes the forward ledge 4680 to support and engage a portion of the crown 4620, and forms the face opening for receipt of the face plate 4610. The front body portion 4602 has an internal surface which is exposed to the hollow void created in the finished club head, and an external surface opposite the internal surface; thus, the outer surface of the forward ledge 4680 is part of the outer surface of the front body portion 4602. In one embodiment the crown 4620 completely covers the forward ledge 4680 between the heel-side crown-to-face junction point 4700 and the toe-side crown-to-face junction point 4800.

In one embodiment at least a portion of the front body portion 4602 is formed of a metal alloy having a density of less than 5 g/cc, and in a further embodiment less than 3 g/cc, and in yet a further embodiment less than 2 g/cc. In another embodiment at least a portion of the front body portion 4602 located below the elevation of center face is formed of a metal alloy having a density of at least 5 g/cc, and in a further embodiment at least 7 g/cc. Thus, in one embodiment at least a portion of the front body portion 4602 located above the elevation of center face is formed of a metal alloy having a density of less than 5 g/cc, 3 g/cc, or 2 g/cc; while at least a portion of the front body portion 4602 located below the elevation of center face is formed of a metal alloy having a density of at least 5 g/cc, 7 g/cc, 9 g/cc, or 11 g/cc. In one embodiment the forward ledge 4680 is formed of a metal alloy having a density that is no more than two times the density of the crown 4620 and/or sole insert 4640.

In one embodiment at least a portion of the front body portion 4602 is formed of nonmetallic material having a density of less than 2 g/cc, and in a further embodiment less than 1.75 g/cc, and in yet a further embodiment less than 1.5 g/cc. In another embodiment at least a portion of the front body portion 4602 located below the elevation of center face is formed of a metal alloy having a density of at least 5 g/cc, and in a further embodiment at least 7 g/cc. Thus, in one embodiment at least a portion of the front body portion 4602 located above the elevation of center face is formed of a nonmetal material having a density of less than 2 g/cc, 1.75 g/cc, or 1.5 g/cc; while at least a portion of the front body portion 4602 located below the elevation of center face is formed of a metal alloy having a density of at least 5 g/cc, 7 g/cc, 9 g/cc, or 11 g/cc.

In one embodiment the rear ring portion 4630 is formed of a metal alloy having a density of less than 5 g/cc, and in a further embodiment less than 3 g/cc, and in yet a further embodiment less than 2 g/cc. In another embodiment at least a portion of the rear ring portion 4630 is formed to also incorporate a metal alloy having a density of at least 5 g/cc, and in a further embodiment at least 7 g/cc, 9 g/cc, 11 g/cc, 13 g/cc, 15 g/cc, or 17 g/cc. Thus, in one embodiment all of the rear ring portion 4630 located above the elevation of center face is formed of a metal alloy having a density of less than 5 g/cc, 3 g/cc, or 2 g/cc; while at least a portion of the rear ring portion 4630 located below the elevation of center face is formed of a metal alloy having a density of at least 5 g/cc, 7 g/cc, 9 g/cc, or 11 g/cc.

In one embodiment rear ring portion 4630 is formed of non-metallic material having a density of less than 2 g/cc, and in a further embodiment less than 1.75 g/cc, and in yet a further embodiment less than 1.5 g/cc. In another embodiment at least a portion of the rear ring portion 4630 located below the elevation of center face is formed of a metal alloy having a density of at least 5 g/cc, and in a further embodiment at least 7 g/cc, 9 g/cc, 11 g/cc, 13 g/cc, 15 g/cc, or 17 g/cc. Thus, in one embodiment all of the rear ring portion 4630 located above the elevation of center face is formed of a nonmetal material having a density of less than 2 g/cc, 1.75 g/cc, or 1.5 g/cc; while at least a portion of the rear ring portion 4630 located below the elevation of center face 205 is formed of a metal alloy having a density of at least 5 g/cc, 7 g/cc, 9 g/cc, 11 g/cc, 13 g/cc, 15 g/cc, or 17 g/cc.

In one embodiment the crown 4620 is formed of at least 3, 5, or 7 unidirectional prepreg plies with each having a crown unidirectional fiber areal weight and a crown unidirectional prepreg resin content, and in another embodiment the crown unidirectional fiber areal weight of the at least 3 unidirectional prepreg plies is equal. In another embodiment the crown 4620 includes a plurality of intersecting elongated strips 145, as previously disclosed. In a further embodiment the face plate 4610 includes at least 3 unidirectional prepreg plies with each having a face unidirectional fiber areal weight equal to the crown unidirectional fiber areal weight of at least one of the crown unidirectional prepreg plies and a face unidirectional prepreg resin content, while in a further embodiment the face unidirectional fiber areal weight of at least 3 unidirectional face plies is equal to the crown unidirectional fiber areal weight of at least three of the crown unidirectional prepreg plies. In another embodiment the crown 4620 includes at least one prepreg layer that is a weave and has a weave layer fiber areal weight that is at least 200% of the crown unidirectional fiber areal weight. In another embodiment the weave layer fiber areal weight is at least 200 gsm, 220 gsm, or 240 gsm; while in another embodiment the crown unidirectional fiber areal weight is no more than 100 gsm, and no more than 70 gsm in a further embodiment. In yet another embodiment the weave layer is a twill weave layer.

In one embodiment the sole insert 4640 is formed of at least 3, 4, 5, 6, or 7 unidirectional prepreg plies with each having a sole unidirectional fiber areal weight and a sole unidirectional prepreg resin content, and in another embodiment the sole unidirectional fiber areal weight of the at least 3 unidirectional prepreg plies is equal. In another embodiment the sole 4640 includes a plurality of intersecting elongated strips 145, as previously disclosed. In a further embodiment the sole unidirectional fiber areal weight is greater than the crown unidirectional fiber areal weight and/or the face unidirectional fiber areal weight. In another embodiment the sole unidirectional fiber areal weight is at least 20, 30, or 40 gsm greater than the crown unidirectional fiber areal weight and/or the face unidirectional fiber areal weight. While in another series of embodiments the sole unidirectional fiber areal weight is no more than 70, 60, 50, 40, or 30 gsm greater than the crown unidirectional fiber areal weight and/or the face unidirectional fiber areal weight.

The sole insert 4640 may have X sole unidirectional plies, the crown 4620 may have Y crown unidirectional plies, and the face plate 4610 may have Z face unidirectional plies. In one embodiment X is greater than Y, while in a further embodiment X is at least 2 greater than Y, and in an even further embodiment X is at least 3 greater than Y. In a further embodiment X is no more than 6 greater than Y, and no more than 5 or 4 in further embodiments. Z is at least four times X and/or Y in one embodiment, while in another embodiment Z is at least five, six, or seven times X and/or Y in further embodiments. In another series of embodiments Z is no more than fifteen times X and/or Y, and no more than twelve times, ten times, or eight times in further embodiments.

Further, the resin of the unidirectional prepreg plies is essential to performance and balancing the stiffness and deflection capabilities and durability of the various components of the club head. Thus the resin of the crown unidirectional prepreg plies has a crown resin elongation to break, likewise the sole insert unidirectional prepreg plies has a sole insert resin elongation to break, and the face insert unidirectional prepreg plies has a face insert resin elongation to break. In one embodiment the face insert resin elongation to break is greater than the crown resin elongation to break and/or the sole insert resin elongation to break, while in another embodiment the face insert resin elongation to break is at least 2%, and at least 2.1%, 2.2%, or 2.3% in further embodiments. In another embodiment the crown resin elongation to break and/or the sole insert resin elongation to break is less than 2%, and in further embodiments less than 1.9%, 1.8%, 1.7%, 1.6%, or 1.5%. Further, the resin content of the unidirectional plies is also essential and in one embodiment any of these relationships are achieve while having the face unidirectional prepreg resin content differ from the crown unidirectional prepreg resin content and/or sole unidirectional prepreg resin content by less than a predetermined resin content variation. In one embodiment the predetermined resin content variation is 4%, and in further embodiments it is 3%, 2.5%, 2%, 1.5%, or 1%. Similarly, in another embodiment the crown unidirectional prepreg resin content and sole unidirectional prepreg resin content vary from each other by less than the predetermined resin content variation. The disclosed resin content is the pre-cured resin content of the indicated unidirectional prepreg play. The overall components also have a final cured resin content, specifically a cured face resin content, a cured crown resin content, and/or a cured sole resin content. In one embodiment the cured face resin content is less than the cured crown resin content, and/or the cured sole resin content, while in a further embodiment either, or both, the cured crown resin content and/or the cured sole resin content is 40% or greater, while in a further embodiment the cured face resin content is 39.5% or less. In another embodiment the cured face resin content is at least 36%, and at least 37% or 38% in further embodiments.

Figure 78:
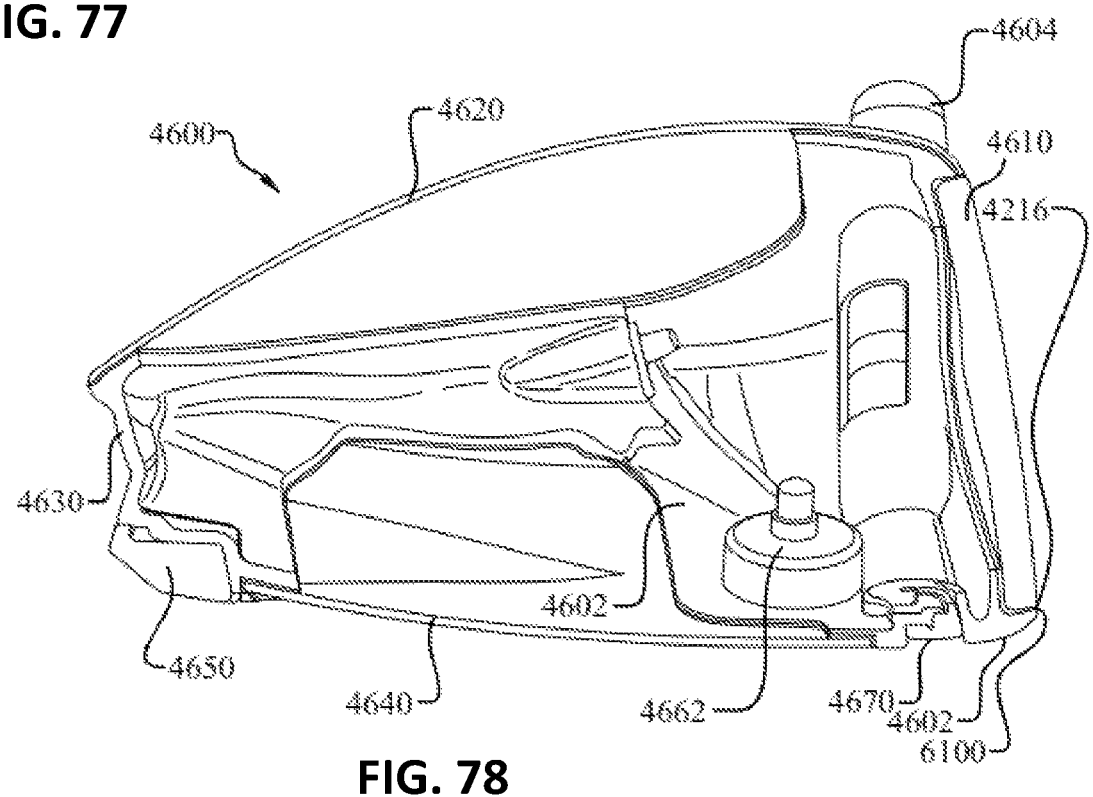
Figure 79:
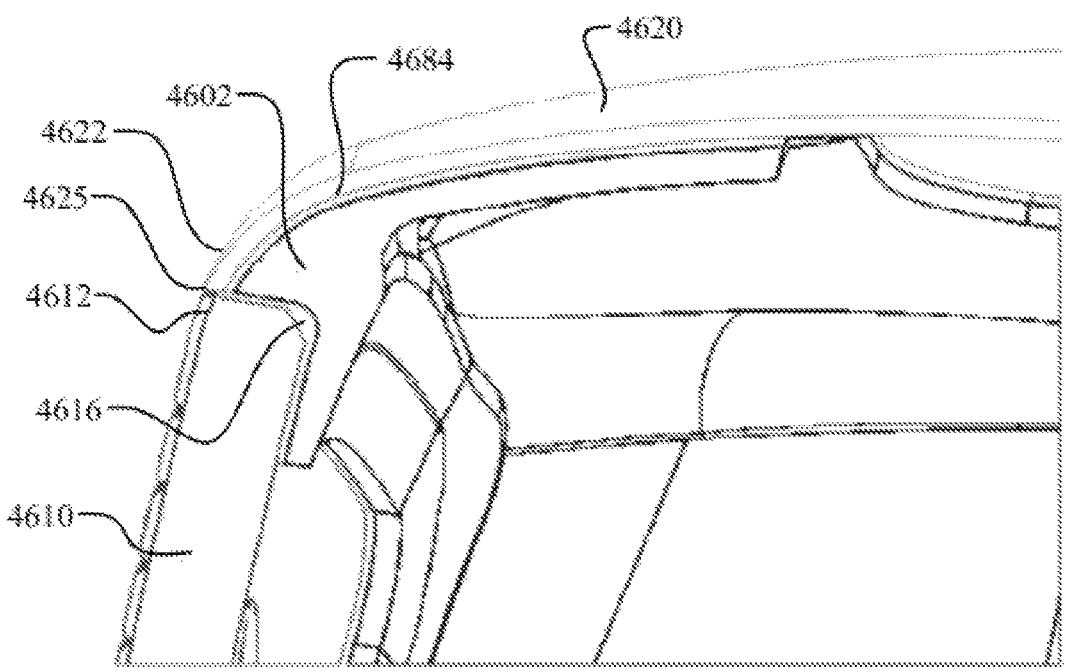
Figure 80:
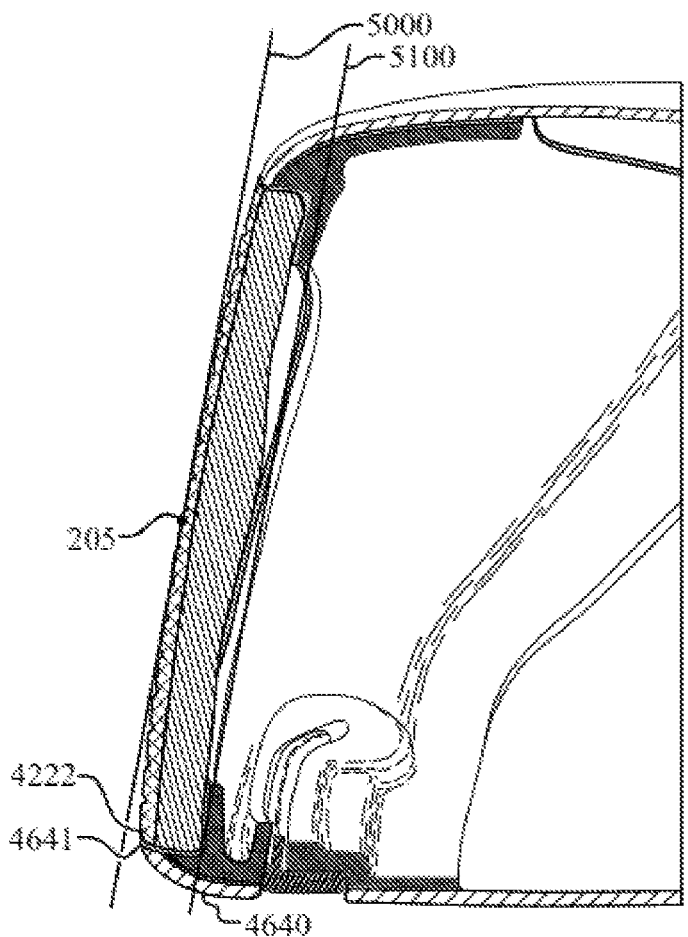

Now looking at FIG. 78 and the bottom perimeter of the face insert 4610, namely the relationship of the face lower portion perimeter edge 4216 and the face lower portion leading edge, here the front body portion 4602 creates the leading edge of the club head. Whereas in the embodiment of FIG. 80 the sole plate 4640 wraps upward to be adjacent to the face plate 4610, and has a sole plate leading edge 4641. In either case the proud relationship with respect to the crown leading edge 4625 may also apply to recess wall leading edge 6100, in FIG. 78, and/or sole plate leading edge 4641, in FIG. 80.

Further, the upper elongate side of the face insert may be recessed in relation to the crown leading edge 4625, or alternatively stated the crown leading edge 4625 may be proud of the upper elongate side of the face insert, as disclosed later in great detail regarding the proud relationship of the crown leading edge 4625 with respect to the face perimeter, and all of that later disclosure applies equally to the relationship of the crown leading edge 4625 to the upper elongate side, as well as the gap therebetween.

Figure 81:
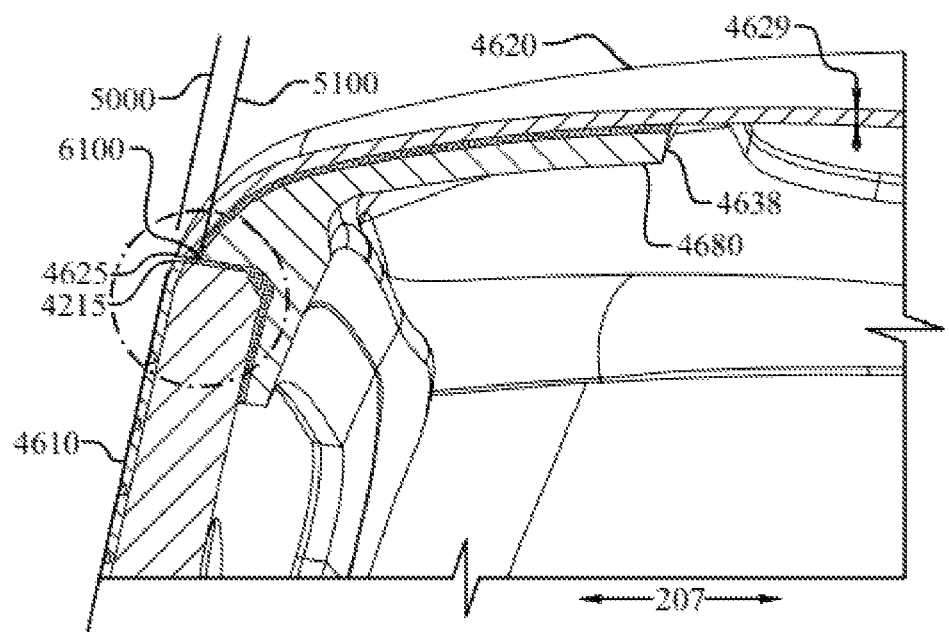
Figure 82:
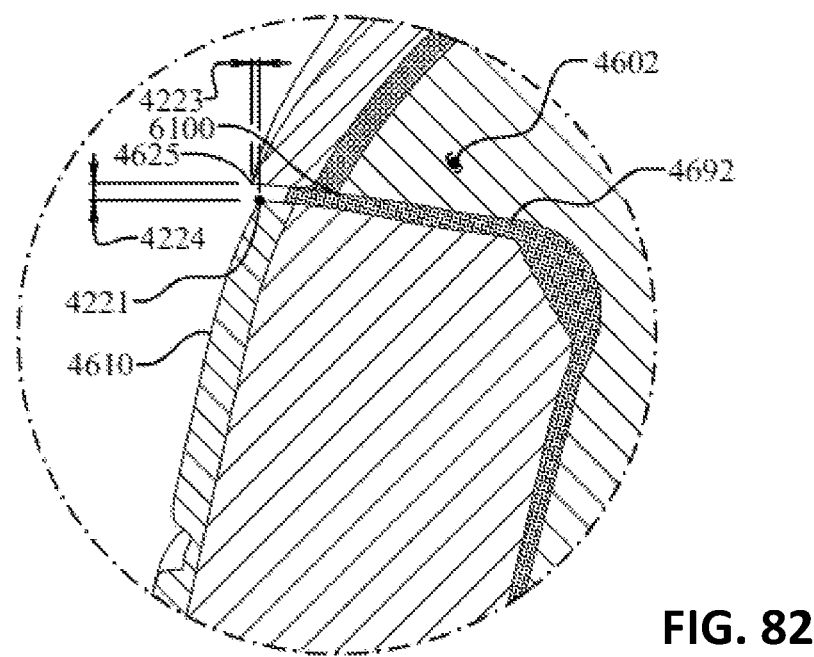

However, in a further embodiment the opposite may be true. Thus, just as the crown leading edge 4625 is proud to obscure a golfer from seeing a face topline leading edge, a portion of the face lower portion leading edge 4222 may be proud of the adjacent recess wall leading edge 6100, in FIG. 78, and/or sole plate leading edge 4641, in FIG. 80, so that now the lower portion of the face lower portion leading edge 4222 prevents a golfer in the address position from noticing a distinct joint around the lower portion of the face plate 4610. Thus, in this embodiment the components are precisely located so the face topline leading edge 4221 is slightly recessed in relation to the crown leading edge 4625, and transitions so that at least a portion of the face lower portion leading edge 4222 may be proud of the adjacent recess wall leading edge 6100, in FIG. 78, and/or sole plate leading edge 4641, in FIG. 80. In another embodiment it is proud by no more than 0.15 mm, measured in the same manner as the proud distance 4223 of FIG. 81, while in another embodiment it is proud by at least 0.02 mm, 0.04 mm, 0.06 mm, or 0.08 mm. While the discussion has been focused on the relationship within a single vertical section, the front elevation view coordinate system may be used to define regions in which the disclosed relationships may be true. For instance in one embodiment any of the proud relationships may be true through any continuous 15 degree range, while in further embodiments the range is expanded to 25, 35, 45, 55, 65, 75, 85, or 95 degrees. In such embodiments the transition of the face plate 4610 being recessed with respect to an adjacent component to being proud with respect to an adjacent component is delicate to that it is not apparent along the toe side and/or heel side perimeter of the face plate 4610. In such embodiments the perimeter of the face plate 4610 is flush with the adjacent component, i.e. neither recessed or proud, at a flush-transition point, which may include a toe-side flush-transition point and a heel-side flush-transition point. In one embodiment an elevation of the toe-side flush-transition point and/or the heel-side flush-transition point is above the elevation of center face, while in an alternative embodiment the elevation of the toe-side flush-transition point and/or the heel-side flush-transition point is below the elevation of center face. In still a further embodiment the elevation of the heel-side flush-transition point is less than the elevation of the toe-side flush-transition point.

Figure 83:
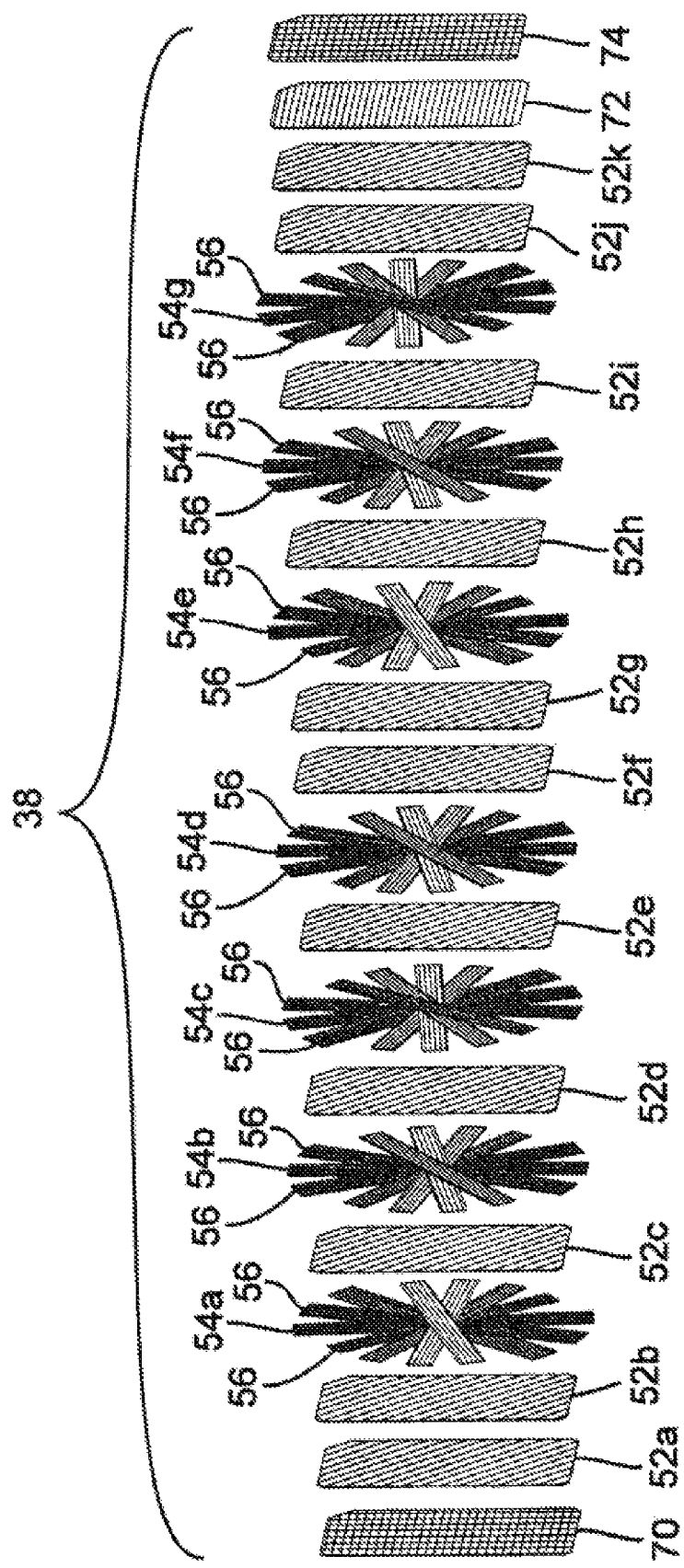
FIGS. 83-87 are various schematic views of layup configurations of panels and preforms, according to one or more examples of the present disclosure.

As shown in FIG. 83, the illustrated lay-up 38 is comprised of a plurality of sets, or unit-groups, 52 *a*-52 *k* of one or more prepreg plies of substantially uniform thickness and one or more sets, or unit-groups, 54 *a*-54 *g* of individual plies in the form of elongated strips 56. For purposes of description, each set 52 *a*-52 *k* of one or more plies can be referred to as a composite "panel" and each set 54 *a*-54 *g* can be referred to as a "cluster" of elongated strips. The clusters 54 *a*-54 *g* of elongated strips 56 are interposed between the panels 52 *a*-52 *k* and serve to increase the thickness of the finished part 40 at its central region 46. Each panel 52 *a*-52 *k* comprises one or more individual prepreg plies having a desired fiber orientation. The individual plies forming each panel 52 *a*-52 *k* desirably are of sufficient size and shape to form a cured lay-up from which the smaller finished component 40 can be formed substantially free of defects. In one embodiment the clusters 54 *a*-54 *g* of strips 56 desirably are individually positioned between and sandwiched by two adjacent panels (i.e., the panels 52 *a*-52 *k* separate the clusters 54 *a*-54 *g* of strips from each other) to facilitate adhesion between the many layers of prepreg material and provide an efficient distribution of fibers across a cross-section of the part. In one embodiment the panel 52 *a*-52 *k* comprises at least 2, 3, or 4 individual prepreg plies; while in a further embodiment the panel 52 *a*-52 *k* comprises no more than 12, 10, 8, or 6 individual prepreg plies.

In additional embodiments, the number of panels 52 *a*-52 *k* can range from 3 to 20 (with eleven panels 52 *a*-52 *k* being used in the illustrated embodiment) and the number of clusters 54 *a*-54 *g* can range from 1 to 19 (with seven clusters 54 *a*-54 *g* being used in the illustrated embodiment). However, in alternative embodiments, the number of panels and clusters can be varied depending on the desired profile and thickness of the part. In one embodiment the number of panels is at least 5, 7, 9, 11, or 13; while in another embodiment the number of panels is no more than 20, 18, 16, or 14. In one embodiment the number of clusters is at least 2, 4, 6, or 8; while in another embodiment the number of clusters is no more than 19, 17, 15, 13, 11, or 9.

The prepreg plies used to form the panels 52 *a*-52 *k* and the clusters 54 *a*-54 *g* desirably comprise carbon fibers impregnated with a suitable resin, such as epoxy. An example carbon fiber is "34-700" carbon fiber (available from Grafil, Sacramento, Calif.), having a tensile modulus of 234 Gpa (34 Msi) and a tensile strength of 4500 Mpa (650 Ksi). Another Grafil fiber that can be used is "TR50S" carbon fiber, which has a tensile modulus of 240 Gpa (35 Msi) and a tensile strength of 4900 Mpa (710 ksi). Suitable epoxy resins are types "301" and "350" (available from Newport Adhesives and Composites, Irvine, Calif.). An exemplary resin content (R/C) is 40%.

Figure 84:
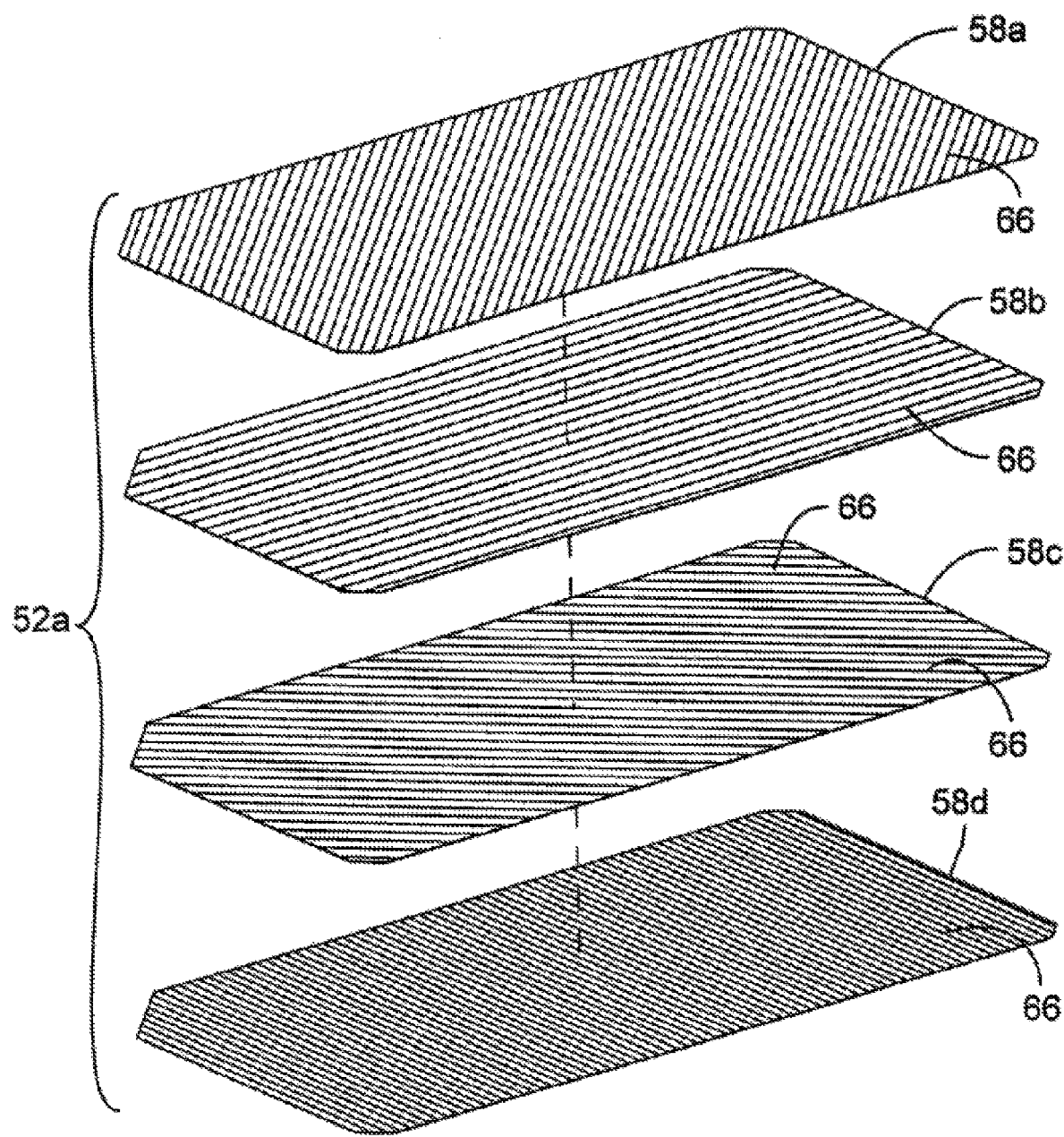

FIG. 84 is an exploded view of the first panel 52 *a*. For convenience of reference, the fiber orientation (indicated by lines 66) of each ply is measured from a horizontal axis of the club-head's face plane to a line that is substantially parallel with the fibers in the ply. As shown in FIG. 84, the panel 52 *a* in the illustrated example comprises a first ply 58 *a* having fibers oriented at +45 degrees, a second ply 58 *b* having fibers oriented at 0 degrees, a third ply 58 *c* having fibers oriented at −45 degrees, and a fourth ply 58 *d* having fibers oriented at 90 degrees. The panel 52 *a* of plies 58 *a*-58 *d* thus form a "quasi-isotropic" panel of prepreg material. The remaining panels 52 *b*-52 *k* can have the same number of prepreg plies and fiber orientation as set 52 *a*. In one embodiment each ply is rotated at least 15 degrees with respect to the adjacent plies, and in a further embodiment at least 20, 25, 30, 35, 40, or 45 degrees. In one embodiment no two plies within the same panel have the same orientation.

The lay-up illustrated in FIG. 83 can further include an "outermost" fiberglass ply 70 adjacent the first panel 52 *a*, a single carbon-fiber ply 72 adjacent the eleventh and last panel 52 *k*, and an "innermost" fiberglass ply 74 adjacent the single ply 72. The single ply can have a fiber orientation of 90 degrees as shown. The fiberglass plies 70, 74 can have fibers oriented at 0 degrees and 90 degrees. The fiberglass plies 70, 74 are essentially provided as sacrificial layers that protect the carbon-fiber plies when the cured lay-up is subjected to surface finishing such as sand blasting to smooth the outer surfaces of the part.

Figure 85:
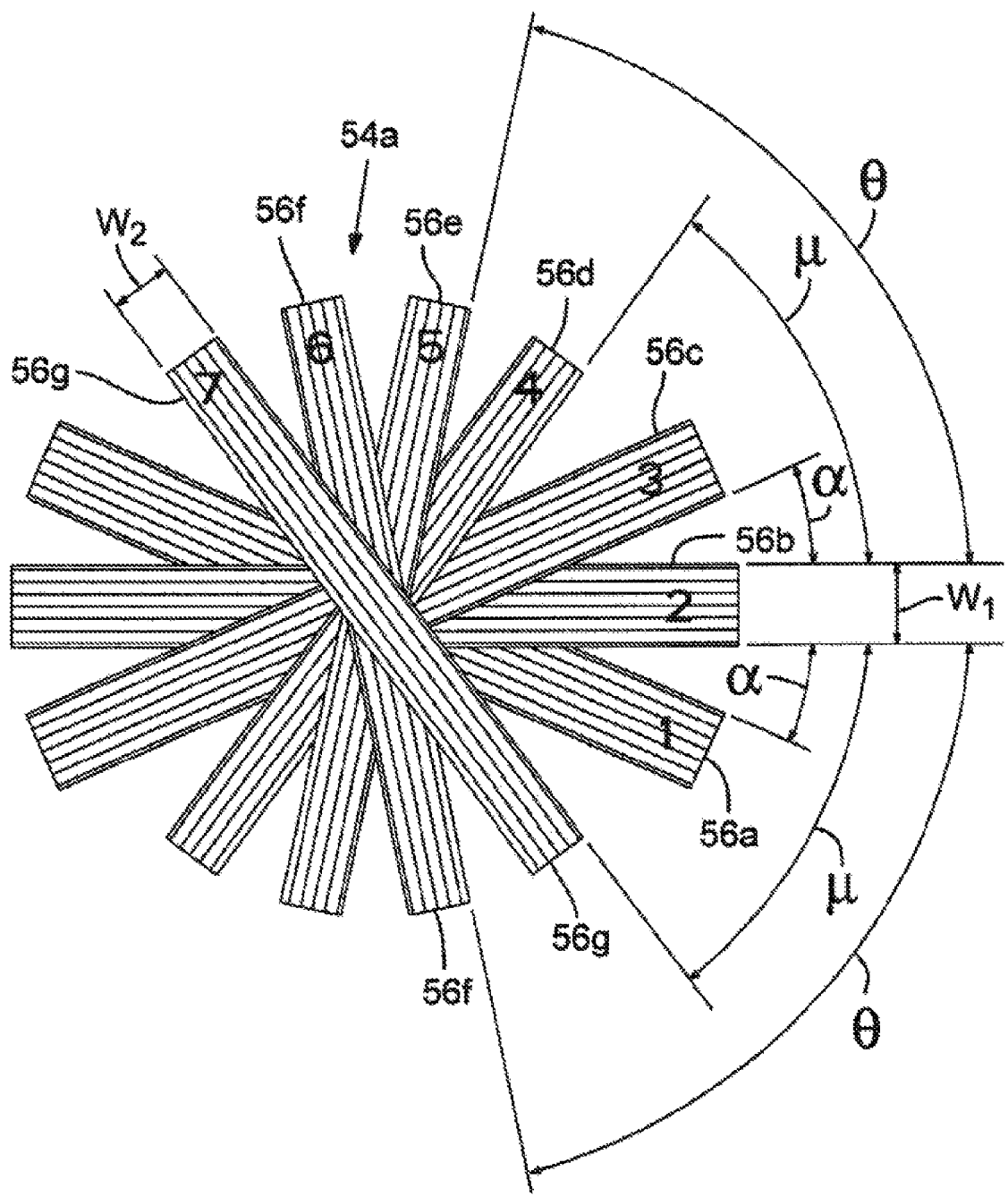

FIG. 85 is an enlarged plan view of the first cluster 54 *a* of elongated prepreg strips which are arranged with respect to each other so that the cluster has a variable thickness. The cluster 54 *a* in the illustrated example includes a first strip 56 *a*, a second strip 56 *b*, a third strip 56 *c*, a fourth strip 56 *d*, a fifth strip 56 *e*, a sixth strip 56 *f*, and a seventh strip 56 *g*. The strips are stacked in a criss-cross pattern such that the strips overlap each other to define an overlapping region 60 and the ends of each strip are angularly spaced from adjacent ends of another strip. The cluster 54 *a* is therefore thicker at the overlapping region 60 than it is at the ends of the strips. The strips can have the same or different lengths and widths, which can be varied depending on the desired overall shape of the composite part 40, although each strip desirably is long enough to extend continuously across the finished part 40 that is cut or otherwise machined from the oversized lay-up. In one embodiment the cluster has at least 3 strips, and in further embodiments at least 4, 5, 6, or 7. In a further embodiment the cluster has not more than 20 strips, and in further embodiments no more than 18, 16, 14, 12, or 12.

The strips 56 *a*-56 *g* in the illustrated embodiment are of equal length and are arranged such that the geometric center point 62 of the cluster corresponds to the center of each strip.

The first three strips 56 a-56 c in this example have a width w1 that is greater than the width w2 of the last four strips 56 d-56 g. The strips define an angle α between the "horizontal" edges of the second strip 56 b and the adjacent edges of strips 56 a and 56 c, an angle μ between the edges of strip 56 b and the closest edges of strips 56 d and 56 g, and an angle θ between the edges of strip 56 b and the closest edges of strips 56 e and 56 f.

In a working embodiment, the width w1 is about 10-30 mm, the width w2 is about 10-30 mm, the angle α is about 10-30 degrees, the angle μ is about 25-60 degrees, and the angle θ is about 70-88 degrees.

Figure 86A:
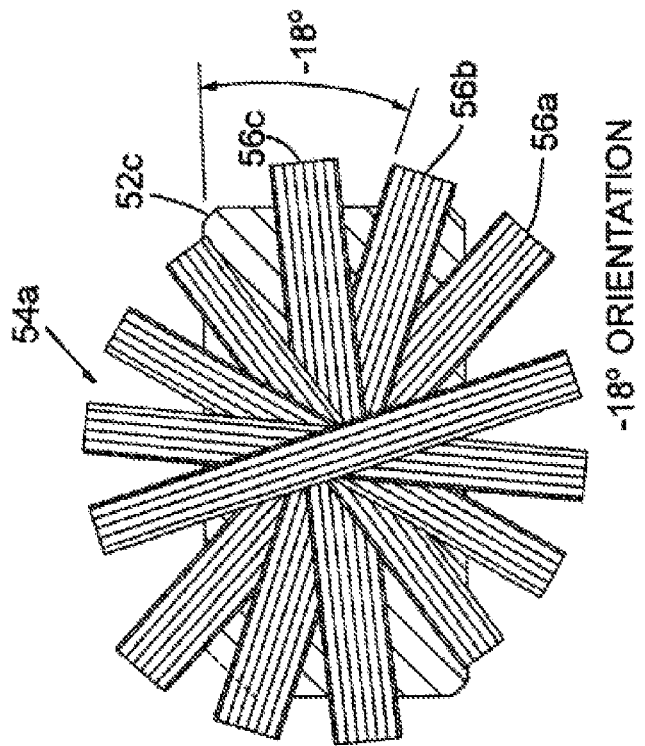
Figure 86B:
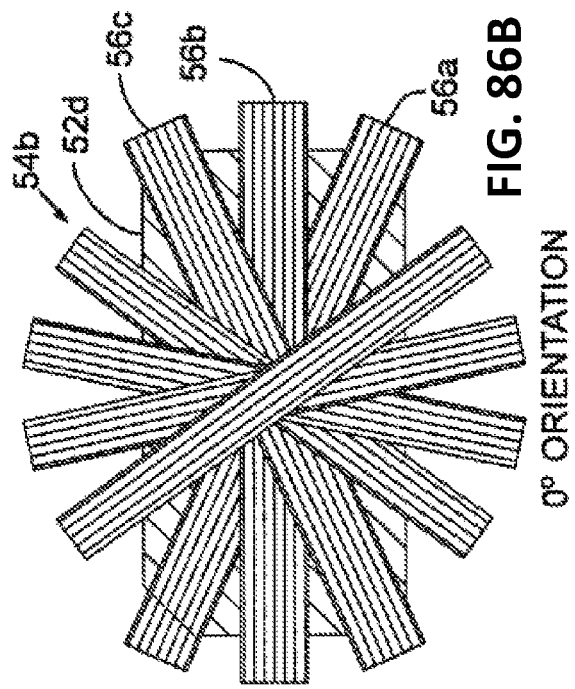
Figure 86C:
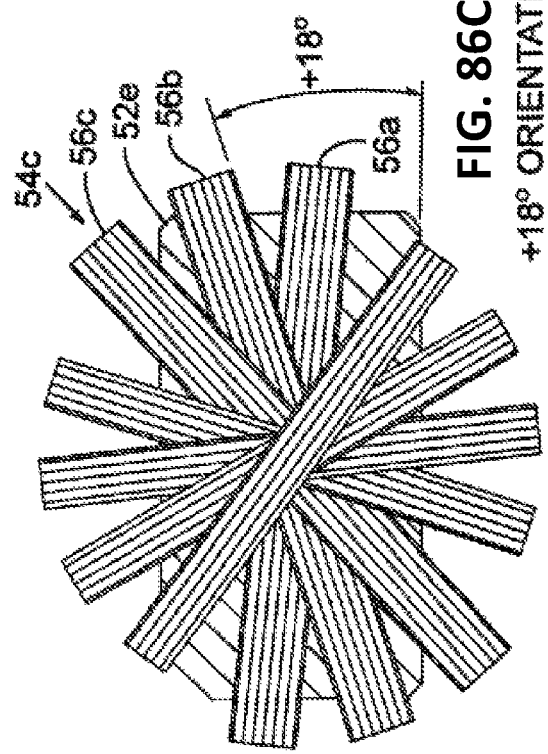
Figure 87:
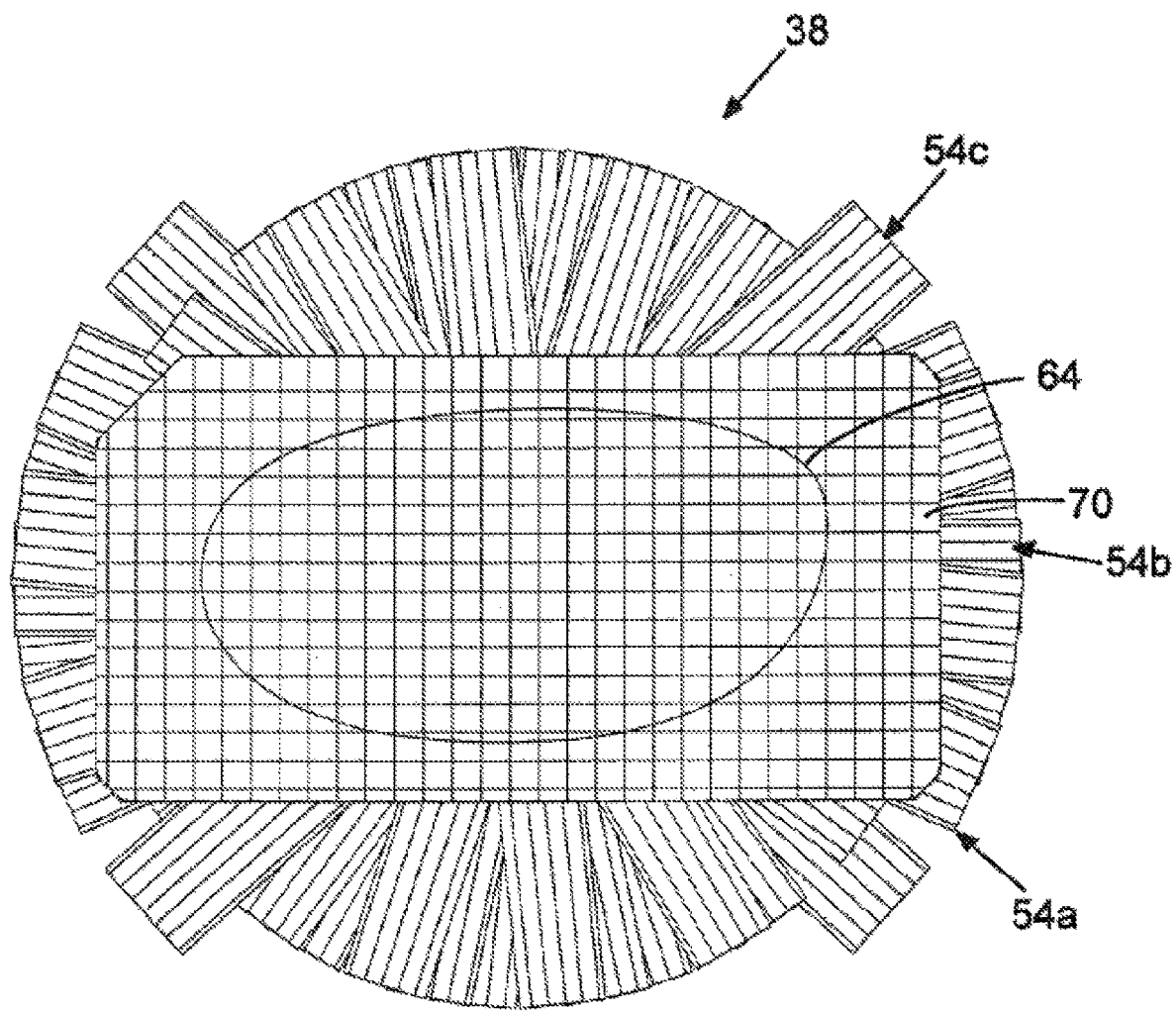

Referring again to FIG. 83, each cluster 54 a-54 g desirably is rotated slightly or angularly offset with respect to an adjacent cluster so that the end portions of each strip in a cluster are not aligned with the end portions of the strips of an adjacent cluster. In this manner, the clusters can be arranged relative to each other in the lay-up to provide a substantially uniform thickness in the peripheral region 48 of the composite part. In the illustrated embodiment, for example, the first cluster 54 a has an orientation of −18 degrees, meaning that the "upper" edge of the second strip 56 b extends at a −18 degree angle with respect to the "upper" horizontal edge of the adjacent unit-group 52 c (as best shown in FIG. 86A). The next successive cluster 54 b has an orientation of 0 degrees, meaning that the second strip 56 b is parallel to the "upper" horizontal edge of the adjacent unit-group 52 d (as best shown in FIG. 86B). The next successive cluster 54 c has an orientation of +18 degrees, meaning that the "lower" edge of the respective second strip 56 b of cluster 54 c extends at a +18 degree angle with respect to the "lower" edge of the adjacent unit-group 52 e (as shown in FIG. 86C). Clusters 54 d, 54 e, 54 f, and 54 g (FIG. 83) can have an orientation of 0 degrees, −18 degrees, 0 degrees, and +18 degrees, respectively. In a further embodiment a first cluster has an orientation of positive 5-10 degrees, a second at negative 5-10 degrees, a third at positive 11-20 degrees, and a fourth at negative 11-20 degrees. In another embodiment adjacent clusters are angularly offset from one another by at least 5 degrees, and in further embodiments at least 7.5 or 10 degrees; while in a further embodiment they are angularly offset from one another by no more than 20 degrees, and in further embodiments no more than 18 degrees, 16 degrees, or 14 degrees.

One embodiment has at least one cluster having two strips oriented perpendicular to one another, and at least two diagonal strips oriented such that an angle between the diagonal strip and the nearest perpendicular strip, namely the angle α in FIG. 85, is no more than 44 degrees, and in further embodiments no more than 42.5 degrees, 40 degrees, or 37.5 degrees. In a further embodiment the angle between the diagonal strip and the nearest perpendicular strip is at least 20 degrees, and in further embodiments at least 22.5 degrees, 25 degrees, 27.5 degrees, 30 degrees, or 32.5 degrees. In one specific embodiment the angle between the diagonal strip and the nearest perpendicular strip is approximately 35 degrees.

When stacked in the lay-up, the overlapping regions 60 of the clusters are aligned in the direction of the thickness of the lay-up to increase the thickness of the central region 46 of the part, while the "spokes" (the strips 56 a-56 g) are "fanned" or angularly spaced from each other within each cluster and with respect to spokes in adjacent clusters. Prior to curing/molding, the lay-up has a cross-sectional profile that is similar to the finished part except that the lay-up is flat, that is, the lay-up does not have an overall convex shape. Thus, in profile, the rear surface of the lay-up has a central region of increased thickness and gradually tapers to a relatively thinner peripheral region of substantially uniform thickness surrounding the central region. In a working embodiment, the lay-up has a thickness of about 3-8 mm at the center of the central region and a thickness of about 1-5 mm at the peripheral region. A greater or fewer number of panels and/or clusters of strips can be used to vary the thickness at the central region and/or peripheral region of the lay-up.

To form the lay-up, according to one specific approach, formation of the panels 52 a-52 k may be done first by stacking individual precut, prepreg plies 58 a-58 d of each panel. After the panels are formed, the lay-up is built up by laying the second panel 52 b on top of the first panel 52 a, and then forming the first cluster 54 a on top of the second panel 52 b by laying individual strips 56 a-56 g in the prescribed manner. The remaining panels 52 c-52 k and clusters 54 b-54 g are then added to the lay-up in the sequence shown in FIG. 83, followed by the single ply 72. The fiberglass plies 70, 74 can then be added to the front and back of the lay-up.

The fully-formed lay-up can then be subjected to a "debulking" or compaction step (e.g., using a vacuum table) to remove and/or reduce air trapped between plies. The lay-up can then be cured in a mold that is shaped to provide the desired bulge and roll of the face plate. An exemplary curing process is described in detail below. Alternatively, any desired bulge and roll of the face plate may be formed during one or more debulking or compaction steps performed prior to curing. To form the bulge or roll, the debulking step can be performed against a die panel having the final desired bulge and roll. In either case, following curing, the cured lay-up is removed from the mold and machined to form the part 40.

The following aspects desirably are controlled to provide composite components that are capable of withstanding impacts and fatigue loadings normally encountered by a club-head, especially by the face plate of the club-head. These three aspects are: (a) adequate resin content; (b) fiber straightness; and (c) very low porosity in the finished composite. These aspects can be controlled by controlling the flow of resin during curing, particularly in a manner that minimizes entrapment of air in and between the prepreg layers. Air entrapment is difficult to avoid during laying up of prepreg layers. However, air entrapment can be substantially minimized by, according to various embodiments disclosed herein, imparting a slow, steady flow of resin for a defined length of time during the laying-up to purge away at least most of the air that otherwise would become occluded in the lay-up. The resin flow should be sufficiently slow and steady to retain an adequate amount of resin in each layer for adequate inter-layer bonding while preserving the respective orientations of the fibers (at different respective angles) in the layers. Slow and steady resin flow also allows the fibers in each ply to remain straight at their respective orientations, thereby preventing the "wavy fiber" phenomenon. Generally, a wavy fiber has an orientation that varies significantly from its naturally projected direction.

As noted above, the prepreg strips 56 desirably are of sufficient length such that the fibers in the strips extend continuously across the part; that is, the ends of each fiber are located at respective locations on the outer peripheral edge 49 of the part. Similarly, the fibers in the prepreg panels 52 a-52 k desirably extend continuously across the part between respective locations on the outer peripheral edge 49 of the part. During curing, air bubbles tend to flow along the length of the fibers toward the outer peripheral (sacrificial)

portion of the lay-up. By making the strips sufficiently long and the panels larger than the final dimensions of the part, the curing process can be controlled to remove substantially all of the entrapped air bubbles from the portion of the lay-up that forms the part. The peripheral portion of the lay-up is also where wavy fibers are likely to be formed. Following curing, the peripheral portion of the lay-up is removed to provide a net-shape part (or near net-shape part if further finishing steps are performed) that has a very low porosity as well as straight fibers in each layer of prepreg material.

In working examples, parts have been made without any voids, or entrapped air, and with a single void in one of the prepreg plies of the lay-up (either a strip or a panel-size ply). Parts in which there is a single void having its largest dimension equal to the thickness of a ply (about 0.1 mm) have a void content, or porosity, of about $1.7 \times 10^{-6}$ percent or less by volume.

In one embodiment the material that is removed in FIG. 62 is then chopped up and recycled to be formed into another portion of the golf club head, such as a portion of the crown and/or sole.

In addition to the various features and methods described herein, any of the methods and/or golf club heads disclosed herein may also incorporate additional features, which can include any of the following features:
1. movable weight features including those described in more detail in U.S. Pat. Nos. 6,773,360, 7,166,040, 7,452,285, 7,628,707, 7,186,190, 7,591,738, 7,963,861, 7,621,823, 7,448,963, 7,568,985, 7,578,753, 7,717,804, 7,717,805, 7,530,904, 7,540,811, 7,407,447, 7,632,194, 7,846,041, 7,419,441, 7,713,142, 7,744,484, 7,223,180, 7,410,425 and 7,410,426, the entire contents of each of which are incorporated by reference in their entirety herein;
2. slidable weight features including those described in more detail in U.S. Pat. Nos. 7,775,905 and 8,444,505, U.S. patent application Ser. No. 13/898,313 filed on May 20, 2013, U.S. patent application Ser. No. 14/047,880 filed on Oct. 7, 2013, the entire contents of each of which are hereby incorporated by reference herein in their entirety;
3. aerodynamic shape features including those described in more detail in U.S. Patent Publication No. 2013/0123040A1, the entire contents of which are incorporated by reference herein in their entirety;
4. removable shaft features including those described in more detail in U.S. Pat. No. 8,303,431, the contents of which are incorporated by reference herein in in their entirety;
5. adjustable loft/lie features including those described in more detail in U.S. Pat. Nos. 8,025,587, 8,235,831, 8,337,319, U.S. Patent Publication No. 2011/0312437A1, U.S. Patent Publication No. 2012/0258818A1, U.S. Patent Publication No. 2012/0122601A1, U.S. Patent Publication No. 2012/0071264A1, U.S. patent application Ser. No. 13/686,677, the entire contents of which are incorporated by reference herein in their entirety; and
6. adjustable sole features including those described in more detail in U.S. Pat. No. 8,337,319, U.S. Patent Publication Nos. US2011/0152000A1, US2011/0312437, US2012/0122601A1, and U.S. patent application Ser. No. 13/686,677, the entire contents of each of which are incorporated by reference herein in their entirety.

The technology described herein may also be combined with other features and technologies for golf clubs, such as:
1. variable thickness face features described in more detail in U.S. patent application Ser. No. 12/006,060, U.S. Pat. Nos. 6,997,820, 6,800,038, and 6,824,475, which are incorporated herein by reference in their entirety;
2. composite face plate features described in more detail in U.S. patent application Ser. Nos. 11/998,435, 11/642,310, 11/825,138, 11/823,638, 12/004,386, 12/004,387, 11/960,609, 11/960,610 and U.S. Pat. No. 7,267,620, which are herein incorporated by reference in their entirety.

Additionally, in addition to the various methods and technologies described herein, any of the methods, technologies, and/or golf club heads disclosed herein may also incorporate additional features and methods, which can include any of the features and methods disclosed in U.S. patent application Ser. Nos. 18/082,735, 18/082,271, 63/292,708, 17/547,519, 17/360,179, 17/560,054, 17/124,134, 17/531,979, 17/722,748, 17/505,511, 17/560,054, 17/389,167, 17/006,561, 17/137,151, 16/806,254, 17/321,315, 17/696,664, 17/565,580, 17/727,963, 16/288,499, 17/530,331, 17/586,960, 17/884,027, 13/842,011, 16/817,311, 17/355,642, 17/722,748, 17/132,645, 17/696,664, 17/884,027, 17/390,615, 17/586,960, 17/691,649, 17/224,026, 17/560,054, 17/164,033, 17/107,474, 17/526,981, 16/352,537, 17/156,205, 17/132,541, 17/565,580, 17/360,179, 17/355,642, 17/727,963, 17/824,727, 17/722,632, 17/712,041, 17/696,664, 17/695,194, 17/691,649, 17/686,181, 63/305,777, 17/577,943, 17/570,613, 17/569,810, 17/566,833, 17/565,580, 17/566,131, 17/566,263, 17/564,077, 17/560,054, 63/292,708, 17/557,759, 17/558,387, 17/645,033, 17/547,519, 17/541,107, 17/530,331, 17/526,981, 17/526,855, 17/524,056, 17/522,560, 17/515,112, 17/513,716, 17/505,511, 17/504,335, 17/504,327, 17/494,416, 17/493,604, 63/261,457, 17/479,785, 17/476,839, 17/477,258, 17/476,025, 17/467,709, 17/403,516, 17/399,823, 17/390,615, 63/227,889, 17/389,167, 17/387,181, 17/378,407, 17/368,520, 17/360,179, 17/355,642, 17/330,033, 17/235,533, 17/233,201, 17/228,511, 17/224,026, 17/216,185, 17/198,030, 17/191,617, 17/190,864, 17/183,905, 17/183,057, 17/181,923, 17/171,678, 17/171,656, 17/164,033, 17/156,205, 17/564,077, 17/124,134, 17/107,447, 17/881,339, 63/292,708, 11/642,310, 11/825,138, 11/998,436, 11/895,195, 11/823,638, 12/004,386, 12/004,387, 11/960,609, 11/960,610, 12/156,947, 17/696,664, 15/857,407, 11/825,138, 15/857,407, 13/452,370, 17/360,179, 17/560,054, 17/722,748, 17/181,923, 17/530,331, 17/586,960, 17/183,057, 17/522,560, 12/005,875, 14/694,998, 12/354,684, 17/235,533, 17/504,335, 17/107,490, 17/198,030, 17/569,810, 17/171,678, 17/107,447, 17/824,727, 17/467,709, 17/513,716, 17/570,613, 17/127,835, 17/515,112, 17/479,785, 17/878,661, 17/355,642, 16/658,365, 16/817,311, 16/866,927, 12/645,328, 12/646,688, 14/630,465, 14/210,000, 14/210,190, 13/329,094, 13/308,114, 13/744,291, 13/719,042, 13/787,519, 13/802,135, 13/802,459, 13/626,705, 13/719,060, 13/786,257, 12/980,552, 14/210,206, 14/214,197, 14/457,883, 17/064,528, 62/020,972, 62/065,552, 62/141,160, 14/789,838, 16/102,627, 17/504,327, 15/170,846, 14/632,947, 14/855,190, 15/689,759, 16/415,778, 17/233,201, 14/579,805, 62/098,707, 14/803,735, 62/046,013, 14/967,133, 62/093,901, 14/975,117, 15/699,895, 16/822,632, 17/541,107, 62/096,605, 62/130,378, 62/183,056, 16/053,492, 62/141,103, 14/812,737, 15/087,002, 15/282,871, 15/254,999, 16/058,845, 16/874,428, 17/494,416, 15/648,377, 62/205,601, 15/098,239, 62/147,496, 15/175,961, 16/687,266, 62/172, 707, 15/203,617, 62/190,652, 14/727,331, 15/606,418, 62/168,225, 15/197,551, 16/517,172, 17/524,056, 16/171,237, 16/186,044, 62/185,882, 15/197,658, 16/046,106, 62/894,523, 17/006,561, 15/199,603, 16/160,884, 16/750,599, 17/105,234, 17/476,025, 15/811,430, 16/034,307, 16/035,929, 16/036,696, 16/037,947, 16/038,005, 16/161,337, 17/132,645, 62/955,727, 16/582,632, 17/100,273, 62/543,778, 16/059,801, 15/370,530, 16/673,060, 17/164,033, 15/394,549, 15/706,632, 16/800,811, 17/156,313, 16/720,678, 17/106,575, 15/396,078, 16/934,613, 17/477,258, 15/860,534, 17/100,438, 17/145,024, 17/145,024, 17/722,632, 15/255,638, 15/259,026, 16/147,026, 17/077,597, 17/722,748, 15/996,854, 16/283,527, 17/105,168, 62/515,401, 62/628,094, 15/857,407, 16/167,078, 16/223,108, 16/883,832, 17/577,943, 16/056,323, 16/116,328, 15/859,297, 16/042,902, 16/875,802, 17/387,181, 17/112,761, 16/434,162, 16/160,974, 16/727,619, 17/191,617, 62/687,143, 62/755,319, 16/660,561, 17/696,664, 16/189,515, 17/557,759, 16/870,714, 17/856,533, 16/565,283, 16/795,126, 17/216,185, 62/882,237, 16/525,284, 17/110,112, 16/554,420, 16/990,666, 17/403,516, 17/011,678, 62/897,148, 17/087,596, 63/066,033, 17/399,823, 62/965,129, 62/954,211, 17/330,033, 63/067,802, 17/124,134, 17/137,151, 17/228,511, 17/224,026, 17/691,649, 17/368,520, 17/171,656, 17/712,041, 63/131,661, 17/390,615, 17/135,666, 17/864,171, 17/190,864, 17/547,519, 17/389,167, 17/505,511, 17/560,054, 63/227,889, 17/566,131, 17/566,263, 63/261,457, 17/558,387, 17/564,077, 09/878,634, 10/621,641, 10/941,474, 14/587,573, 15/293,323, 15/263,929, 16/258,848, 17/143,527, 17/566,833, 17/727,963, 16/282,386, 17/463,801, 17/668,902, 17/695,194, 61/077,802, 63/305,777, 63/433380, and 63/338,818, all of which are herein incorporated by reference in their entirety.

Further, in addition to the various methods and technologies described herein, any of the methods, technologies, and/or golf club heads disclosed herein may also incorporate additional features and methods, which can include any of the features and methods disclosed in U.S. Pat. Nos. 11,213,726, 8,777,776, 7,278,928, 7,445,561, 9,409,066, 8,303,435, 7,874,937, 8,628,434, 8,608,591, 8,740,719, 8,777,776, 9,694,253, 9,683,301, 9,468,816, 8,777,776, 8,262,509, 7,901,299, 8,119,714, 8,764,586, 8,227,545, 8,066,581, 9,409,066, 10,052,530, 10,195,497, 10,086,240, 9,914,027, 9,174,099, 8,771,095, 10,391,369, 7,267,620, 7,140,974, 11,219,803, 6,623,378, 8,608,591, 9,868,036, 7,513,296, 9,731,176, 10,016,662, 6,773,360, 7,166,040, 7,452,285, 7,628,707, 7,186,190, 7,591,738, 7,963,861, 7,621,823, 7,448,963, 7,568,985, 7,578,753, 7,717,804, 7,717,805, 7,530,904, 7,540,811, 7,407,447, 7,632,194, 7,846,041, 7,419,441, 7,713,142, 7,744,484, 7,223,180, 7,410,425, 7,410,426, 9,814,944, 10,265,586, 10,543,405, 7,874,938, 8,163,119, 10,046,212, 8,979,669, 10,195,497, 10,646,755, 10,232,233, 8,506,425, 8,814,721, 10,729,951, 7,628,707, 8,888,609, 8,801,541, 10,835,790, 7,731,604, 7,758,447, 9,440,121, 8,491,411, 8,202,462, 8,680,204, 9,220,956, 8,575,278, 11,167,178, 8,801,539, 8,303,435, 7,874,937, 8,858,364, 9,174,099, 8,0610,11, 8,632,423, 8,674,023, 8,481,621, 8,758,155, 8,608,591, 9,265,995, 8,727,900, 10,874,928, 8,399,566, 8,932,150, 8,740,719, 9,278,267, 8,535,176, 9,375,619, 8,629,228, 9,033,821, 9,694,253, 9,409,362, 9,155,936, 9,089,745, 8,979,677, 9,511,524, 8,840,388, 11,235,207, 8,480,511, 9,155,945, 9,108,082, 9,683,301, 11,364,420, 10,350,714, 9,731,465, 9,220,949, 8,864,598, 9,550,098, 9,682,297, 9,216,331, 11,478,683, 10,500,766, 10,675,516, and EP1923420, all of which are herein incorporated by reference in their entirety.

Many variations and modifications may be made to the above-described embodiment(s) without departing substantially from the spirit and principles of the present disclosure. Further, the scope of the present disclosure includes any and all combinations and sub-combinations of all elements, features, and aspects disclosed herein and in the documents that are incorporated by reference. All such combinations, modifications, and variations are included herein within the scope of the present disclosure, and all possible claims to individual aspects or combinations of elements or steps are intended to be supported by the present disclosure.

The disclosure contains a delicate interplay of relationships of the various components and process variables, variables within each component as well, as relationships across the components and process variables, which impact the performance, sound, feel, durability, and manufacturability of the golf club head and its individual components. The disclosed relationships are more than mere optimization, maximization, or minimization of a single characteristic or variable, and are often contrary to conventional design thinking, yet have been found to achieve a unique balance of the trade-offs associated with competing criteria such as durability, acoustics, vibration, fatigue resistance, strength, stiffness, torsional and flexural rigidity, weight, and ease of manufacture. The relationships disclosed do more than maximize or minimize a single characteristic such as characteristic time (CT), coefficient of restitution (COR) at a single point such as face center or offset/distributed COR, strength, rigidity, stiffness, fatigue resistance, moments of inertia, deflection of a single component, rigidity of a single component, ductility of a single component, stiffness of the overall club head, deflection of a single component, frequency of a single components, damping, and/or changes in mode frequencies of the individual components, rather, the relationships achieve a unique balance among these characteristics, which are often conflicting, to produce a club head that has improved feel, sound, durability, and/or performance. After all, the interaction of the numerous components and process parameters of the components of the present golf club head, particularly when they have such varied material properties, has the potential to adversely impact the sound and feel of the golf club head, as well as its durability, manufacturability, and overall performance. The aforementioned balance requires trade-offs among the competing characteristics recognizing key points of diminishing returns. Further, it is important to recognize that all the associated disclosure and relationships apply equally to all embodiments and should not be interpreted as being limited to the particular embodiment being discussed when a relationship is mentioned. The aforementioned balances require trade-offs among the competing characteristics recognizing key points of diminishing returns, as often disclosed with respect to open and closed ranges for particular variables and relationships. Proper functioning of each component, and the overall club head, on each and every shot, over thousands of impacts during the life of a golf club, is critical. Therefore, this disclosure contains unique combinations of components and relationships that achieve these goals. While the relationships of the various features and dimensions of a single component play an essential role in achieving the goals, the relationships of features and/or characteristics across multiple components are just as critical, if not more critical, to achieving the goals. Further, the relative length, width, thickness, layout, intersection locations, geometry, and material properties of various components, and their relationships to one another and the other design variables disclosed herein, influence the performance, durability, feel, sound, safety, and ease of manufacture. Additionally, many embodiments have identified upper and/or lower limits ranges of relationships when extension outside the range the performance may suffer and adversely impact the goals. While some relationships may appear unrelated, adoption of non-metallic faces has been avoided in the past due to issues with durability, sound, and performance, despite advantages regarding weight savings allowing for more discretionary mass to be moved to more desirable locations within, or on, the club head to achieve the disclosed mass properties, as well as those in any of the references incorporated by reference.

The following paragraphs include a number of examples of the subject matter of the present disclosure.

Example 1. A method of creating a multi-layer composite strike face of a golf club head, the method comprising:
  positioning a first non-cluster panel having a first panel perimeter, a first panel width, a first panel length, a first panel thickness, a first panel longitudinal axis, and a first panel transverse axis;
  creating and attaching a cluster panel to the first non-cluster panel, wherein creating and attaching the cluster panel to the first non-cluster panel comprises:
  attaching a first elongated strip to the first non-cluster panel at a first strip angle relative to the first panel longitudinal axis, wherein the first elongated strip has a first strip width, a first strip length, a first strip thickness, and a first strip longitudinal axis; attaching a second elongated strip to a portion of the first elongated strip and a portion of the first non-cluster panel at a second strip angle relative to the first panel longitudinal axis, wherein the second elongated strip has a second strip width, a second strip length, a second strip thickness, and a second strip longitudinal axis; and attaching a third elongated strip to a portion of the second elongated strip, and a portion of the first non-cluster panel at a third strip angle relative to the first panel longitudinal axis, wherein the third elongated strip has a third strip width, a third strip length, a third strip thickness, and a third strip longitudinal axis; and
  positioning and attaching a second non-cluster panel to a portion of the third elongated strip, a portion of the second elongated strip, a portion of the first elongated strip, and a portion of the first non-cluster panel, wherein the second non-cluster panel has a second panel perimeter, a second panel width, a second panel length, a second panel thickness, a second panel longitudinal axis, and a second panel transverse axis.

Example 2. The method of example 1, wherein the steps of attaching the first elongated strip, the second elongated strip, and the third elongated strip are performed by a first strip dispenser.

Example 3. The method of example 2, wherein the first strip dispenser is operatively connected to a first roll of elongated strip material and incorporates a first applicator.

Example 4. The method of example 3, wherein the first strip dispenser and the first non-cluster panel are moved relative to each other so that the first elongated strip is attached to the first non-cluster panel at an attachment rate of at least 25% of a width of the first elongated strip per second.

Example 5. The method of example 4, wherein the attachment rate is at least 50% of the width of the first elongated strip per second.

Example 6. The method of example 5, wherein the attachment rate is at least 75% of the width of the first elongated strip per second.

Example 7. The method of example 6, wherein the attachment rate is at least 100% of the width of the first elongated strip per second.

Example 8. The method of example 4, wherein the attachment rate is no more than 700% of the width of the first elongated strip per second.

Example 9. The method of example 8, wherein the attachment rate is no more than 600% of the width of the first elongated strip per second.

Example 10. The method of example 9, wherein the attachment rate is no more than 500% of the width of the first elongated strip per second.

Example 11. The method of example 10, wherein the attachment rate is no more than 400% of the width of the first elongated strip per second.

Example 12. The method of example 11, wherein the attachment rate is no more than 300% of the width of the first elongated strip per second.

Example 13. The method of example 12, wherein the attachment rate is no more than 200% of the width of the first elongated strip per second.

Example 14. The method of example 3, wherein the first strip dispenser and the first non-cluster panel are moved relative to each other so that the first elongated strip is attached to the first non-cluster panel at an attachment rate of at least 10% of a width of the first non-cluster panel per second.

Example 15. The method of example 14, wherein the attachment rate is at least 20% of the width of the first non-cluster panel per second.

Example 16. The method of example 15, wherein the attachment rate is at least 30% of the width of the first non-cluster panel per second.

Example 17. The method of example 16, wherein the attachment rate is at least 40% of the width of the first non-cluster panel per second.

Example 18. The method of example 14, wherein the attachment rate is no more than 500% of the width of the first non-cluster panel per second.

Example 19. The method of example 18, wherein the attachment rate is no more than 400% of the width of the first non-cluster panel per second.

Example 20. The method of example 19, wherein the attachment rate is no more than 300% of the width of the first non-cluster panel per second.

Example 21. The method of example 20, wherein the attachment rate is no more than 200% of the width of the first non-cluster panel per second.

Example 22. The method of example 20, wherein the attachment rate is no more than 100% of the width of the first non-cluster panel per second.

Example 23. The method of example 4 or 14, wherein the attachment rate is at least 6.3 mm per second.

Example 24. The method of example 23, wherein the attachment rate is no more than 150 mm per second.

Example 25. The method of example 23, wherein the attachment rate is 9-130 mm per second.

Example 26. The method of example 25, wherein the attachment rate is 12-100 mm per second.

Example 27. The method of example 26, wherein the attachment rate is 15-85 mm per second.

Example 28. The method of example 26, wherein the attachment rate is 18-75 mm per second.

Example 29. The method of example 4, 14, or 23, wherein the step of attaching the first elongated strip includes applying a first pressure to the first elongated strip for a first pressure period as it is attached to the first non-cluster panel, wherein the first pressure is at least 1700 pascal (0.2465 psig).

Example 30. The method of example 29, wherein the first pressure period is less than 5 seconds.

Example 31. The method of example 30, wherein the first pressure is at least 3400 pascal.

Example 32. The method of example 31, wherein the first pressure period is less than 2.5 seconds.

Example 33. The method of example 32, wherein the first pressure is at least 5100 pascal.

Example 34. The method of example 33, wherein the first pressure period is less than 1 second.

Example 35. The method of example 34, wherein the first pressure is at least 6800 pascal.

Example 36. The method of example 29, wherein the first pressure is less than 140,000 pascal.

Example 37. The method of example 36, wherein the first pressure is less than 120,000 pascal.

Example 38. The method of example 37, wherein the first pressure is less than 100,000 pascal.

Example 39. The method of example 38, wherein the first pressure is less than 80,000 pascal.

Example 40. The method of example 39, wherein the first pressure is less than 60,000 pascal.

Example 41. The method of example 40, wherein the first pressure is less than 40,000 pascal.

Example 42. The method of example 41, wherein the first pressure is less than 20,000 pascal.

Example 43. The method of example 29, wherein the first pressure period is at least 0.05 seconds.

Example 44. The method of example 43, wherein the first pressure period is at least 0.10 seconds.

Example 45. The method of example 44, wherein the first pressure period is at least 0.15 seconds.

Example 46. The method of example 44, wherein the first pressure period is at least 0.20 seconds.

Example 47. The method of example 29, wherein the step of attaching the second elongated strip includes applying a second pressure to the second elongated strip for a second pressure period as it is attached to the first non-cluster panel and the first elongated strip, wherein the second pressure is at least 1700 pascal.

Example 48. The method of example 47, wherein the second pressure period is less than 5 seconds.

Example 49. The method of example 48, wherein the second pressure is at least 3400 pascal.

Example 50. The method of example 49, wherein the second pressure period is less than 2.5 seconds.

Example 51. The method of example 50, wherein the second pressure is at least 5100 pascal.

Example 52. The method of example 51, wherein the second pressure period is less than 1 second.

Example 53. The method of example 52, wherein the second pressure is at least 6800 pascal.

Example 54. The method of example 47, wherein the second pressure is less than 140,000 pascal.

Example 55. The method of example 54, wherein the second pressure is less than 120,000 pascal.

Example 56. The method of example 55, wherein the second pressure is less than 100,000 pascal.

Example 57. The method of example 56, wherein the second pressure is less than 80,000 pascal.

Example 58. The method of example 57, wherein the second pressure is less than 60,000 pascal.

Example 59. The method of example 58, wherein the second pressure is less than 40,000 pascal.

Example 60. The method of example 59, wherein the second pressure is less than 20,000 pascal.

Example 61. The method of example 47, wherein the second pressure period is at least 0.05 seconds.

Example 62. The method of example 61, wherein the second pressure period is at least 0.10 seconds.

Example 63. The method of example 62, wherein the second pressure period is at least 0.15 seconds.

Example 64. The method of example 63, wherein the second pressure period is at least 0.20 seconds.

Example 65. The method of example 47, wherein the step of attaching the third elongated strip includes applying a third pressure to the third elongated strip for a third pressure period as it is attached to the first non-cluster panel and the second elongated strip, wherein the third pressure is at least 1700 pascal.

Example 66. The method of example 65, wherein the third pressure period is less than 5 seconds.

Example 67. The method of example 66, wherein the third pressure is at least 3400 pascal.

Example 68. The method of example 67, wherein the third pressure period is less than 2.5 seconds.

Example 69. The method of example 68, wherein the third pressure is at least 5100 pascal.

Example 70. The method of example 69, wherein the third pressure period is less than 1 third.

Example 71. The method of example 70, wherein the third pressure is at least 6800 pascal.

Example 72. The method of example 65, wherein the third pressure is less than 140,000 pascal.

Example 73. The method of example 72, wherein the third pressure is less than 120,000 pascal.

Example 74. The method of example 73, wherein the third pressure is less than 100,000 pascal.

Example 75. The method of example 74, wherein the third pressure is less than 80,000 pascal.

Example 76. The method of example 75, wherein the third pressure is less than 60,000 pascal.

Example 77. The method of example 76, wherein the third pressure is less than 40,000 pascal.

Example 78. The method of example 77, wherein the third pressure is less than 20,000 pascal.

Example 79. The method of example 65, wherein the third pressure period is at least 0.05 seconds.

Example 80. The method of example 79, wherein the third pressure period is at least 0.10 seconds.

Example 81. The method of example 80, wherein the third pressure period is at least 0.15 seconds.

Example 82. The method of example 81, wherein the third pressure period is at least 0.20 seconds.

Example 83. The method of example 65, wherein the first pressure is different than at least one of the second pressure and the third pressure.

Example 84. The method of example 65, wherein the first pressure period is different than at least one of the second pressure period and the third pressure period.

Example 85. The method of example 65, wherein at least one of the first pressure, the second pressure, and the third pressure, varies as the associated first elongated strip, second elongated strip, and third elongated strip are attached, from a lowest pressure to a highest pressure.

Example 86. The method of example 85, wherein the highest pressure is at least 5% greater than the lowest pressure.

Example 87. The method of example 86, wherein the highest pressure is at least 10% greater than the lowest pressure.

Example 88. The method of example 87, wherein the highest pressure is at least 15% greater or 20% greater than the lowest pressure.

Example 89. The method of example 85, wherein the highest pressure is no more than 100% greater than the lowest pressure.

Example 90. The method of example 89, wherein the highest pressure is no more than 85% greater than the lowest pressure.

Example 91. The method of example 90, wherein the highest pressure is no more than 70% greater than the lowest pressure.

Example 92. The method of example 91, wherein the highest pressure is no more than 55% greater than the lowest pressure.

Example 93. The method of any one of examples 4, 14, 23, or 29, wherein the first strip length is not equal to at least one of the second strip length and the third strip length.

Example 94. The method of example 93, wherein the first strip length is not equal to the second strip length and the first strip length is not equal to the third strip length.

Example 95. The method of example 93, wherein the first elongated strip extends from a first point on the first panel perimeter to a second point on the first panel perimeter.

Example 96. The method of example 95, wherein the second elongated strip extends from a third point on the first panel perimeter to a fourth point on the first panel perimeter.

Example 97. The method of example 96, wherein the third elongated strip extends from a fifth point on the first panel perimeter to a sixth point on the first panel perimeter.

Example 98. The method of example 95, wherein the first strip length is 125%-300% of at least one of the second strip length and the third strip length.

Example 99. The method of example 98, wherein the first strip length is 150%-275% of at least one of the second strip length and the third strip length.

Example 100. The method of example 99, wherein the first strip length is 175%-225% of at least one of the second strip length and the third strip length.

Example 101. The method of any one of examples 4, 14, 23, 29, or 93, wherein the first strip width is not equal to at least one of the second strip width and the third strip width.

Example 102. The method of example 101, wherein the first strip width is not equal to the second strip width and the first strip width is not equal to the third strip width.

Example 103. The method of example 101, wherein a greatest strip width of the first strip width, the second strip width, and the third strip width, is at least 10% greater than a smallest strip width of the first strip width, the second strip width, and the third strip width.

Example 104. The method of example 103, wherein the greatest strip width is at least 20% greater than the smallest strip width.

Example 105. The method of example 104, wherein the greatest strip width is at least 30% greater than the smallest strip width.

Example 106. The method of example 101, wherein a greatest strip width of the first strip width, the second strip width, and the third strip width, is no more than 300% of a smallest strip width of the first strip width, the second strip width, and the third strip width.

Example 107. The method of example 106, wherein the greatest strip width is no more than 250% of the smallest strip width.

Example 108. The method of example 107, wherein the greatest strip width is no more than 200% of the smallest strip width.

Example 109. The method of example 108, wherein the greatest strip width is no more than 150% of the smallest strip width.

Example 110. The method of any one of examples 4, 14, 23, 29, 93, or 101, wherein at least one of the first strip width, the second strip width, and the third strip width varies from a minimum strip width to a maximum strip width.

Example 111. The method of example 110, wherein the maximum strip width is at least 10% greater than the minimum strip width.

Example 112. The method of example 111, wherein the maximum strip width is at least 20% greater than the minimum strip width.

Example 113. The method of example 112, wherein the maximum strip width is at least 30% greater than the minimum strip width.

Example 114. The method of example 113, wherein the maximum strip width is at least 40% greater than the minimum strip width.

Example 115. The method of example 110, wherein the maximum strip width is no more than 400% of the minimum strip width.

Example 116. The method of example 115, wherein the maximum strip width is no more than 350% of the minimum strip width.

Example 117. The method of example 116, wherein the maximum strip width is no more than 300% of the minimum strip width.

Example 118. The method of example 117, wherein the maximum strip width is no more than 250% of the minimum strip width.

Example 119. The method of example 118, wherein the maximum strip width is no more than 150% of the minimum strip width.

Example 120. The method of example 119, wherein the maximum strip width is no more than 125% of the minimum strip width.

Example 121. The method of any one of examples 4, 14, 23, 29, 93, 101, or 110, wherein at least one of the first elongated strip, the second elongated strip, and the third elongated strip has a first longitudinal side edge that includes a curvilinear portion.

Example 122. The method of example 21, wherein the first elongated strip, the second elongated strip, and the third elongated having the first longitudinal side edge with the curvilinear portion also has a second longitudinal side edge that includes a curvilinear portion.

Example 123. The method of any one of examples 4, 14, 23, 29, 93, 101, 110, or 121, wherein the first non-cluster panel has a first panel centroid.

Example 124. The method of example 123, wherein the second strip longitudinal axis crosses the first strip longitudinal axis at a first intersection point that is offset from the first panel centroid by a first offset distance.

Example 125. The method of example 124, wherein the first offset distance is at least 10% of at least one of the first strip width and the second strip width.

Example 126. The method of example 125, wherein the first offset distance is at least 15% of at least one of the first strip width and the second strip width.

Example 127. The method of example 124, wherein the first offset distance is no more than 300% of at least one of the first strip width and the second strip width.

Example 128. The method of example 127, wherein the first offset distance is no more than 250% of at least one of the first strip width and the second strip width.

Example 129. The method of example 128, wherein the first offset distance is no more than 200% of at least one of the first strip width and the second strip width.

Example 130. The method of example 124, wherein the third strip longitudinal axis crosses the second strip longitudinal axis at a second intersection point that is offset from the first panel centroid by a second offset distance.

Example 131. The method of example 130, wherein the second offset distance is at least 25% of at least one of the second strip width and the third strip width.

Example 132. The method of example 131, wherein the second offset distance is at least 50% of at least one of the second strip width and the third strip width.

Example 133. The method of example 130, wherein the second offset distance is no more than 300% of at least one of the second strip width and the third strip width.

Example 134. The method of example 133, wherein the second offset distance is no more than 250% of at least one of the second strip width and the third strip width.

Example 135. The method of example 134, wherein the second offset distance is no more than 200% of at least one of the second strip width and the third strip width.

Example 136. The method of example 130, wherein the second intersection point aligns with the first intersection point.

Example 137. The method of example 130, wherein the second intersection point is offset from the first intersection point.

Example 138. The method of example 137, wherein the second offset distance is greater than the first offset distance.

Example 139. The method of example 138, wherein the second offset distance is at least 10% greater than the first offset distance.

Example 140. The method of example 139, wherein the second offset distance is at least 20% greater than the first offset distance.

Example 141. The method of example 138, wherein the second offset distance is no more than 200% greater than the first offset distance.

Example 142. The method of example 141, wherein the second offset distance is no more than 150% greater than the first offset distance.

Example 143. The method of example 142, wherein the second offset distance is no more than 100% greater than the first offset distance.

Example 144. The method of example 137, wherein the first offset distance is greater than the second offset distance.

Example 145. The method of example 144, wherein the first offset distance is at least 10% greater than the second offset distance.

Example 146. The method of example 145, wherein the first offset distance is at least 20% greater than the second offset distance.

Example 147. The method of example 144, wherein the first offset distance is no more than 200% greater than the second offset distance.

Example 148. The method of example 147, wherein the first offset distance is no more than 150% greater than the second offset distance.

Example 149. The method of example 148, wherein the first offset distance is no more than 100% greater than the second offset distance.

Example 150. The method of example 123, wherein the first panel perimeter is asymmetric.

Example 151. The method of example 150, wherein the second panel perimeter is asymmetric.

Example 152. The method of example 123, wherein the second non-cluster panel has a second panel centroid.

Example 153. The method of example 152, wherein the second panel centroid aligns with the first panel centroid.

Example 154. The method of example 152, wherein the second panel centroid is offset from the first panel centroid.

Example 155. The method of any one of examples 4, 14, 23, 29, 93, 101, 110, 121, or 123, further including the step of rotating the first non-cluster panel and the first elongated strip through a first predetermined angle prior to attaching the second elongated strip.

Example 156. The method of example 155, further including the step of rotating the first non-cluster panel, the first elongated strip, and the second elongated strip through a second predetermined angle prior to attaching the third elongated strip.

Example 157. The method of example 156, wherein the second predetermined angle is not equal to the first predetermined angle.

Example 158. The method of example 157, wherein the second predetermined angle is at least 25% greater than the first predetermined angle.

Example 159. The method of example 158, wherein the second predetermined angle is at least 35% greater than the first predetermined angle.

Example 160. The method of example 159, wherein the second predetermined angle is at least 45% greater than the first predetermined angle.

Example 161. The method of example 160, wherein the second predetermined angle is at least 55% greater than the first predetermined angle.

Example 162. The method of example 157, wherein the second predetermined angle is no more than 300% of the first predetermined angle.

Example 163. The method of example 162, wherein the second predetermined angle is no more than 250% of the first predetermined angle.

Example 164. The method of example 163, wherein the second predetermined angle is no more than 200% of the first predetermined angle.

Example 165. The method of example 163, wherein the second predetermined angle is no more than 175% of the first predetermined angle.

Example 166. The method of example 2, further including the step of rotating the first strip dispenser through a first predetermined angle prior to attaching the second elongated strip.

Example 167. The method of example 166, further including the step of rotating the first strip dispenser through a second predetermined angle prior to attaching the second elongated strip.

Example 168. The method of example 167, wherein the second predetermined angle is not equal to the first predetermined angle.

Example 169. The method of example 168, wherein the second predetermined angle is at least 25% greater than the first predetermined angle.

Example 170. The method of example 169, wherein the second predetermined angle is at least 35% greater than the first predetermined angle.

Example 171. The method of example 170, wherein the second predetermined angle is at least 45% greater than the first predetermined angle.

Example 172. The method of example 171, wherein the second predetermined angle is at least 55% greater than the first predetermined angle.

Example 173. The method of example 168, wherein the second predetermined angle is no more than 300% of the first predetermined angle.

Example 174. The method of example 173, wherein the second predetermined angle is no more than 250% of the first predetermined angle.

Example 175. The method of example 174, wherein the second predetermined angle is no more than 200% of the first predetermined angle.

Example 176. The method of example 175, wherein the second predetermined angle is no more than 175% of the first predetermined angle.

Example 177. The method of example 1, wherein the step of attaching the first elongated strip is performed by a first strip dispenser, and the step of attaching the second elongated strip is performed by a second strip dispenser.

Example 178. The method of example 177, wherein the step of attaching the third elongated strip is performed by a third strip dispenser.

Example 179. The method of example 3, further including the step of dispensing a portion of the first roll across a portion of the first non-cluster panel and cutting the first roll to separate it and leave the first elongated strip attached to the first non-cluster panel.

Example 180. The method of example 179, wherein the step of cutting the first roll further includes the step of forcing the first roll against a first blade.

Example 181. The method of example 180, further including the step of dispensing a portion of the first roll across a portion of the first non-cluster panel and cutting the first roll to separate it and leave the second elongated strip attached to the first non-cluster panel.

Example 182. The method of example 181, wherein the step of cutting the first roll and creating the second elongated strip further includes the step of forcing the first roll against a second blade.

Example 183. The method of example 182, further including the step of dispensing a portion of the first roll across a portion of the first non-cluster panel and cutting the first roll to separate it and leave the third elongated strip attached to the first non-cluster panel.

Example 184. The method of example 183, wherein the step of cutting the first roll and creating the third elongated strip further includes the step of forcing the first roll against a third blade.

Example 185. The method of example 184, wherein the first blade, the second blade, and the third blade are stationary and spaced apart around the first panel perimeter.

Example 186. The method of example 180, wherein the first blade includes a plurality of pointed tips, a plurality of individual angled blade sections, and a total quantity of the plurality of pointed tips is at least equal to a number of unidirectional fibers within the first roll and a total quantity of the plurality of individual angled blade sections is at least equal to a number of unidirectional fibers within the first roll.

Example 187. The method of example 3, further including the step of dispensing a portion of the first roll across a portion of the first non-cluster panel and cutting the first roll to separate it and leave the first elongated strip attached to the first non-cluster panel.

Example 188. The method of example 187, wherein the step of cutting the first roll further includes the step of drawing a blade across the first roll.

Example 189. The method of example 188, further including the step of dispensing a portion of the first roll across a portion of the first non-cluster panel and cutting the first roll to separate it and leave the second elongated strip attached to the first non-cluster panel.

Example 190. The method of example 189, wherein the step of cutting the first roll and creating the second elongated strip further includes the step of drawing the blade across the first roll.

Example 191. The method of example 190, further including the step of dispensing a portion of the first roll across a portion of the first non-cluster panel and cutting the first roll to separate it and leave the third elongated strip attached to the first non-cluster panel.

Example 192. The method of example 191, wherein the step of cutting the first roll and creating the third elongated strip further includes the step of drawing the blade across the first roll.

Example 193. The method of example 192, wherein the blade is attached to the first strip dispenser.

Example 194. The method of example 1, wherein the first elongated strip has a first quantity of longitudinal fibers that extend throughout the first strip length, the second elongated strip has a second quantity of longitudinal fibers that extend throughout the second strip length, and the third elongated strip has a third quantity of longitudinal fibers that extend throughout the third strip length, wherein at least two of the first quantity, the second quantity, and the third quantity are not equal.

Example 195. The method of example 194, wherein the each of the first quantity, the second quantity, and the third quantity are not equal.

Example 196. The method of example 1, wherein at least one of: the first elongated strip has a first resin content, the second elongated strip has a second resin content, and the third elongated strip has a third resin content, wherein at least two of the first resin content, the second resin content, and the third resin content are not equal; or the first non-cluster panel has a first panel resin content, the first elongated strip has a first strip resin content, the second elongated strip has a second strip resin content, and the third elongated strip has a third strip resin content, wherein the first panel resin content is different than at least one of the first strip resin content, the second strip resin content, and the third strip resin content.

Example 197. The method of example 1, further including the step of curing the first non-cluster panel, the cluster panel, and the second non-cluster panel to form a strike-plate preform having a preform front surface, a preform perimeter, a preform length, a preform width, and a preform first side surface area.

Example 198. The method of example 197, further including the step of cutting a strike plate from the strike-plate preform, wherein the strike plate has strike plate front surface, a strike plate center point, a strike plate perimeter, a strike plate length, a strike plate width, a strike plate bulge, a strike plate roll, a strike plate thickness, and a strike plate first side surface area, wherein the strike plate length is a longest dimension of the strike plate within the strike plate perimeter and the strike plate width is a dimension within the strike plate perimeter, passing through the strike plate center point, and perpendicular to the strike plate length.

Example 199. The method of example 198, wherein the preform length is at least 3% greater than the strike plate length, the preform width is at least 5% greater than the strike plate width, and the preform first side surface area is not more than 200% of the strike plate first side surface area.

Example 200. The method of example 199, wherein the preform length is no more than 50% greater than the strike plate length, the preform width is no more than 75% greater than the strike plate width, and the preform first side surface area is at least 110% of the strike plate first side surface area.

Example 201. The method of example 200, wherein the preform length is no more than 30% greater than the strike plate length, the preform width is no more than 60% greater than the strike plate width, and the preform first side surface area is at least 120% of the strike plate first side surface area.

Example 202. The method of example 201, wherein the preform length is no more than 20% greater than the strike plate length, the preform width is no more than 45% greater than the strike plate width, and the preform first side surface area is at least 130% of the strike plate first side surface area.

Example 203. The method of example 198, wherein the strike plate perimeter is entirely within the preform perimeter, and the strike-plate preform includes a transition region around at least a predetermined offset percentage of the strike plate perimeter such that at least the predetermined offset percentage of the strike plate perimeter on the strike plate front surface is offset by at least a predetermined offset distance from a portion of the preform front surface, and the predetermined offset distance is at least 20% of the strike plate thickness and the predetermined offset percentage is at least 50%, wherein the offset distance is measured parallel to the strike plate thickness.

Example 204. The method of example 203, wherein the predetermined offset distance is at least 40% of the strike plate thickness, and the predetermined offset percentage is at least 60%.

Example 205. The method of example 204, wherein the predetermined offset distance is at least 60% of the strike plate thickness, and the predetermined offset percentage is at least 70%.

Example 206. The method of example 203, wherein the predetermined offset distance is no more than 400% of the strike plate thickness, and the predetermined offset percentage is at least 60%.

Example 207. The method of example 206, wherein the predetermined offset distance is no more than 350% of the strike plate thickness, and the predetermined offset percentage is at least 70%.

Example 208. The method of example 207, wherein the predetermined offset distance is no more than 300% of the strike plate thickness, and the predetermined offset percentage is at least 80%.

Example 209. The method of example 208, wherein the predetermined offset distance is no more than 250% of the strike plate thickness, and the predetermined offset percentage is at least 90%.

Example 210. The method of example 209, wherein the predetermined offset distance is no more than 200% of the strike plate thickness, and the predetermined offset percentage is 100%.

Example 211. The method of example 203, wherein the predetermined offset distance is no more than 10% of the strike plate bulge, and the predetermined offset percentage is at least 60%.

Example 212. The method of example 211, wherein the predetermined offset distance is no more than 10% of the strike plate roll, and the predetermined offset percentage is at least 70%.

Example 213. The method of example 197, further including the step of creating a polymeric material layer on at least a portion of the strike-plate preform, wherein the polymeric material layer creates at least a portion of the preform front surface and has a polymeric material layer thickness.

Example 214. The method of example 213, wherein the polymeric material layer thickness is constant.

Example 215. The method of example 213, wherein the polymeric material layer thickness varies from 0.03 mm to 0.70 mm.

Example 216. The method of example 213, wherein the polymeric material layer thickness varies from 0.0001 mm to 2.5 mm and the polymer material forms at least a portion of the bulge and roll of the multi-layer composite face.

Example 217. The method of example 213, wherein the polymeric material layer attaches to a surface on a cured portion of the preform and the surface of the cured portion of the preform is flat and the polymeric material layer thickness varies from 0.0001 mm to 2.5 mm and the polymer material forms at least a portion of the bulge and roll of the multi-layer composite face.

Example 218. The method of example 213, wherein the polymeric material layer attaches to a surface on a cured portion of the preform and the surface of the cured portion of the preform is curved and the polymeric material layer thickness varies from 0.0001 mm to 2.5 mm and the polymer material forms at least 10% of the bulge and roll of the multi-layer composite face and the cured portion of the preform prior to attaching the polymeric material layer forms at least 10% of the bulge and roll of the multi-layer composite face.

Example 219. The method of example 213, wherein the polymeric material layer thickness varies from a minimum polymeric material layer thickness to a maximum polymeric material thickness that is at least 10% greater than the minimum polymeric material layer thickness.

Example 220. The method of example 203, wherein the transition region has a transition region perimeter, and at least 50% of the transition region perimeter is substantially parallel with the strike plate perimeter and radially offset from the strike plate perimeter by a transition offset distance that is at least as great as 50% of the strike plate thickness.

Example 221. The method of example 220, wherein the transition offset distance is at least as great as the strike plate thickness.

Example 222. The method of example 221, wherein the transition offset distance is no more than 600% of the strike plate thickness.

Example 223. The method of example 222, wherein the transition offset distance is no more than 500% of the strike plate thickness.

Example 224. The method of example 223, wherein the transition offset distance is no more than 400% of the strike plate thickness.

Example 225. The method of example 224, wherein the transition offset distance is no more than 300% of the strike plate thickness.

Example 226. The method of example 198, wherein the strike-plate preform has a preform mass and the strike plate has a plate mass and the plate mass is at least 55% of the preform mass.

Example 227. The method of example 226, wherein the plate mass is at least 60% of the preform mass.

Example 228. The method of example 227, wherein the plate mass is at least 65% of the preform mass.

Example 229. The method of example 228, wherein the plate mass is at least 70% of the preform mass.

Example 230. The method of example 226, wherein the plate mass is no more than 95% of the preform mass.

Example 231. The method of example 230, wherein the plate mass is no more than 90% of the preform mass.

Example 232. The method of example 223, wherein the plate mass is no more than 85% of the preform mass.

Example 233. The method of example 232, wherein the plate mass is no more than 80% of the preform mass.

Example 234. The method of example 233, wherein the plate mass is no more than 75% of the preform mass.

Example 235. A golf club face comprising: a first rough surface and a second rough surface, wherein a roughness of the first rough surface is greater than a roughness of the second rough surface; and a protective layer covering at least a portion of the first rough surface, wherein the protective coating is capable of preventing an adhesive from touching the first rough surface.

Example 236. The golf club face according to example 235, wherein the protective layer does not cover any portion of the second rough surface.

Example 237. A method for making a component of a golf club head, the method comprising: retaining a component of the golf club head to a mold, wherein the component comprises first retention features; and the mold comprises second retention features, and wherein retaining the component of the golf club head to the mold comprises engaging each one of the first retention features to a corresponding one of the second retention features.

Example 238. The method according to example 237, wherein one of the first retention features are openings and the second retention features are protrusions; or the first retention features are protrusions and the second retention features are openings.

Example 239. The method according to example 237, the first retention features and the second retention features are engaged with a friction fit.

Example 240. A method of creating a multi-layer composite face, the method comprising positioning a first non-cluster panel having a first panel perimeter, a first panel width, a first panel length, a first panel thickness, a first panel longitudinal axis, and a first panel transverse axis; creating and attaching a second non-cluster panel to the first non-cluster panel, wherein the second non-cluster panel has a second panel perimeter, a second panel width, a second panel length, a second panel thickness, a second panel longitudinal axis, and a second panel transverse axis; creating and attaching a cluster panel to the second non-cluster panel. Creating and attaching comprises attaching a first elongated strip to the second non-cluster panel at a first strip angle relative to the second panel longitudinal axis, wherein the first elongated strip has a first strip width, a first strip length, a first strip thickness, and a first strip longitudinal axis; attaching a second elongated strip to a portion of the first elongated strip and a portion of the second non-cluster panel at a second strip angle relative to the first panel longitudinal axis, wherein the second elongated strip has a second strip width, a second strip length, a second strip thickness, and a second strip longitudinal axis; and attaching a third elongated strip to a portion of the second elongated strip, and a portion of the second non-cluster panel at a third strip angle relative to the first panel longitudinal axis, wherein the third elongated strip has a third strip width, a third strip length, a third strip thickness, and a third strip longitudinal axis, wherein the cluster panel forms a rear surface of the multi-layer composite face.

Example 241. The method according to example 240, wherein the first non-cluster panel and the second non-cluster panel comprise a thermoplastic resin.

Example 242. The method according to example 241, wherein the cluster panel comprises a thermoplastic resin.

Example 243. The method according to example 242, wherein the cluster panel comprises a thermoplastic resin and at least the first, second, and third elongated strips are heated above 30 degrees Celsius during attachment.

Example 244. A method of creating a multi-layer composite face, the method comprising: positioning a first non-cluster panel having a first panel perimeter, a first panel width, a first panel length, a first panel thickness, a first panel longitudinal axis, and a first panel transverse axis and creating and attaching a cluster panel to the first non-cluster panel. Creating and attaching comprises attaching a first elongated strip to the first non-cluster panel at a first strip angle relative to the second panel longitudinal axis, wherein the first elongated strip has a first strip width, a first strip length, a first strip thickness, and a first strip longitudinal axis; attaching a second elongated strip to a portion of the first elongated strip and a portion of the first non-cluster panel at a second strip angle relative to the first panel longitudinal axis, wherein the second elongated strip has a second strip width, a second strip length, a second strip thickness, and a second strip longitudinal axis; and attaching a third elongated strip to a portion of the second elongated strip, and a portion of the first non-cluster panel at a third strip angle relative to the first panel longitudinal axis, wherein the third elongated strip has a third strip width, a third strip length, a third strip thickness, and a third strip longitudinal axis, wherein the cluster panel forms a rear surface of the multi-layer composite face.

Example 245. The method according to example 244, wherein the first non-cluster panel is an injection molded thermoplastic.

Example 246. The method according to example 244, wherein the cluster panel comprises a thermoplastic resin.

Example 247. A method of removing a backing layer from a panel, made of an uncured pre-impregnated fiber-reinforced polymer, wherein the backing layer is secured to, via a tack force between the backing layer and the uncured pre-impregnated fiber-reinforced polymer, and flush against a broad surface of the panel, the method comprising steps of orienting the panel into a backing-separation orientation relative to an edge-engagement tool; positioning the panel into a backing-separation position relative to the edge-engagement tool; moving the edge-engagement tool, relative to the panel and when the panel is in the backing-separation orientation and the backing-separation position, so that backing-engagement features of the edge-engagement tool engage the backing layer, at only an edge portion of the backing layer, and just the edge portion of the backing layer separates from the panel; and gripping the backing layer, after the edge portion separates from the panel, and, when gripped, moving the backing layer relative to the panel so that an entirety of the backing layer separates from the panel. The edge-engagement tool comprises a plate and the backing-engagement features comprise a plurality of protrusions protruding from the plate. The step of moving the edge-engagement tool comprises reciprocating the plate along a plane, angled at a plate angle relative to the panel and parallel with a leading edge of the edge portion, when the panel is oriented in the backing-separation orientation and positioned in the backing-separation position, so that only the plurality of protrusions of the plate engage only the edge portion of the backing layer when the plate moves along the plane.

Example 248. The method according to example 247, wherein gripping the backing layer comprises applying a suction force to the backing layer.

Example 249. The method according to example 248, wherein the suction force is applied to the backing layer at a location on the backing layer other than the edge portion of the backing layer separated from the panel.

Example 250. The method according to example 248, wherein the suction force is applied to the backing layer via a vacuum device, and wherein the vacuum device is movable, relative to the panel, to move the backing layer relative to the panel so that an entirety of the backing layer separates from the panel.

Example 251. The method according to example 247, further comprising applying a second suction force to the panel, wherein the second suction force is greater than the suction force applied to the backing layer.

Example 252. The method according to example 251, wherein the second suction force is applied to the panel via a vacuum device, and wherein the vacuum device is movable relative to a second panel to move the panel onto the second panel.

Example 253. A strike-plate preform for manufacturing a golf club head, wherein the strike-plate preform comprises a variable thickness; a base surface that defines a bulge and a roll of a strike face of the golf club head; a first layer of paint applied onto the base surface over a first surface area of the base surface; a second layer of paint applied onto at least one of the base surface and the first layer of paint, wherein the second layer of paint is applied over a second surface area of the base surface; a third layer of paint applied onto at least one of the base surface, the first layer of paint, or the second layer of paint, wherein the second layer of paint is applied over a third surface area of the base surface, and wherein each one of the first surface area and the second surface area is larger than the third surface area; and a polymer coating applied over the base surface, the first layer of paint, the second layer of paint, and the third layer of paint, wherein the polymer coating defines an exterior surface of the strike-plate preform, wherein the polymer coating comprises a plurality of peaks and troughs formed in the exterior surface, and wherein the plurality of peaks and troughs define a surface roughness of the exterior surface of the strike-plate preform with an Ra value between, and inclusive of, 2.5 µm and 5 µm. The strike-plate preform defines a strike face of the golf club head, the strike face has a fourth surface area, which is less than the first surface area and the second surface area; and the polymer coating has a variable thickness and a maximum thickness between 0.2 mm and 1.2 mm.

Example 254. The strike-plate preform according to example 253, wherein the polymer coating is at least translucent such that at least a portion of at least one of the base surface, the first layer of paint, the second layer of paint, and the third layer of paint is visible through the polymer coating.

Example 255. The strike-plate preform according to example 253, wherein the strike-plate preform comprises between, and inclusive of, 40 and 80 layers of material.

Example 256. The strike-plate preform according to example 253, wherein a thickness of a portion of the strike-plate preform that defines the strike face of the golf club head is between, and inclusive of, 3.2 mm and 6.0 mm.

Example 257. The strike-plate preform according to example 253, wherein the strike-plate preform comprises a plurality of cluster panels each comprising a plurality of overlapping elongated strips of material.

Example 258. The strike-plate preform according to example 257, wherein the plurality of overlapping elongated strips of material of each one of the plurality of cluster panels intersect each other at an intersection point; and the intersection point is shifted away from a geometric center of the strike face of the golf club head, toward a toe portion of the strike face of the golf club head, by a distance between, and inclusive of, 10% and 100% of a minimum width of each one of the overlapping elongated strips of material.

Example 259. The strike-plate preform according to example 257, wherein the plurality of overlapping elongated strips of material of each one of the plurality of cluster panels intersect each other at an intersection point; and the intersection point is shifted away from a geometric center of the strike-plate preform, toward a toe portion of the strike face of the golf club head, by a distance between, and inclusive of, 10% and 100% of a minimum width of each one of the overlapping elongated strips of material.

Although in some examples, the methods disclosed herein may be performed manually, in other examples, the methods are automated. As used herein, automated means operated at least partially by automatic equipment, such as computer-numerically-controlled (CNC) machines. In some examples, as shown in FIGS. 13, 14, and 25, the automated system 100 includes an electronic controller 103. The automatic equipment of the automated system 100, which, in certain examples, can include the edge-engagement tools, grippers, robotic arms, rotatable platforms, and other manufacturing tools disclosed herein, is controlled by the electronic controller 103. Moreover, any movement or operation of the features of the automated system 100 disclosed herein can be enabled by various movement-enabling automatic equipment, such as actuators (e.g., motors, cylinders, gears, rails, etc.), powered by electrical, pneumatic, magnetic, or hydraulic, means.

The electronic controller 103 may be implemented as a hardware circuit comprising custom VLSI circuits or gate arrays, off-the-shelf semiconductors such as logic chips, transistors, or other discrete components. The electronic controller 103 may also be implemented in programmable hardware devices such as field programmable gate arrays, programmable array logic, programmable logic devices or the like.

The electronic controller 103 may also be implemented in code and/or software for execution by various types of processors. An identified module of code may, for instance, comprise one or more physical or logical blocks of executable code which may, for instance, be organized as an object, procedure, or function. Nevertheless, the executables of the electronic controller 103 need not be physically located together, but may comprise disparate instructions stored in different locations which, when joined logically together, comprise the electronic controller 103 and achieve the stated purpose for the electronic controller.

Indeed, code of the electronic controller 103 may be a single instruction, or many instructions, and may even be distributed over several different code segments, among different programs, and across several memory devices. Similarly, operational data may be identified and illustrated herein within the electronic controller 103, and may be embodied in any suitable form and organized within any suitable type of data structure. The operational data may be collected as a single data set, or may be distributed over different locations including over different computer readable storage devices. Where the electronic controller 103 or portions of the electronic controller are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the examples are described above with reference to schematic flowchart diagrams and/or schematic block diagrams of methods, apparatuses, systems, and program products according to examples. It will be understood that each block of the schematic flowchart diagrams and/or schematic block diagrams, and combinations of blocks in the schematic flowchart diagrams and/or schematic block diagrams, can be implemented by code. These code may be provided to a processor of the electronic controller 103, which can be a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two." Moreover, unless otherwise noted, as defined herein a plurality of particular features does not necessarily mean every particular feature of an entire set or class of the particular features.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. A strike-plate preform for a golf club head, wherein the strike-plate preform comprises:
    a variable thickness;
    a base surface that defines a bulge and a roll of a strike face of the golf club head;
    a first layer of paint applied onto the base surface over a first surface area of the base surface;
    a second layer of paint applied onto at least one of the base surface and the first layer of paint, wherein the second layer of paint is applied over a second surface area of the base surface;
    a third layer of paint applied onto at least one of the base surface, the first layer of paint, or the second layer of paint, wherein the second layer of paint is applied over a third surface area of the base surface, and wherein each one of the first surface area and the second surface area is larger than the third surface area; and
    a polymer coating applied over the base surface, the first layer of paint, the second layer of paint, and the third layer of paint, wherein the polymer coating defines an exterior surface of the strike-plate preform, wherein the polymer coating comprises a plurality of peaks and troughs formed in the exterior surface, and wherein the plurality of peaks and troughs define a surface roughness of the exterior surface of the strike-plate preform with an Ra value between, and inclusive of, 2.5 μm and 5 μm,
    wherein:
        the strike-plate preform defines a strike face of the golf club head;
        the strike face has a fourth surface area, which is less than the first surface area and the second surface area;
        the polymer coating has a variable thickness and a maximum thickness between 0.2 mm and 1.2 mm; and
        the polymer coating is at least translucent such that at least a portion of at least one of the base surface, the first layer of paint, the second layer of paint, and the third layer of paint is visible through the polymer coating.

2. The strike-plate preform according to claim 1, wherein the strike-plate preform comprises between, and inclusive of, 40 and 80 layers of material.

3. The strike-plate preform according to claim 1, wherein a thickness of a portion of the strike-plate preform that defines the strike face of the golf club head is between, and inclusive of, 3.2 mm and 6.0 mm.

4. The strike-plate preform according to claim 1, wherein the strike-plate preform comprises a plurality of cluster panels each comprising a plurality of overlapping elongated strips of material.

5. The strike-plate preform according to claim 4, wherein:
    the plurality of overlapping elongated strips of material of each one of the plurality of cluster panels intersect each other at an intersection point; and
    the intersection point is shifted away from a geometric center of the strike face of the golf club head, toward a toe portion of the strike face of the golf club head, by a distance between, and inclusive of, 10% and 100% of a minimum width of each one of the overlapping elongated strips of material.

6. The strike-plate preform according to claim 4, wherein:
    the plurality of overlapping elongated strips of material of each one of the plurality of cluster panels intersect each other at an intersection point; and
    the intersection point is shifted away from a geometric center of the strike-plate preform, toward a toe portion of the strike face of the golf club head, by a distance between, and inclusive of, 10% and 100% of a minimum width of each one of the overlapping elongated strips of material.

7. The strike-plate preform according to claim 4, wherein each one of the plurality of cluster panels comprises a thermoplastic resin.

8. The strike-plate preform according to claim 7, wherein the plurality of overlapping elongated strips of material of each one of the plurality of cluster panels comprises at least first, second, and third elongated strips.

9. The strike-plate preform according to claim 8, wherein the first, second, and third elongated strips are heated above 30 degrees Celsius during attachment.

10. The strike-plate preform according to claim 8, wherein the strike-plate preform comprises at least a first non-cluster panel and a second non-cluster panel.

11. The strike-plate preform according to claim 10, wherein each one of the first non-cluster panel and the second non-cluster panel comprises a thermoplastic resin.

12. The strike-plate preform according to claim 11, wherein at least one of the plurality of cluster panels is interposed between the first non-cluster panel and the second non-cluster panel.

13. The strike-plate preform according to claim 11, wherein at least one of the plurality of cluster panels forms a rear surface the strike-plate preform.

14. The strike-plate preform according to claim 4, wherein:
- the strike-plate preform has a strike-plate preform front surface, a strike-plate preform perimeter, a strike-plate preform length, a strike-plate preform width, and a strike-plate preform first side surface area;
- material is removed from the strike-plate preform to form the strike face of the golf club head;
- the strike face has a strike face front surface, a strike face center point, a strike face perimeter, a strike face length, a strike face width, a strike face thickness, and a strike face first side surface area; and
- the strike face length is a longest dimension of the strike face within the strike face perimeter and the strike face width is a dimension within the strike face perimeter that passes through the strike face center point and is perpendicular to the strike face length.

15. The strike-plate preform according to claim 14, wherein material is removed from the perimeter of the strike-plate preform to form the strike face of the golf club head.

16. The strike-plate preform according to claim 14, wherein the strike-plate preform length is at least 3% greater than the strike face length, the strike-plate preform width is at least 5% greater than the strike face width, and the strike-plate preform first side surface area is not more than 200% of the strike face first side surface area.

17. The strike-plate preform according to claim 16, wherein the strike-plate preform length is no more than 50% greater than the strike face length, the strike-plate preform width is no more than 75% greater than the strike face width, and the strike-plate preform first side surface area is at least 110% of the strike face first side surface area.

18. The strike-plate preform according to claim 17, wherein the strike-plate preform length is no more than 30% greater than the strike face length, the strike-plate preform width is no more than 60% greater than the strike face width, and the strike-plate preform first side surface area is at least 120% of the strike face first side surface area.

19. The strike-plate preform according to claim 15, wherein the strike face perimeter is entirely within the strike-plate preform perimeter.

20. The strike-plate preform according to claim 10, wherein the first non-cluster panel is an injection molded thermoplastic.

21. The strike-plate preform according to claim 10, wherein the second non-cluster panel is attached to a rear surface of the first non-cluster panel.

22. The strike-plate preform according to claim 10, wherein none of the plurality of cluster panels are interposed between the first non-cluster panel and the second non-cluster panel.

\* \* \* \* \*